US012706938B1

(12) United States Patent
Estrada et al.

(10) Patent No.: US 12,706,938 B1
(45) Date of Patent: Aug. 11, 2026

(54) LATENT SPACE FUSION SYSTEM FOR CROSS-DOMAIN THREAT DETECTION AND STRATEGIC DETERRENCE

(71) Applicant: GRVTY, Inc., Arlington, VA (US)

(72) Inventors: Adam Estrada, Reston, VA (US); Matt Flure, Barboursville, VA (US); Dave Rabrun, Rockville, MD (US); Terry Hurlburt, Aurora, CO (US); Kristen E. Mistysyn, Erie, CO (US); Nicholas Stephens, Thornton, CO (US); Michael Ludlam, Tampa, FL (US); Aaron Tirrell, Avinger, TX (US); Jacob Young, Woodbridge, VA (US); Tina Agarwal, Ashburn, VA (US)

(73) Assignee: GRVTY, INC., Arlington, VA (US)

( * ) Notice: Subject to any disclaimer, the term of this patent is extended or adjusted under 35 U.S.C. 154(b) by 0 days.

(21) Appl. No.: 19/225,368

(22) Filed: Jun. 2, 2025

Related U.S. Application Data

(63) Continuation-in-part of application No. 19/224,859, filed on Jun. 1, 2025, which is a continuation-in-part (Continued)

(51) Int. Cl.

| | |
|---|---|
| ***H04L 29/06*** | (2006.01) |
| ***G06F 18/25*** | (2023.01) |
| ***H04L 9/40*** | (2022.01) |

(52) U.S. Cl.
CPC .......... *H04L 63/1425* (2013.01); *G06F 18/25* (2023.01); *H04L 63/1433* (2013.01); *H04L 63/1441* (2013.01)

(58) Field of Classification Search
CPC ............. H04L 63/1425; H04L 63/1416; H04L 63/1433; H04L 63/1441; H04L 63/1408; H04L 63/30; G06F 18/25
See application file for complete search history.

(56) References Cited

U.S. PATENT DOCUMENTS 10,387,728 B2 8/2019 Arya et al.
10,839,211 B2 11/2020 Reinstein et al.

(Continued)

*Primary Examiner* — Yogesh Paliwal
(74) *Attorney, Agent, or Firm* — GALVIN PATENT LAW LLC; Brian R. Galvin; Erin L. Johnston

(57) ABSTRACT

A system is disclosed for generating a common intelligence picture through latent space fusion and threat forecasting. Priority intelligence requirements are processed using language and machine learning models to generate structured tasking and prioritize multi-modal sensor collection. Data from geospatial, cyber, radio frequency, and behavioral sources is embedded into domain-specific representations and fused into a unified latent space. The system models behavioral trajectories, detects anomalies, and maintains digital twins of entities and regions. Deviations from expected behavior may trigger alerts, causal inference, attribution hypotheses, and deterrence simulations. Adversary behavior is forecast in latent space, enabling evaluation of intervention strategies with impact and timing assessments. Visualizations, alerts, and reports are generated based on latent divergence and simulation outputs. The architecture supports multi-phase operations—tasking, processing, analysis, and feedback—while remaining compatible with ISR systems and command-level interfaces.

20 Claims, 46 Drawing Sheets

Related U.S. Application Data of application No. 19/063,602, filed on Feb. 26, 2025, now Pat. No. 12,488,225, which is a continuation-in-part of application No. 19/048,902, filed on Feb. 8, 2025.

(56) References Cited

U.S. PATENT DOCUMENTS

| | | | | |
|---|---|---|---|---|
| 11,189,032 | B2 | 11/2021 | Ma et al. | |
| 11,256,916 | B2 | 2/2022 | She et al. | |
| 11,423,785 | B2 | 8/2022 | Fridman et al. | |
| 11,526,723 | B2 | 12/2022 | Yang et al. | |
| 11,544,832 | B2 | 1/2023 | Lowe et al. | |
| 11,694,354 | B2 | 7/2023 | Strong | |
| 12,417,214 | B1 * | 9/2025 | Zhang | G06F 40/205 |
| 2010/0017870 | A1 * | 1/2010 | Kargupta | H04L 63/1408 709/201 |
| 2021/0295546 | A1 | 9/2021 | He et al. | |
| 2021/0319370 | A1 | 10/2021 | Schneider | |
| 2022/0091607 | A1 | 3/2022 | Zang | |
| 2022/0095114 | A1 * | 3/2022 | Bishop | H04W 12/121 |
| 2023/0056136 | A1 * | 2/2023 | Webber | G06Q 10/103 |
| 2023/0146181 | A1 | 5/2023 | Meshkin et al. | |
| 2024/0031846 | A1 | 1/2024 | Mengwasser et al. | |
| 2025/0141912 | A1 * | 5/2025 | Hill | H04L 63/1433 |
| 2025/0175456 | A1 * | 5/2025 | Crabtree | G06F 16/909 |
| 2025/0259082 | A1 * | 8/2025 | Crabtree | G06N 3/047 |

* cited by examiner

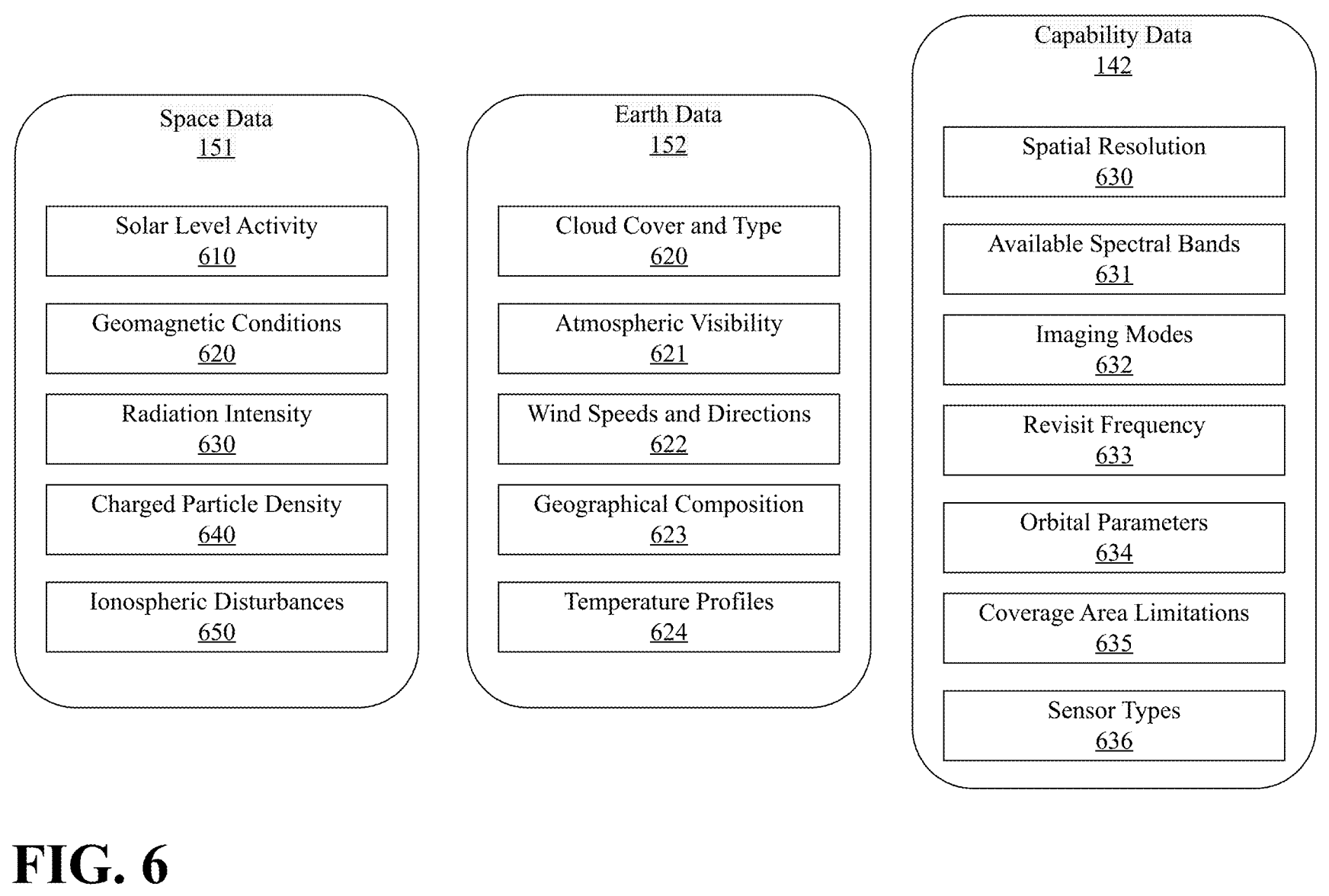

Space Data
151

Solar Level Activity
610

Geomagnetic Conditions
620

Radiation Intensity
630

Charged Particle Density
640

Ionospheric Disturbances
650

Earth Data
152

Cloud Cover and Type
620

Atmospheric Visibility
621

Wind Speeds and Directions
622

Geographical Composition
623

Temperature Profiles
624

Capability Data
142

Spatial Resolution
630

Available Spectral Bands
631

Imaging Modes
632

Revisit Frequency
633

Orbital Parameters
634

Coverage Area Limitations
635

Sensor Types
636

FIG. 6

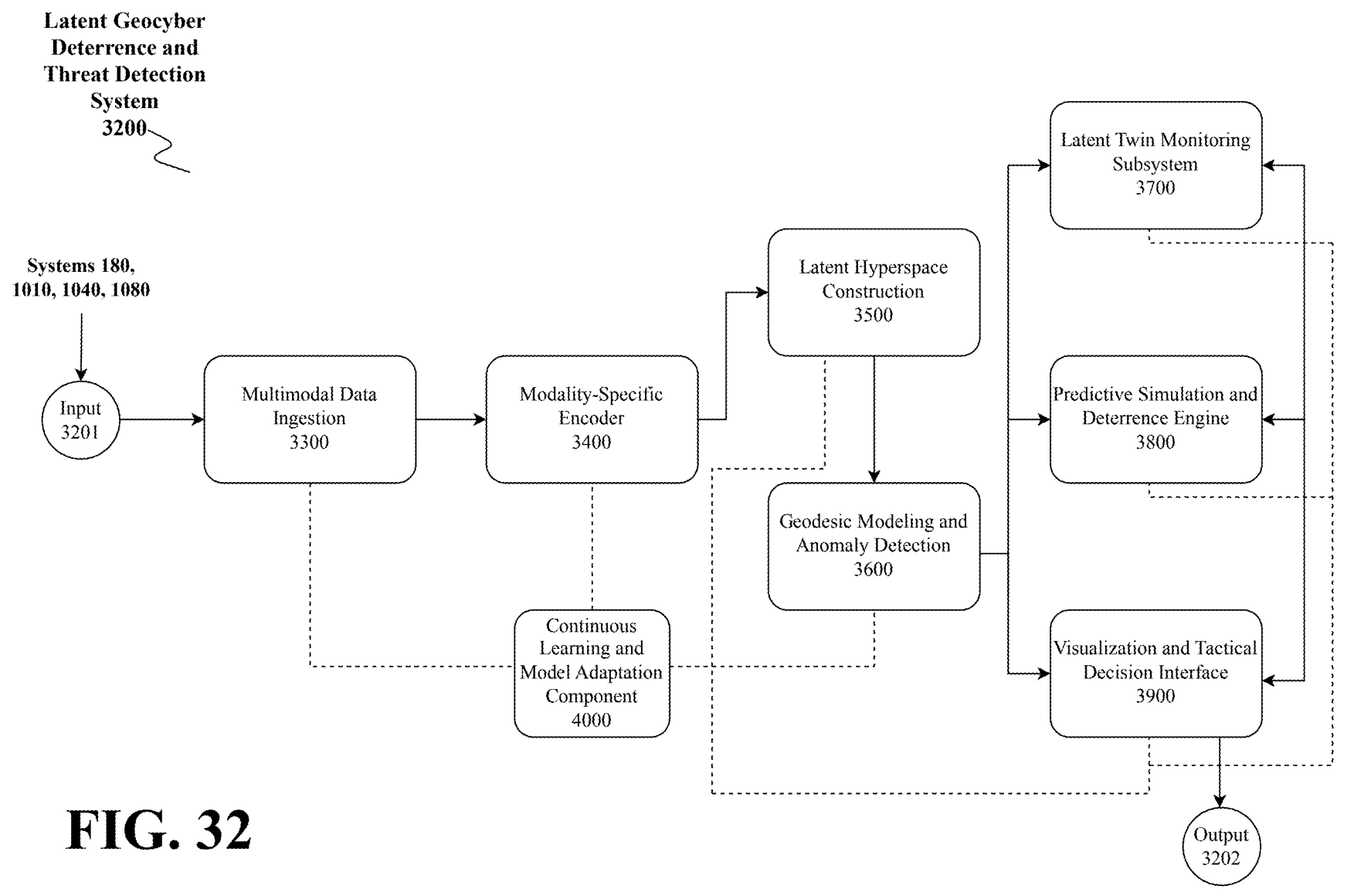

Latent Geocyber Deterrence and Threat Detection System 3200

Systems 180, 1010, 1040, 1080

Input 3201

Multimodal Data Ingestion 3300

Modality-Specific Encoder 3400

Latent Hyperspace Construction 3500

Geodesic Modeling and Anomaly Detection 3600

Latent Twin Monitoring Subsystem 3700

Predictive Simulation and Deterrence Engine 3800

Visualization and Tactical Decision Interface 3900

Continuous Learning and Model Adaptation Component 4000

Output 3202

FIG. 32

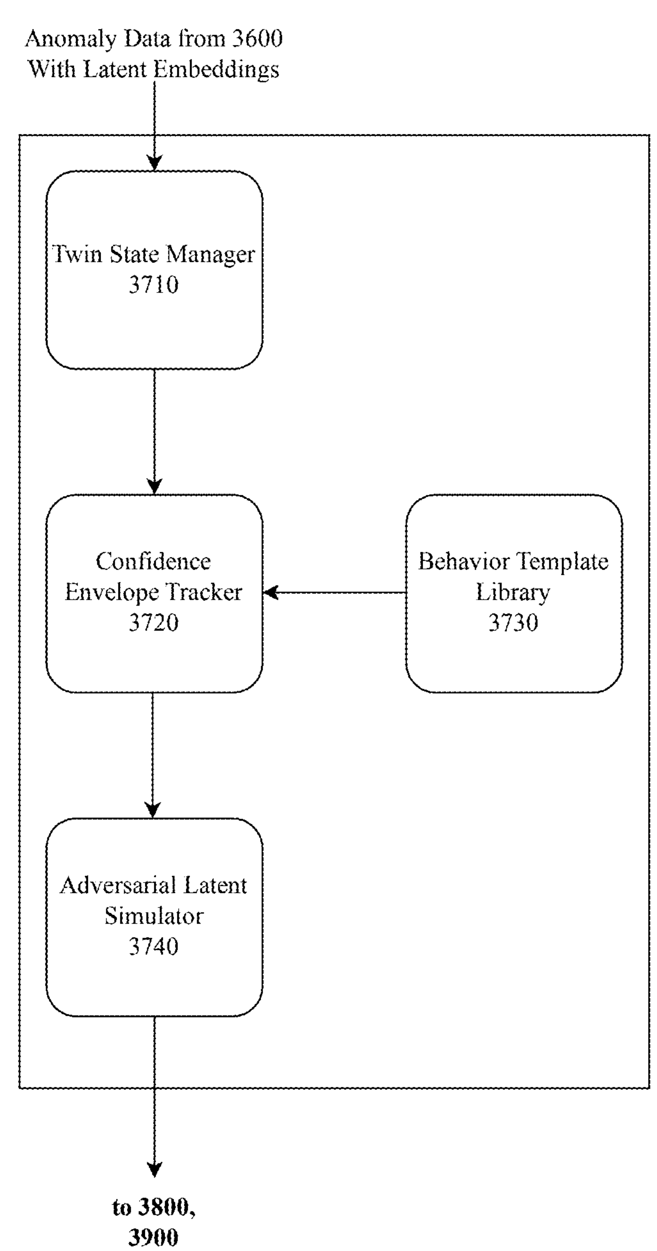
FIG. 37

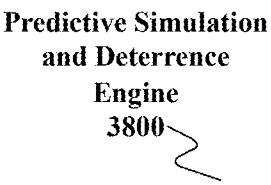
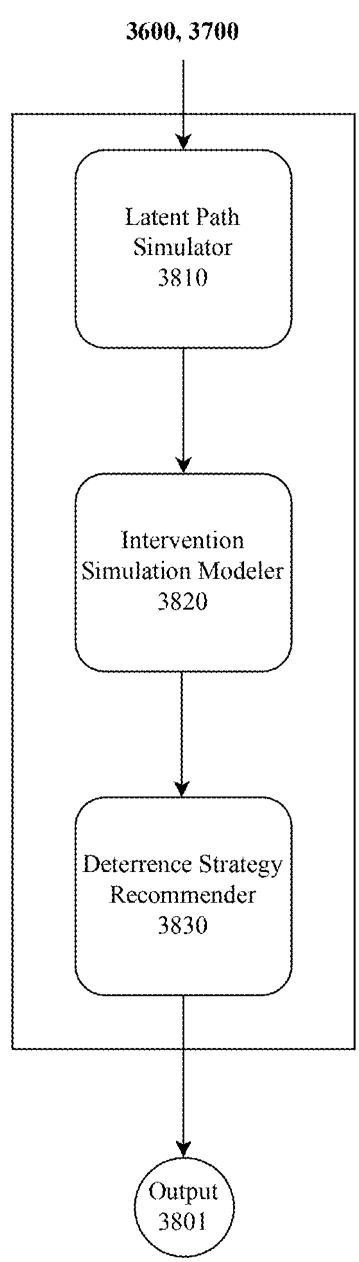
FIG. 38

LATENT SPACE FUSION SYSTEM FOR CROSS-DOMAIN THREAT DETECTION AND STRATEGIC DETERRENCE

CROSS-REFERENCE TO RELATED APPLICATIONS

Priority is claimed in the application data sheet to the following patents or patent applications, each of which is expressly incorporated herein by reference in its entirety:
Ser. No. 19/224,859
Ser. No. 19/063,602
Ser. No. 19/048,902

BACKGROUND OF THE INVENTION

Field of the Art

The present invention relates to intelligence analysis systems, and more particularly to modular architectures for generating and maintaining a common intelligence picture through automated ingestion, correlation, and latent space fusion of multi-source intelligence data. The invention integrates campaign-based orchestration, spatiotemporal fusion, cross-domain latent space analysis, and predictive modeling to support identity continuity, behavioral assessment, threat forecasting, and dynamic tasking in multi-intelligence environments. It leverages containerized analytics pipelines, modality-specific encoders, unified latent hyperspace construction, digital twin monitoring, deterrence simulation, and machine learning algorithms to enable target custody tracking, cross-domain anomaly detection, and behavior-driven intelligence, surveillance, and reconnaissance (ISR) cueing across satellite, signals, cyber, and open-source intelligence domains.

Discussion of the State of the Art

Current intelligence analysis systems face increasing pressure to operate at speed and scale as the volume, variety, and volatility of sensor-derived data continues to grow. Modern collection operations span multiple domains-including satellite imagery, signals intelligence, cyber indicators, radio frequency emissions, and behavioral data-which must be processed, fused, and interpreted in real time to support dynamic mission needs and threat detection requirements. While platforms exist that can collect and store these diverse data streams, most rely on manual fusion workflows, domain-specific analysis tools, and static tasking frameworks that are unable to adapt quickly to changing target behaviors, cross-domain threat patterns, operational priorities, or environmental constraints. Collection strategies are often limited to predefined sensor schedules, rule-based asset selection, or simple visibility modeling within individual intelligence domains, resulting in delayed response times, redundant tasking, missed cross-domain correlations, and inadequate threat attribution capabilities.

Existing intelligence fusion approaches typically process each modality in isolation, lacking unified representations that enable cross-domain pattern recognition and anomaly detection. Traditional systems cannot effectively correlate cyber activities with geospatial observations, electromagnetic signatures with behavioral patterns, or supply chain indicators with facility activities. This domain-specific approach prevents analysts from detecting sophisticated adversary operations that span multiple intelligence disciplines and limits the ability to perform comprehensive threat attribution. Current target tracking systems are likewise constrained, relying on basic geotemporal correlation or single-modality trajectory modeling without accounting for cross-source uncertainty, predictive behavior modeling, terrain-influenced movement constraints, or latent behavioral patterns that may indicate deception or coordinated activities.

Despite advances in large language models, machine learning, and representation learning, few architectures integrate natural language requirement parsing, cross-modal data encoding, latent space fusion, spatiotemporal correlation, pattern-of-life-informed prediction, and real-time threat forecasting into a unified, modular workflow. Systems that do attempt automated target fusion often treat identity resolution, behavior prediction, and threat assessment as isolated functions, lacking persistent custody models that track targets across ambiguous observations and unified latent representations that enable cross-domain threat detection. Furthermore, existing systems provide limited capability for proactive deterrence planning, threat trajectory forecasting, or strategic intervention simulation based on integrated multi-source intelligence analysis.

As adversaries increasingly employ cross-domain operations that blend cyber activities, physical movements, electromagnetic signatures, and information operations, traditional intelligence systems that analyze each domain separately are insufficient for comprehensive threat detection and attribution. In operational environments where threats may manifest across multiple intelligence domains simultaneously, and where proactive deterrence may be more effective than reactive response, the absence of unified latent space fusion, cross-domain anomaly detection, and deterrence simulation capabilities represents a critical gap in the state of the art.

What is needed is a system that automates multi-source intelligence fusion through latent space integration, cross-domain anomaly detection, digital twin monitoring, and deterrence simulation, enabling real-time threat forecasting, attribution, and strategic intervention planning within a unified common intelligence picture architecture.

SUMMARY OF THE INVENTION

Accordingly, the inventor has conceived and reduced to practice a computing system for generating a common intelligence picture using latent space fusion and threat forecasting within a modular open system architecture. The system comprises one or more processors configured to process priority intelligence requirements using a language model and machine learning models that generate structured tasking instructions and prioritize multi-modal sensor collection. The system executes multi-phase intelligence operations including tasking, data ingestion, processing, analysis, dissemination, and feedback based on Priority Intelligence Requirement (PIR)-derived objectives. The system encodes intelligence data from geospatial, cyber, radio frequency, and behavioral sources using modality-specific encoders to generate domain embeddings, then fuses these embeddings into a unified latent space using contrastive learning or manifold optimization techniques. The system constructs latent trajectories over time and detects cross-domain anomalies based on deviations from expected geodesics, cross-modal inconsistencies, or latent displacement. The system maintains digital twin models for high-value entities or regions, tracks divergence from learned behavioral baselines, computes deviation scores, and simulates adversary behavior within the latent space to forecast potential escalation or activity paths. The system evaluates candidate deterrence actions, recommends intervention options including timing, messaging, or posture changes based on latent divergence and projected outcomes, and generates intelligence visualizations, alerts, and reports based on latent anomalies, digital twin divergence, and deterrence simulation results.

According to an aspect of an embodiment, each modality-specific encoder transforms data into domain-specific embeddings using neural network architectures optimized for the input modality characteristics.

According to an aspect of an embodiment, the unified latent space is constructed using a contrastive learning framework that aligns multi-modal embeddings by maximizing similarity for temporally and spatially co-occurring inputs while preserving temporal coherence.

According to an aspect of an embodiment, latent trajectory modeling comprises the generation of time-sequenced behavioral paths and the detection of anomalies based on observed divergence from expected movement through the latent space.

According to an aspect of an embodiment, each digital twin model is initialized with a latent behavioral baseline and a set of learned activity templates, and is configured to compute a divergence score when real-time entity behavior exceeds configured confidence thresholds.

According to an aspect of an embodiment, the system performs causal path inference by identifying candidate latent trajectories that precede a detected anomaly, thereby enabling reverse attribution of precursor activities.

According to an aspect of an embodiment, the system evaluates potential deterrence actions by simulating their effect on projected adversary behavior within latent space and by adjusting future trajectory forecasts based on modeled intervention outcomes.

According to an aspect of an embodiment, each deterrence simulation includes a calculation of intervention impact based on changes to forecasted latent behavior, digital twin stability, and projected threat likelihood.

According to an aspect of an embodiment, anomaly detection is based on the identification of deviations from established geodesics, inconsistencies across fused modalities, or emergent behavior patterns that indicate coordinated activity not present in historical baselines. In some embodiments, the unified latent space may alternatively be implemented as a graph structure comprising nodes and edges, and anomaly detection may further include identifying anomalous subgraphs, edge pattern deviations, or centrality shifts.

According to an aspect of an embodiment, the system includes a visualization interface that presents latent trajectory dynamics, anomaly alerts, and projected escalation indicators within a geospatially contextualized operational dashboard.

According to an embodiment, a computer-implemented method is provided for generating a common intelligence picture using latent space fusion and threat forecasting. The method processes priority intelligence requirements using a language model and machine learning models to generate structured tasking instructions and prioritize multi-modal sensor collection. The method executes multi-phase intelligence operations, encodes intelligence data from multiple sources using modality-specific encoders, fuses domain embeddings into a unified latent space, constructs latent trajectories and detects cross-domain anomalies, maintains digital twin models with divergence tracking, simulates adversary behavior for threat forecasting, evaluates deterrence actions, and generates intelligence products based on latent space analysis and deterrence simulation results.

According to an aspect of an embodiment, the method includes transforming data into domain-specific embeddings using neural network architectures optimized for the input modality characteristics.

According to an aspect of an embodiment, the method includes constructing the unified latent space using a contrastive learning framework that aligns multi-modal embeddings by maximizing similarity for temporally and spatially co-occurring inputs while preserving temporal coherence.

According to an aspect of an embodiment, the method includes generating time-sequenced behavioral paths and detecting anomalies based on observed divergence from expected movement through the latent space.

According to an aspect of an embodiment, the method includes initializing digital twin models with latent behavioral baselines and learned activity templates, and computing divergence scores when real-time entity behavior exceeds configured confidence thresholds.

According to an aspect of an embodiment, the method includes performing causal path inference by identifying candidate latent trajectories that precede detected anomalies to enable reverse attribution of precursor activities.

According to an aspect of an embodiment, the method includes simulating deterrence action effects on projected adversary behavior within latent space and adjusting future trajectory forecasts based on modeled intervention outcomes.

According to an aspect of an embodiment, the method includes calculating intervention impact based on changes to forecasted latent behavior, digital twin stability, and projected threat likelihood.

According to an aspect of an embodiment, the method includes identifying deviations from established geodesics, inconsistencies across fused modalities, or emergent behavior patterns that indicate coordinated activity not present in historical baselines. In some embodiments, the unified latent space may alternatively be implemented as a graph structure comprising nodes and edges, and anomaly detection may further include identifying anomalous subgraphs, edge pattern deviations, or centrality shifts.

According to an aspect of an embodiment, the method includes presenting latent trajectory dynamics, anomaly alerts, and projected escalation indicators within a geospatially contextualized operational dashboard through a visualization interface.

BRIEF DESCRIPTION OF THE DRAWING FIGURES

FIG. 6 is a block diagram illustrating an exemplary, non-exhaustive list of data sets for space data, Earth data, and capability data that may be incorporated into the system to enhance task allocation.

Figure 26:
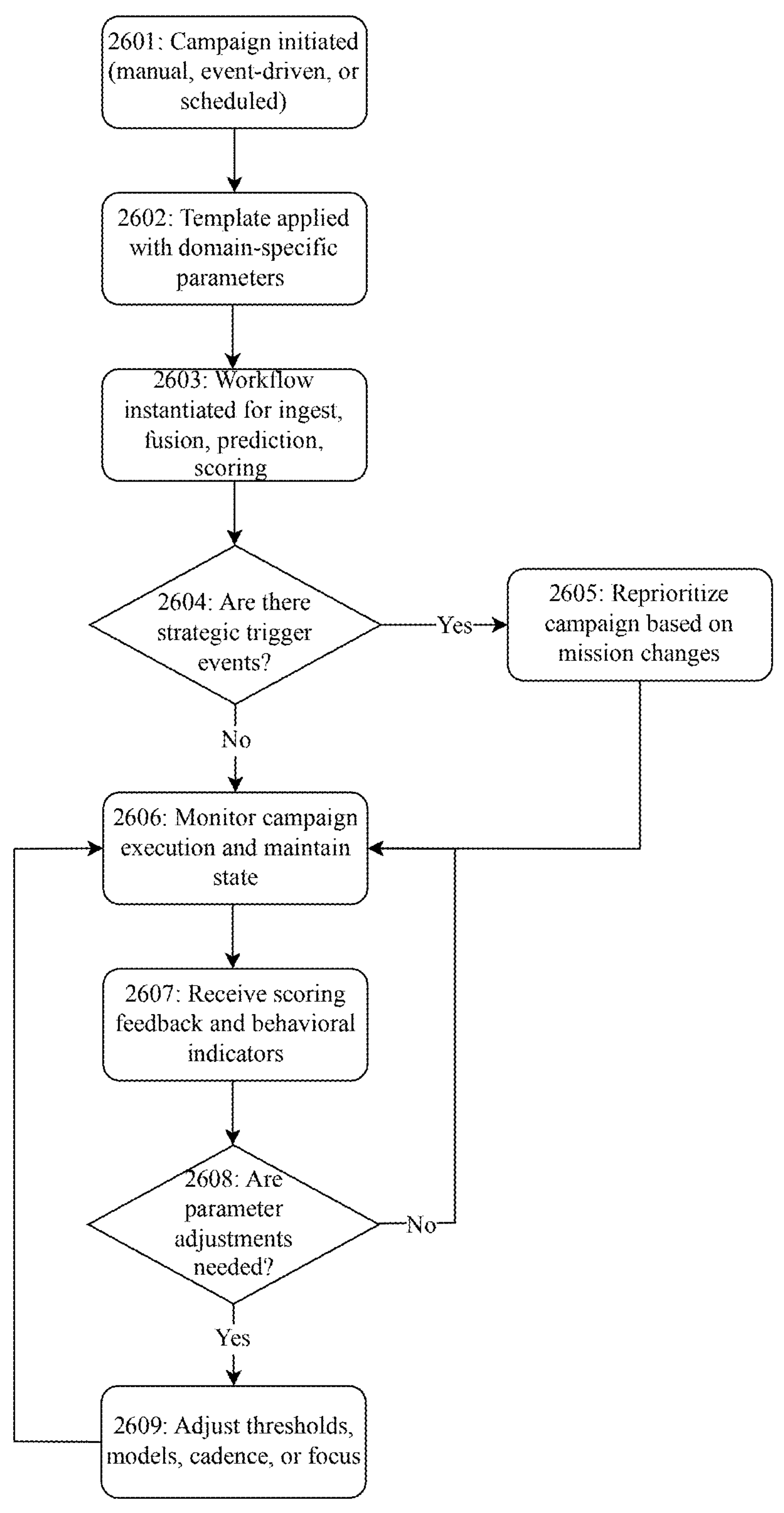
Figure 27:
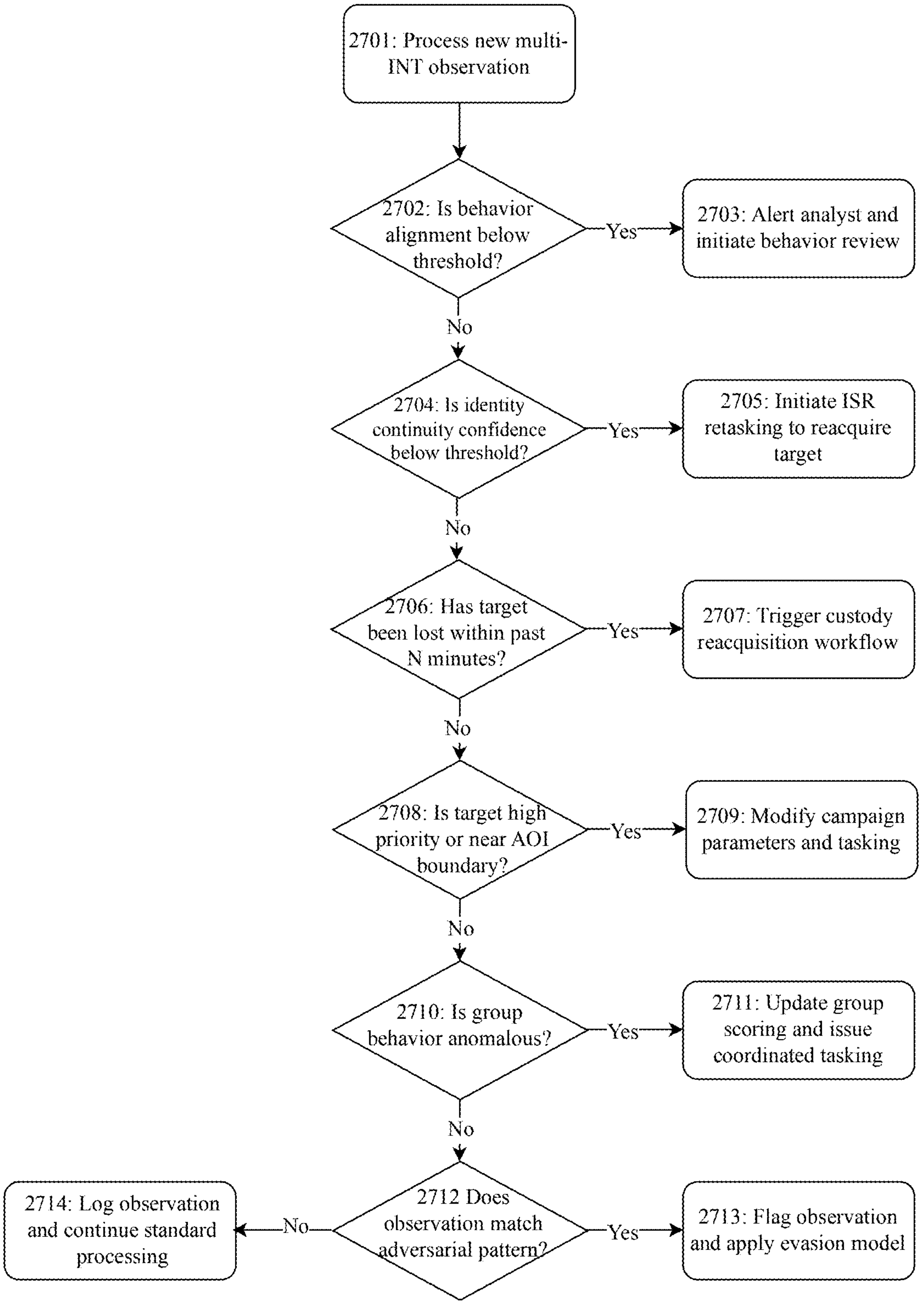

FIG. 26 is a flow diagram illustrating the campaign lifecycle process within fusion engine, including initialization, execution, feedback integration, and dynamic reprioritization based on operational triggers and scoring results FIG. 27 is a flow diagram illustrating an alert and ISR tasking decision tree within fusion engine, enabling dynamic triage of incoming observations based on behavior alignment, identity continuity, priority, group behavior, and adversarial pattern detection.

Figure 28:
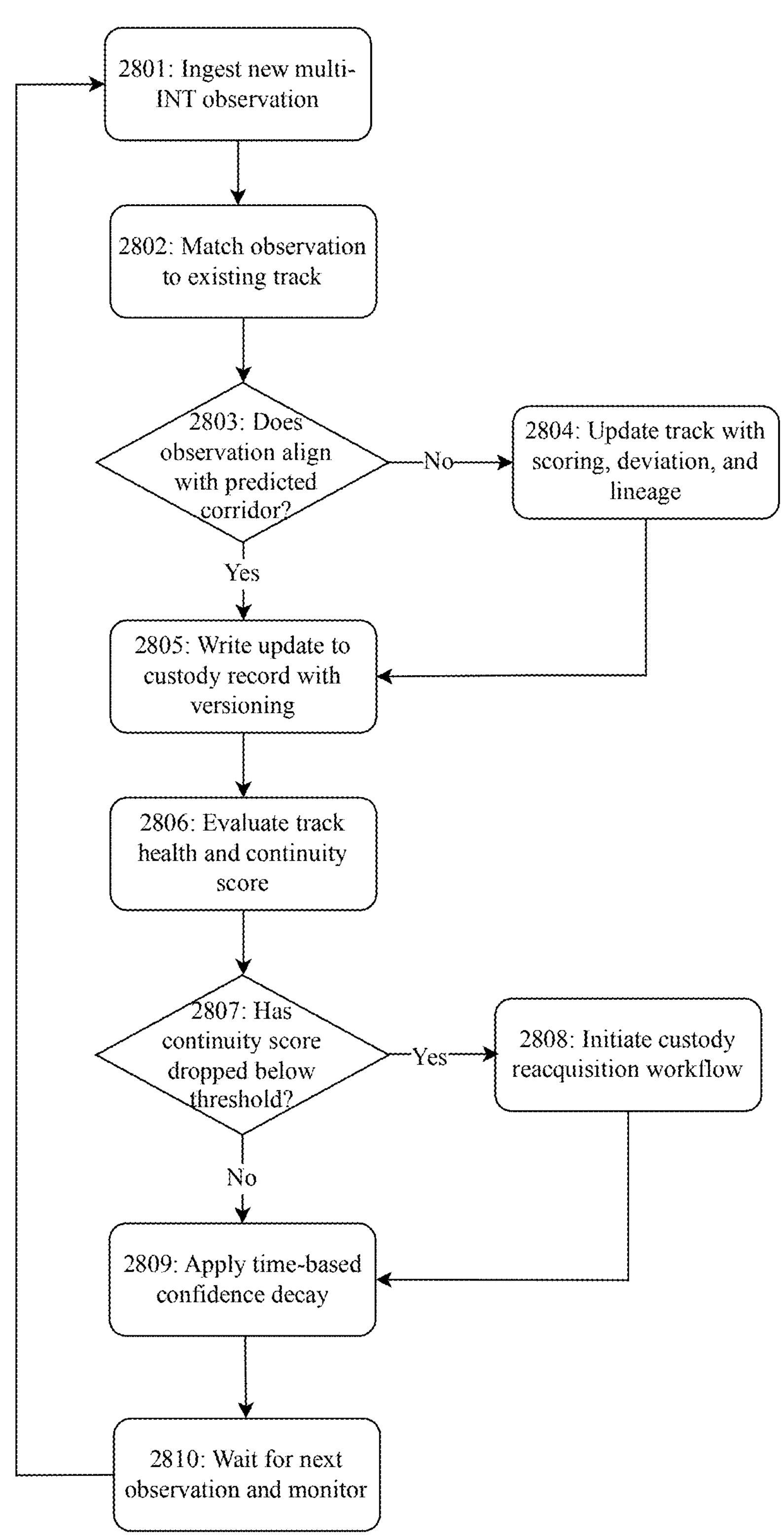

FIG. 28 is a flow diagram illustrating the custody record and track scoring update cycle within fusion engine, including observation matching, behavioral comparison, scoring updates, and continuity management to support persistent target custody.

Figure 29:
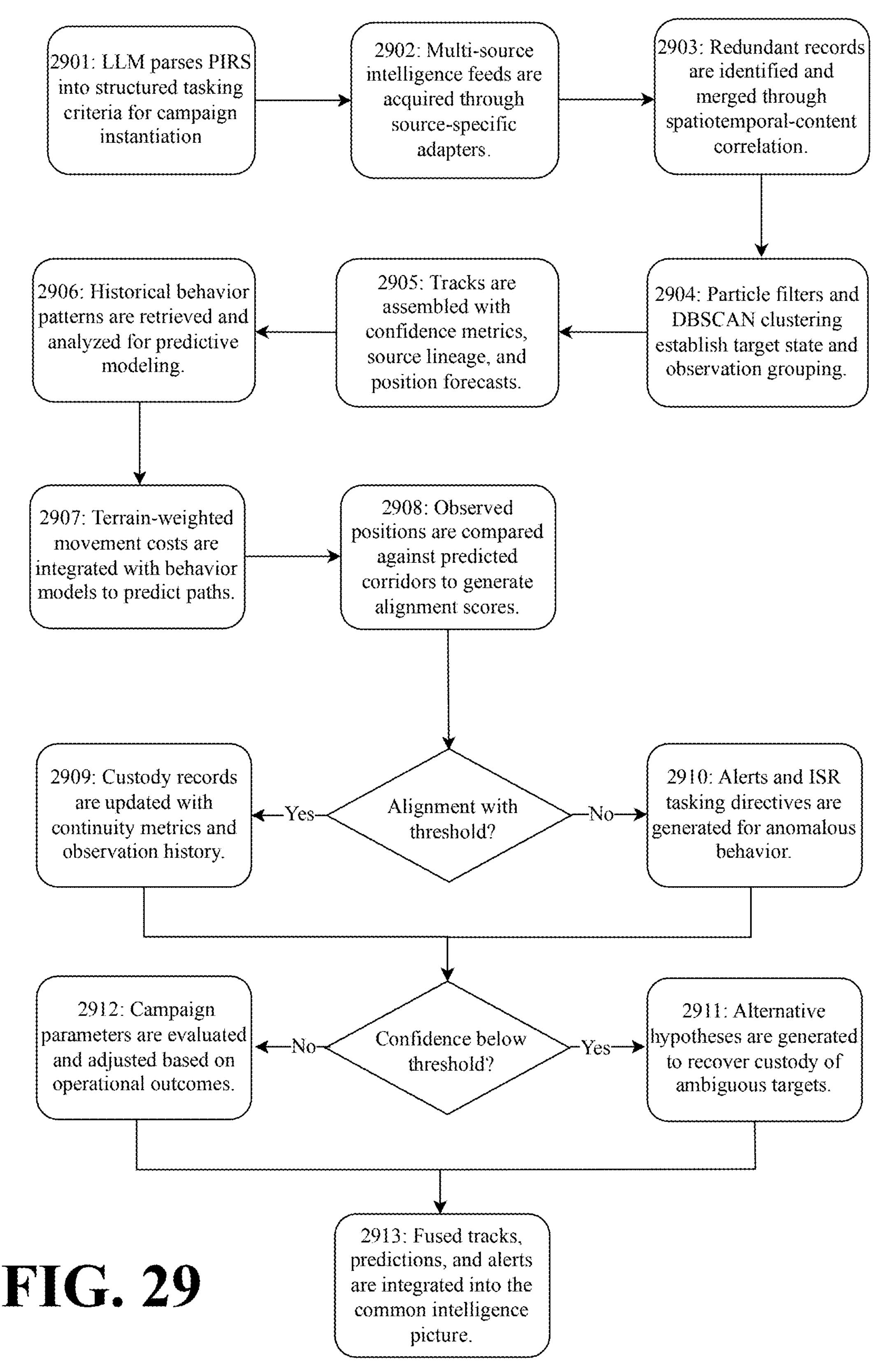

FIG. 29 is a flow diagram illustrating an exemplary execution workflow of fusion engine for campaign-based custody tracking.

Figure 30:
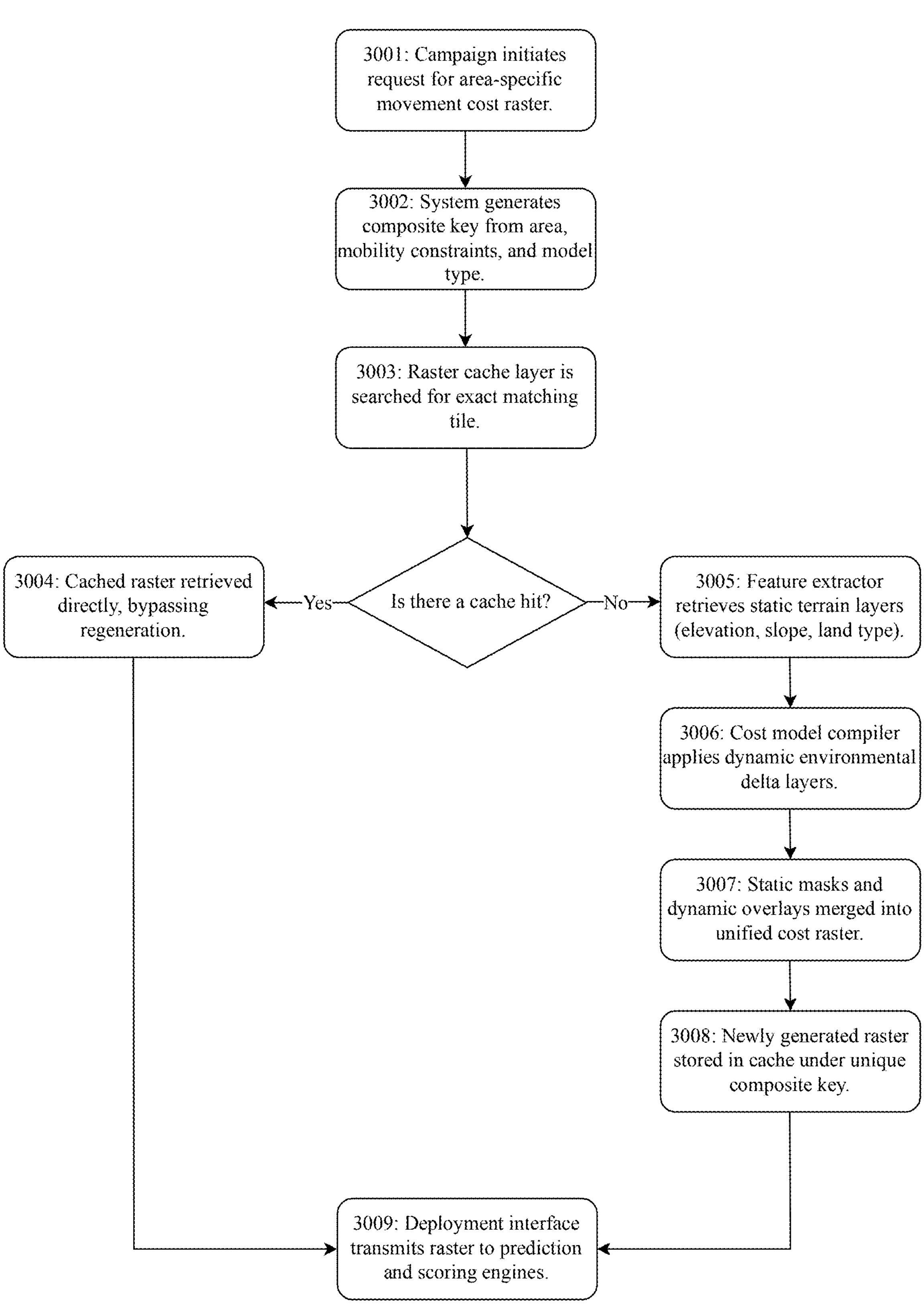

FIG. 30 is a flow diagram illustrating a raster caching and delta update workflow within transit cost raster system.

Figure 31:
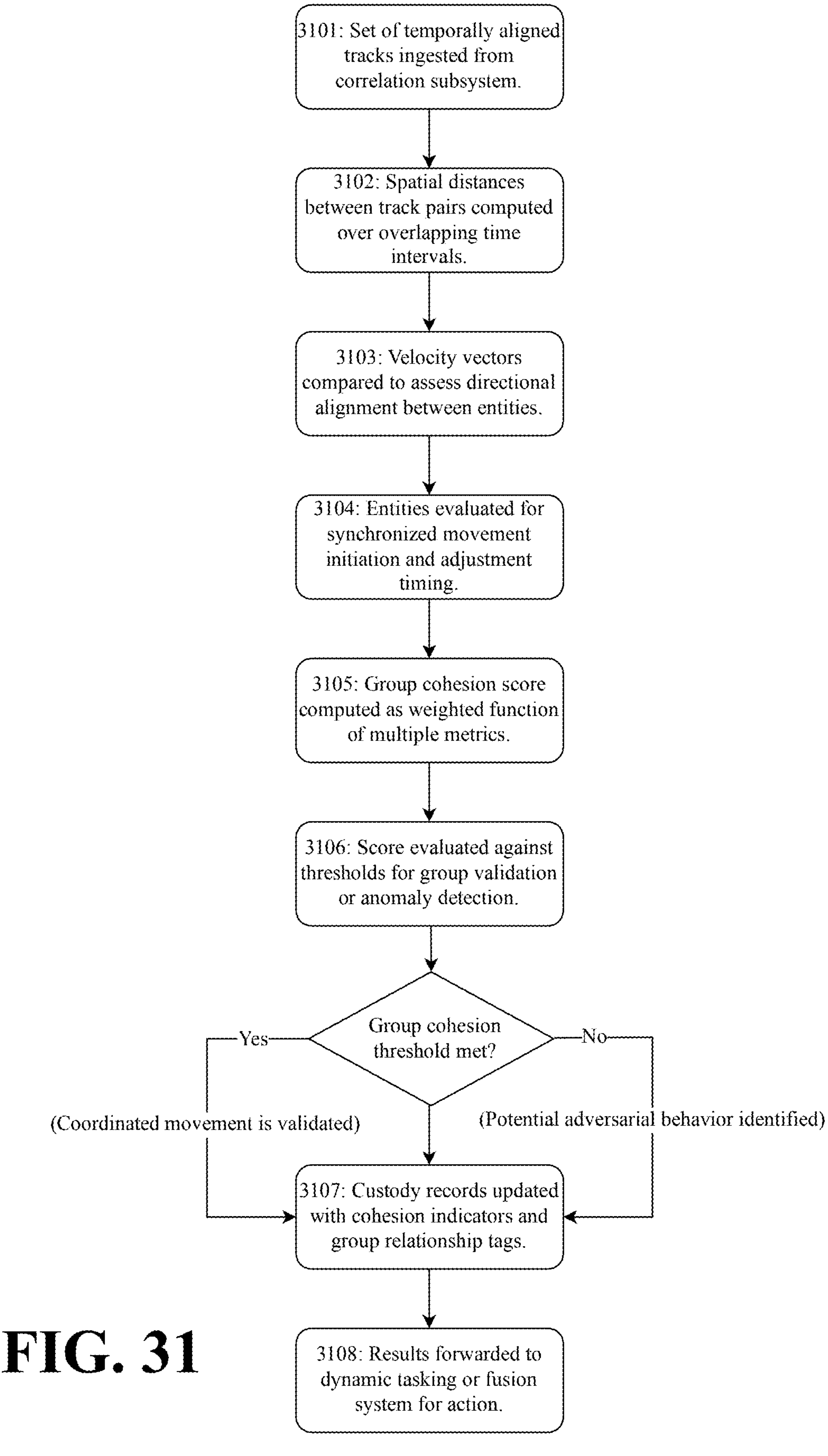

FIG. 31 is a flow diagram illustrating a group behavior scoring pipeline implemented by fusion scoring engine.

FIG. 32 is a block diagram illustrating an exemplary system architecture of a latent geocyber deterrence and threat detection system configured for unified latent space modeling, cross-domain anomaly detection, and strategic deterrence integration.

Figure 33:
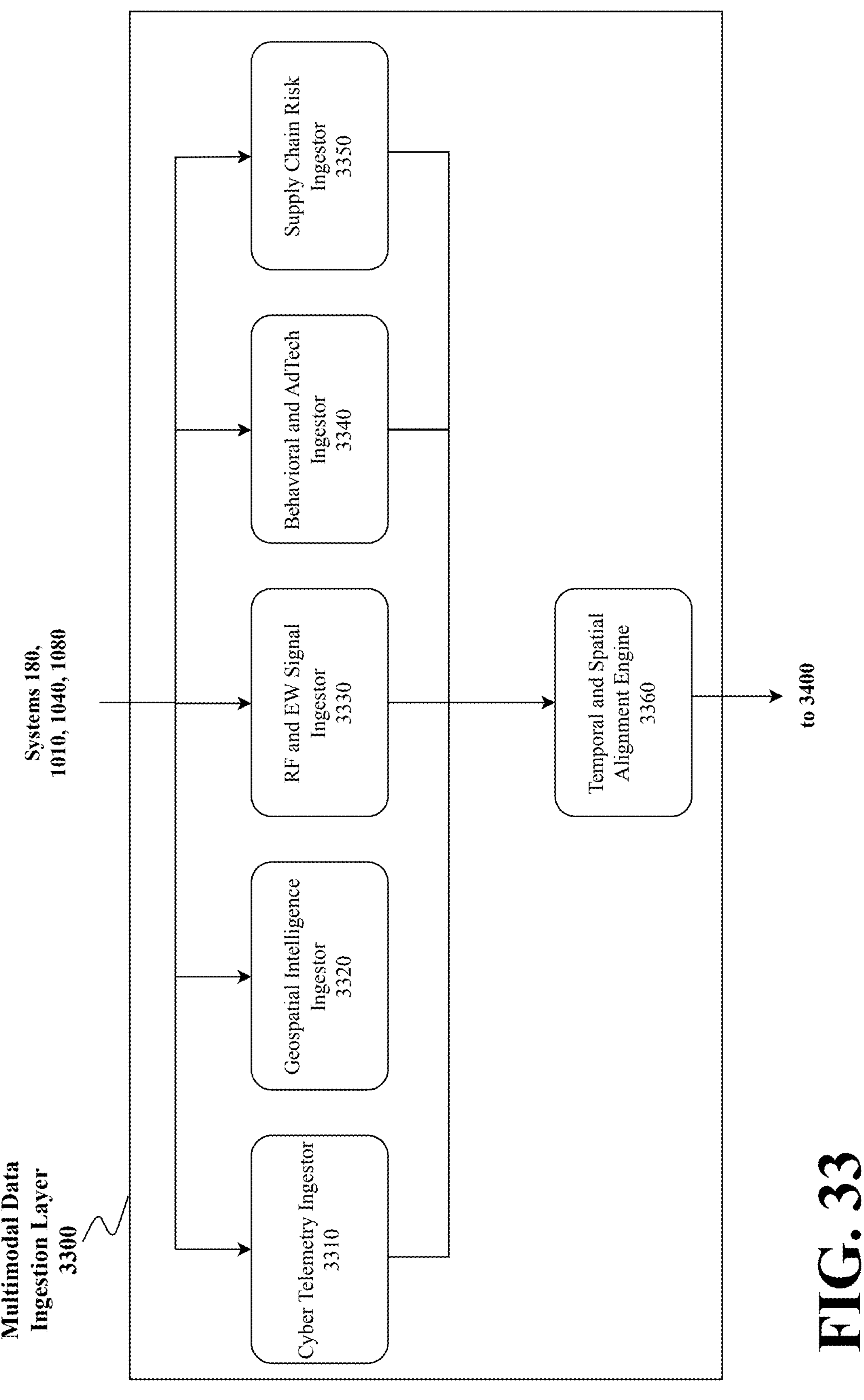

FIG. 33 is a block diagram illustrating an exemplary architecture of multimodal data ingestion layer configured to receive, normalize, and temporally align heterogeneous intelligence data streams for latent space processing.

Figure 34:
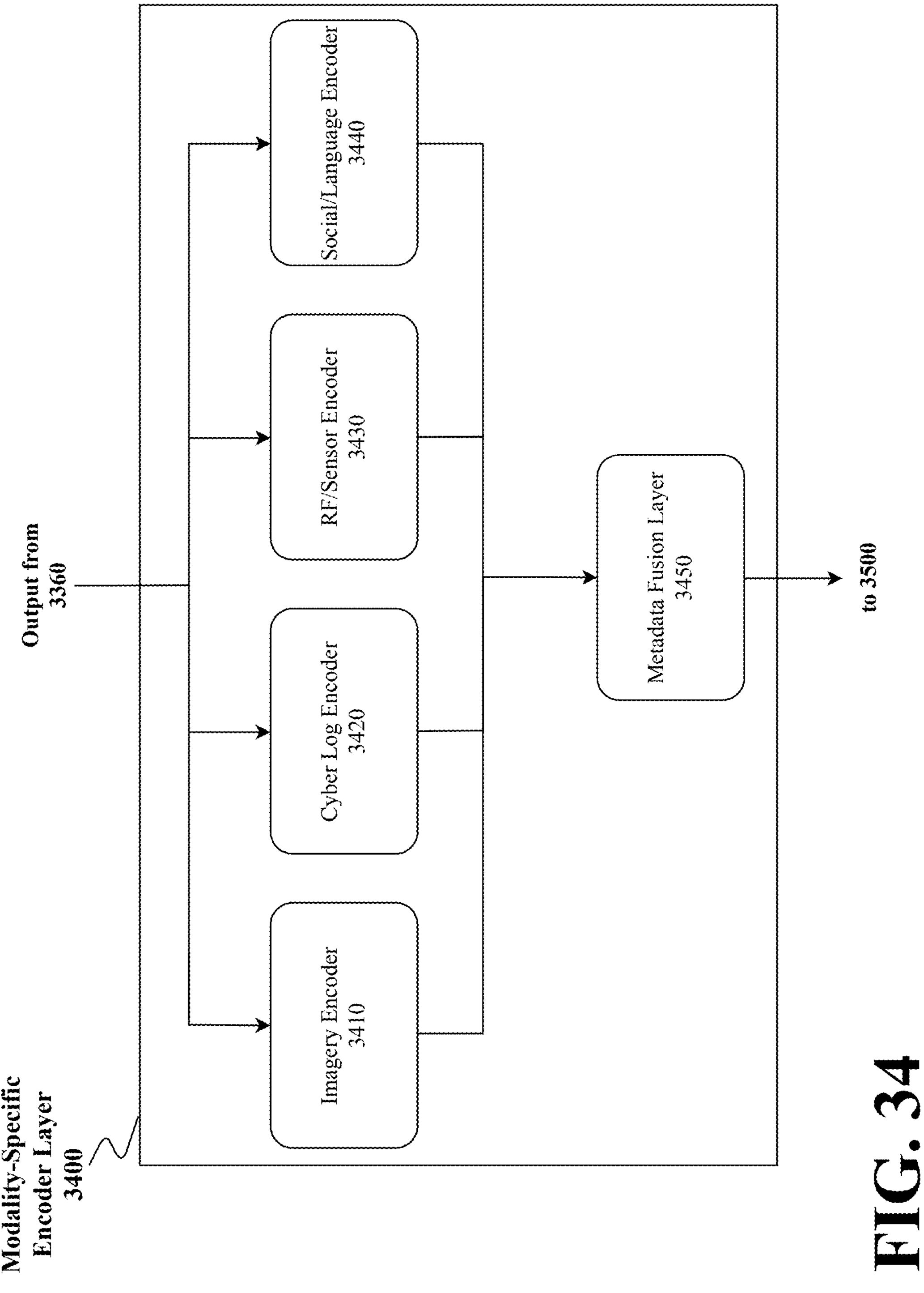

FIG. 34 is a block diagram illustrating an exemplary architecture of modality-specific encoder layer configured to generate domain-optimized embeddings from multi-modal intelligence data for latent space fusion and cross-domain analysis.

Figure 35:
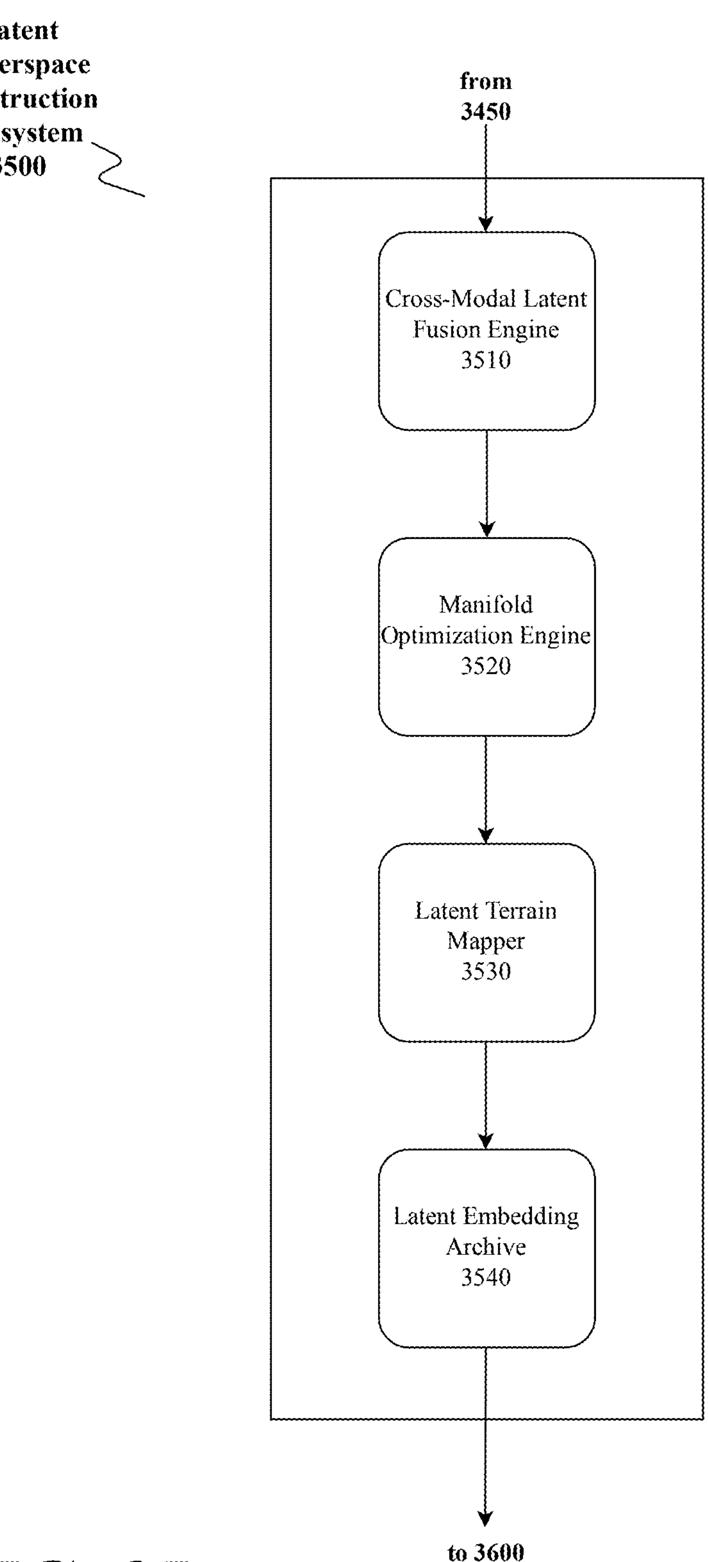

FIG. 35 is a block diagram illustrating an exemplary architecture of latent hyperspace construction subsystem configured to generate a unified latent space from multimodal embeddings using cross-domain alignment, manifold optimization, terrain mapping, and archival storage.

Figure 36:
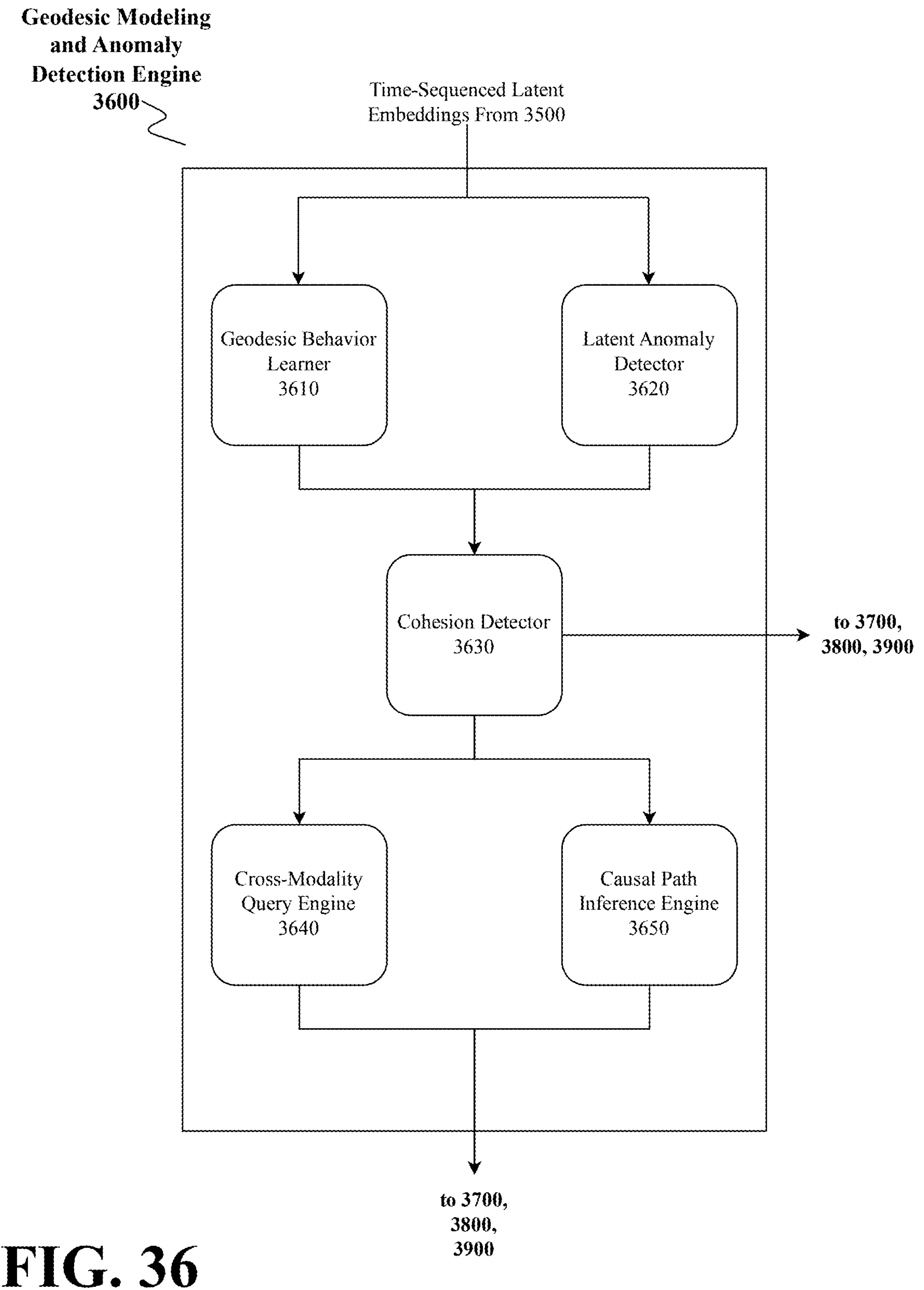

FIG. 36 is a block diagram illustrating an exemplary architecture of geodesic modeling and anomaly detection engine configured to establish latent behavioral baselines, detect deviations, assess coordinated activity, and generate causal attribution hypotheses for emerging threats.

FIG. 37 is a block diagram illustrating an exemplary architecture of latent twin monitor subsystem configured to maintain digital twins of entities and regions, track behavioral deviations, and generate predictive indicators for downstream simulation and decision support.

FIG. 38 is a block diagram illustrating an exemplary architecture of predictive simulation and deterrence engine configured to forecast adversary behavior in latent space, simulate deterrence effects, and generate prioritized intervention recommendations to support operational decision-making.

Figure 39:
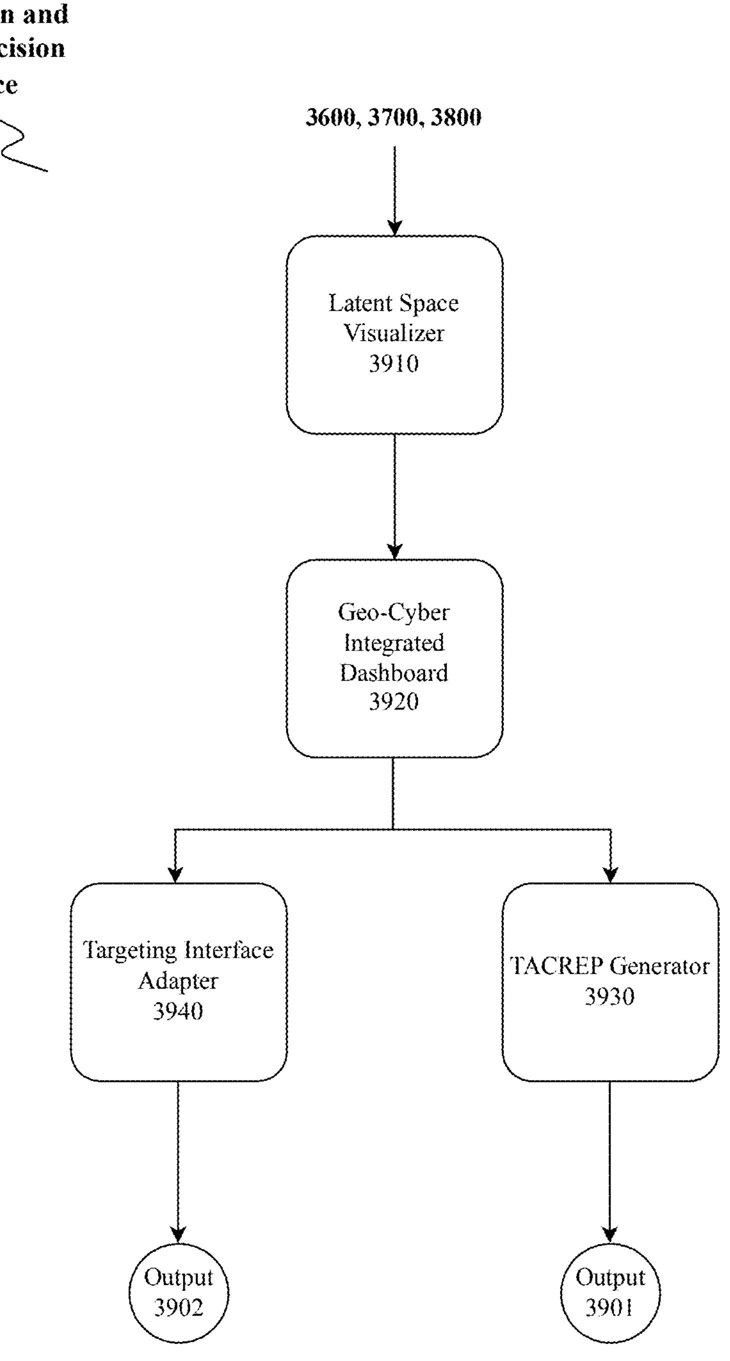

FIG. 39 is a block diagram illustrating an exemplary architecture of visualization and tactical decision interface configured to present latent intelligence, anomaly alerts, and deterrence outputs through interactive visualizations, tactical reports, and response integration tools for analyst and command-level decision support.

Figure 40:
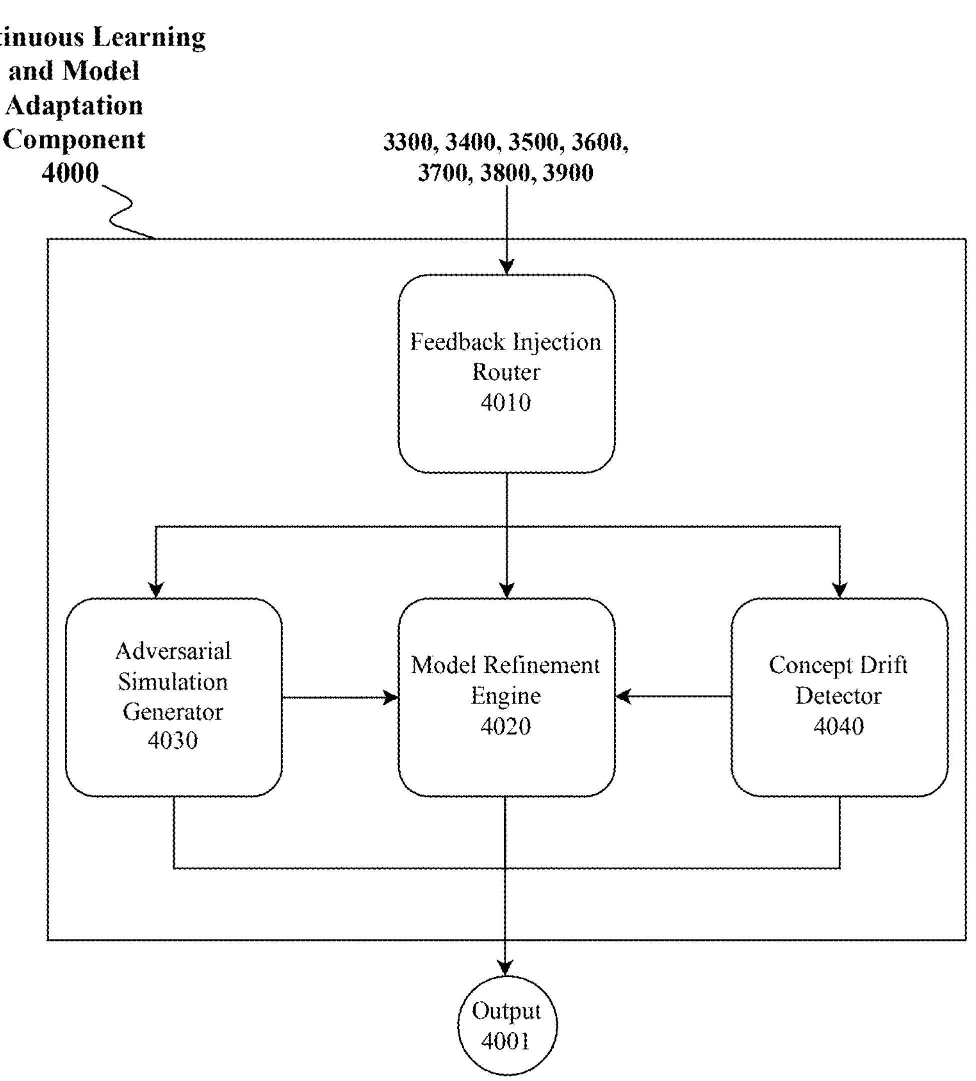

FIG. 40 is a block diagram illustrating an exemplary architecture of continuous learning and model adaptation component configured to receive feedback from across the system, refine analytical models, and distribute updated parameters and templates for persistent threat adaptation and system improvement.

Figure 41:
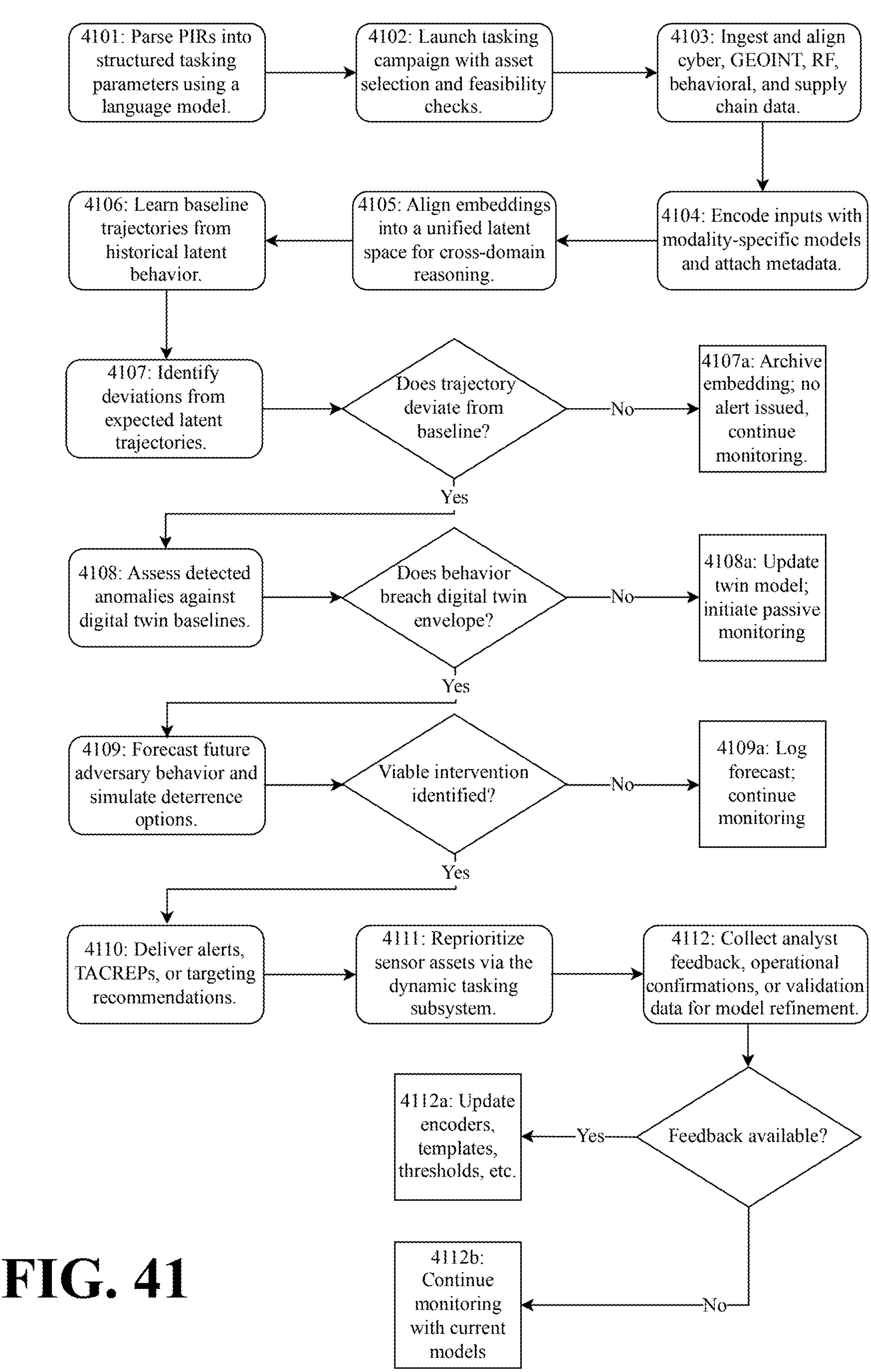

FIG. 41 is a flow diagram illustrating an end-to-end operational workflow for latent threat detection, from PIR intake through data fusion, anomaly detection, simulation-based deterrence, and continuous system adaptation.

Figure 42:
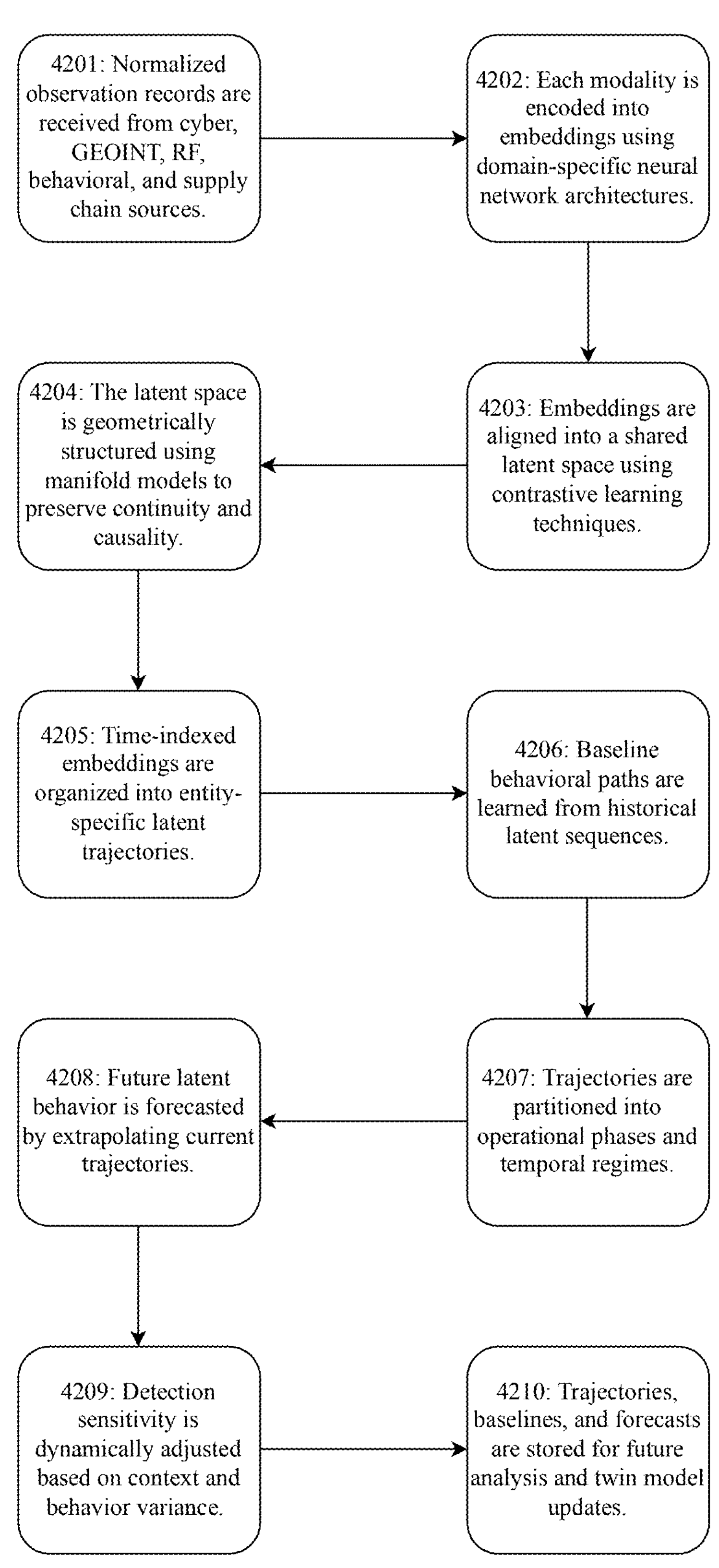

FIG. 42 is a flow diagram illustrating latent space fusion and geodesic trajectory modeling, in which multi-modal intelligence data is transformed into unified behavioral trajectories for cross-domain anomaly detection and predictive forecasting.

Figure 43:
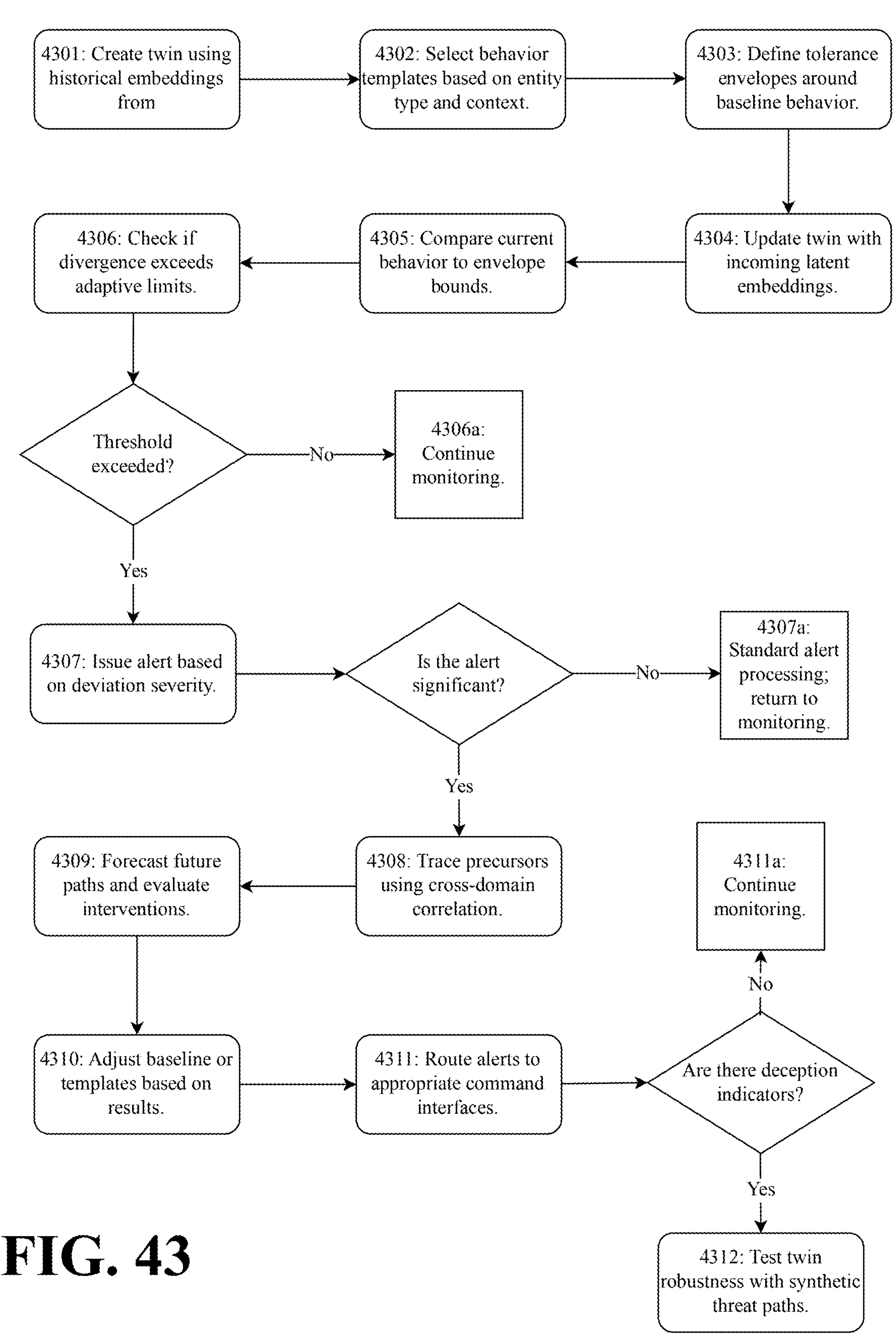

FIG. 43 is a flow diagram illustrating the digital twin divergence monitoring and alerting workflow implemented by latent twin monitor subsystem, including initialization, real-time monitoring, envelope-based deviation scoring, alerting, and simulation-driven response.

Figure 44:
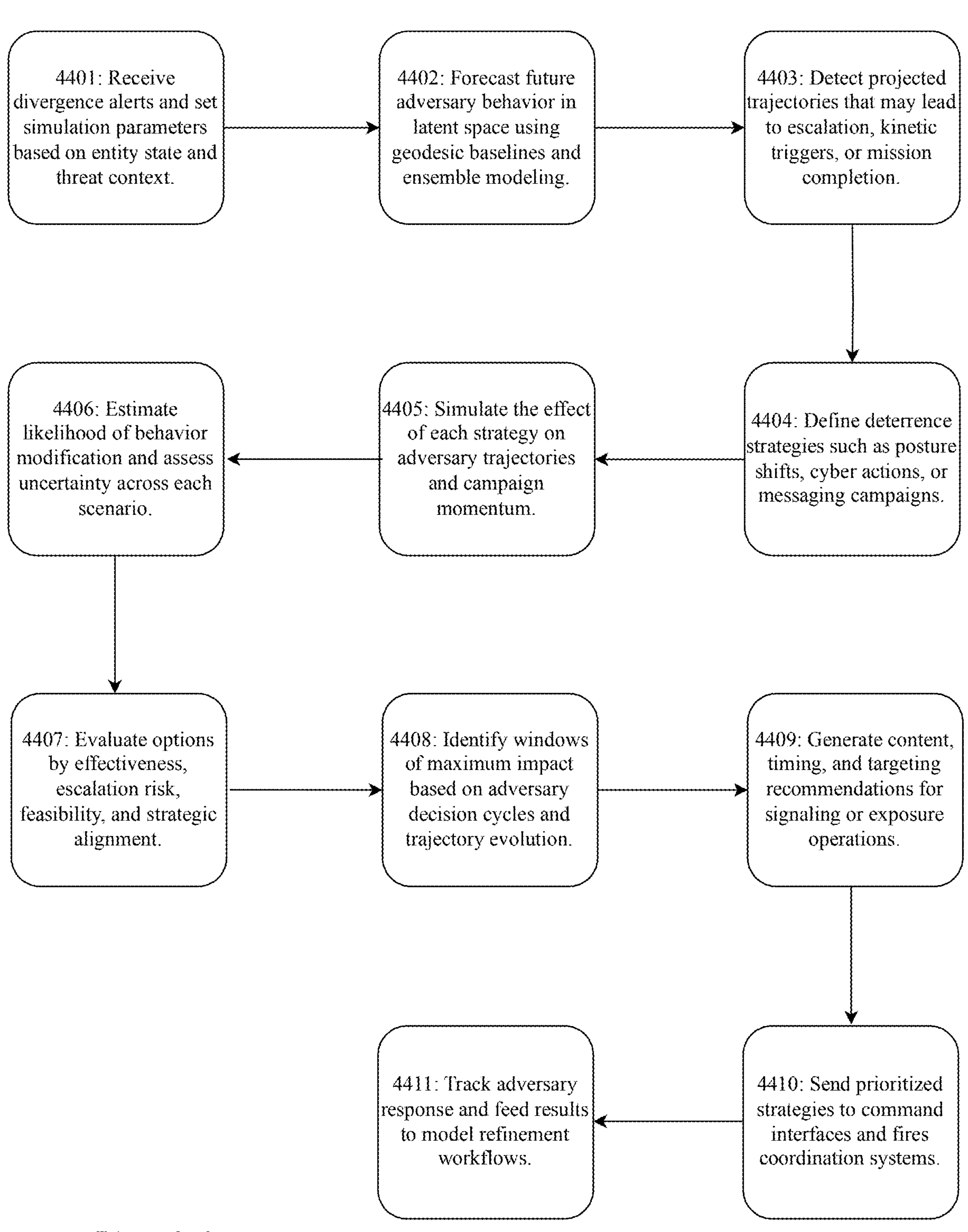

FIG. 44 is a flow diagram illustrating the deterrence simulation and outcome forecasting workflow implemented by predictive simulation and deterrence engine, including forward trajectory projection, intervention modeling, strategy ranking, and feedback integration.

Figure 45:
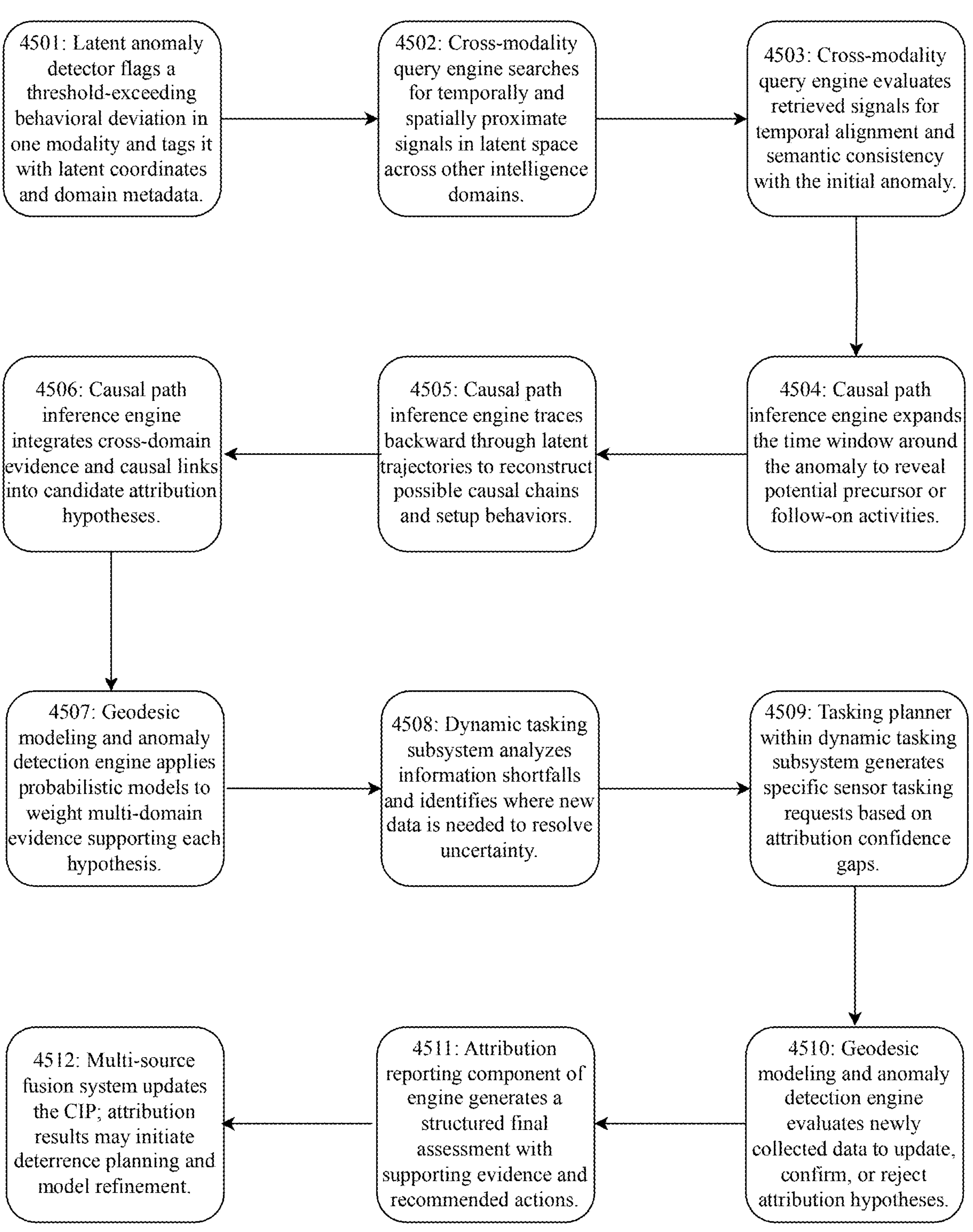

FIG. 45 is a flow diagram illustrating cross-domain anomaly triangulation and attribution, where a latent anomaly detected in one modality triggers multi-source correlation, causal inference, and targeted collection planning for threat attribution.

Figure 46:
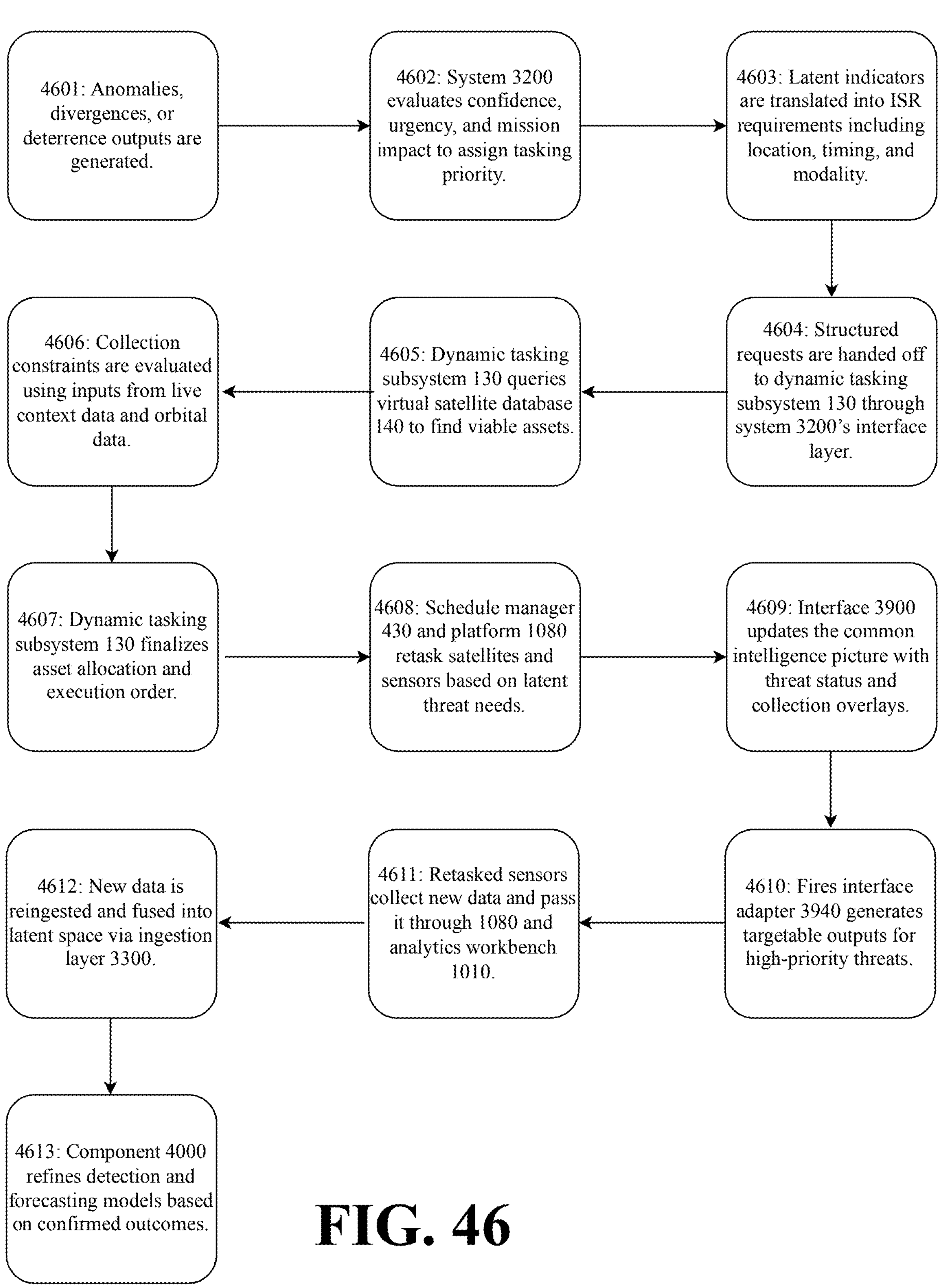

FIG. 46 is a flow diagram illustrating the real-time ISR integration and tasking flow, in which latent threat indicators generated by system are translated into actionable collection plans, sensor retasking, and tactical targeting networks or mission command interfaces coordination through dynamic interfaces with existing ISR infrastructure.

DETAILED DESCRIPTION OF THE INVENTION

The inventor has conceived and reduced to practice a modular intelligence processing architecture configured to generate and maintain a common intelligence picture using latent space fusion and threat forecasting through automated tasking, fusion, prediction, and dissemination of multi-source intelligence data. In various embodiments, a system integrates natural-language processing, statistical estimation, geospatial modeling, and latent space analysis to enable real-time identity continuity, behavior assessment, cross-domain threat detection, and Intelligence, Surveillance, and Reconnaissance (ISR) tasking across satellite, signals, cyber, and open-source collection modalities. A system may receive human-defined intelligence requirements and interpret them using a language model and machine learning models to produce structured tasking instructions and optimized sensor collection strategies. These instructions coordinate a multi-phase workflow including sensor allocation, data ingestion, spatiotemporal correlation, pattern-of-life-informed prediction, latent space fusion, digital twin monitoring, deterrence simulation, and intelligence product generation. An architecture supports both strategic and tactical intelligence operations, particularly in scenarios requiring persistent custody of mobile targets, cross-domain threat attribution, and proactive deterrence planning.

In some embodiments, the unified latent space may be alternatively or additionally implemented as a graph-based structure. In such configurations, entities such as facilities, devices, individuals, and events may be represented as nodes, and observed or inferred relationships—such as proximity, communication, movement, behavioral correlation, or temporal sequencing—may be represented as edges. This graph-based representation enables application of graph analytics techniques including but not limited to community detection, centrality analysis, anomaly detection, and path inference to identify clusters, influential entities, and multi-modal behavioral patterns. The geodesic modeling, anomaly detection, and causal path inference functions described herein may operate over such a graph structure, using graph traversal, neighborhood search, and subgraph extraction techniques to detect threats and forecast adversary activity. Graph-based representations may also support fusion of cyber, geospatial, RF, and behavioral intelligence by encoding cross-domain linkages as edge types or attributes. The graph may be implemented as a dynamic graph structure supporting time-series updates, and may be queried using graph query languages or embedded within a graph database to support scalable reasoning across complex, interrelated data sets.

A modular intelligence processing system is implemented as a software-defined platform comprising one or more computing environments configured to execute analytics workflows enhanced with latent space fusion capabilities. These workflows are dynamically instantiated based on campaign definitions or triggered by incoming Priority Intelligence Requirements (PIRs). In various configurations, a system incorporates language models and machine learning models trained to interpret PIRs, generate sensor collection strategies, allocate assets based on historical tasking outcomes, mission constraints, and feasibility assessments, and perform cross-domain threat analysis. A containerized tasking framework instantiates analytics pipelines for sensor tasking, data ingestion, correlation, latent space encoding, analysis, visualization, and reporting.

Language models and machine learning models process natural-language PIRs to extract structured tasking parameters, including collection modality, geographic coverage, revisit timing, resolution, and priority. From these inputs, a system generates one or more executable tasking strategies, ranks them based on feasibility and predicted collection value, and selects appropriate assets from a multi-modal sensor inventory spanning geospatial, cyber, electromagnetic, and behavioral intelligence sources. Feedback from analyst validation and historical tasking success is used to update tasking models over time.

A system executes multi-phase intelligence operations encompassing tasking, data ingestion, processing, analysis, dissemination, and feedback. During planning, relevant assets are identified, revisit windows are evaluated, and environmental constraints such as cloud cover, terrain masking, or signal interference are assessed. A tasking phase issues sensor commands to satellite, Signals Intelligence (SIGINT), cyber intelligence, and Open-Source Intelligence (OSINT) collection platforms. Processing pipelines normalize data, apply geolocation refinement, generate structured records suitable for fusion, and encode multi-modal intelligence data into domain-specific embeddings. Analytical workflows extract patterns and classify behavior using correlation models, statistical estimation, computer vision, and latent space analysis. Dissemination tools generate reporting products tailored to operational roles, and a feedback phase incorporates performance metrics and user interaction to refine system behavior.

In various embodiments, the system includes specialized ingestors for diverse intelligence domains, including but not limited to the following: a cyber telemetry ingestor processes network logs, netflow data, intrusion detection events, signal intelligence related to cyber operations, and data from obfuscated collection environments. A geospatial intelligence ingestor handles satellite imagery including electro-optical, infrared, and synthetic aperture radar data, terrain models, and orbital data, and may include image-based correlation components to detect and time-align events. An RF and electronic warfare signal ingestor processes SIGINT and RF spectrum monitoring data, detecting and classifying radar, spoofing, and jamming signatures. A behavioral and advertising technology ingestor processes mobile device telemetry, device counts, movement patterns, social media sentiment, regional psychological operations indicators, and detection of identity spoofing in maritime and aerial tracks. A supply chain risk ingestor performs origin tracing of components and firmware with geospatial linkages to manufacturing and transshipment facilities. A temporal and spatial alignment engine normalizes timestamps, geolocations, and confidence scores across sources.

The system employs modality-specific encoder layers to transform raw intelligence data into structured embeddings suitable for latent space fusion. An imagery encoder may utilize convolutional neural networks or vision transformer architectures to encode terrain features, facility characteristics, and change detection patterns. A cyber log encoder may employ transformer models to learn embeddings for intrusion events, attack chains, and reconnaissance behavior. An RF/sensor encoder may use one-dimensional convolutional networks and spectrogram encoders for electronic warfare classification, tagging directionality, power levels, and repeat patterns. A social/language encoder may utilize large language model-based architectures for processing human intelligence, open-source intelligence, and advertising technology-derived text, extracting sentiment trends, community narratives, and adversary messaging. A metadata fusion layer attaches temporal, spatial, behavioral context, and signal lineage for each embedding.

To support unified cross-domain reasoning, a latent hyperspace construction subsystem creates coherent multi-modal representations. A cross-modal latent fusion engine employs contrastive learning to align representations across cyber, imagery, RF, and text modalities by projecting each modality into a common embedding space with shared geometric structure. Embeddings are aligned through learned similarity functions or joint training objectives, resulting in a unified latent hyperspace. A manifold optimization engine enforces topological and causal smoothness within the latent space using techniques such as Lorentzian autoencoders or diffusion-based models to preserve temporal continuity and anomaly separability. A latent terrain mapper identifies operational zones within the hyperspace, including adversary-preferred latent clusters and under-observed latent corridors, facilitating proactive coverage strategies. In some embodiments, the latent terrain mapper identifies latent safe zones—regions exhibiting sparse observation density or underutilized sensor coverage—which may indicate exploitable terrain for adversary maneuver or deception. A latent embedding archive stores temporally indexed representations of tracked entities for backtracing, attribution, and long-term behavioral trend analysis.

A geodesic modeling and anomaly detection engine performs behavioral modeling across time-indexed latent embeddings. A geodesic behavior learner learns baseline trajectories representing typical adversary activity across domains and encodes event progressions such as reconnaissance, staging, and execution. A latent anomaly detector identifies deviations from learned trajectories, co-occurrences of domain signals that are statistically rare, and dislocations indicative of emerging threats. A device cohesion detector identifies coordinated device movement patterns such as unit-level staging or force assembly. A cross-modality query engine links anomalies across domains, while a causal path inference engine reconstructs latent trajectories by analyzing anomalies across multiple domains, performing both backward and forward causal tracing to identify latent precursors and project downstream consequences. This supports cross-domain anomaly triangulation, allowing detection of previously unlinked threat indicators across cyber, RF, and geospatial sources.

A latent twin monitor subsystem maintains real-time latent models of critical assets and behaviors. These include facility twins (modeling infrastructure and activity signatures), network twins (modeling cyber posture and signaling), regional twins (tracking sentiment or population-level patterns), and actor twins (capturing behavioral signatures of known adversaries). Each twin is defined by a confidence envelope that reflects the expected range of latent trajectory behavior for a given entity or region. These envelopes define statistical tolerances around observed activity patterns; divergence outside these envelopes may signal a strategic anomaly. Deviations are computed as divergence scores and may trigger alerts, retasking, or deterrence modeling. The system supports adversarial latent training, wherein synthetic threat paths are introduced to stress-test behavioral assumptions and twin resilience. The behavior template library may also be linked to campaign instantiation logic, enabling automated selection of relevant templates based on PIR class, target category, or operational phase.

A predictive simulation and deterrence engine simulates possible adversary futures and evaluates intervention outcomes. A latent path simulator projects future behavior in latent space based on past activity and contextual drivers. An intervention simulation module models effects of preemptive actions, including signaling, posture adjustment, and countermeasures. A deterrence strategy recommender ranks possible interventions by predicted disruption efficacy. A messaging and signaling subcomponent suggests optimal timing and framing for information operations, escalation control, or exposure campaigns.

Spatiotemporal correlation may be performed using particle filters to estimate posterior probability distributions over a target's likely position and velocity, while clustering algorithms such as Density-Based Spatial Clustering of Applications with Noise (DBSCAN) associate temporally and spatially coherent observations. Resulting tracks include confidence scores for identity continuity, now enhanced with latent space alignment information.

To support behavioral prediction, the system generates Pattern-of-Life (POL) models for individual entities, facilities, and regions. These are segmented into temporal regimes (e.g., weekday vs. weekend, diurnal patterns, mission phases) and enhanced with latent trajectory prediction to capture cross-domain correlations. Terrain-weighted transit cost rasters constrain forecasts using elevation, slope, infrastructure, and land classification data. These constraints are applied jointly with latent behavior projections to generate time-bounded envelopes representing likely movement paths.

Incoming observations are scored against both physical and latent forecasts. Behavior alignment scores are computed to quantify conformity with predicted paths. When deviations exceed configured thresholds, alerts are issued and automated retasking initiated. Adversarial behaviors—such as trajectory spoofing or decoy use—are detected using latent anomaly classifiers and are used to refine behavior models and update scoring thresholds dynamically.

Group-level reasoning is supported by associating entities into coherent behavioral clusters across latent and physical domains. Group cohesion scores reflect alignment in space, time, velocity, and behavioral markers, enabling detection of convoy behavior, distributed staging, or decoupling maneuvers.

Custody records are maintained for each entity and include latent space association history in addition to physical tracking continuity. When continuity falls below threshold, a custody reacquisition process is initiated, including retroactive correlation, alternate hypothesis generation, and task plan modification. The reacquisition workflow may use latent drift patterns to guide recovery efforts.

The system may reprioritize campaigns in real time based on latent anomalies or twin divergences. Strategic triggers such as policy shifts, PIR updates, or sudden adversary movement may dynamically adjust scoring thresholds, revisit intervals, or modality selection.

A visualization and tactical decision interface provides integrated awareness. A latent space visualizer shows clustering, trajectory evolution, and anomaly detection. A geo-cyber dashboard overlays latent scores, collection opportunities, and behavioral alerts. Structured alerting workflows support tiered escalation protocols and tailored dissemination formats. Tactical reports (TACREPs) are automatically generated based on alert type, affected entity, confidence score, and operational context, ensuring rapid alignment with command-level decision requirements. A mission communication infrastructure interface adapter converts predicted latent trajectories or geospatial anomalies into targetable coordinates and may integrate with over-the-horizon strike platforms and tactical targeting network or mission command interface networks to support dynamic targeting operations.

A continuous learning subsystem performs model adaptation using outcomes of confirmed alerts, adversary activity, and operational feedback. Models are updated using online training, adversarial path injection, and behavioral template revision. Latent concept drift is monitored to prevent degradation in forecast accuracy or anomaly sensitivity.

An interactive interface supports validation and annotation. Intelligence products are linked to PIRs, latent scoring metrics, and physical observables. Dashboards, reports, and overlays are generated dynamically and comply with classification and access control protocols.

Although specific implementations and workflows have been described herein, various modifications and alternative configurations may be employed without departing from the inventive concepts. Variations in latent space construction, geodesic modeling, twin maintenance, deterrence simulation, system topology, or user interface design are all considered within the scope of the disclosure. Functional components may be implemented in hardware, software, firmware, or hybrid configurations adapted to specific mission or operational requirements.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, “constellation” refers to a collection of one or more satellite assets that may be utilized for data collection operations, regardless of ownership or operational control. Building upon the target custody tracking systems described in U.S. Pat. No. 11,861,894 B1, a constellation may comprise satellites from single or multiple vendors, with varying capabilities, orbital parameters, and operational characteristics. A constellation may incorporate diverse sensor types, such as synthetic aperture radar (SAR), electro-optical (EO), and radio frequency (RF) sensing capabilities, as described in the system architecture. Through integration with onboard processing environments and edge computing platforms, constellations may be dynamically tasked and managed to support both persistent surveillance and dynamic collection requirements. In an embodiment, constellations are treated as virtual resources that may be dynamically accessed and tasked based on collection priorities and real-time conditions. The term encompasses both physical satellite groupings operated by a single entity and virtual aggregations created by accessing multiple independent satellite systems. Historically, constellation management has been limited to coordination within a single operator’s control. In an embodiment, the system enables integration and optimization across multiple independent constellation resources, treating disparate satellite assets as components of a unified virtual constellation that may be orchestrated to improve collection efficiency and success rates. This virtual constellation approach facilitates flexible resource allocation and dynamic tasking across available assets, regardless of their ownership or operational origin.

As used herein, “campaign” refers to a structured set of configuration parameters and tasking objectives used to govern the operation of one or more coordinated intelligence workflows instantiated within fusion engine. A campaign may be initiated in response to a priority intelligence requirement (PIR), user-defined input, or automated trigger, and defines spatial boundaries, time intervals, target types, sensor constraints, and analysis objectives. Campaigns control tasking logic, fusion model selection, scoring thresholds, and reporting behavior and may operate independently or concurrently across the system. Campaigns may include predefined templates, dynamic workflows, and adaptive feedback mechanisms enabling continuous optimization based on operational context or scoring results.

As used herein, “movement corridor” refers to a time-bounded, geospatial region generated by the system to represent a predicted path of motion for a tracked entity. A movement corridor is produced by pattern of life and prediction engine using historical activity, behavioral models, and terrain-weighted cost rasters from transit cost raster system. The corridor may be expressed as a polygon, grid, or raster-based probability surface, and includes temporal bounds, confidence levels, and mobility feasibility metrics. Movement corridors serve as predictive references for scoring alignment and determining behavioral deviation.

As used herein, “raster” refers to a gridded geospatial data structure encoding movement cost, environmental constraint, or mobility feasibility for a given area of interest. Rasters may be generated by transit cost raster system using inputs such as elevation models, land classification, infrastructure overlays, and environmental conditions. A raster may include one or more data bands, each corresponding to different constraints (e.g., terrain slope, weather, time-of-day penalties), and may be cached, updated incrementally using delta overlays, and reused across campaigns. Rasters are used to constrain movement forecasts and evaluate physical plausibility of observed activity.

As used herein, “scoring output” refers to a structured set of metrics computed by fusion scoring engine that quantifies behavioral conformity, identity continuity, and operational significance of observed activity. Scoring outputs may include behavior alignment scores, identity confidence scores, group cohesion scores, and custody degradation indicators. Scoring outputs may further include alert triggers, ISR retasking recommendations, and campaign feedback data, and may be annotated with source lineage, campaign identifiers, and timestamp metadata. Scoring outputs are disseminated to other subsystems such as dynamic tasking subsystem, campaign coordinator, or multi-source intelligence fusion system.

As used herein, “custody record” refers to a persistent data structure maintained by custody record manager that tracks the continuity, identity confidence, behavioral history, and source provenance of a monitored entity over time. A custody record may include version-controlled updates, scoring histories, lineage identifiers, and temporal annotations. Custody records support reacquisition workflows, confidence decay logic, and analytical auditing of entity behavior across interrupted, ambiguous, or deceptive reporting environments.

As used herein, “latent space” refers to a mathematical embedding space in which multi-modal intelligence data is transformed into unified, semantically structured representations. Latent space is constructed by system 3200 through the application of contrastive learning, geometric manifold optimization, and cross-modal encoding. The latent space supports behavior modeling, anomaly detection, entity comparison, and geodesic trajectory analysis by representing diverse sensor observations (e.g., imagery, cyber logs, RF signals, text) as standardized vectors within a common space, preserving proximity relationships that reflect behavioral or operational similarity.

As used herein, "digital twin" refers to a real-time latent model of a physical entity, operational region, or infrastructure element, constructed and maintained by latent twin monitor subsystem. A digital twin encodes expected behavioral patterns, operational cycles, and geospatial signatures using learned baselines and behavioral templates. Each twin maintains a current latent position, historical trajectory, and confidence envelope reflecting acceptable behavioral variance. Digital twins support continuous monitoring, anomaly scoring, and simulation-based forecasting.

As used herein, "confidence envelope" refers to a multi-dimensional boundary in latent space representing the acceptable behavioral variance for a digital twin. Confidence envelopes are computed by confidence envelope tracker using historical variance, entity classification, and operational constraints, and are used to detect divergence from expected behavior. When current latent behavior exceeds the bounds of the confidence envelope, an alert is generated and may trigger simulation, retasking, or escalation.

As used herein, "geodesic trajectory" refers to a time-ordered path through latent space that represents the most behaviorally plausible progression of a tracked entity or digital twin over time. Geodesic trajectories are generated by geodesic behavior learner using baseline movement patterns, historical activity, and environmental constraints. These trajectories serve as predictive references for scoring deviation and forecasting future behavior.

As used herein, "deterrence strategy" refers to an intervention plan generated by predictive simulation and deterrence engine that is designed to influence, delay, or disrupt adversary behavior based on projected latent trajectories. Deterrence strategies may include posture changes, cyber operations, information signaling, or kinetic readiness actions. Strategies are evaluated using simulation models and are ranked by predicted impact, escalation risk, and mission alignment.

As used herein, "attribution hypothesis" refers to a candidate explanation for a detected anomaly or behavioral deviation, derived from cross-domain correlation and causal path reconstruction. Attribution hypotheses are constructed by causal path inference engine and are scored based on multi-domain evidence, temporal coherence, and alignment with known adversary tactics. Attribution hypotheses may be confirmed or refuted through targeted ISR collection and scoring validation.

As used herein, "latent anomaly" refers to a deviation from expected behavioral patterns detected within latent space by latent anomaly detector. A latent anomaly may include unexpected trajectory shifts, cross-modal inconsistencies, or statistically rare co-occurrence patterns, and is evaluated using scoring models to determine operational significance.

Conceptual Architecture

Figure 1:
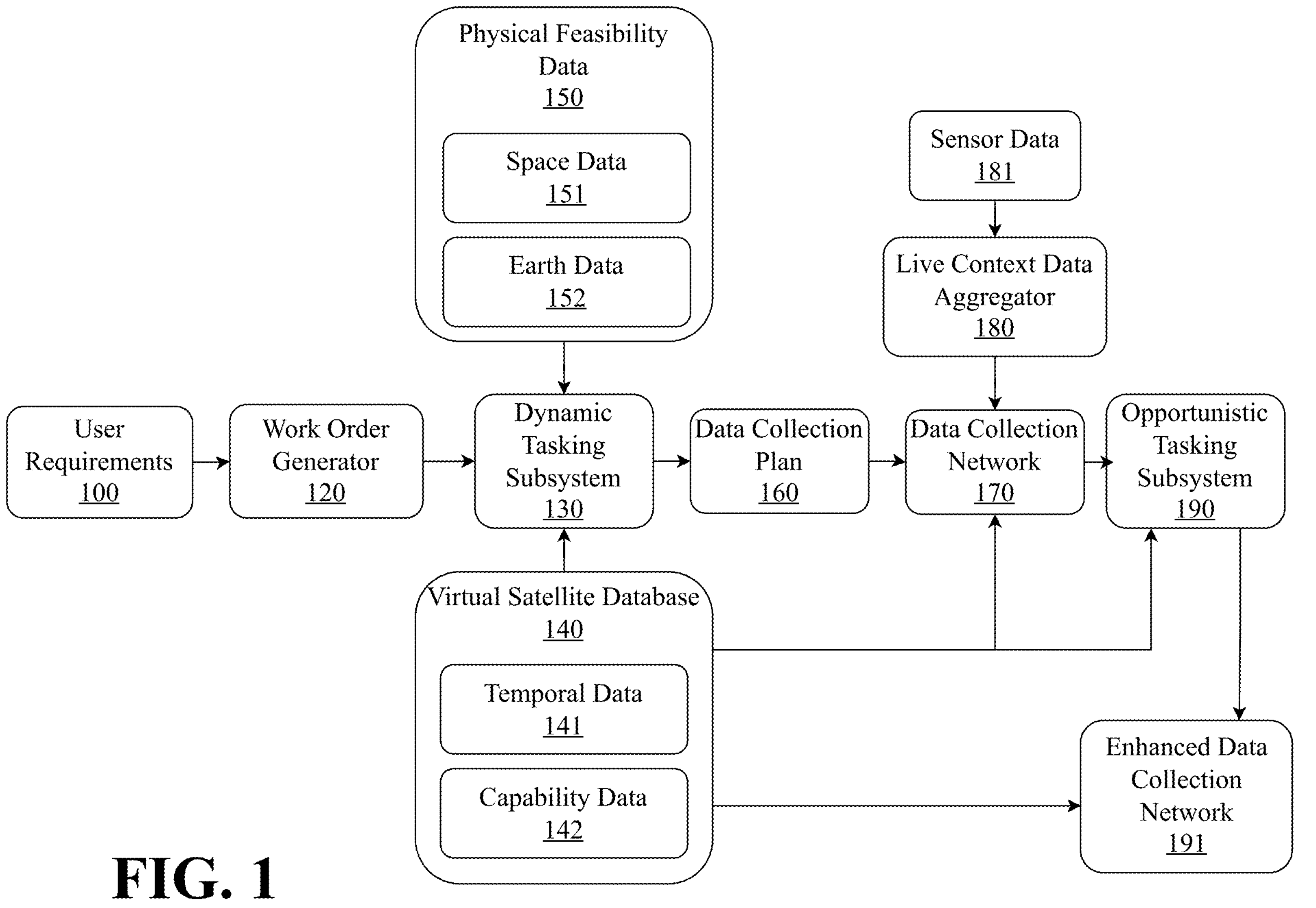
FIG. 1 is a block diagram illustrating an exemplary system architecture for an adaptive satellite data acquisition optimization platform.

FIG. 1 is a block diagram illustrating an exemplary system architecture for an adaptive satellite data acquisition optimization platform. The platform begins with user requirements 100 that are input into a work order generator 120. The work order generator 120 formalizes these requirements into structured collection parameters that can be processed by downstream components.

A dynamic tasking subsystem 130 serves as a central processing hub, orchestrating the complex interplay between collection requirements and operational constraints. This subsystem continuously processes inputs from the work order generator 120, which translates user requirements into machine readable collection parameters such as desired ground sample distance, collection timing, and coverage specifications. Satellite data acquisition optimization platform analyzes requirements against historic local/space weather and constellation capabilities including orbital coverage and revisit cadence via vendor feasibility APIs. The system's processing algorithms evaluate these requirements against real world collection conditions and constraints to determine optimal collection strategies, achieving a 94% persistent collection rate.

In an embodiment, a physical feasibility logic subsystem may enhance a feasibility analyzer by incorporating comprehensive checks for communication conditions in both X-band and S-band frequency ranges. An implementation may utilize data parameters defined in space data 151 and earth data 152 components to assess communication viability. For X-band interference assessment, the subsystem may evaluate factors such as solar interference using solar activity levels and radiation intensity data, ionospheric effects using ionospheric disturbance measurements, and terrain masking based on geographic composition data. These analyses may determine potential impacts on X-band downlink performance within a military frequency range, for example, 7.9-8.4 GHz. S-band weather impact assessment may focus on atmospheric conditions derived from earth data 152 inputs, including atmospheric signal loss from cloud cover, wind conditions, and temperature profiles. The subsystem may further analyze precipitation effects from cloud data and assess visibility using atmospheric visibility measurements to predict degradation in S-band uplink performance, for example, in the 2.2-2.3 GHz range.

In an embodiment, a geographic constraints analysis may evaluate communication feasibility across both frequency bands by considering target location parameters such as latitude, longitude, and elevation. This analysis may be enhanced through integration with radio frequency (RF) to geospatial intelligence (GEOINT) fusion capabilities and collaborative infrastructure components described in the system architecture. The analysis may account for terrain features that affect signal propagation, local weather patterns influencing transmission quality, and location-specific frequency restrictions. Through integration with an operational environment framework, a system may dynamically adjust collection parameters based on pattern-of-life analysis and structured target observations. The system may interface with environmental data sources, such as weather and space weather application programming interfaces (APIs), to retrieve real-time updates on parameters including cloud cover, precipitation, wind speed, temperature, visibility, solar activity, radiation levels, and ionospheric state. Significant changes in these parameters may trigger automatic feasibility reassessment. These components may generate a continuously updated feasibility assessment indicating X-band downlink and S-band uplink viability for each collection opportunity. This assessment may inform resource allocation decisions by components such as a task optimizer and a priority scheduler, while maintaining consistency with defined data flows in, for example, FIG. 4, and providing operational flexibility.

The platform incorporates comprehensive physical feasibility data 150 through two primary categories. Space data 151 includes parameters such as but not limited to solar activity levels, geomagnetic conditions, ionospheric disturbances, and charged particle densities that could impact collection quality. Earth data 152 includes but is not limited to atmospheric conditions including cloud cover percentages, precipitation forecasts, visibility levels, wind conditions at various altitudes, and terrain interference factors. For example, when planning a collection over a mountainous region, the system evaluates terrain shadows, cloud formations typical to mountainous areas, and seasonal snow cover patterns to determine optimal collection windows.

The system incorporates comprehensive feasibility analysis through, which automatically calculates collection feasibilities for a plurality of considerations per month by analyzing requirements against historical local/space weather and constellation capabilities including orbital coverage and revisit cadence via vendor feasibility APIs. The analysis builds a data collection plan, which determines the down selected list of imaging vendors meeting requirements for upcoming Looks. This approach significantly mitigates program risk by leveraging 50+ on orbit collection assets across vendors to overcome space-based challenges due to resolution, local/space weather, illumination, terrain obstructions and competition.

A virtual satellite database 140 functions as a dynamic repository of satellite resource information, continuously updated to reflect current constellation states and capabilities. The database maintains temporal data 141 that includes but is not limited to detailed orbital parameters such as satellite position, velocity vectors, and predicted overhead passes, along with scheduling constraints and collection windows. This temporal information aids in determining when specific satellites will have physical access to target areas. The database also maintains capability data 142 that catalogs each satellite's operational characteristics, including but not limited to spatial resolution capabilities (e.g., 30 cm to 1 m ground sample distance), available spectral bands (RGB, NIR, SWIR), imaging modes (strip, spotlight, wide-area), maximum off-nadir collection angles, and data downlink capabilities. For instance, when planning a collection requiring 50 cm resolution imagery of a coastal area, the platform queries the database to identify satellites that can achieve the required resolution while accounting for atmospheric conditions typical to coastal environments.

A dynamic tasking subsystem 130 processes the variety of inputs through optimization algorithms to generate a comprehensive data collection plan 160. This plan includes specific collection windows, sensor configurations, and orbital access points for each required collection. For example, if a collection requirement specifies morning imagery of an area prone to afternoon cloud cover, the system will prioritize satellites with favorable morning passes while considering factors such as sun angle and expected atmospheric conditions. Data collection plan 160 is then implemented through the data collection network 170, which interfaces with multiple satellite operators' tasking systems to schedule and execute collections according to the optimized plan.

Real-time feedback mechanisms are implemented through a live context data aggregator 180, which continuously processes sensor data 181 from various sources to maintain current situational awareness. This includes but is not limited to real-time weather updates, satellite telemetry data, and initial image quality assessments. For instance, if a satellite begins collecting imagery and detects unexpected cloud formation or degraded atmospheric conditions, this information is immediately processed by the aggregator. The system can then evaluate whether these conditions will impact collection quality and determine if adjustments are needed.

An opportunistic tasking subsystem 190 serves as an intelligent oversight mechanism, continuously analyzing collection performance and environmental conditions to identify opportunities for improved data collection. When the system detects suboptimal conditions or collection results, it can dynamically modify collection strategies in real-time. For example, if a planned collection using an optical satellite is compromised by unexpected cloud cover, the opportunistic tasking subsystem can rapidly identify and task an available SAR satellite capable of imaging through clouds. These modified collection tasks are redirected to an enhanced data collection network 190, which maintains access to additional or alternative satellite resources reserved for dynamic re-tasking scenarios. This adaptive approach ensures that collection opportunities are maximized while maintaining the quality standards specified in the original requirements.

The system maintains continuous data flow and feedback loops between components, enabling dynamic adjustment of collection strategies based on changing conditions and requirements. This architecture ensures optimal resource utilization while maintaining flexibility to adapt to varying collection scenarios and environmental conditions. The integration of real-time monitoring and adaptive planning capabilities enables the system to maximize collection success rates while minimizing resource waste.

Figure 2:
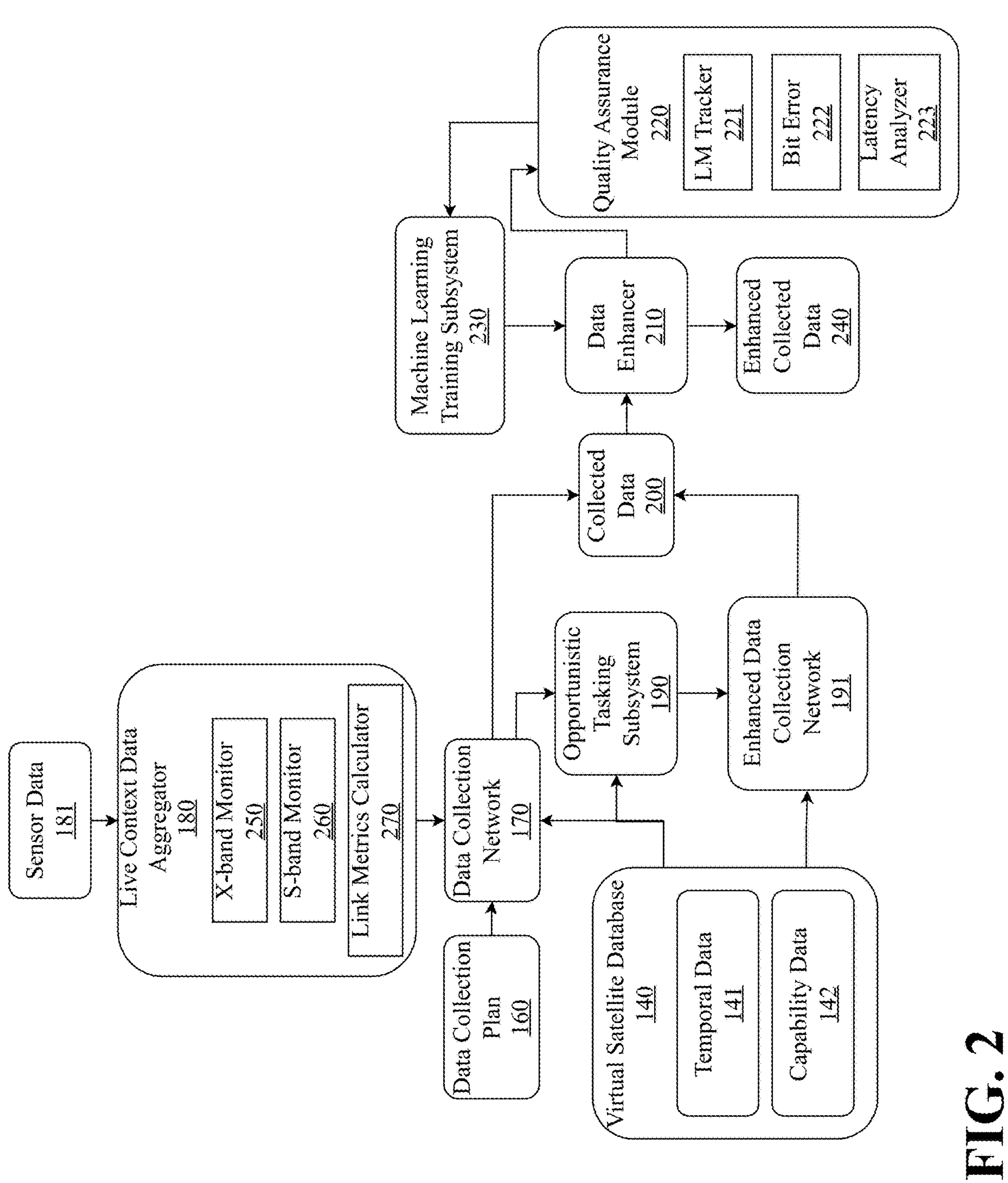
FIG. 2 is a block diagram illustrating an exemplary system architecture for an adaptive satellite data acquisition optimization platform with data quality assurance and quality reporting capabilities.

FIG. 2 is a block diagram illustrating an exemplary system architecture for an adaptive satellite data acquisition optimization platform with data quality assurance and quality reporting capabilities. The workflow begins with the execution of data collection plan 160 through data collection network 170, which coordinates satellite tasking and data reception. Live context data aggregator 180 continuously processes sensor data 181 to provide real-time feedback about collection conditions and initial data quality metrics.

The live context data aggregator 180 incorporates dedicated monitoring components for both X-band and S-band communications. The X-band monitor 250 tracks downlink quality performance in the 7.9-8.4 GHz range, while the S-band monitor 260 assesses uplink performance in the 2.2-2.3 GHz range. A Link Metrics Collector 270 continuously aggregates real-time performance data including signal strength, inference levels, and atmospheric impacts on both frequency bands.

The system employs parallel processing paths to maximize collection success and data quality. When the primary collection network identifies potential quality issues or collection constraints, the opportunistic tasking subsystem 190 can redirect collection tasks to an enhanced data collection network 191. This network leverages additional satellite resources identified through the virtual satellite database 140, which provides both temporal data 141 about satellite availability and capability data 142 regarding sensor specifications and operational parameters. For example, if initial collection attempts are compromised by environmental conditions, the system can automatically transition to satellites with more suitable capabilities for the current conditions.

Once data is successfully collected, it flows into the collected data repository 200, which serves as a secure staging area for incoming satellite imagery and associated metadata. This repository manages multiple data streams from various satellite platforms, each with their own format specifications and quality characteristics. The collected data may include multiple spectral bands, varying spatial resolutions, and different levels of atmospheric interference based on collection conditions.

A data enhancer 210 implements a sophisticated suite of enhancement algorithms tailored to address specific quality challenges in satellite imagery. For atmospheric correction, the system may analyze atmospheric conditions at the time of collection, including aerosol content, water vapor, and other atmospheric constituents to remove their effects from the imagery. Resolution enhancement employs advanced super-resolution techniques that can improve spatial detail while preserving spectral fidelity. Geometric accuracy improvements address issues such as terrain-induced distortions, satellite positioning errors, and perspective effects from off-nadir collections. In some embodiments, data enhancer 210 may utilize machine learning algorithms to improve the quality of collected data. Different algorithms may be necessary to address different data types.

A machine learning training subsystem 230 maintains a comprehensive database of enhancement scenarios and their outcomes, continuously learning from each enhancement operation. Building upon the target trajectory modeling techniques disclosed in U.S. Pat. No. 11,861,894 B1, when new data arrives, the system analyzes its characteristics—such as collection geometry, atmospheric conditions, sensor type, and target characteristics—and compares them against this historical database. For example, when processing imagery collected over urban areas during humid conditions, the system draws upon learned parameters from similar collections to optimize dehazing algorithms and contrast enhancement techniques.

The system's data ecosystem incorporates multiple specialized capabilities as shown in the architecture. Object-based production capabilities enable structured observations of targets, while Pattern of Life (POL) analysis provides deep behavioral understanding. AI/ML and Computer Vision processing occurs at both central and edge locations, enabling rapid exploitation of collected data. Persistent Surveillance integration, combined with Dynamic Exploitation capabilities and Over the Horizon Targeting, ensures comprehensive situational awareness. Precision Geolocation services provide accurate positioning data, while integration with mission communication infrastructure enables tactical dissemination of processed intelligence. These capabilities work in concert with the Satellite data acquisition optimization platform collection orchestration system to ensure optimal data acquisition and exploitation.

The system has demonstrated operational performance through processing over 55,000 image collections across multiple vendors while meeting rigorous requirements for global facility coverage, monitoring cadence, accurate CV Recall and Precision performance, and precise geolocations for detected objects. The system leverages real-time local and space weather data from commercial forecast APIs along with constellation asset data including operational status, GSD, slew agility, competitive tasking overrides, tasking uplink. Cutoff windows, and downlink, backhaul, and production latency.

A quality assurance module 220 implements a multi-stage validation process for enhanced data products. Initial validation includes automated checks for geometric accuracy, radiometric calibration, and spatial resolution verification. Building upon the confidence interval calculations established in U.S. Pat. No. 11,861,894 B1, the module implements secondary validation examining enhancement-specific metrics, such as improvement in signal-to-noise ratio, reduction in atmospheric artifacts, and maintenance of spectral characteristics. The module also performs contextual validation, ensuring that enhancements have not introduced artificial features or unintended modifications to the imagery.

The system's data ecosystem has been proven to integrate with multiple specialized capabilities including state-of-the-art data science practices that leverage mass volumes of expertly curated data. Over the course of operational testing, CV model F1 Scores against target object schema have shown significant improvement, with up to 34% growth in specific object class performance.

Quality assurance module 220 may include components configured for communication quality monitoring. A quality assurance integration may include enhancements to support monitoring of X-band and S-band communication metrics. This integration may enable comprehensive evaluation of communication quality, while providing performance data to task optimizer 412 and dynamic tasking subsystem 130 to support ongoing optimization.

Link margin calculations may be integrated into live context data aggregator 180 to continuously monitor and compute margins for both X-band downlink and S-band uplink communications. These calculations may incorporate atmospheric conditions from environmental analyzer 512 and space weather impacts derived from space data 151. The system may maintain distinct margin thresholds, for example, a 3.0 dB margin for high-priority communications and a 2.0 dB margin for normal-priority communications, to ensure appropriate quality levels based on operational requirements.

Bit error rate monitoring implements within the data collection network 170, tracking error rates for both uplink commands and downlink data streams. The system enforces the maximum allowable error rate of $10^{-6}$, with real-time monitoring to detect any degradation in communication quality. This monitoring focuses particularly on weather impacted periods, using Earth Data 152 to correlate environmental conditions with communication performance.

Latency tracking operations through performance monitor 513, measuring end-to-end communication delays across both X-band and S-band paths. The system tracks multiple latency components including ground station processing time, signal propagation delay, and satellite processing overhead. These measurements maintain the system's 4 hour latency requirement for data delivery.

Feedback loops between components include communication performance metrics. When quality assurance module 220 identifies communication quality issues, it provides detailed metrics on link margins 221, bit error rates 222, and latency 223 to both data enhancer 210 and machine learning subsystem 230. This feedback enables dynamic optimization of communication parameters based on actual performance data. For instance, if certain atmospheric conditions consistently impact X-band or S-band performance during specific collection windows, this information is incorporated into future scheduling and resource allocation decisions.

Quality metrics feed back into the tasking optimization process through opportunistic tasking subsystem 190, enabling dynamic adjustments to communication schedules and resource allocation based on actual performance data. Alternative plan generator 532 uses this quality data to develop contingency plans when performance metrics indicate potential communication challenges, ensuring continuous mission support under degraded conditions. All quality metrics and performance data store in model and training database 306, supporting long-term analysis and system optimization.

The system's quality assurance capabilities have been validated through extensive operational testing, achieving object detection precision and recall performance exceeding 90% F1/mAP50 across object classes. This performance is achieved through gold standard datasets that are meticulously labeled and strictly segregated from training data to ensure that each CV's model performance matches analytical capabilities of human experts. The system maintains an ever growing library consisting of thousands of gold-standard labels aligned to super and subcategories.

The final enhanced collected data 240 product represents imagery that has been optimized across multiple quality dimensions while maintaining data integrity. This might include imagery where cloud shadows have been corrected, haze has been removed, and resolution has been enhanced to better define feature boundaries. The enhancement process maintains careful documentation of all modifications, ensuring that downstream applications have access to both the enhanced imagery and a complete processing audit trail.

Figure 3:
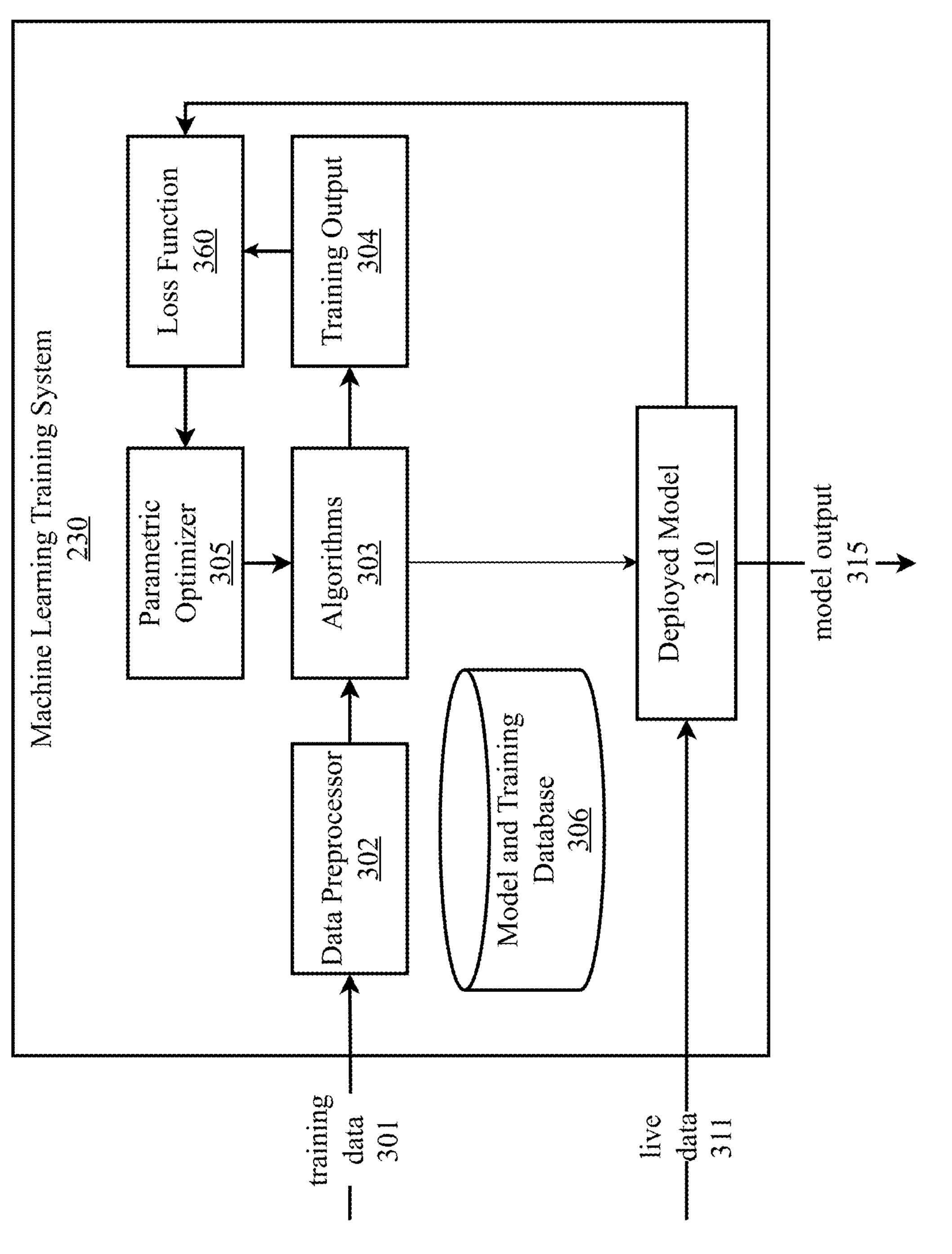
FIG. 3 is a block diagram illustrating an exemplary component of a system for an adaptive satellite data acquisition optimization platform with data quality assurance and quality reporting capabilities, a machine learning training subsystem.

FIG. 3 is a block diagram illustrating an exemplary component of a system for an adaptive satellite data acquisition optimization platform with data quality assurance and quality reporting capabilities, a machine learning training subsystem. According to the embodiment, machine learning training subsystem 230 may comprise a model training stage comprising a data preprocessor 302, one or more machine and/or deep learning algorithms 303, training output 304, and a parametric optimizer 305, and a model deployment stage comprising a deployed and fully trained model 310 configured to perform tasks described herein such enhance the quality of gathered satellite data.

At the model training stage, a plurality of training data 301 may be received by machine learning training subsystem 230. Data preprocessor 302 may receive the input data (e.g., satellite data, hyperspectral data, compressed data, images, videos) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 302 may also be configured to create training dataset, a validation dataset, and a test set from the plurality of input data 301. For example, a training dataset may comprise 80% of the preprocessed input data, the validation set 10%, and the test dataset may comprise the remaining 10% of the data. The preprocessed training dataset may be fed as input into one or more machine and/or deep learning algorithms 303 to train a predictive model for object monitoring and detection.

During model training, training output 304 is produced and used to measure the accuracy and usefulness of the predictive outputs. During this process a parametric optimizer 305 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training subsystem 270 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, and personal identifying information/payment card industry redaction, to name a few. In one embodiment, the system may utilize a loss function 360 to measure the system's performance. The loss function 360 compares the training outputs with an expected output and determined how the algorithm needs to be changed in order to improve the quality of the model output. During the training stage, all outputs may be passed through the loss function 360 on a continuous loop until the algorithms 303 are in a position where they can effectively be incorporated into a deployed model 315.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 311 (e.g., satellite data, hyperspectral data, compressed data, images, videos). Further, model correlations and restorations made by deployed model can be used as feedback and applied to model training in the training stage, wherein the model is continuously learning over time using both training data and live data and predictions. A model and training database 306 is present and configured to store training/test datasets and developed models. Database 306 may also store previous versions of models.

According to some embodiments, the one or more machine and/or deep learning models may comprise any suitable algorithm known to those with skill in the art including, but not limited to: Large Language Models (LLMs), generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 303 may comprise a deep learning algorithm such as neural networks (e.g., recurrent, convolutional, long short-term memory networks, etc.). Extending the trajectory modeling capabilities disclosed in U.S. Pat. No. 11,861,894 B1, these networks are trained on both historical enhancement results and target custody data to optimize processing parameters based on specific collection conditions and data characteristics. In some implementations, the machine learning subsystem 230 automatically generates standardized model scorecards for each model produced to provide rapid insights into the model and training data, maintain model provenance, and track performance over time.

In some implementations, the machine learning training subsystem 230 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 306.

Figure 4:
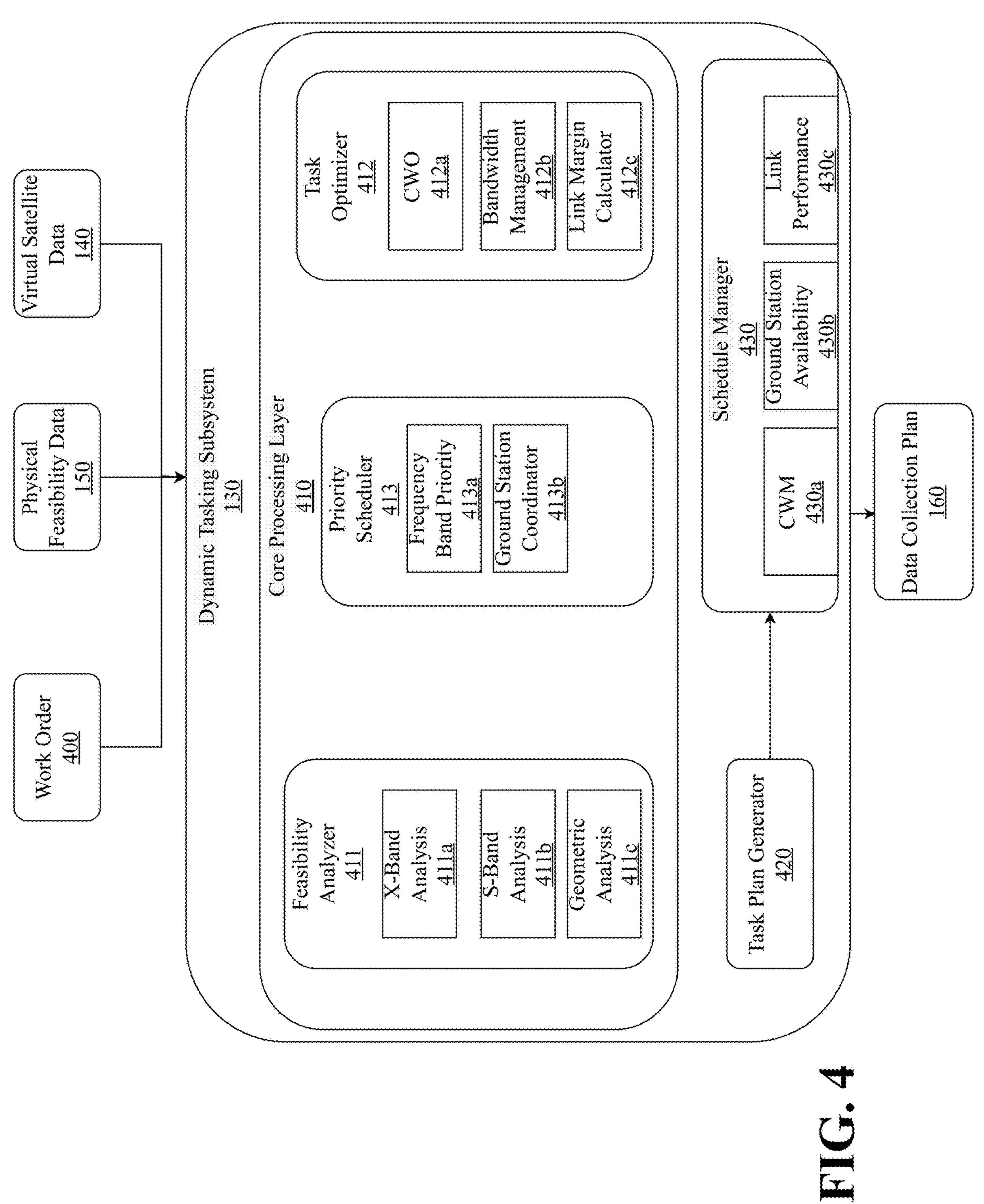
FIG. 4 is a block diagram illustrating an exemplary component of a system for an adaptive satellite data acquisition optimization platform with data quality assurance and quality reporting capabilities, a dynamic tasking subsystem.

FIG. 4 is a block diagram illustrating an exemplary component of a system for an adaptive satellite data acquisition optimization platform with data quality assurance and quality reporting capabilities, a dynamic tasking subsystem. Dynamic tasking subsystem receives work orders 400 containing specific collection requirements, physical feasibility data 150 providing environmental and operational constraints, and virtual satellite data 140 describing available collection resources. Core processing layer 410 represents the analytical core of the dynamic tasking subsystem, implementing algorithms to process multiple data streams and constraints simultaneously.

In one embodiment, a feasibility analyzer 411 processes the combined inputs through a multi-stage evaluation pipeline to determine viable collection options. In the first stage, it overlays orbital access windows from the virtual satellite data 140 with collection requirements to identify basic geometric compatibility. For example, when processing a requirement for 50 cm resolution imagery of a coastal area, feasibility analyzer 411 first identifies satellites capable of achieving this resolution, then calculates their viewing geometries and access times for the target location. In the second stage, feasibility analyzer 411 integrates physical feasibility data 150 to assess environmental impacts. This includes evaluating predicted cloud cover patterns, analyzing historical weather trends for the collection window, and calculating sun angles to ensure proper illumination. Feasibility analyzer 411 might determine that morning collections between 0900-1100 local time provide optimal illumination while avoiding typical afternoon cloud formation patterns.

In another embodiment, feasibility analyzer 411 may perform detailed geometric analysis, calculating factors such as target-to-sensor viewing angles and their impact on achievable resolution. For instance, if a satellite's nominal resolution is 50 cm at nadir (directly overhead), the analyzer calculates how this degrades at various viewing angles, perhaps determining that a 30-degree off-nadir angle would result in 65 cm resolution-potentially exceeding the requirement threshold. These calculations incorporate terrain effects, such as how mountain shadows might impact collection windows or how urban canyon effects could influence image quality at certain collection angles. Feasibility analyzer 411 aggregates these various constraints to generate a comprehensive feasibility score for each potential collection opportunity, considering factors such as predicted image quality, collection reliability, and compliance with requirement specifications.

Feasibility analyzer 411 incorporates dedicated communication analysis components for both uplink and downlink assessments. X-Band analyzer 411*a* evaluates downlink feasibility in the military X-band frequency range (7.9-8.4 GHz), analyzing potential interference from solar activity, ionospheric disturbances, and terrain masking effects. For each potential collection opportunity, it calculates expected signal degradation from atmospheric and space weather conditions, producing a comprehensive uplink feasibility score. S-band analyzer 411*b* component performs similar analysis for uplink communications in the 2.2-2.3 GHz frequency range, with particular focus on atmospheric signal loss from cloud cover, precipitation, and other weather impacts. Geographic constraints analyzer 411*c* evaluates terrain features and location specific restrictions that could impact either frequency band, incorporating data about terrain elevation, ground station visibility windows, and regional frequency use regulations.

For each viable collection opportunity, feasibility analyzer 411 generates detailed feasibility metrics that include confidence scores for various quality factors, predicted resolution at specific collection geometries, and potential risk factors that could impact collection success. These metrics might indicate, for example, that a morning collection at 15 degrees off-nadir would provide 55 cm resolution with 85% confidence of clear skies, while an afternoon collection at 25 degrees off-nadir would offer 60 cm resolution but only 60% confidence of clear conditions.

A task optimizer 412 builds upon the feasibility analyzer's 411 outputs by implementing an optimization framework to determine the most efficient collection strategies. When processing multiple collection opportunities, task optimizer 412 may employ a weighted scoring algorithm that considers both feasibility metrics and operational efficiency factors. For example, when optimizing collections across a geographic region, task optimizer 412 might identify that combining collections into a single satellite pass would reduce tasking overhead by 40% compared to separate collections, even if individual image quality might be slightly lower.

Task optimizer 412 includes specialized components for communication resource optimization. Communication window optimizer (CWO) 412*a* analyses potential transmission windows for both X-band downlink and S-band uplink considering factors such as ground station visibility, atmospheric conditions, competing traffic demands. Bandwidth manager 412*b* allocates available bandwidth across the constellation, implementing dynamic adjustments based on mission priorities and real-time conditions. Link margin calculator 412*c* continuously assesses expected link margins for both frequency bands, maintaining separate thresholds for high-priority communications (3.0 dB margin) and normal-priority communications (2.0 dB margin). These components work together to ensure optimal utilization of available communication resources while maintaining required quality of service levels.

The optimization process considers resource utilization patterns across multiple timescales. On a tactical level, it evaluates immediate collection opportunities, such as determining whether to collect imagery at a 20-degree off-nadir angle now versus waiting two days for a more direct overhead pass. Task optimizer 412 weighs factors such as predicted weather patterns, competing collection requirements, and the urgency of the collection requirement. For instance, if weather forecasts show deteriorating conditions over the next week, the optimizer might prioritize a less-than-ideal current collection opportunity over waiting for perfect conditions.

Priority Schedule 413 incorporates frequency band prioritization and ground station coordination capabilities. The frequency band prioritizer 413*a* manages competing demands for X-band and S-band resources, implementing a sophisticated ranking algorithm that considers factors such as mission criticality, weather impacts, and resource availability. The ground station coordinator 413*b* optimizes the allocation of ground station resources across multiple collection tasks, managing conflicts between uplink and downlink requirements while ensuring continuous coverage for critical operations.

A priority scheduler 413 implements a dynamic prioritization framework that manages multiple competing collection requirements. Priority scheduler 413 employs a multi-factor ranking algorithm that considers not just traditional priority levels, but also temporal dependencies, resource availability and windows. For example, when managing high-priority collections in regions with frequent cloud cover, the scheduler might temporarily elevate the priority of lower-priority tasks during clear weather windows to ensure efficient resource utilization.

Priority scheduler 413 may also implement conflict resolution mechanisms for competing collection requirements. When multiple high-priority collections vie for the same satellite resources, priority scheduler 413 may evaluate trade-offs and develops optimal scheduling solutions. For instance, if two collections require similar viewing geometries in nearby locations, the scheduler might bundle them into a single optimized collection sequence. Priority scheduler 413 may also maintain awareness of satellite tasking lead times and planning horizons, ensuring that high-priority collections are queued with sufficient advance notice to secure necessary resources.

Schedule Manager 430 includes dedicated components for communication and monitoring. Communication window management 430*a* maintains real-time oversight of all planned communication windows, dynamically adjusting schedules based on changing conditions and requirements. Ground station availability 430*b* tracks the current status and future availability of all ground stations, enabling efficient resource allocation and conflict resolution. Link performance monitoring 430*c* provides continuous assessment of communication quality across both frequency bands, enabling rapid identification and response to any degradation in performance. These maintain close integration with containerized analytics workbench through live context data aggregator 180, enabling comprehensive monitoring and management of all communication resources.

A task plan generator 420 transforms abstract collection requirements and optimization results into concrete, executable collection plans through a multi-stage process. For each optimized collection opportunity, task generator 420 creates detailed tasking parameters that specify exact collection geometries, sensor modes, and timing requirements. For example, when generating a plan for urban area imagery, the platform might specify a collection window of 1015-1025 local time, with the sensor operating in multispectral mode at 11-bit radiometric resolution, using a specific combination of spectral bands optimized for urban feature extraction.

Task generator 420 creates vendor-specific tasking instructions that account for different satellite operators' capabilities and requirements. These instructions may include specific orbital access points, sensor commanding sequences, and data handling requirements. For instance, when tasking a high-resolution optical satellite, the generator might specify a dynamic imaging sequence that adjusts exposure settings based on predicted surface reflectance variations, while for a SAR satellite, it might define specific beam modes and polarization combinations optimized for the target characteristics.

A schedule manager 430 serves as the tactical execution component, implementing sophisticated scheduling algorithms to coordinate multiple collection tasks across various satellite resources. The manager interfaces with specialized systems include an operational environment framework workbench for TECPED operations, distributed edge computing edge computing nodes for distributed processing, Full Motion Video (FMV) processing capabilities, and RF to GEOINT fusion services. Through these interfaces, schedule manager 430 maintains a dynamic scheduling database that tracks all planned collections, their dependencies, and their temporal constraints, while coordinating with the broader partner community for comprehensive collection management. This integrated approach ensures efficient utilization of collection assets while maintaining the flexibility to respond to changing operational requirements.

Communication schedule management system enhances satellite data acquisition optimization platform's scheduling capabilities through integration with both schedule manager 430 and data collection network 170. This enhancement addresses uplink ad downlink communication requirements while maintaining coordination with the containerized analytics workbench through live context data aggregator 180. X-band uplink window management operates within satellite data acquisition optimization platform's scheduling system, utilizing virtual satellite database 140 to track constellation communication windows. The system maintains dynamic scheduling of uplink opportunities based on orbital parameters 634 and coverage area limitations 635. These windows update continuously based on physical feasibility data 150, incorporating space and Earth conditions affecting X-band transmission quality in the 7.9-8.4 GHz range. S-band downlink management coordinates through enhanced data collection network 191, tracking optimal downlink windows for each satellite within the 2.2-2.3 GHz frequency range. The scheduling system employs environmental analyzer 512 to assess and predict viable downlink opportunities based on environmental conditions. Ground station coordination operates through data collection network 170, with satellite tasking manager 530 orchestrating multi-station communications. This includes real-time assessment of station availability, loading, and scheduling conflicts. The system optimizes station utilization by balancing uplink and downlink requirements while maintaining critical coverage.

Containerized analytics workbench integration occurs through live context data aggregator 180, providing real-time communication monitoring. This enables immediate feedback on communication quality, link margins, and window utilization. Performance monitor 513 tracks effectiveness and enables dynamic schedule adjustments. Through the enhanced data collection network 191, the tasking manager maintains priority access to a subset of satellite resources specifically configured for rapid response scenarios. The network leverages multiple data collection modalities including SAR, EO, and RF sensors, while incorporating edge computing capabilities for real-time processing and exploitation. The system has successfully orchestrated over 55,000 individual collections and run CV inference on over 180,000 EO scenes, with the unique ability to process rapid Level-0 images which are typically available hours in advance of further vendor processing. These resources might include satellites with more flexible tasking protocols, better maneuverability, or specialized imaging capabilities. The network is managed through a dedicated tasking interface that enables expedited command sequences and priority data routing when implementing alternative collection plans. This comprehensive scheduling system operates within dynamic tasking subsystem 130, synchronizing communication schedules with overall mission execution. The approach provides flexible management of uplink and downlink communications while adapting to dynamic conditions and requirements.

When managing multiple collections in a geographic region, the schedule manager might identify that shifting a collection time by 15 minutes would enable more efficient use of satellite resources while still meeting all collection requirements. Schedule manager 430 also implements contingency management capabilities, maintaining alternative collection options for critical requirements. For example, if a primary collection is at risk due to developing weather conditions, the manager can automatically activate pre-planned backup collections using alternative satellites or different imaging modes. The manager continuously monitors scheduling conflicts and resource constraints, implementing real-time adjustments to maintain optimal collection efficiency.

Schedule manager's 430 automated capabilities have been validated through extensive operational testing, processing over 1,700 EO images weekly through integration with vendor tasking APIs to calculate true physical and competitive feasibilities. The system continuously monitors and refines planned collections for each Look hundreds of times per hour by polling vendor APIs for order status and weather forecast APIs for cloud coverage, automatically rescheduling at-risk collections.

A resulting data collection plan 160 represents a comprehensive collection strategy that includes primary collection tasks, backup options, and detailed execution parameters. Each plan may include specific timing sequences, sensor configurations, data routing instructions, and quality verification requirements. For instance, a plan might specify that initial image quality checks must be completed within 5 minutes of collection to enable rapid activation of backup collections if necessary. These plans are continuously updated based on feedback from the collection network, ensuring that collection strategies remain optimized as conditions change.

Throughout this process, the system maintains dynamic awareness of changing conditions and requirements, allowing for real-time adjustments to collection strategies when necessary. For instance, if weather conditions deteriorate for a planned collection, the system can rapidly reprocess through the core layer to identify alternative approaches or collection assets.

Figure 5:
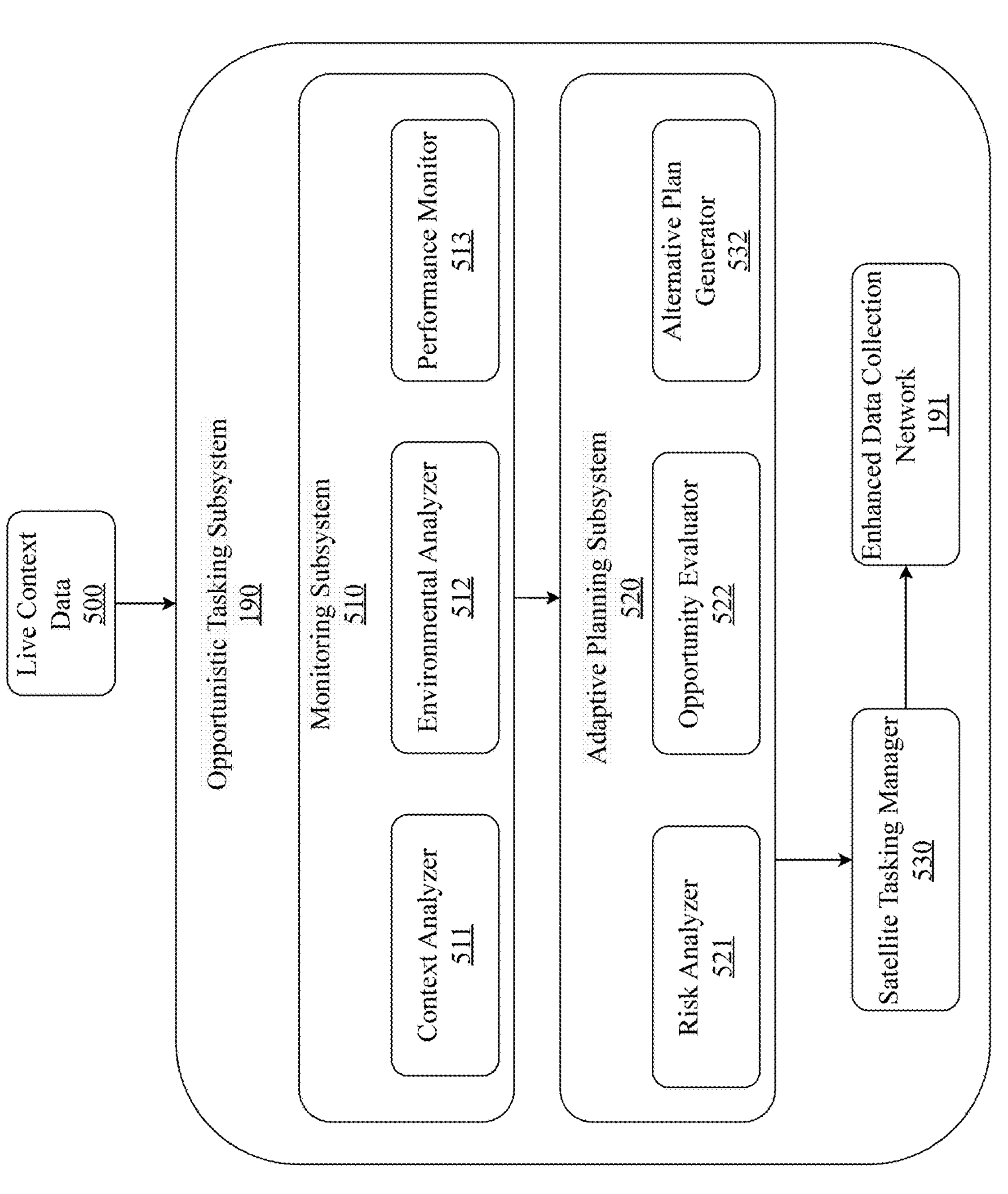
FIG. 5 is a block diagram illustrating an exemplary component of a system for an adaptive satellite data acquisition optimization platform with data quality assurance and quality reporting capabilities, an opportunistic tasking subsystem.

FIG. 5 is a block diagram illustrating an exemplary component of a system for an adaptive satellite data acquisition optimization platform with data quality assurance and quality reporting capabilities, an opportunistic tasking subsystem. The opportunistic tasking subsystem processes live context data 500 through multiple components to enable dynamic adaptation of collection strategies. The monitoring subsystem 510 serves as the first layer of analysis, implementing a plurality of monitoring components.

A context analyzer 511 processes real-time situational data to understand current collection conditions. For example, when monitoring an ongoing collection sequence, it might detect that a target area is experiencing unexpected urban development activity that could affect collection quality. An environmental analyzer 512 specifically focuses on environmental factors that could impact collection success. It processes real-time weather updates, atmospheric condition changes, and environmental phenomena that might affect collection quality. For instance, it might detect a developing dust storm that could degrade image quality several hours before it impacts the collection area. A performance monitor 513 evaluates the effectiveness of current collection strategies in real-time, tracking metrics such as image quality scores, collection success rates, and resource utilization efficiency.

In one embodiment, context analyzer 511 employs a multi-layered analysis framework to process real-time situational data. At its lowest level, it ingests raw sensor data from multiple sources, including but not limited to satellite telemetry, ground-based sensors, and external monitoring systems. This data undergoes initial preprocessing to normalize formats and temporal alignment before being fed into analysis modules. For instance, when analyzing urban areas, context analyzer 511 employs change detection algorithms that compare current imagery with historical baselines to identify significant changes. These algorithms can detect construction activities, temporary structures, or surface material changes that might affect reflectance characteristics and impact collection quality. Context analyzer 511 implements pattern recognition techniques to identify both gradual trends and sudden changes in collection conditions, using machine learning models trained on historical collection scenarios.

Environmental analyzer 512 maintains an integrated environmental modeling system that combines data from multiple weather services and atmospheric monitoring systems. It processes this data through a hierarchical analysis pipeline that evaluates conditions at different atmospheric levels and temporal scales. For example, when analyzing a planned collection area, it simultaneously evaluates ground-level conditions (such as fog or smoke), mid-level phenomena (cloud formations and precipitation), and upper-atmospheric effects (such as jet stream patterns and aerosol concentrations). Environmental analyzer 512 may employ predictive modeling techniques that can forecast how current conditions will evolve over various timeframes, from hours to days. These models account for diurnal patterns, seasonal trends, and local geographic influences on weather patterns. The system calculates specific impact metrics for different collection scenarios—for instance, determining that morning haze will reduce contrast ratios by 30% for visible spectrum collections but have minimal impact on SAR collections.

Performance monitor 513 implements a comprehensive metrics tracking system that evaluates collection performance across multiple dimensions. It maintains a real-time database of collection attempts, success rates, and quality metrics, processing this information through statistical analysis engines to identify trends and anomalies. Performance monitor 513 tracks both absolute performance metrics (such as achieved resolution and geometric accuracy) and relative metrics that compare actual results against predicted performance. For each collection, it generates detailed quality scores based on multiple parameters including signal-to-noise ratio, ground sample distance achieved versus planned, and geometric accuracy. These metrics are continuously updated and compared against historical performance baselines to identify degradation trends or systematic issues.

An adaptive planning subsystem 520 integrates monitoring outputs through a decision-making framework. A risk analyzer 521 implements a multi-factor risk assessment model that quantifies both immediate and potential future threats to collection success. It processes risk factors through a weighted scoring algorithm that considers both the probability and impact of various failure modes. For example, when evaluating a collection sequence over a coastal region, the analyzer might determine that morning fog presents a 70% probability of reducing image quality below requirements, while afternoon sea breeze patterns create a 40% probability of cumulus cloud formation. Each risk factor is assigned an impact score based on its effect on different collection parameters—for instance, calculating that light fog might degrade resolution by 20% while dense fog would prevent usable collection entirely.

An opportunity evaluator 522 maintains a dynamic opportunity scoring system that continuously assesses potential collection improvements. It implements a comparative analysis engine that evaluates current collection plans against potential alternatives across multiple parameters. For instance, when a new satellite becomes available, opportunity evaluator 522 calculates potential improvements in collection geometry, timing, and sensor capabilities compared to currently tasked assets. The evaluation process considers factors such as improved ground sample distance (e.g., 30 cm versus 50 cm resolution), better viewing angles (15 degrees off-nadir versus 25 degrees), or more favorable illumination conditions. Each opportunity is scored based on both its potential improvement over current plans and its probability of successful execution.

An alternative plan generator 532 employs a planning algorithm that develops multiple contingency options for each collection requirement. When risks or opportunities are identified, it generates detailed collection scenarios that account for satellite capabilities, orbital mechanics, and collection constraints. For example, if cloud cover threatens a primary collection, the generator might develop three alternative plans: one using a different imaging window with the same satellite, another using a different satellite with better viewing geometry, and a third employing SAR imaging to penetrate cloud cover. Each alternative plan includes specific timing sequences, sensor configurations, and data handling requirements optimized for the particular scenario.

A satellite tasking manager 530 implements a resource management system that maintains real-time control over satellite tasking and collection execution. It maintains a dynamic tasking database that tracks satellite availability, current tasking status, and response capabilities for rapid re-tasking. Satellite tasking manager 530 may employ a priority-based tasking protocol that can preempt lower-priority collections when necessary to exploit critical opportunities. For instance, if a high-priority collection is compromised by unexpected weather, the manager can immediately evaluate currently tasked satellites, identify those that could be re-tasked without significantly impacting their current missions, and implement the most efficient re-tasking solution. The manager also maintains awareness of satellite-specific constraints such as minimum re-tasking notice requirements, fuel status, and data downlink limitations, ensuring that adaptive tasking decisions remain within operational constraints.

Through the enhanced data collection network 191, the tasking manager maintains priority access to a subset of satellite resources specifically configured for rapid response scenarios. These resources are coordinated through an operational environment framework work bench for comprehensive TCPED operations, leveraging edge computing capabilities through Distributed edge computing nodes for distributed processing. The network enables integration with FMV processing capabilities and specialized collection assets for Over the Horizon Targeting and Precision Geolocation services. This enhanced infrastructure supports both Object-Based Production and Dynamic Exploitation requirements while maintaining tactical dissemination paths through mission communication infrastructure.

FIG. 6 is a block diagram illustrating an exemplary, non-exhaustive list of data sets for space data, Earth data, and capability data that may be incorporated into the system to enhance task allocation. The data categories and specific parameters illustrated in FIG. 6 represent exemplary types of information that may be utilized by the system, but should not be considered an exhaustive or limiting list of all possible data inputs. The dynamic nature of satellite operations, coupled with continuous advances in sensor technology and environmental monitoring capabilities, means that additional data types and parameters may be incorporated into the system's decision-making processes. For example, while the space data category lists several fundamental space weather parameters, the system may also process other space environment characteristics such as micrometeoroid activity, thermal conditions, or electromagnetic interference patterns. Similarly, the earth data category could expand to include additional atmospheric phenomena, seasonal patterns, or localized environmental effects that influence collection success. The capability data category may evolve to incorporate new sensor technologies, novel collection modes, or advanced platform capabilities as they become available. The system's architecture is specifically designed to accommodate and integrate new data sources and parameters as they become relevant to optimizing collection operations, ensuring that the platform remains adaptable to emerging requirements and capabilities.

The space data 151 category encompasses critical space environment parameters that can impact collection quality and satellite operations. Solar activity level 610 monitoring tracks solar flares, coronal mass ejections, and general solar output that can affect satellite operations and imaging quality. Geomagnetic conditions 620 include measurements of Earth's magnetic field variations that can impact satellite electronics and positioning accuracy. Radiation intensity 630 monitoring measures various forms of space-based radiation that can affect sensor performance and satellite operations. Charged particle density 640 tracking provides information about the concentration of energetic particles that can interfere with satellite electronics and imaging sensors. Ionospheric disturbances 650 monitoring tracks perturbations in the ionosphere that can affect signal propagation and data transmission.

The earth data 152 category includes atmospheric and surface conditions critical for collection planning. Cloud cover and type 620 analysis provides detailed information about cloud formations, density, and movement patterns that directly impact optical imaging capabilities. Atmospheric visibility 621 measurements track various atmospheric phenomena including haze, dust, and aerosol concentrations that affect image quality. Wind speeds and directions 622 at various altitudes influence both atmospheric conditions and potential platform stability. Geographical composition 623 data provides information about terrain types, surface materials, and features that affect collection geometry and image quality. Temperature profiles 624 through various atmospheric layers impact both sensor performance and atmospheric conditions affecting collection quality.

The capability data 142 category details the specific operational characteristics of available collection assets. Spatial resolution 630 specifications define the ground sample distance achievable under various collection conditions. Available spectral bands 631 describe the specific portions of the electromagnetic spectrum each sensor can collect, from visible light through various infrared bands to radar frequencies. Imaging modes 632 detail the various collection configurations available, such as strip mapping, spotlight, or wide-area collection capabilities. Revisit frequency 633 defines how often a satellite can image the same location based on orbital parameters. Orbital parameters 634 specify the satellite's orbit characteristics including altitude, inclination, and period. Coverage area limitations 635 define geographical and temporal constraints on collection capabilities. Sensor types 636 specify the fundamental collection technology employed, such as optical, synthetic aperture radar, or multispectral imaging systems.

Detailed Description of Exemplary Aspects

Figure 7:
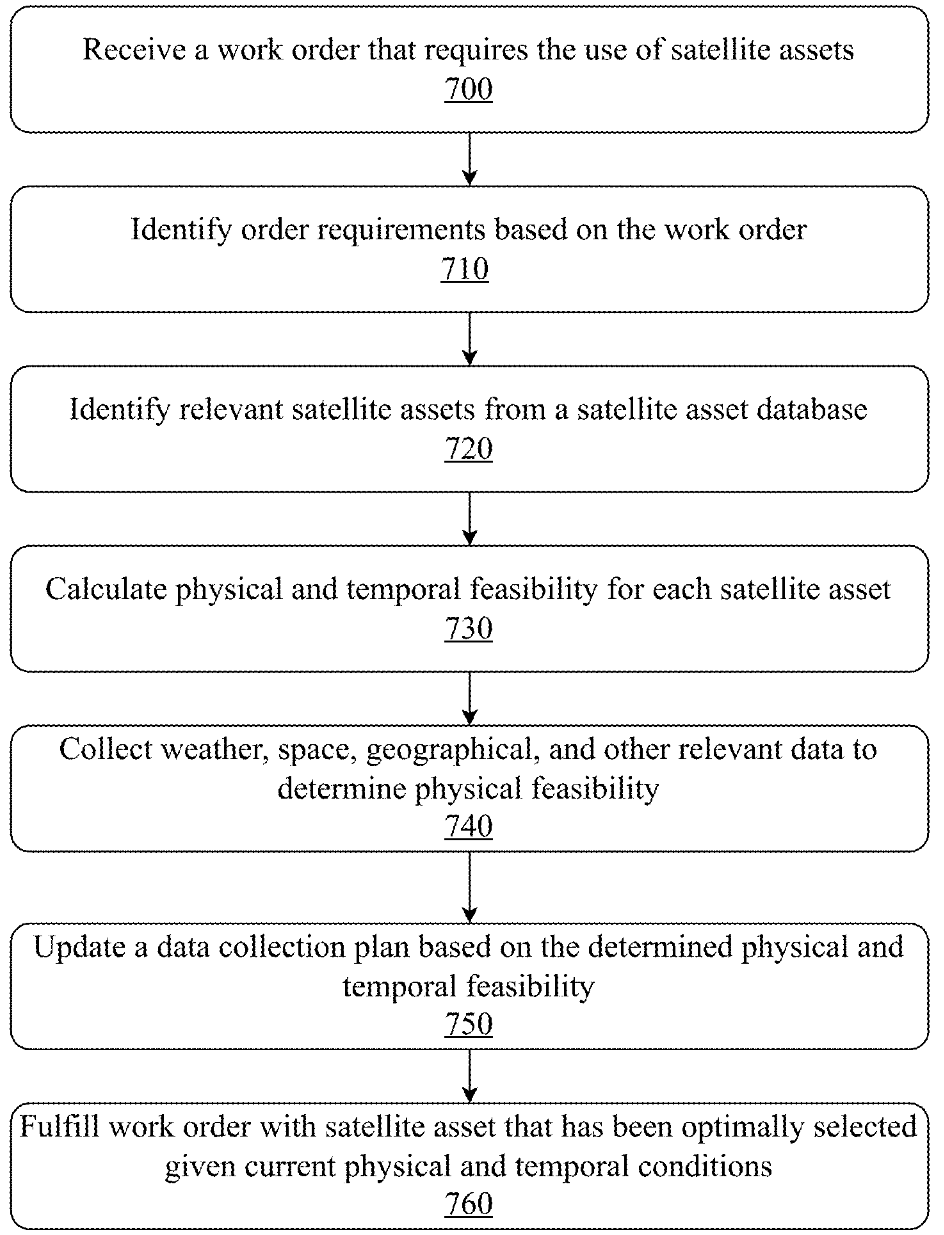
FIG. 7 is a flow diagram illustrating an exemplary method for an adaptive satellite data acquisition optimization platform.

FIG. 7 is a flow diagram illustrating an exemplary method for an adaptive satellite data acquisition optimization platform. In a first step 700, the system receives a work order that requires the use of satellite assets. This work order typically contains specific requirements such as ground sample distance, delivery timing, and collection parameters defined within a work order.

In a step 710, the system identifies specific order requirements based on the received work order. This step involves parsing and standardizing requirements such as persistence needs, latency constraints, and observation parameters into machine-readable formats that can be processed by the system's optimization algorithms.

In a step 720, the system identifies relevant satellite assets from a satellite asset database. This step involves querying the virtual constellation database to determine which satellites possess the necessary capabilities to fulfill the work order requirements, considering factors such as spatial resolution, spectral capabilities, and basic orbital parameters.

In a step 730, the system calculates physical and temporal feasibility for each identified satellite asset. This calculation considers factors such as orbital dynamics, collection geometry, and temporal constraints to determine which assets can physically accomplish the required collection within the specified timeframe.

In a step 740, the system collects weather, space, geographical, and other relevant data to determine physical feasibility. This step involves real-time queries to multiple weather service providers, analysis of terrain interference patterns, and evaluation of space weather conditions that might impact collection quality. The system processes both vendor-provided and third-party weather data to create comprehensive environmental awareness.

In a step 750, the system updates a data collection plan based on the determined physical and temporal feasibility. This step involves dynamically adjusting collection schedules and asset assignments based on the latest feasibility calculations, ensuring the plan remains optimized as conditions change. The system continuously monitors these conditions and updates the plan hundreds of times per hour when necessary.

In a step 760, the system fulfills the work order with a satellite asset that has been optimally selected given current physical and temporal conditions. This final step executes the optimized collection plan, tasking the selected satellite through vendor APIs and initiating the collection process. The selection considers all previously analyzed factors to ensure the highest probability of successful data collection.

Figure 8:
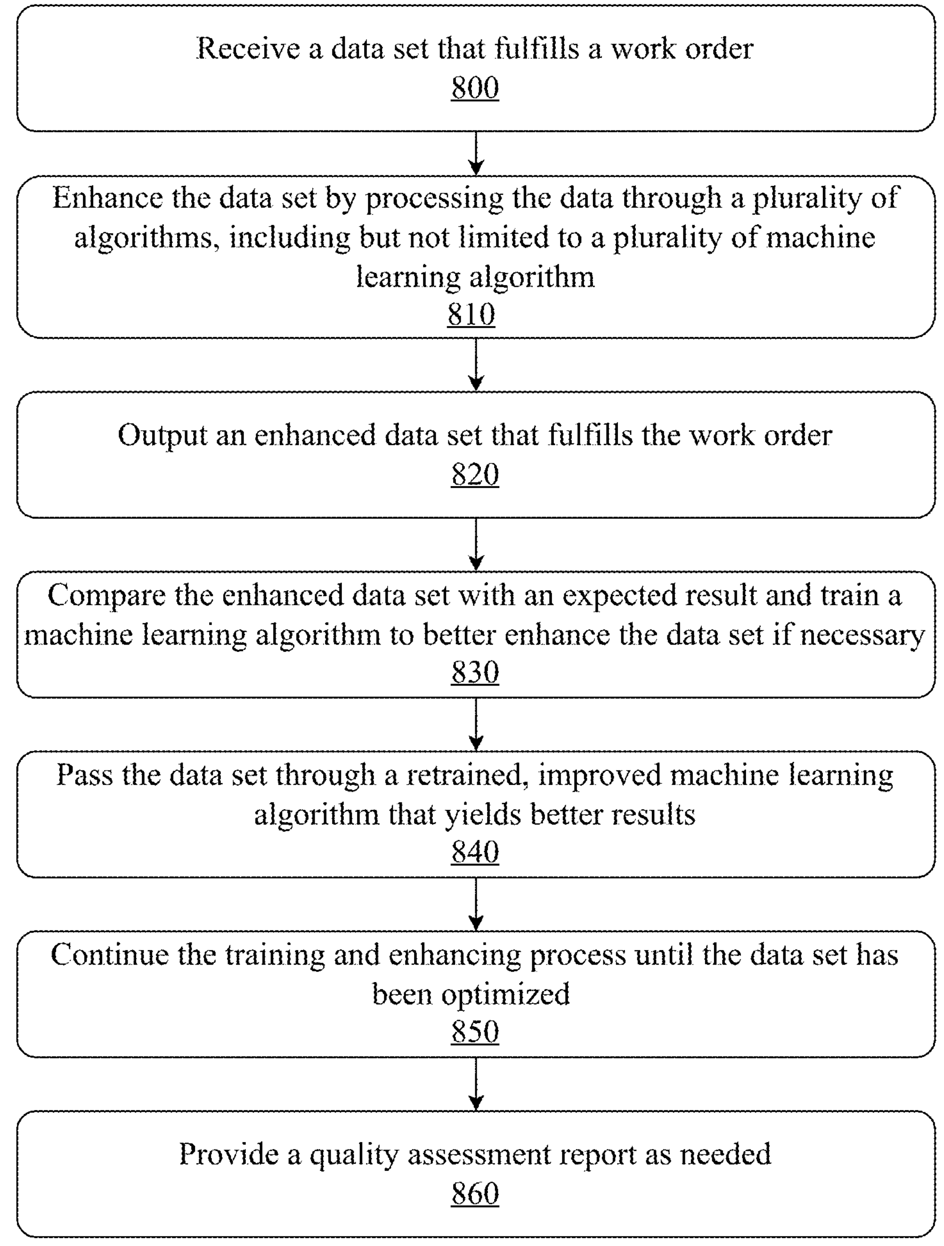
FIG. 8 is a flow diagram illustrating an exemplary method for an adaptive satellite data acquisition optimization platform with data quality assurance and quality reporting capabilities.

FIG. 8 is a flow diagram illustrating an exemplary method for an adaptive satellite data acquisition optimization platform with data quality assurance and quality reporting capabilities. In a first step 800, the system receives a data set that fulfills a work order, comprising the raw satellite imagery and associated metadata collected according to specified requirements. This initial data represents the unprocessed collection results that meet basic work order parameters.

In a step 810, the system enhances the data set by processing the data through a plurality of algorithms, including but not limited to machine learning algorithms. These algorithms apply sophisticated enhancement techniques that may include atmospheric correction, resolution improvement, and geometric accuracy refinement. The machine learning approach enables the system to learn from historical enhancement results and apply optimized processing parameters based on specific collection conditions and data characteristics.

In a step 820, the system outputs an enhanced data set that fulfills the work order requirements. This enhanced product represents the initial application of machine learning-based improvements to the raw collection data. The output undergoes detailed quality assessment to verify that enhancement objectives have been achieved.

In a step 830, the system performs a comparative analysis between the enhanced data set and expected results, using this analysis to train the machine learning algorithm for improved performance. This comparison evaluates multiple quality metrics including spatial resolution, radiometric accuracy, and feature definition. When necessary, the system adjusts the machine learning model's parameters based on identified discrepancies between achieved and expected results. In a step 840, the system processes the data set through the retrained, improved machine learning algorithm to achieve better enhancement results. This step applies the refined model parameters determined through the comparative analysis, potentially implementing multiple processing passes to achieve optimal results.

In a step 850, the system continues the iterative training and enhancement process until the data set has been optimized to meet or exceed quality requirements. This continuous improvement cycle may involve multiple iterations of enhancement and evaluation, with each pass refining the machine learning model's ability to improve data quality. In a step 860, the system generates a quality assessment report documenting the enhancement process and results. This report includes detailed metrics about improvements achieved, processing parameters used, and validation results from each enhancement iteration. The report provides transparency into the enhancement process and verification of the final data quality.

Figure 10:
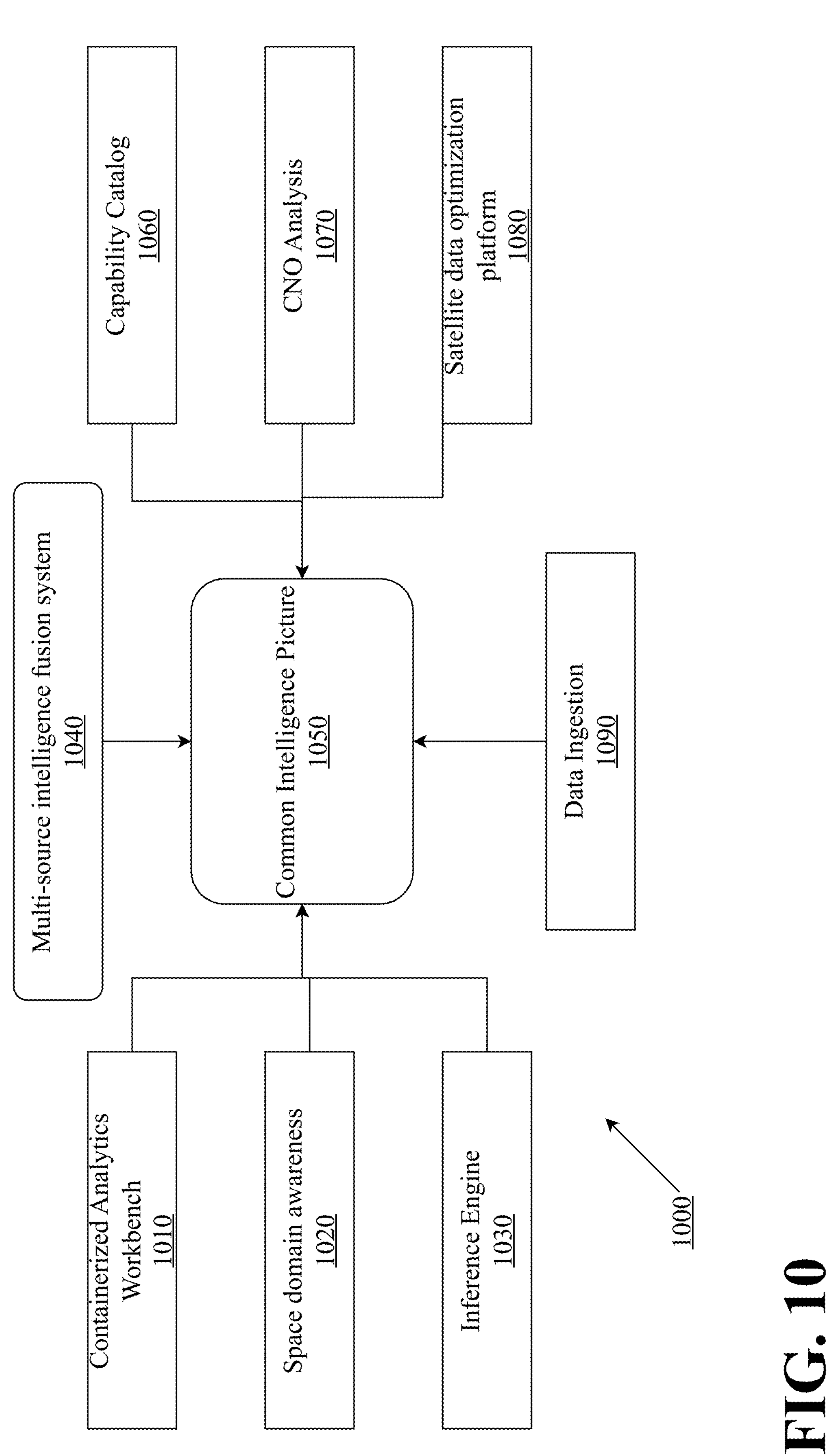
FIG. 10 illustrates a block diagram of the system architecture, depicting the multi-modal AI components that populate the common intelligence picture.

FIG. 10 illustrates the system modular architecture 1000 designed to populate the common intelligence picture 1050 through a distributed processing framework. Satellite data acquisition optimization platform 1080, which was disclosed in detail above, handles satellite tasking and orchestration through sophisticated algorithms to evaluate multiple real-time conditions including weather patterns, orbital dynamics, and sensor capabilities to determine the most effective collection opportunities. Through continuous monitoring and assessment of physical feasibility factors such as terrain interference and environmental conditions, alongside competitive feasibility considerations including orbit availability and targeting geometries, satellite data acquisition optimization platform 1080 automatically orchestrates data collection tasks across available satellite resources to maximize collection success rates and operational efficiency. As previously disclosed, satellite data acquisition optimization platform 1080 has demonstrated operational performance through processing over 55,000 image collections across multiple vendors while meeting rigorous requirements for global facility coverage. The system leverages real-time local and space weather data from commercial forecast APIs along with constellation asset data including operational status, GSD, slew agility, competitive tasking overrides, tasking uplink cutoff windows, and downlink, backhaul, and production latency. The Satellite data acquisition optimization platform 1080 system's proven capabilities in optimizing collection opportunities across multiple satellite providers serve a foundational component within the broader architecture.

Building upon satellite data acquisition optimization platform's collection management capabilities, the architecture implements a sophisticated multi-node system where specialized components communicate through a message-based infrastructure, with multi-source intelligence fusion system 1040 serving as the primary neural hub for priority intelligence processing (PIR) processing and course of action generation. The system employs distributed computing techniques to enable parallel processing of multiple intelligence streams while maintaining data synchronization across components.

Through this integrated architecture, the multi-source intelligence fusion system 1040 processes complex intelligence requirements and priority intelligence requirements (PIRs). For instance, when tasked with monitoring industrial activity, it automatically parses the requirement text, determines appropriate courses of action, and identifies relevant collection assets and data sources to generate a comprehensive collection strategy that might include periodic satellite imagery, RF monitoring, and social media analysis. When new information arrives from any source, the multi-source intelligence fusion system 1040 automatically updates the common intelligence picture with the latest analytical findings. The system implements automated workflows across six distinct phases-Planning and Direction: multi-source intelligence fusion system processes PIRs and generates courses of action; collection: satellite data acquisition optimization platform executes multi-source collection including satellite tasking; processing: containerized analytics workbench implements automated data processing; analysis and exploitation: deep learning models conduct automated analysis while maintaining the common intelligence picture (CIP)/common operational procedure (COP); dissemination: system generates customized intelligence products; feedback: interactive mechanisms enable continuous CIP/COP updates based on user feedback. Throughout this process, space domain awareness system maintains continuous space situational awareness, while the containerized analytics workbench manages automated processing workflows and intelligence product generation.

The architecture implements a sophisticated multi-node system where specialized components communicate through a message-based infrastructure. The system employs distributed computing techniques to enable parallel processing of multiple intelligence streams while maintaining data synchronization across components. This architecture maps directly to the joint intelligence process cycle, with each component fulfilling specific roles in response to Priority Intelligence Requirements (PIRs): multi-source intelligence fusion system and analytics handle planning and direction (Phase 1) by processing PIRs to develop comprehensive collection strategies that integrate multiple intelligence disciplines; Satellite data acquisition optimization platform, ATR, Ground systems, and the collection coordination system execute data collection (Phase 2) by orchestrating synchronized collection system execute data across multiple intelligence disciplines including HUMINT, IMINT, ELINT, SIGINT, OSINT, and CYBER, all driven by PIR prioritization and urgency; the containerized analytics workbench manages processing (Phase 3) through its containerized analytics and workflow automation, with expedited processing paths for time-critical PIRs; Analytics conducts analysis and production (Phase 4) by establishing significance and identifying patterns while maintaining focus on PIR satisfaction; and reporting handles dissemination (Phase 5) by generating finished intelligence products tailored to decision-maker needs and PIR responses. The architecture maintains continuous evaluation and feedback loops, ensuring intelligence products remain responsive to evolving operational requirements, PIR updates, and decision-maker feedback.

Containerized analytics workbench 1010 implements containerized analytics modules and workflow automation through a microservices architecture, enabling analysts to create and deploy automated processing chains using a visual workflow builder. The space domain awareness system 1020 maintains real-time space domain awareness through a distributed sensor network, processing telemetry data, orbital parameters, and space weather integration indicators through specialized algorithms for conjunction analysis and collection forecasting. The inference engine 1030 utilizes GPU-accelerated deep learning models for automated target recognition, implementing a sophisticated MLOps pipeline that enables continuous model training and deployment while maintaining version control of both models and training data.

Multi-source intelligence fusion system 1040, processes complex intelligence requirements. For instance, when tasked with monitoring industrial activity, it automatically parses the requirement text, identifies relevant collection assets and data sources, and generates a comprehensive collection strategy that might include periodic satellite imagery, RF monitoring, and social media analysis. When new information arrives from any source, multi-source intelligence fusion system 1040 automatically updates the common intelligence picture with the latest analytical findings.

Capability catalog 1060 manage microservices that can be rapidly deployed to handle new requirements—for example, quickly implementing a new ship detection algorithm across the system. CNO analysis 1070 might detect unusual network traffic patterns at a port facility and automatically cross-reference this with satellite-observed physical activities and known threat actor tactics. Satellite data acquisition optimization platform 1080 orchestrates satellite collection planning—for instance, when monitoring a remote facility, it automatically schedules complementary collections across multiple satellite providers, using SAR capabilities during cloudy conditions and high-resolution imagery during clear weather.

Data ingest layer 1090 processes multiple intelligence feeds. For example, when tracking global supply chain activities, the system simultaneously ingests shipping manifests, customs declarations, satellite imagery, and social media discussions about specific facilities or companies. When monitoring technology proliferation, it might combine technical publications, commercial shipping data, and facility monitoring to identify patterns of interest. Inter-component communication enables sophisticated coordination.

The system maintains continuous real-time updates as new information arrive from the collection sources, automatically correlating findings across multiple intelligence disciplines to provide comprehensive situational awareness. For instance, when monitoring global proliferation activities, the system automatically integrates physical observations, network patterns, supply chain data, and open source information to develop a complete understanding of activities and trends. This automated fusion of multiple intelligence streams enables rapid identification of emerging patterns, anomalous activities, and potential threats while maintaining historical context and supporting predictive analysis. Through continuous evaluation and feedback mechanisms, the common intelligence picture provides decision-makers with timely, accurate, and actionable intelligence that adapts to evolving operational requirements and emerging collection opportunities. The system further implements comprehensive security protocols including data anonymization, access control enforcement, and automated privacy filtering to ensure sensitive information is properly protected throughout the intelligence cycle. Through automated classification management, the system carefully controls information access and sharing based on established security policies and need-to-know requirements. For instance, when monitoring global proliferation activities, the system automatically integrates physical observations, network patterns, supply chain data, and open-source information while enforcing privacy rules that protect personally identifiable information and sensitive operational details. This automated fusion of multiple intelligence streams enables rapid identification of emerging patterns, anomalous activities, and potential threats while maintaining historical context and supporting predictive analysis, all within a secure framework that safeguards privacy and sensitive data. Through continuous evaluation and feedback mechanisms, the common intelligence picture provides decision-makers with timely, accurate, and actionable intelligence that adapts to evolving operational requirements and emerging collection opportunities while ensuring robust protection of privacy and sensitive information throughout the intelligence process.

Figure 11:
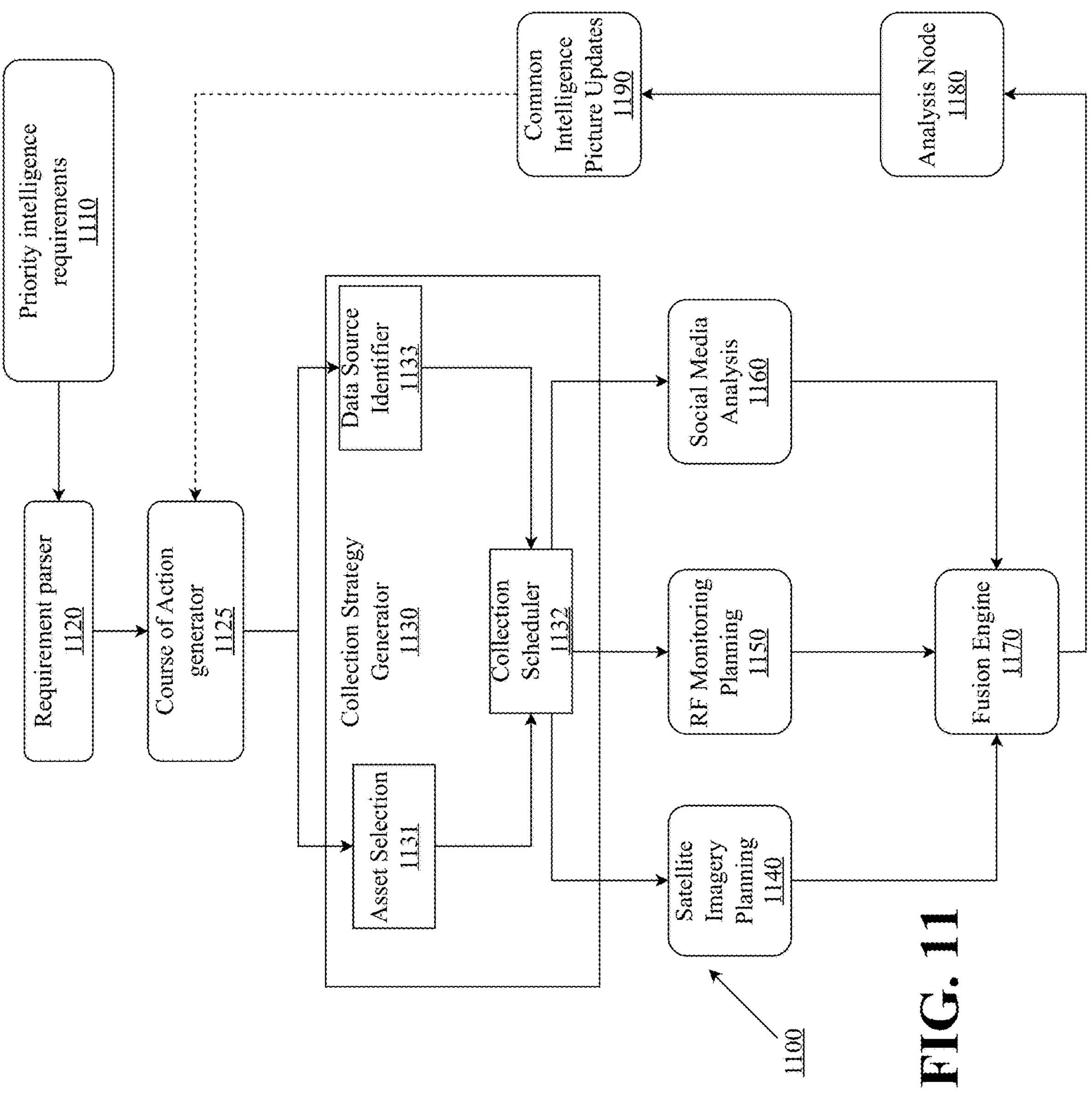
FIG. 11 illustrates a block diagram of the multi-source intelligence fusion system large language model, which functions as the neural processing hub within the architecture.

FIG. 11 illustrates the internal architecture of multi-source intelligence fusion system 1040, which serves a neural processing hub within the architecture, implementing advanced large language model (LLM) capabilities for interactive intelligence requirement processing. The system provides sophisticated natural language processing to understand, analyze, and response to priority intelligence requirements (PIRs) through an interactive question-and-answer framework. When PIRs 1110 are received, requirement parser 1120 module leverages natural language understanding to decompose requirements into structured components that drive downstream processing. For instance, when processing a requirement to monitor industrial activity at a port facility, the LLM-driven parser engages in interactive refinement of the requirement, breaking it down into specific parameters including facility boundary identification, vehicle movement detection thresholds, cargo handling equipment operational states, maritime vessel presence indicators, and associated storage facility status metrics. The parser's language model capabilities enable nuanced understanding of complex requirements while establishing priority indicators that influence subsequent processing decisions.

Following initial parsing, the system's LLM capabilities analyze requirements to generate specific courses of action 1125 through two parallel processing streams: asset selection 1131 and data source identification 1133. The asset selection module leverages the language model's understanding of capabilities and constraints to evaluate available collection platforms and sensors. The system automatically generates comprehensive courses of action that may include tasking the satellite data acquisition optimization platform, initiating OSINT collection, directing cyber operations, or coordinating other intelligence gathering activities. The data source identification stream employs natural language processing to determine relevant intelligence feeds needed for comprehensive analysis, incorporating diverse sources such as commercial shipping manifests, port authority schedules social media activity, local news reports, and environmental monitoring data.

Collection strategy generator 1130 subsystem, through its collection scheduler 1132, translates the LLM-generated courses of action into coordinated collection plans across three primary domains. These courses of action are automatically converted into specific tasking instructions for system components including the satellite data acquisition optimization platform and containerized analytics workbench. In the satellite imagery domain 1140, the scheduler coordinates dawn collections for shadow analysis of vertical structures, schedules SAR collections during predicted cloud cover, plans stereo collections for height determination, and optimizes multiple provider tasking for maximum temporal coverage. The RF monitoring domain 1150 involves scheduling SIGINT collection during peak activity periods, coordinating multiple sensor geometries for signal geolocation, adapting collection bandwidth based on signal characteristics, and implementing selective sampling strategies. Social media analysis 1160 planning encompasses targeting specific geographic regions and timeframes, monitoring identified user networks and activity patterns, tracking relevant hashtags and keywords, and analyzing image and video content from public posts. Throughout this process, results are continuously integrated into the Common Intelligence Picture while automated reporting workflows generate intelligence products based on the collected information.

The fusion engine 1170 represents a critical integration point where multi-source intelligence is aggregated through sophisticated processing algorithms. The engine performs temporal alignment of disparate data streams, spatial correlation of observations, cross-validation of indicators across sources, and confidence scoring of integrated assessments. For example, when satellite imagery reveals increased vehicle presence, the fusion engine automatically correlates this with RF emission patterns indicating enhanced communications, social media posts about increased work shifts, shipping manifest data showing scheduled deliveries, and historical patterns of similar activity to build a comprehensive understanding of the situation.

Within the analysis node 1180, advanced processing algorithms apply pattern recognition and change detection capabilities across the fused data streams. Pattern recognition encompasses activity level baseline deviation detection, seasonal trend analysis, anomaly identification, and correlation with known operational patterns. Then from the analysis Node, the common intelligence picture will update 1190. Change detection algorithms simultaneously monitor for infrastructure modifications, equipment deployment changes, activity pattern shifts, and personnel presence variations, providing a comprehensive analytical framework for understanding evolving situations.

The multi-source intelligence fusion system's courses of action are automatically translated into specific collection tasks for the satellite data acquisition optimization platform, establishing a sophisticated command and control relationship between the components. When the multi-source intelligence fusion system determines satellite collection is required, it automatically generates optimized collection parameters and communicates these directly to the satellite data acquisition optimization platform for execution. This processing occurs through synchronized workflows between the containerized analytics workbench and the broader architecture, continuously updating the Common Intelligence Picture (CIP) as new data is processed and analyzed.

The system implements automated report generation leveraging both the continuously updated CIP and the containerized analytics workbench's workflows. These reports are dynamically generated based on the original PIR requirements, incorporating newly collected intelligence, analysis results, and relevant historical context from the CIP. The reporting system automatically formats intelligence products appropriate to different user needs and security levels, while maintaining direct traceability to the originating PIR and collected intelligence within the CIP.

Figure 12:
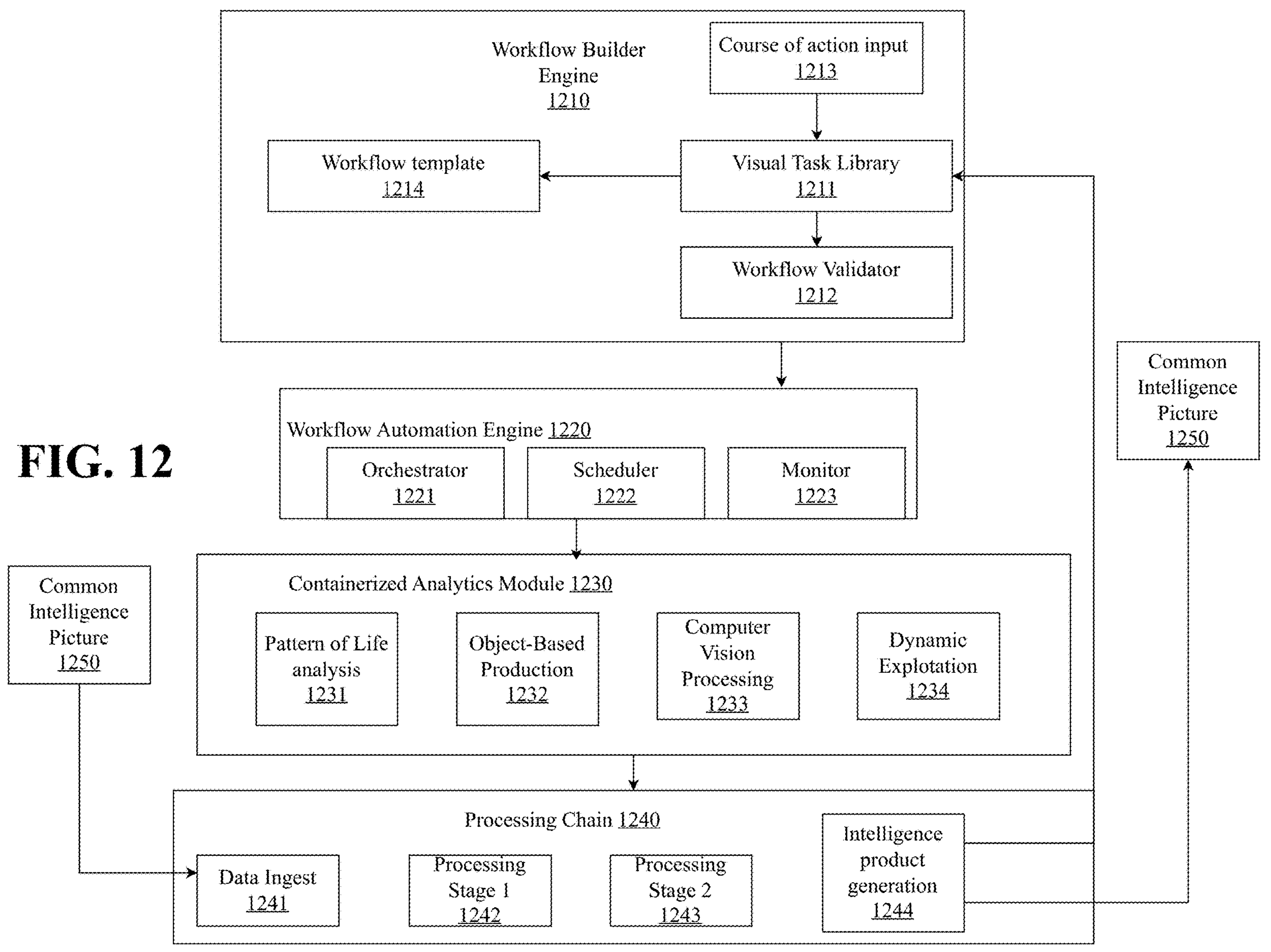
FIG. 12 illustrates a block diagram of the containerized analytics workbench component, which implements model-based analysis and containerized microservices within the architecture.

FIG. 12 is a block diagram illustrating the architecture of the containerized analytics workbench 1010, a critical component within the architecture that serves as the primary processing and analysis engine within Phase 3 of the Joint Intelligence process and intelligence lifecycle. The containerized analytics workbench utilizes advanced containerized analytics and workflow automation through a sophisticated microservices architecture to transform raw intelligence data into actionable insights. Through its modular design, the workbench enables rapid deployment of new capabilities while maintaining system stability and scalability.

The visual workflow builder engine 1210 represents the analyst interface layer, providing an intuitive graphical environment where intelligence analysts can design, modify, and deploy complex processing workflows without requiring deep technical expertise. The workflow builder engine 1210 implements sophisticated logic that translates analyst designed workflows into executable processing chains. For example, when analyzing patterns of life at a facility of interest, an analyst can quickly assemble a workflow that combines satellite imagery analysis, RF signal processing, and social media monitoring. The visual task library 1211 maintains pre-configured workflow templates designed to address common intelligence scenarios. These templates enable rapid workflow generation based on course of action requirements 1213—for instance, automatically assembling analytical components for maritime domain monitoring including vessel detection algorithms, wake analysis tools, and behavior characterization modules. When a new course of action is received, the system automatically selects and configures appropriate workflow templates 1214, which are then validated by the the workflow validator 1212 to ensure they meet the original PIR requirements and course of action specifications.

The workflow automation engine 1220 serves as the operational core, orchestrating the execution of analytical workflows generated in response to the multi-source intelligence system directives. The orchestrator 1221 manages the complex flow of data and processing tasks, ensuring efficient resource utilization and maintaining processing priorities established by the original PIR. For example, when executing a multi-source analysis workflow, the orchestrator 1221 automatically might parallel process SAR imagery analysis alongside SIGINT data correlation while managing resource allocation to maintain system responsiveness. The scheduler 1222 coordinates the precise timing and sequencing of analytical operations based on course of action requirements. The monitor 1223 maintains continuous oversight of workflow execution, tracking processing status, resource utilization, and task completion while generating detailed performance metrics that feed back into the CIP.

The containerized analytics module 1230 implements the core processing capabilities through a scalable microservices architecture that responds to courses of action. The pattern of life analysis 1231 module employs algorithms to detect and characterize behavioral patterns across multiple intelligence sources as specified in the course of action. The object-based production module 1232 enables structured observation of targets through standardized collection and annotation frameworks, ensuring consistent analysis aligned with PIR requirements. The computer vision processing module 1233 leverages GPU-accelerated deep learning models for automated image analysis based on collection requirements specified in the course of action. The dynamic exploitation module 1234 enables rapid analysis of time-sensitive intelligence, automatically extracting and highlighting significant changes or activities that require immediate attention per the original PIR specifications.

The processing chain 1240 represents the practical implementation of workflows derived from courses of action, transforming raw intelligence data into finished analytical products that directly address PIR requirements. The data ingest 1241 stage implements data normalization and preparation functions, handling diverse input formats from multiple intelligence sources while maintaining data integrity and source attribution. The system supports multiple parallel processing stages 1242, 1243 that execute specific analytical tasks required by the course of action. The intelligence product generation stage 1244 automatically creates customized intelligence outputs based on the original PIR requirements and course of action specifications. When generating tactical intelligence summaries, the system automatically combines relevant imagery snippets, signal analysis results, and pattern matching assessments into cohesive reports. For ongoing surveillance requirements, the system produces pattern of life reports that merge temporal analysis, behavior characterization, and anomaly detection results, while comprehensive threat assessments incorporate multi-source correlation and historical trend analysis. The system also generates geospatial intelligence products with annotated imagery and derived feature analysis, alongside activity alerts containing associated collection artifacts and analytical findings. The intelligence product generation capability automatically formats all products according to preferences and roles, supporting multiple output formats including interactive displays, PDFs, and briefing materials. Each product maintains direct traceability to source data in the common intelligence picture (CIP) 1250 while enforcing appropriate security controls and access restrictions. The generation process implements automated quality checks throughout production to ensure completeness, accuracy, and alignment with original PIR requirements. Through continuous feedback loops, the system refines product generation based on interaction patterns, evolving requirements, and effectiveness metrics. When new intelligence data arrives, the system automatically updates relevant products while maintaining version control and change tracking. The product generation workflow adapts dynamically to changing priorities and needs, ensuring intelligence products remain current and responsive to operational requirements while maintaining the integrity of the analytical process. The processed results are properly formatted and delivered according to specific dissemination requirements established in the original PIR, automatically generating intelligence products that feed the CIP and support automated report generation.

Through standardized interfaces and API integration, the containerized analytics workbench maintains seamless connectivity with other components, facilitating rapid data exchange and coordinated processing across the broader intelligence architecture. This integration enables automated processing chains that support both persistent surveillance requirements and dynamic collection tasks, while the system's edge computing capabilities through distributed edge computing nodes enable distributed processing close to collection sources. The architecture's modular design and containerized implementation ensure the system can rapidly adapt to new requirements and integrate emerging analytical capabilities while maintaining operational stability and processing efficiency.

Figure 13:
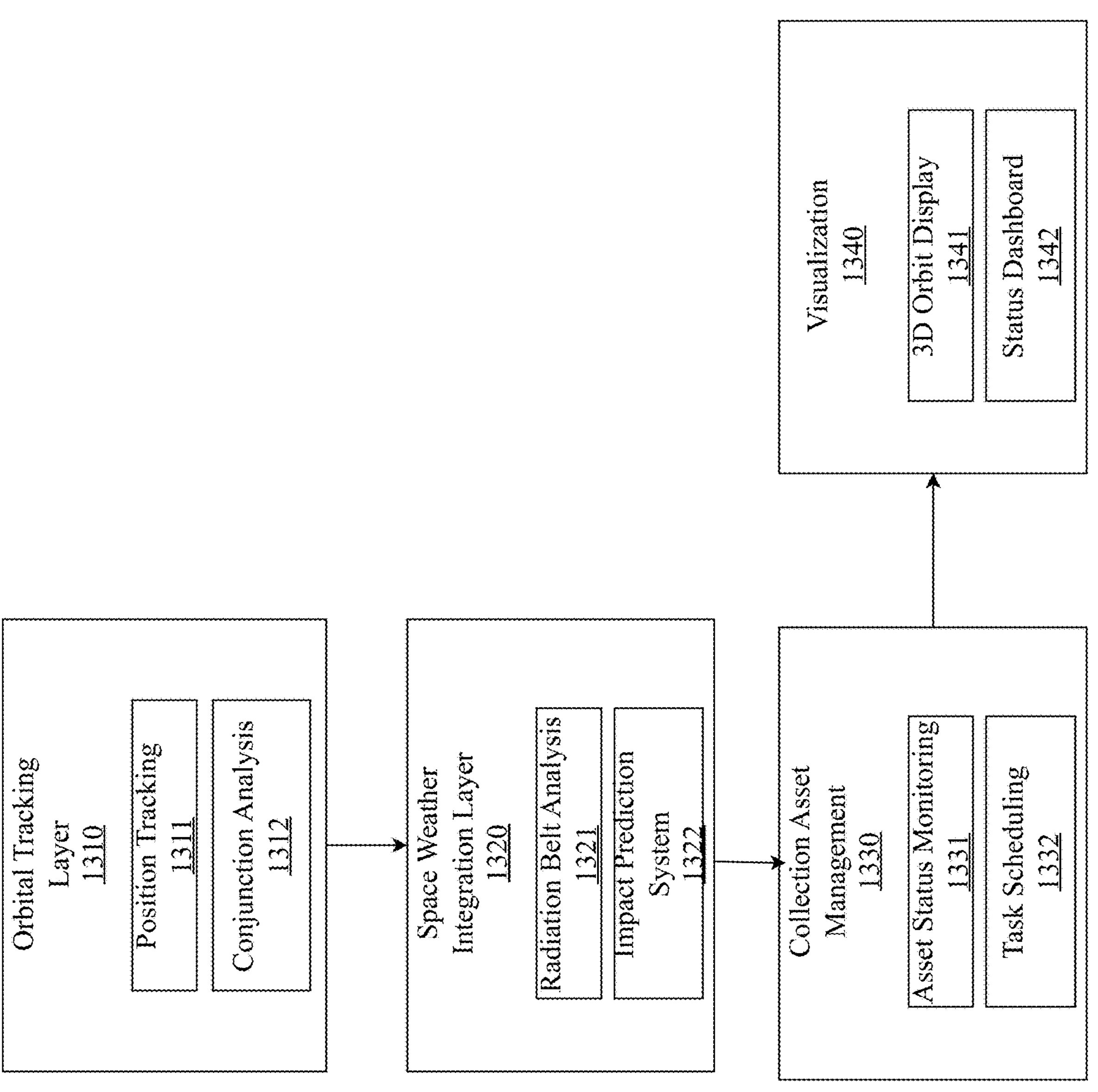
FIG. 13 illustrates a block diagram of the space domain awareness system architecture, which provides real-time collection asset management and space domain awareness through multiple integrated layers.

FIG. 13 is a block diagram illustrating the space domain awareness system architecture, designed to provide comprehensive space domain awareness and management of collection assets through four integrated layers. This hierarchical system implements sophisticated monitoring capabilities to ensure safe and efficient operation of orbital assets while enabling dynamic response to changing space conditions and mission requirements.

The orbital tracking layer 1310 establishes the foundational awareness of the space environment through two primary subsystems. Position tracking 1311 ingests and processes real-time orbital data for both collection assets and space objects of interest. For example, when tracking an imaging satellite in sun-synchronous orbit, the system continuously updates its position using two-line Element (TLE) data every 15 minutes, calculating future orbital positions up to 72 hours in advance with sub-kilometer accuracy. This enables precise prediction of collection opportunities, such as determining exact overhead passes for priority target areas. The conjunction analysis 1312 implements safety monitoring by evaluating potential collision risks between tracked objects. When monitoring a satellite preparing for an imaging pass, the system might detect a piece of orbital debris approaching within the designated 25-kilometer safety threshold, automatically calculating the probability of collision and time of closest approach. If the calculated risk exceeds 1 in 10,000, the system generates immediate alerts and begins developing alternative collection strategies.

The space weather integration layer 1320 provides critical environmental monitoring through two specialized components. The solar activity monitor within this system maintains continuous surveillance of solar conditions that could impact operations. For instance, when detecting a major solar flare (X-class), the system immediately evaluates potential impacts on satellite electronics and communications systems. If the flare is accompanied by a coronal mass ejection (CME), the system calculates its arrival time and predicted geomagnetic effects, such as increased drag on low-orbit satellites or potential communication disruptions. Radiation analysis 1321 tracks radiation conditions that could affect sensor performance. During periods of heightened solar activity, it might detect elevated radiation levels in the South Atlantic Anomaly region, automatically adjusting collection plans to minimize exposure of sensitive optical sensors during passes through this area. For example, if radiation levels exceed 100 rads/hour, the system could temporarily suspend high-resolution imaging operations to protect sensor equipment. The impact prediction system 1322 implements sophisticated forecasting and risk assessment capabilities to predict how space environment conditions will affect satellite operations and collection quality. The system processes multiple data streams to generate actionable predictions that enable proactive mission planning and risk mitigation. The impact prediction system enables sophisticated response to space weather events. When the solar activity monitor detects a major solar flare, the system immediately calculates arrival times for various effects, including radiation bursts, particle events, and communication impacts. These predictions trigger automated updates to collection schedules, communication plans, and orbital predictions while generating specific mitigation recommendations for operators. During predicted geomagnetic storms, the system provides comprehensive impact analysis including atmospheric density changes, orbital effects, collection quality predictions, and communication reliability forecasts. This integrated approach ensures optimal utilization of collection assets while maintaining system health and data quality standards, significantly improving operational efficiency and reducing environmental impact-related collection failures.

Collection asset management 1330 optimizes resource utilization through two sophisticated components. The Asset Status monitoring 1331 implements comprehensive health monitoring of satellite systems. For a typical imaging satellite, this includes tracking over 50 different parameters such as battery charge levels, solar panel efficiency, fuel reserves, and thermal conditions. If any parameter deviates from nominal ranges for instance, if battery charge drops below 85% during eclipse periods—the system generates alerts and adjusts collection plans accordingly. The task scheduling 1332 coordinates complex collection operations across multiple assets. When planning collections over a high-priority target area requiring persistent surveillance, the system might orchestrate complementary passes between optical and SAR satellites. For example, scheduling optical collections during clear daylight hours while automatically switching to SAR imaging during nighttime or cloudy conditions. The system also manages dynamic retasking, such as interrupting routine collections to respond to emergent high-priority requirements while minimizing impact on existing collection commitments.

The visualization layer 1340 enables efficient operator interaction through two integrated display systems. The orbit display 1341 provides interactive 3D visualization of the space environment, allowing operators to observe current satellite positions, predicted orbits, and planned collection opportunities. For example, when evaluating coverage of a new area of interest, operators can visualize all potential collection passes over the next 24 hours, including the expected ground track and sensor footprint for each pass. The status dashboard 1342 implements comprehensive situational awareness through configurable real-time displays. During normal operations, it might show key metrics like satellite health status, upcoming collection windows, and space weather conditions. When anomalies occur, such as a conjunction warning or solar storm alert, the dashboard automatically reconfigures to highlight critical information, displaying countdown timers to critical events and recommended mitigation actions.

The integrated operation of these layers enables sophisticated space domain awareness and efficient collection management. For example, during a typical collection scenario, the system might detect an approaching space weather disturbance through the space weather integration layer. This automatically triggers the collection management layer to adjust scheduled collections, shifting optical imaging operations to periods before the disturbance arrives while increasing utilization of SAR satellites during the affected period. The orbital tracking layer 1310 continuously updates asset positions and safety margins, while the visualization layer 1340 keeps operators informed of changing conditions and automated system responses. This coordinated operation ensures maximum collection efficiency while maintaining spacecraft safety and data quality.

Figure 14:
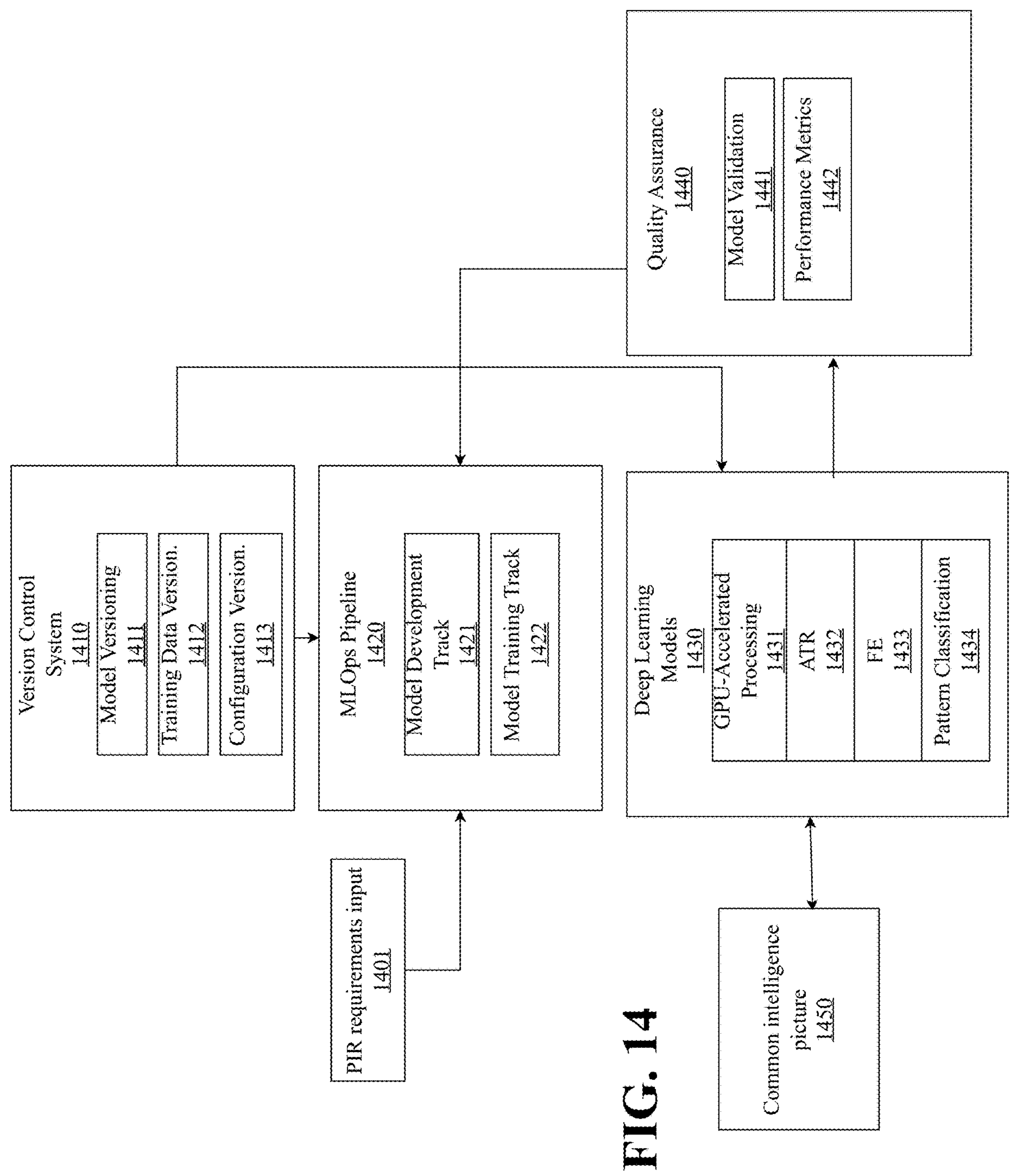
FIG. 14 illustrates a block diagram of the inference engine architecture, which implements GPU-accelerated deep learning models for automated target recognition within the framework.

FIG. 14 illustrates the architecture of the Inference Engine 1030, the inference Engine represents a sophisticated component within the architecture, implementing advanced GPU-accelerated inference capabilities for both deep learning models and processing multi-source intelligence fusion system directives. The system establishes a robust framework for executing complex analytical tasks derived from PIR-driven courses of action 1401 while maintaining strict version control and quality assurance standards throughout the operational lifecycle.

The MLOps Pipeline 1420 implements two integrated development tracks that enable continuous model evolution and improvement based on PIR processing requirements. The Model Development Track 1421 focuses on creating and refining deep learning architectures that directly support course of action execution. For example, when developing models for maritime vessel classification as specified by a multi-source intelligence fusion system directive, this track might combine convolutional neural networks for feature extraction with transformer architectures for contextual understanding of vessel behavior patterns. The model training track 1422 implements rigorous protocols for model training and optimization aligned with PIR requirements. When training models for facility monitoring based on specific courses of action, the system processes millions of images representing diverse operational conditions—varying illumination, weather conditions, seasonal changes, and partial obscuration scenarios. Advanced hyperparameter optimization techniques automatically tune model parameters using Bayesian optimization approaches, while sophisticated cross-validation procedures ensure model generalization across diverse operational scenarios.

The Deep Learning Models 1430 subsystem leverages state-of-the-art graphics processing unit (GPU) acceleration to enable real-time processing of intelligence data streams as directed by courses of action. The GPU-accelerated processing 1431 utilizes specialized hardware architectures to execute complex deep learning operations in parallel, achieving processing speeds up to 100 times faster than traditional CPU-based systems, to execute complex deep learning operations in parallel, achieving processing speeds up to 100 times faster than traditional CPU-based systems. The automated target recognition (ATR) 1432 implements sophisticated computer vision algorithms that can simultaneously detect, classify, and track multiple objects of interest across diverse sensor modalities based on PIR specifications. For instance, when analyzing complex industrial facilities, the ATR system can identify specific equipment types with 95% accuracy, detect subtle changes in operational patterns, and automatically flag new construction or equipment installations. For automated target recognition, the system implements advanced computer vision algorithms that can simultaneously detect, classify, and track multiple objects of interest across diverse sensor modalities. For instance, when analyzing satellite imagery of industrial facilities, these algorithms can concurrently identify specific equipment types, characterize operational patterns, and detect changes in activity levels. The Feature Extraction 1433 component employs sophisticated algorithms to isolate relevant characteristics from raw intelligence data based on course of action requirements. The Pattern Classification 1434 applies trained models to categorize and identify complex patterns in processed data according to PIR specifications. When processing imagery of port facilities, the system can automatically classifies activities and objects according to the priorities established in the original course of action while maintaining real-time processing capabilities. Each update to the CIP 1450 maintains complete traceability to the generating model version and configuration, enabling transparent validation of results. The system implements sophisticated temporal management to ensure proper sequencing of updates while maintaining consistency across multiple simultaneous processing streams. Through this integration, the CIP provides continuously updated, comprehensive view of the intelligence picture that incorporates both historical context and real-time machine learning insights while maintaining analytical integrity and enabling rapid dissemination of critical findings to decision-makers.

The Version Control System 1410 maintains comprehensive tracking of all operational components to ensure reproducibility and systematic improvement. The Model Versioning 1411 implements sophisticated version control mechanisms that track all aspects of model development and deployment. For example, when updating a model for vehicle detection, the system maintains complete records of architecture changes, training configurations, and performance metrics, enabling rapid rollback if needed. The training data versioning 1412 tracks all modifications to training datasets, maintaining detailed documentation of data sources, preprocessing steps, and annotation procedures. This enables the system to reproduce training results and systematically improve model performance through targeted dataset enhancements. The configuration versioning 1413 manages comprehensive version control for all system parameters, including model hyperparameters, processing configurations, and deployment specifications. For instance, when deploying an updated facility monitoring model, the system maintains detailed records of all configuration changes, including neural network architecture parameters, training hyperparameters, inference optimization settings, and hardware-specific configurations. This enables systematic tracking of all system configurations while supporting rapid troubleshooting and performance optimization.

To ensure operational reliability, the quality assurance 1440 subsystem implements comprehensive validation protocols throughout the model lifecycle. The model validation 1441 conducts systematic performance testing using carefully curated validation datasets that represent real-world operational scenarios. For instance, when validating a new facility monitoring model, the system evaluates performance across different environmental conditions, viewing angles, and facility types. The performance metrics 1442 component tracks key indicators including detection precision, classification accuracy, and processing latency, maintaining detailed performance histories for each deployed model. These metrics enable continuous optimization of model performance while ensuring operational requirements are consistently met.

The system has demonstrated exceptional operational performance through rigorous testing and validation. Object detection capabilities consistently achieve precision and recall metrics exceeding 90% F1/mAP50 across diverse object classes, supported by an extensive library of over 300,000 meticulously labeled examples. This performance level is maintained through continuous model training and validation procedures that leverage carefully segregated training and testing datasets to ensure robust generalization capabilities. Through standardized API integration with other components, the inference engine enables sophisticated real-time processing of intelligence data while maintaining strict version control and quality assurance standards. For example, when processing incoming satellite imagery, the system automatically applies appropriate models for target detection while maintaining complete traceability of model versions and processing results. This integration enables continuous improvement of analytical capabilities while ensuring operational stability and processing efficiency across the broader architecture.

Figure 15:
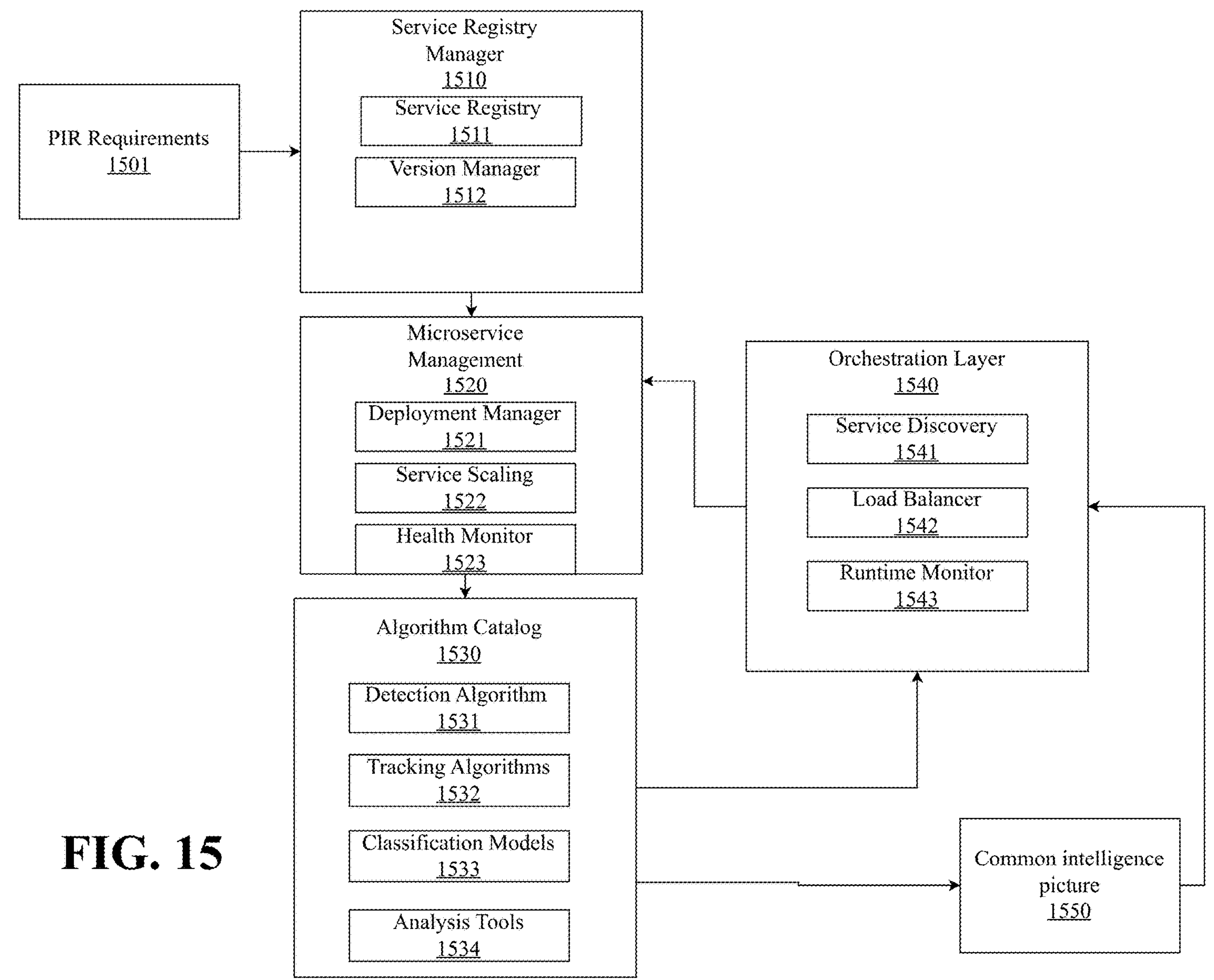
FIG. 15 illustrates a block diagram of the capability catalog architecture, which manages the rapid deployment and orchestration of analytical capabilities across the framework.

FIG. 15 illustrates the architecture of the capability catalog 1060 provides a sophisticated component within the architecture that serves as the dynamic management system for rapidly deploying and orchestrating analytical capabilities in response to courses of action generated by the multi-source intelligence fusion system. Through its advanced microservices architecture, the capability catalog enables seamless integration of analytical capabilities required to execute PIR-driven collection and analysis tasks 1501.

The service registry manager 1510 functions by implementing a comprehensive service management and control mechanisms aligned with course of action requirements. The service registry 1511 maintains a detailed inventory of all available services and their capabilities, tracking everything from basic satellite imagery analysis tools to sophisticated pattern recognition algorithms needed to fulfill PIR requirements. For example, when managing maritime domain awareness capabilities in response to a course of action, the registry maintains detailed records of ship detection algorithms, wake analysis tools, and behavior characterization services, including their specific capabilities, resource requirements, and operational parameters. When multi-source intelligence fusion system specifies particular analysis needs, the registry automatically identifies and catalogs required capabilities such as specific object detection algorithms, pattern recognition services, or correlation tools. The version manager 1512 implements rigorous control over service versioning, ensuring compatibility across deployments while maintaining detailed records of service evolution and dependencies required for consistent course of action execution.

The microservice management subsystem 1520 handles the complex operational aspects of deploying and maintaining analytical services required by courses of action. The deployment manager orchestrates the intricate process of service deployment, automatically handling resource allocation, configuration management, and integration testing based on PIR requirements. For example, when deploying a new synthetic aperture radar (SAR) processing capability, the deployment manager 1521 coordinates the distribution of processing components, establishes necessary data pathways, and verifies operational readiness across the system. The service scaling 1522 implements sophisticated algorithms for dynamic resource allocation, automatically adjusting processing capacity based on course of action priorities and operational demands. During periods of heightened collection activity, such as monitoring multiple high-priority targets simultaneously, the system can automatically scale up processing resources to maintain responsiveness while ensuring efficient resource utilization. The health monitor 1523 maintains continuous oversight of service performance and availability, ensuring reliable execution of PIR-driven workflows.

The algorithm catalog 1530 serves as a comprehensive repository of specialized processing capabilities required to execute various courses of action. The detection algorithms 1531 house a sophisticated suite of object recognition and pattern detection capabilities, ranging from basic feature detection to advanced deep learning models for complex target identification. For example, the catalog might include specialized algorithms for detecting and characterizing military equipment, analyzing construction activities, or identifying specific types of maritime vessels. The tracking algorithms 1532 provide advanced tools for monitoring and analyzing target behavior over time, enabling sophisticated pattern of life analysis and movement prediction. The classification models 1533 implement diverse categorization capabilities supporting automated labeling and categorization of detected objects and activities according to PIR specifications. The analysis tools 1534 provide specialized utilities for data processing and analysis, including capabilities for signal processing, image enhancement, and multi-source data fusion as required by specific courses of action.

The orchestration layer 1540 provides sophisticated operational coordination across the distributed processing environment. The service discovery 1541 implements advanced mechanisms for dynamically identifying and integrating available services, enabling automated service composition for complex analytical tasks. The load balancer 1542 employs sophisticated algorithms to optimize processing distribution across available resources, ensuring efficient utilization while maintaining system responsiveness. For instance, when processing multiple high-priority intelligence requirements simultaneously, the load balancer automatically adjusts resource allocation to maintain optimal processing efficiency. The runtime monitor 1543 maintains comprehensive oversight of system performance and resource utilization, generating detailed metrics and analytics to support continuous system optimization.

Through its integration with the broader architecture, the capability catalog 1512 enables rapid deployment of new analytical capabilities while maintaining strict operational standards. This is demonstrated through real-world examples such as the rapid deployment of new ship detection algorithms, where the system automatically handles service registration, deployment orchestration, resource allocation, and processing integration. The microservices architecture ensures both scalability and flexibility, allowing the system to efficiently adapt to evolving requirements while maintaining processing efficiency and operational stability. The system has demonstrated this capability through successful integration of numerous analytical services, supporting diverse intelligence requirements from basic object detection to sophisticated pattern analysis and threat assessment.

The integration between the capability catalog and common intelligence picture maintains continuous synchronization of analytical outputs and service states. As analytical services process intelligence data, the orchestration layer 1540 automatically manages the flow of results to the CIP 1550. The service discovery 1541 ensures all available analytical products are properly indexed and accessible, while the runtime monitor 1543 tracks the provenance of each analytical result to maintain complete traceability. For example, when detection algorithms 1531 identify objects of interest or tracking algorithms 1532 establish patterns of behavior, these findings are automatically formatted with appropriate metadata and confidence scores before being pushed to the CIP. Classification models 1533 enhance the CIP by automatically establishing relationships between detected entities, while analysis tools 1534 provide additional context through multi-source correlation. Each result maintains links to its generating algorithm version and configuration settings, enabling transparent validation of findings. The system implements sophisticated state management to ensure proper sequencing of updates while maintaining consistency across multiple concurrent analytical processes. This integration ensures the CIP provides a continuously updated, comprehensive view of the intelligence picture that incorporates outputs from all active analytical services while maintaining data integrity and enabling rapid access to critical findings.

Figure 16:
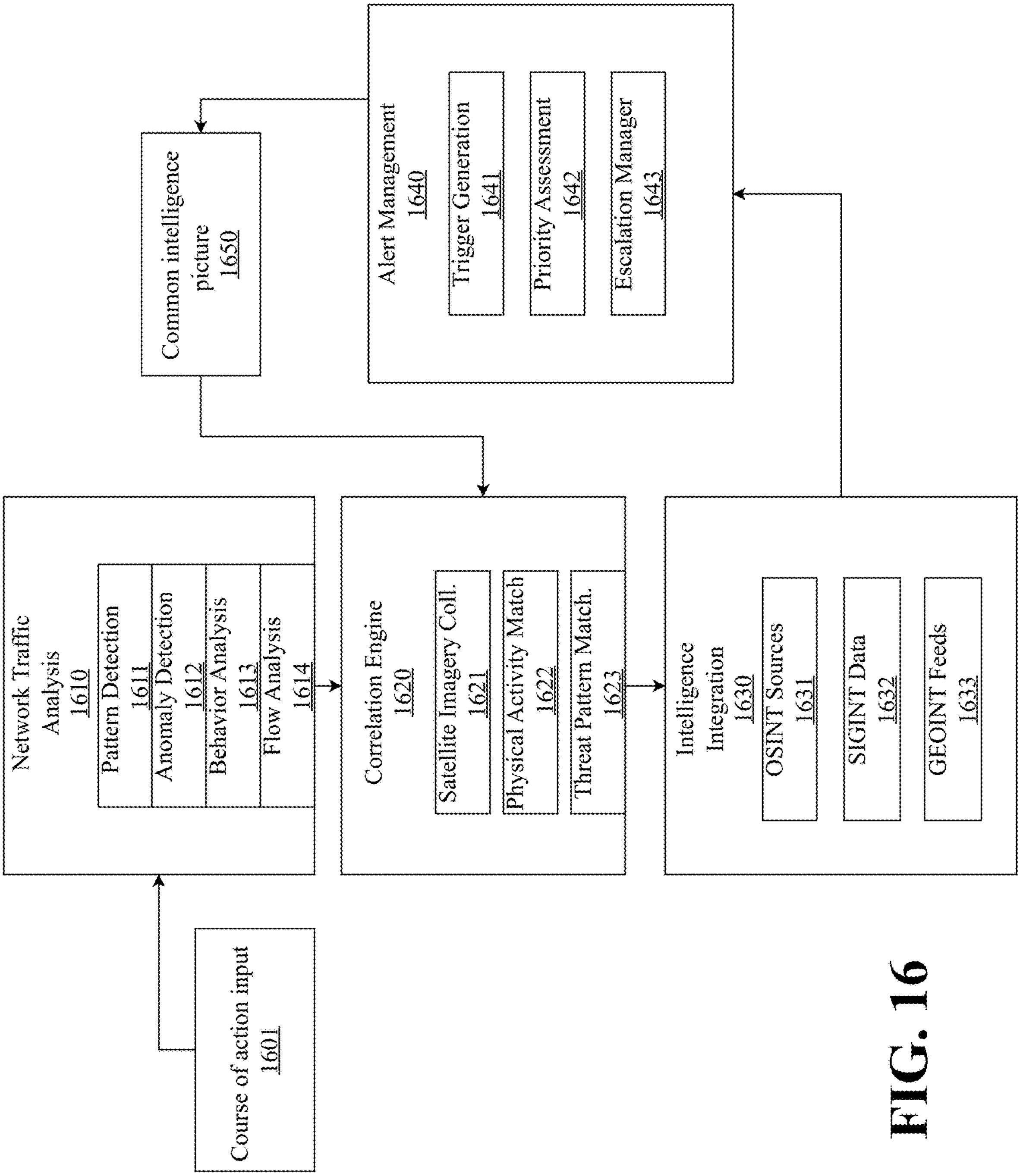
FIG. 16 illustrates a block diagram of the computer network operations (CNO) architecture, which integrates network traffic analysis with multi-source intelligence correlation capabilities.

FIG. 16 illustrates the architecture of the Computer Network Operations (CNO) Analysis component 1070, a sophisticated subsystem within the architecture that enriches threat detection and analysis by integrating advanced network traffic analysis with courses of action 1601 generated by the multi-source intelligence fusion system. This innovative system represents a critical advancement in cyber-physical intelligence fusion, enabling comprehensive monitoring and analysis based on PIR-driven requirements.

The Network Traffic Analysis 1610 subsystem forms the foundation of the CNO Analysis component, implementing state-of-the-art monitoring capabilities that process network data based on courses of action requirements. The pattern detection 1611 module employs sophisticated machine learning algorithms to identify recurring network behaviors and communication patterns specified in PIR requirements. For example, when monitoring a critical infrastructure facility based on a course of action, the system might automatically detect regular patterns of SCADA system communications. Anomaly Detection 1612 utilizes advanced statistical analysis and deep learning models to flag unusual network activities based on PIR-specified parameters. The behavioral analysis module 1613 implements long-term pattern recognition capabilities, studying network behavior over extended periods as directed by specific courses of action. For instance, it might track and analyze daily, weekly, and seasonal patterns in network traffic to establish detailed behavioral profiles. The flow analysis 1614 examines network traffic flows using visualization and analysis tools configured according to PIR requirements.

The correlation engine 1620 represents a groundbreaking approach to multi-source intelligence integration, implementing advanced algorithms for linking cyber activities with physical observations as specified in courses of action. The satellite imagery correlation 1621 module automatically connects network traffic patterns with observed physical changes based on collection requirements determined by the multi-source intelligence fusion system. The physical activity matcher 1622 employs sophisticated pattern matching algorithms to associate network behaviors with real-world events, such as linking spikes in industrial network traffic with observed changes in facility operations. The threat pattern matcher 1623 implements advanced comparison algorithms to evaluate observed patterns against an extensive database of known threat actor tactics, techniques, and procedures (TTPs), prioritized by current courses of action.

The intelligence integration subsystem 1630 serves as a sophisticated fusion center, synthesizing intelligence from diverse sources based on PIR requirements. The OSINT Sources 1631 module continuously monitors and processes open-source intelligence feeds according to parameters established in the course of action. The SIGINT Data module 1632 processes signals intelligence data as specified by collection requirements. The GEOINT Feeds module 1633 integrates geospatial intelligence data based on PIR-driven collection plans.

The Alert Management subsystem 1640 implements sophisticated response coordination mechanisms that ensure timely and appropriate handling of detected threats. The Trigger Generation module 1641 employs advanced decision algorithms to create alerts based on complex pattern analysis and correlation results. For example, when detecting a potential threat to a critical facility, the system automatically generates alerts that include both network indicators and correlated physical observations. The Priority Assessment 1642 utilizes machine learning models to evaluate alert severity and assign appropriate priority levels, considering factors such as target criticality, threat indicators, and historical patterns. The Escalation Manager 1643 implements automated workflows for alert handling and notification, ensuring that critical information reaches appropriate decision-makers in a timely manner. Through its deep integration with the broader architecture, the CNO Analysis component enables unprecedented capabilities in threat detection and analysis. The system demonstrates this through sophisticated pattern recognition and correlation capabilities, such as automatically linking suspicious network activities with observed physical changes at monitored facilities. Advanced machine learning algorithms and neural networks enable the system to identify subtle patterns in network behavior, detect emerging threat indicators, and even predict potential future activities based on observed patterns. The system maintains continuous adaptation to evolving threat patterns through automated learning mechanisms and regular updates to its threat detection models. For instance, when new threat actor TTPs are identified, the system automatically updates its pattern matching algorithms and correlation rules to maintain detection effectiveness. This comprehensive approach to cyber-physical intelligence analysis has demonstrated exceptional operational effectiveness. For example, during a recent deployment monitoring critical infrastructure facility, the system successfully identified and correlated subtle changes in network traffic patterns with minor physical modifications observed through satellite imagery, enabling early detection of potential security concerns. The system's ability to rapidly process and correlate vast amounts of data from multiple intelligence sources, while maintaining high accuracy in threat detection and low false positive rates, represents a significant advancement in integrated intelligence analysis capabilities.

Through continuous integration with the common intelligence picture (CIP), the CNO analysis maintains real-time correlation of cyber and physical intelligence indicators. The system automatically formats analytical findings with appropriate metadata and confidence scores before integration into the CIP. Each correlation maintains complete traceability to generating analysis components and course of action requirements. The system implements sophisticated temporal management to ensure proper sequencing of updates while maintaining consistency across multiple concurrent analysis streams. This integration enables the CIP to provide a comprehensive view that incorporates both cyber and physical domain intelligence while maintaining analytical integrity and enabling rapid dissemination of critical findings to decision-makers.

Figure 17:
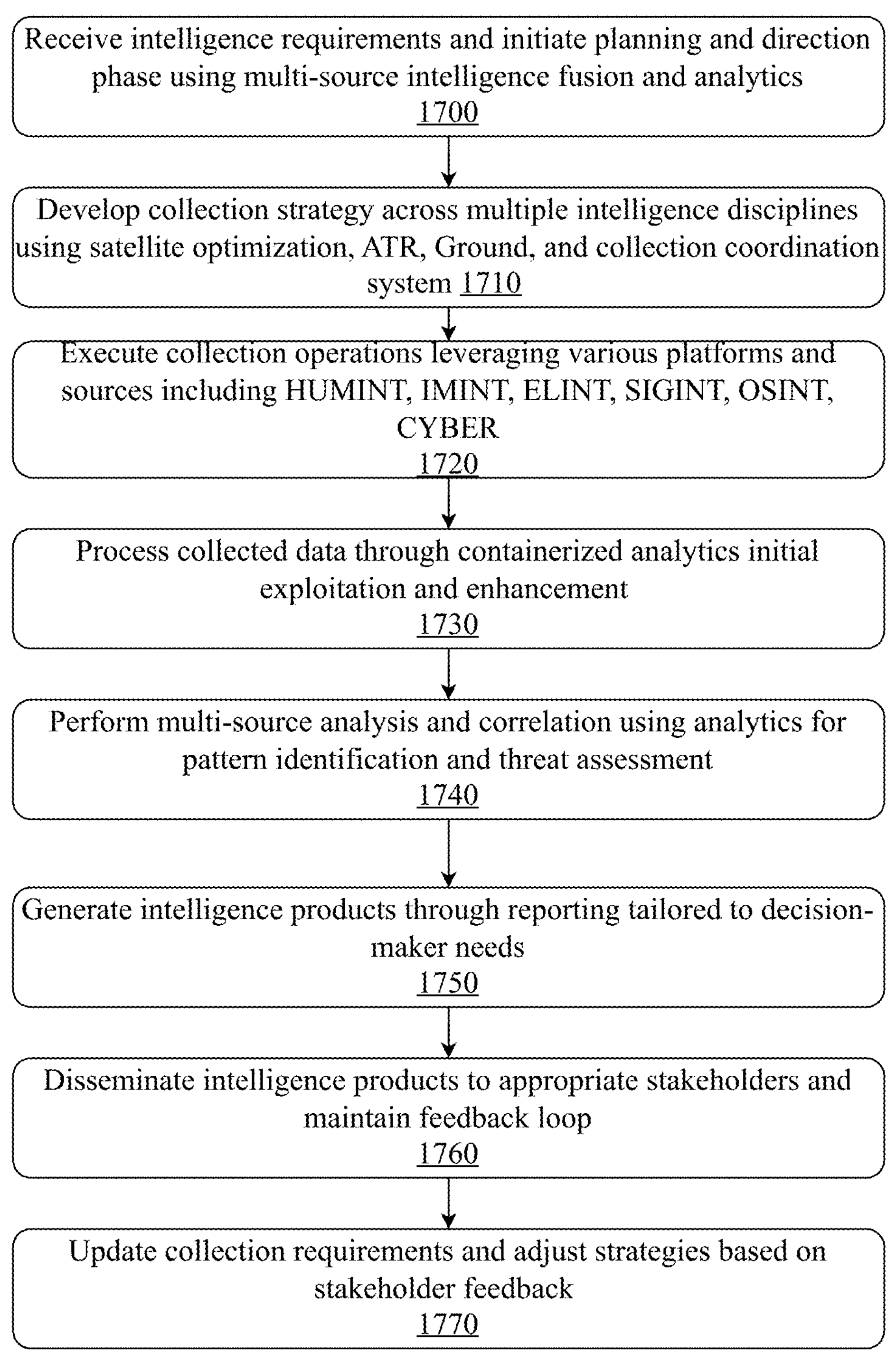
FIG. 17 illustrates a flow diagram of the comprehensive method for implementing the joint intelligence process through the system, demonstrating the integration of specialized components throughout each phase of the automated intelligence cycle.

FIG. 17 illustrates a comprehensive method for implementing the joint intelligence process through the system architecture, demonstrating how specialized components execute each phase of the automated intelligence cycle. At its core, the system is driven by the multi-source intelligence fusion system's large language model, which acts as an interactive question-and-answer system to process and respond to priority intelligence requirements (PIRs) with contextually appropriate courses of action. This integrated approach represents a significant advancement in automated intelligence operations, with each phase maintaining continuous updates to the Common Intelligence Picture. The process begins with Planning and Direction (phase 1), where the multi-source intelligence fusion system analyses incoming PIRs using sophisticated natural language processing to understand intelligence needs, temporal constraints, and operational context. This advanced LLM capability automatically generates comprehensive courses of action spanning multiple intelligence disciplines, ensuring limited collection assets are employed efficiently. These courses of action are continuously assessed and updated based on operational progress and emerging requirements. This has the overall responsibility for supervising and directing the resources that govern intelligence operations including support to PIR, ISR, and RFI management. Successful PIRs are tied to decision points, ensuring limited collection asserts are employed efficiently, and must be continuously assessed or updated depending on the progress of the operation. In Collection (phase 2), the satellite data acquisition optimization platform orchestrates multi-source collection in response to generated courses of action. The platform coordinates with the space domain awareness system for real-time collection asset management while evaluating physical feasibility across multiple providers. Collection integrates HUMINT (human intelligence), IMINT (imagery intelligence) through satellite platforms, ELINT (electronic intelligence), SIGINT (signals intelligence), OSINT (open source intelligence), and CYBER intelligence gathering, with each discipline carefully synchronized through the fusion engine to ensure complementary coverage. Once the collection plan has executed and the data arrives, it is processed for exploitation, the containerized analytics workbench manages processing (phase 3). During processing (phase 3), the containerized analytics workbench manages automated data preparation through its sophisticated microservices architecture. The workbench implements specialized processing chains for each intelligence type, leveraging GPU-accelerated deep learning models for automated target recognition while maintaining processing traceability to original PIR requirements. Stakeholders must consider available resources and capacity for the processing of raw information and then augment organic PED with federated reach back to ensure speed, depth of analysis, and support. The analysis and production stage (phase 4) utilizes analytics in concert with the inference engine's deep learning models to establish the significance of processed intelligence. The system automatically correlates findings across multiple intelligence sources, integrating disparate pieces of information to identify patterns while maintaining continuous updates to the CIP. This analysis establishes the significance and implications of processed intelligence, integrate it by combining disparate pieces of information to identify collateral information and patterns, then interprets the significance of any newly developed knowledge. A comprehensive Ops and intel overview with predictive analysis by analytics. Finished intelligence products take more forms depending on the needs of the decision-maker and reporting requirements. The level of urgency of various types of intelligence is typically established by an intelligence organization or community. The reporting handles dissemination (phase 5), which automatically generates intelligence products tailored to different user needs. The system supports multiple product formats including interactive displays, PDFs, and presentations, while maintaining direct links to underlying intelligence data in the CIP. The automated feedback mechanisms complete the cycle (phase 6) which enables users to provide input directly through or on derivative products, with feedback automatically processed to update the CIP ensuring intelligence products remain current and responsive to evolving requirements.

The intelligence cycle begins with the planning and direction phase, where the process begins with PIR intake and processing 1700 through the multi-source intelligence fusion system's LLM capabilities. The LLM acts as an interactive question-and-answer system that processes PIRs, understanding context, urgency, and specific intelligence needs. When receiving a complex requirement, such as monitoring industrial activity at a port facility, the system engages in natural language processing to analyze the PIR, automatically identifying key collection parameters including facility boundary identification, vehicle movement detection thresholds, cargo handling equipment operational states, maritime vessel presence indicators, and associated storage facility status metrics. The parser module works in concert with the capability catalog to identify required analytical services and algorithms, the space domain awareness system to evaluate collection asset availability and capabilities, and the containerized workbench to determine required processing workflows.

During this initial phase, the system's course of action generator processes priority intelligence requirements (PIRs) through two parallel streams where asset selection evaluates available collection platforms through the virtual satellite database and other collection resources, while data source identification determines relevant intelligence feeds needed for comprehensive analysis. The collection strategy generator then translates these requirements into coordinated plans across multiple domains, orchestrating satellite imagery planning for space-based collection, RF monitoring planning for signals intelligence, and social media analysis for OSINT collection. This sophisticated requirement analysis algorithms that automatically decompose complex intelligence needs into specific collection and processing tasks, considering available collection assets, temporal requirements, and operational constraints. When a requirement specifies monitoring of technology transfer activities, the system automatically develops a multi-INT collection strategy that might include daily high-resolution imagery collection during peak operating hours, continuous RF monitoring for specific communication signatures, and automated OSINT collection focused on relevant commercial shipping data and social media activity. This automated planning process ensures efficient resource utilization while maintaining focus on critical intelligence needs. The system's LLM capabilities enable nuanced understanding of complex requirements. For example, when a PIR specifies monitoring technology transfer activities, the system automatically analyzes the requirement to develop comprehensive courses of action spanning multiple intelligence disciplines. This might include orchestrating daily high-resolution imagery collection during peak operating hours, establishing continuous RF monitoring for specific communication signatures, and implementing automated OSINT collection focused on relevant commercial shipping data and social media activity. The system evaluates each potential collection strategy against historical performance data, current asset availability, and environmental conditions to optimize resource allocation. Through its natural language processing capabilities, the system maintains interactive refinement of requirements, automatically adjusting collection strategies based on emerging patterns and evolving operational needs. For instance, if initial collection reveals new indicators of interest, the system can autonomously modify its collection strategy while maintaining alignment with the original PIR intent. This automated planning process ensures efficient resource utilization while maintaining focus on critical intelligence needs, with each course of action maintaining clear traceability to originating requirements and organizational priorities.

Through integration with the fusion engine, the system maintains temporal alignment of collection strategies while the analysis node ensures analytical feasibility. For example, when a PIR specifies monitoring technology transfer activities, the system queries the satellite data acquisition optimization platform to evaluate collection opportunities, coordinates with the CNO Analysis component to establish cyber monitoring parameters, leverages the inference engine to configure appropriate deep learning models, and interfaces with the containerized analytics workbench to establish required processing chains. The system continuously evaluates collection strategies through the opportunistic tasking subsystem for dynamic collection adjustment, the live context data aggregator for real-time situational awareness, and the quality assurance module for performance validation. This integrated approach ensures comprehensive collection planning while maintaining clear traceability from PIRs through courses of action to specific collection tasks, with continuous updates to the Common Intelligence Picture throughout the process.

Following initial planning, the system develops detailed collection strategies based on the course of action 1710, where the satellite data acquisition optimization platform working under the direction of the multi-source intelligence fusion system's directives, automatically evaluates collection feasibility across multiple providers through the virtual satellite database, analyzing parameters such as orbital dynamics from the space domain awareness system, weather conditions from the live context data aggregator, and sensor capabilities cataloged in the capability database. This platform operates in synchronization with the inference engine's automated target recognition capabilities, which leverages GPU-accelerated deep learning models to process requirements and identify optimal collection parameters for object detection and classification tasks. The collection strategy generator coordinates these requirements across multiple intelligence domains through its collection scheduler, orchestrating comprehensive multi-INT operation. For satellite imagery collection, the system interfaces with the space domain awareness system's orbital tracking layer to identify optimal collection windows, such as morning passes between 0900-1100 local time that provide ideal illumination while avoiding typical afternoon cloud formations. Simultaneously, the system leverages the CNO analysis component for cyber collection, the containerized analytics workbench for signals intelligence processing, and the data ingest layer for OSINT aggregation, creating a synchronized collection strategy across all intelligence disciplines. The system maintains dynamic collection optimization through continuous feedback loops. The inference engine's Automated target recognition (ATR) system provides real-time assessment of collection quality and target detection confidence levels to the fusion engine, while the opportunistic tasking subsystem enables rapid adjustment of collection parameters. This information flows through the live context data aggregator to enable real-time mission refinement. The containerized analytics workbench coordinates these adjustments through its workflow automation engine, ensuring all collection assets maintain synchronization with evolving mission requirements. Through integration with the quality assurance module and performance monitoring systems, the platform continuously validates collection effectiveness while maintaining updates to the CIP, ensuring comprehensive intelligence gathering across all collection modalities. This step processes requirements from the multi-source intelligence fusion system LLM to identify optimal collection parameters for object detection and classification tasks. For instance, when tasking satellite imagery collection, the system might identify that morning collections between 0900-1100 local time provide optimal illumination while avoiding typical afternoon cloud formation patterns. The system orchestrates comprehensive collection strategies across multiple intelligence disciplines. While the satellite data acquisition optimization platform manages space-based collection, the system simultaneously coordinates complementary collection assets—SIGINT collection during peak communication periods, implementing targeted OSINT monitoring of shipping manifests and port schedules, and establishing automated tracking of relevant cyber indicators. The ATR system provides continuous feedback on collection quality and target detection confidence levels, enabling dynamic adjustment of collection parameters to optimize recognition performance. The system automatically schedules these collection operations while optimizing resource allocation across available assets and coordinating multi-INT collection activities to ensure comprehensive intelligence gathering.

Then the execution 1720 implements these collection plans across multiple intelligence disciplines, representing a sophisticated orchestration of diverse collection capabilities. The satellite data acquisition optimization platform manages IMINT collection by interfacing with the space domain awareness system's asset management layer, which continuously monitors satellite health and capabilities while the orbital tracking layer ensures precise collection timing. For SIGINT and ELINT collection, the containerized analytics workbench deploys specialized processing chains through its workflow automation engine, while the CNO Analysis component's network traffic analysis subsystem handles CYBER intelligence gathering. The data ingest layer processes OSINT feeds through automated collection templates managed by the capability catalog's algorithm repository. This multi-INT synchronization is coordinated through the fusion engine, which maintains temporal alignment across all collection disciplines. For example, when monitoring technology transfer activities, the multi-source intelligence fusion system translates courses of action into synchronized collection tasks: the satellite data acquisition optimization platform schedules high-resolution imagery collection during predicted equipment movement windows identified through pattern of life analysis, while the CNO Analysis component's correlation engine links cyber activities with physical observations. The containerized analytics workbench simultaneously processes SIGINT data through its dynamic exploitation module, as the data ingest layer aggregates OSINT from shipping manifests and corporate registries through automated monitoring templates. The system manages simultaneous collection operations including HUMINT (human intelligence), IMINT (imagery intelligence) through satellite and aerial platforms, ELINT (electronic intelligence), SIGINT (signals intelligence), OSINT (open source intelligence), and CYBER intelligence collection. Each collection discipline is carefully coordinated to ensure maximum effectiveness and complementary coverage. For example, when monitoring a specific target involving technology transfer activities, the system might synchronize multiple collection types: scheduling high-resolution satellite imagery collection during predicted equipment movement windows, coordinating SIGINT collection to capture associated communications, maintaining continuous OSINT monitoring of relevant shipping manifests and corporate registries, while automatically adjusting collection priorities based on detected activities. The system might also implement automated tipping and cueing between collection assets—for instance, using SIGINT detection of specific communication patterns to trigger automated high-resolution imagery collection of associated facilities. When the CNO Analysis component's pattern detection module identifies significant network activities, it automatically triggers the satellite data acquisition optimization platform through the collection strategy generator to task high-resolution imagery collection. These automated collection adjustments are managed through the live context data aggregator, which maintains continuous situational awareness across all collection assets while updating the Common Intelligence Picture with new findings. This integrated approach ensures comprehensive intelligence gathering while maintaining synchronization across all collection disciplines through automated workflow management and continuous quality assurance monitoring.

Collected intelligence undergoes initial processing through the containerized analytics workbench (phase 3) 1730, which executes workflows based on courses of action from the multi-source intelligence fusion system LLM. The workbench implements sophisticated data preparation and enhancement capabilities through containerized microservices that maintain processing traceability to original PIR requirements applying automated data normalization to standardize formats across different intelligence sources, initial exploitation algorithms to extract key information, and quality enhancement procedures to improve data usability. For each intelligence type, the workbench applies specialized processing chains. For instance, satellite imagery might undergo automatic atmospheric correction to compensate for specific atmospheric conditions, advanced contrast enhancement to improve ATR performance, and automated orthorectification to ensure precise geolocation for multi-source correlation. SIGINT data flows might be processed through advanced signal cleaning algorithms to remove interference, followed by automated signal characterization and pattern matching aligned with collection requirements. When processing radar data, the system applies sophisticated algorithms for speckle reduction, automated change detection, and feature extraction optimized for integration with other intelligence sources. The workbench prepares all processed data for detailed analysis while maintaining data integrity and source attribution, automatically generating quality metrics and confidence assessments for each processed intelligence item.

The processing phase may begin as collected intelligence flows into the containerized analytics workbench, which executes sophisticated workflows orchestrated by directives from the multi-source intelligence fusion system. The workbench's visual workflow builder engine translates these courses of action into executable processing chains through its task library, while the workflow validator ensures alignment with original PIR requirements. The workflow automation engine coordinates processing across multiple intelligence types through its orchestrator component, managing complex data flows while maintaining processing priorities established by the original PIRs. The containerized analytics module implements specialized processing chains for each intelligence type through its modular architecture. For satellite imagery, the processing chain interfaces with the inference engine's GPU-accelerated processing capabilities to perform atmospheric correction, leveraging space weather data from the space domain awareness system for calibration. The workbench's computer vision processing module applies advanced contrast enhancement optimized for the automated target recognition system's deep learning models, while maintaining precise geolocation through integration with the space domain awareness system's orbital parameters. For SIGINT processing, the workbench coordinates with the CNO Analysis component's signal processing capabilities, implementing advanced cleaning algorithms through the pattern detection module while the behavioral analysis module performs automated signal characterization. Radar data undergoes specialized processing through the capability catalog's algorithm suite, applying speckle reduction and change detection algorithms maintained in the detection algorithms repository. Throughout these operations, the quality assurance module continuously validates processing results, with the performance metrics component tracking key indicators while the model validation system ensures processing accuracy. The workflow automation engine maintains synchronized data flows through its scheduler component, while the monitor tracks processing status and resource utilization. Processed intelligence flows through the fusion engine for temporal alignment before integration into the Common Intelligence Picture, with the multi-source intelligence fusion system maintaining continuous correlation across intelligence types. The processing architecture maintains dynamic adaptation through feedback from the performance monitor, automatically refining processing parameters through the MLOps pipeline to optimize analytical outcomes while maintaining complete provenance through the version control system.

The workbench orchestrates these data processing workflows maintaining data integrity and source attribution, automatically generating quality metrics and confidence assessment for each processed intelligence item. All processing results are formatted for ingestion into phase 4 analysis through analytics, enabling automated target recognition, pattern analysis, and threat assessment. The system maintains continuous updates to the CIP, ensuring processed intelligence is immediately available for analysis while preserving complete provenance of processing operations. This processing architecture enables dynamic workflow adjustment based on feedback from phase 6, automatically refining processing parameters to improve analytical outcomes.

The analysis phase (phase 4) leverages Analytics 1740 to execute multi-source analysis directives generated by the multi-source intelligence fusion system LLM, implementing advanced pattern recognition and threat detection capabilities based on processed intelligence from phase 3. The analytics engine ingests multi-INT data through the containerized analytics workbench and applies courses of action to conduct sophisticated correlation and pattern analysis. For example, when analyzing technology proliferation activities based on PIR requirements, the system automatically correlates multiple indicators through parallel processing streams: the ATR system detects specific equipment signatures in satellite imagery using computer vision algorithms trained on known examples, while simultaneously the SIGINT processing identifies relevant technical specifications in intercepted communications. The system correlates these findings with vessel movements against historical patterns of concern. These physical and signals intelligence indicators are then fused with OSINT data, correlating changes in online technical job postings or academic publications from associated institutions to build comprehensive activity assessments. In port facility monitoring, analytics employs pattern of life analysis modules that establish detailed behavioral baselines by integrating multiple intelligence feeds. The system tracks typical cargo handling patterns through satellite imagery analysis, correlates vessel berthing durations from maritime tracking data, monitors vehicle movements through persistent surveillance, and analyzes associated communications patterns—enabling rapid identification of anomalous activities that could indicate threats. The system also implements sophisticated network analysis capabilities, automatically mapping relationships between entities, facilities, and activities across all intelligence sources while maintaining traceability to source data in the common intelligence picture. When analyzing industrial activities, it might correlate power consumption patterns derived from infrared imagery with production related communications intercepted through SIGINT, integrates shipping records from OSINT sources, and fuses observed personnel movements to assess operational status. The analytics engine coordinates with multiple system components. Through integration with the inference engine, it applies GPU-accelerated deep learning models to conduct automated target recognition and pattern detection. For example, when analyzing technology proliferation activities, the ATR automatically detects specific equipment signatures in satellite imagery, while feature extraction isolates relevant characteristics from intercepted communications. The containerized analytics workbench contributes through its pattern of life analysis module, which establishes detailed behavioral baselines by integrating multiple intelligence feeds. The dynamic exploitation module enables rapid analysis of time-sensitive intelligence based on course of action priorities. The capability catalog's algorithm catalog provides specialized processing capabilities, with detection algorithms and tracking algorithms working in concert to monitor behavioral patterns. The classification models automatically categorize detected activities according to PIR specifications. The CNO analysis enriches the analysis through its correlation engine, which automatically links cyber activities with physical observations. The physical activity matcher associates network behaviors with real-world events, while the threat pattern matcher evaluates patters against known TTPs. Throughout this process, analytical findings are continuously integrated into the CIP through the fusion engine, which performs temporal alignment of disparate data streams, spatial correlation of observations, and confidence scoring of integrated assessments. For example, when satellite imagery reveals increased vehicle presence, the fusion engine correlates this with RF emission patterns from signals intelligence, integrates relevant OSINT data about facility activities, and matches these against historical patterns to build comprehensive activity assessments. The system maintains sophisticate network analysis capabilities through the CNO analysis intelligence integration subsystem, automatically mapping relationships between entities, facilities, and activities across all intelligence sources. When analyzing industrial activities, it correlates power consumption patterns from infrared with production-related communications intercepted through SIGINT, integrates shipping records from OSINT sources, and fuses observed personnel movements to assess operational status. This comprehensive analysis supports Intelligence product generation is managed through reporting 1750, which ingests analytical outputs from multiple system components to automatically create tailored intelligence products based on specific user requirements and operational needs. For time critical situations, such as detecting unusual activity at a monitored facility, the system generates immediate tactical intelligence summaries that include relevant imagery snippets, signal analysis results, and pattern matching assessments, automatically prioritizing the most significant indicators. For persistent monitoring requirements, the system produces detailed periodic assessments that might include trend analysis of vessel traffic patterns, changes in communication volumes, variations in thermal signatures, and correlation with relevant indicators. When generating strategic assessment reports, the system automatically integrates historical pattern analysis, predictive trending, and confidence assessments for each analytical conclusion. For example, a proliferation monitoring report might include automated analysis of technology transfer patterns, correlation with known proliferation networks, assessment of technical capabilities based on observed activities, and predictive analysis of future capabilities development. The reporting system leverages findings from many components. The containerized analytics workbench, utilizing outputs from its pattern of life analysis, object-based production, and dynamic exploitation modules to generate comprehensive assessments. The inference engine's deep learning models incorporating results from automated target recognition and pattern classification to provide detailed object detection and behavioral analysis. The CNO analysis correlation engine, which enriches products with cyber-physical correlations and threat pattern matching. The multi-source intelligence fusion system's fusion engine, which ensures temporal and spatial alignment of all intelligence data. For time-critical situations, such as detecting unusual activity at a monitored facility, the system generates immediate tactical intelligence summaries through the workflow automation engine. These products automatically integrate: relevant imagery snippets processed through the ATR system; signal analysis results from RF monitoring; pattern matching assessments from the capability catalog's algorithm suite; network traffic analysis from the CNO; automated alerts from the alert management subsystem. For persistent monitoring requirements, the system's processing chain produces detailed periodic assessments that leverage: trend analysis from the pattern recognition algorithms; vessel traffic patterns detected through maritime domain monitoring templates; communication volume analysis from SIGINT data; thermal signature variations from multi-sensor fusion; and indicators correlated through OSINT sources. When generating strategic assessment reports, the system integrates data from multiple analytical pipelines while maintaining direct traceability to the CIP. For example, a proliferation monitoring report combines: technology transfer pattern analysis from multi-source correlation; network relationship mapping from CNO analysis; historical pattern analysis from the containerized analytics workbench; predictive trending using GPU-accelerated machine learning models; and confidence assessments generated by the quality assurance module. Each product maintains complete linkage to source data in the CIP while enforcing appropriate security controls and access restrictions managed through the orchestration layer. The system implements continuous feedback loops through the performance monitor to refine product generation based on user interaction patterns, evolving requirements, and effectiveness metrics.

The dissemination phase 1760 implements sophisticated mechanisms for secure and targeted delivery of intelligence products. The system maintains multiple dissemination pathways with automated handling of classification requirements and access controls. Within the system interface, users can access interactive dashboards showing real-time intelligence updates, dynamic maps with overlaid multi-source intelligence, timeline views of historical patterns and trends, customizable analytical workspaces for detailed investigation, and alert feeds prioritized by user role and requirements. For derivative products delivered outside, the system automatically generates PDF reports with embedded analytics and visualizations, PowerPoint briefings with automated updates as new intelligence arrives, spreadsheet exports for detailed data analysis, geospatial data packages for GIS integration, and standard intelligence information reports (IIRs). When disseminating periodic assessments, the system automatically determines appropriate distribution based on content classification, customer requirements, and established dissemination protocols. For immediate threat warnings, the system might simultaneously push alerts through classified networks to operational commands while generating appropriate sanitized versions for broader distribution. For example, a maritime activity assessment might be automatically formatted into multiple versions: a comprehensive classified report with detailed technical analysis for intelligence customers delivered within a tactical PowerPoint summary for operational forces, and a sanitized PDF trend analysis for policy makers. Each product maintains direct links to source data in the CIP/COP, enabling users to drill down into detailed intelligence when appropriate access levels exist. The system maintains audit trails of all dissemination actions while automatically monitoring delivery confirmation and access patterns. Through continuous integration with the CIP/COP, all disseminated products remain synchronized with the latest validated intelligence, ensuring consistency across all product formats and delivery mechanisms.

The cycle concludes with an advanced feedback mechanism 1770 that enables continuous system improvement through direct interaction with delivered intelligence products. Feedback can either go directly through the interface or on derivative products such as PDFs and presentations, with all feedback automatically processed to update the CIP/COP. The system implements sophisticated metrics collection and analysis to evaluate the effectiveness of each intelligence cycle phase. For collection operations, it tracks factors such as collection success rates, data quality metrics, and target coverage statistics. Processing effectiveness is measured through quality assessment metrics, processing time statistics, and enhancement result validation. Analysis performance is evaluated through accuracy assessments, correlation success rates, and customer feedback incorporation. As feedback is received on any product format, the system automatically updates relevant data in the CIP/COP, ensuring all users have access to the most current validated intelligence. The system employs machine learning algorithms to continuously refine its analytical models based on operational results and validated intelligence. For example, when monitoring industrial activities, the system might automatically adjust its pattern recognition algorithms based on confirmed activity identifications, refine its anomaly detection thresholds based on validated alerts, and update its predictive models based on observed outcome accuracy. This comprehensive feedback process ensures continuous improvement in intelligence operations while maintaining adaptation to evolving collection requirements and threat patterns.

Fusion Engine Exemplary System Architecture

Figure 18:
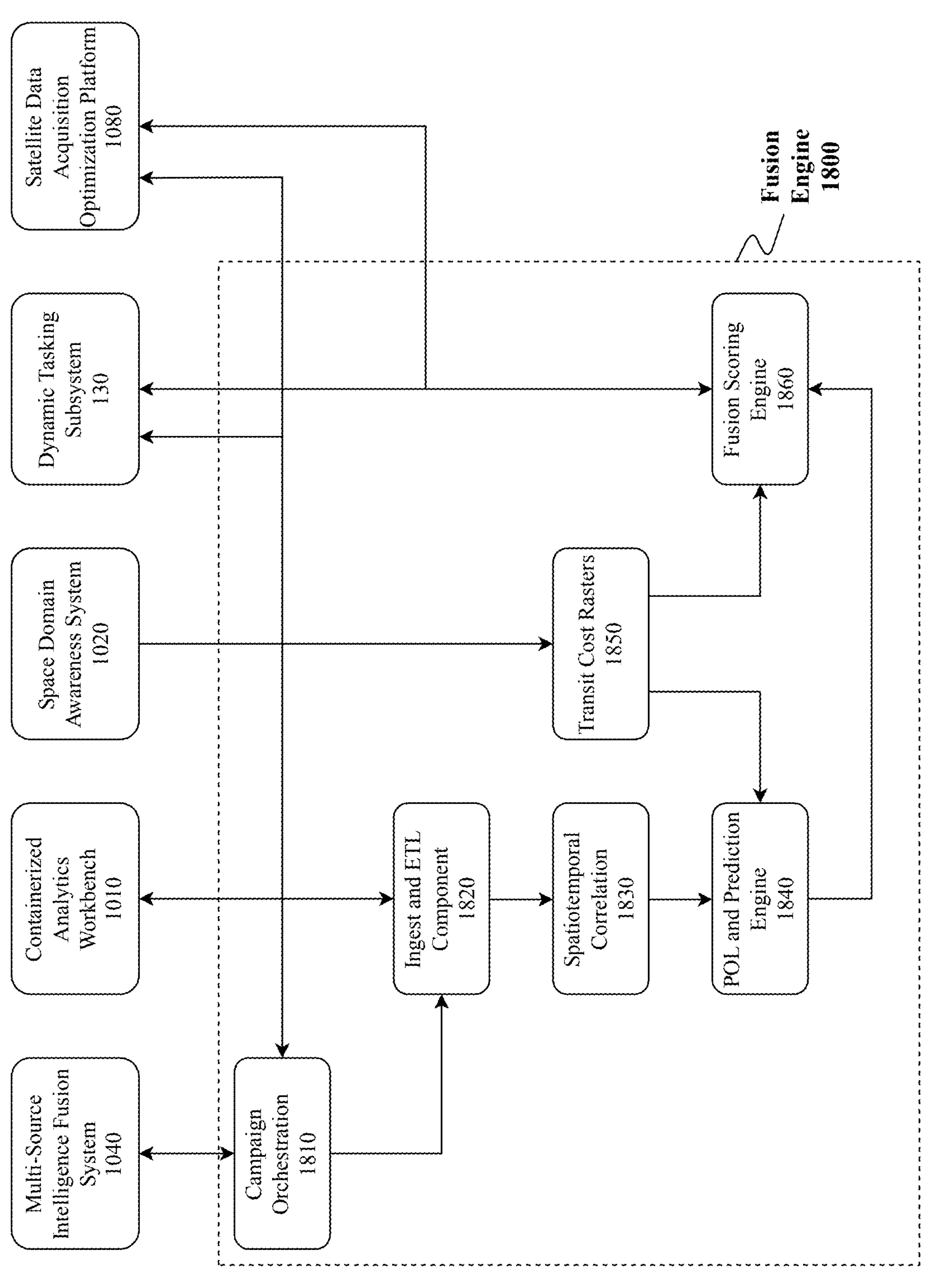
FIG. 18 illustrates an exemplary architecture of a fusion engine system comprising multiple interconnected components configured to perform automated multi-source intelligence fusion, target tracking, behavior prediction, and collection management.

FIG. 18 is a block diagram illustrating an exemplary architecture of fusion engine 1800, in an embodiment. Fusion engine 1800 comprises multiple interconnected components configured to perform automated multi-source intelligence fusion, target tracking, behavior prediction, scoring, and dynamic collection management. In various embodiments, fusion engine 1800 supports concurrent custody tracking of multiple coordinated entities and assigns behavior scores at both the individual and group level. The architecture further supports detection of adversarial movement behavior, initiation of custody reacquisition workflows based on confidence degradation, and real-time campaign reprioritization based on strategic triggers. Each component operates as part of a closed-loop feedback system that continuously refines predictive models and tasking logic based on operational context and system performance Campaign orchestration 1810 serves as the control layer for initiating and managing fusion workflows. Upon receiving user inputs defining parameters such as area of interest, time frame, target types, and operational constraints, campaign orchestration 1810 generates structured workflows and orchestrates downstream components. It interfaces with multi-source intelligence fusion system 1040, which contributes broader contextual tasking and maintains the common intelligence picture.

Ingest and Extract, Transform, Load (ETL) component 1820 receives asynchronous intelligence inputs from GEOINT, SIGINT, OSINT, and CYBER sources. It performs data normalization, spatial-temporal alignment, deduplication, metadata tagging, and source evaluation. The component may leverage services from containerized analytics workbench 1010 for preprocessing tasks. Normalized reports are forwarded to spatiotemporal correlation 1830.

Spatiotemporal correlation 1830 applies statistical estimation and clustering to maintain target identity continuity. This subsystem uses particle filters to estimate target state over time, clustering algorithms such as DBSCAN to associate observations, and contextual filters to discard implausible associations. A track generator produces coherent trajectories, while a track validator ensures data integrity. Validated tracks are passed to pattern of life and prediction engine 1840.

Pattern of life and prediction engine 1840 analyzes validated tracks to generate probabilistic forecasts of future movement. It includes a pattern analyzer for behavioral baselining, a trajectory projector, and predictive models that may implement Markov chains, Bayesian methods, or machine learning. User-defined movement constraints and terrain-weighted routing from transit cost rasters 1850 are incorporated into the forecast.

Transit cost rasters 1850 generate geospatial movement cost models based on topography, road infrastructure, and environmental data. This subsystem includes a raster generator, compiler, and processor to integrate terrain and mobility constraints. Rasters are derived using inputs from space domain awareness system 1020 and physical feasibility data 150. The resulting rasters support both movement prediction in engine 1840 and behavior scoring in engine 1860.

Fusion scoring engine 1860 evaluates new observations against predicted movement corridors to assign behavior alignment scores and identity confidence metrics. It includes a corridor matcher, behavior scorer, confidence scorer, custody record manager, and alert generator. Custody records log track continuity, scoring history, and source lineage. Fusion scoring engine 1860 also drives ISR cueing and collection planning by generating prioritized tasking recommendations, alerts for anomalous behavior, and fused outputs for analyst consumption. These outputs are disseminated to dynamic tasking subsystem 130, satellite data acquisition optimization platform 1080, containerized analytics workbench 1010, and multi-source intelligence fusion system 1040 to support ongoing intelligence cycles.

Fusion engine 1800 operates as a continuous feedback loop: as new observations are ingested and scored, collection plans are refined in near real-time, enabling persistent custody across dynamic environments. The architecture supports multiple concurrent campaigns, with each subsystem instantiated and managed according to campaign-specific parameters and constraints.

Figure 19:
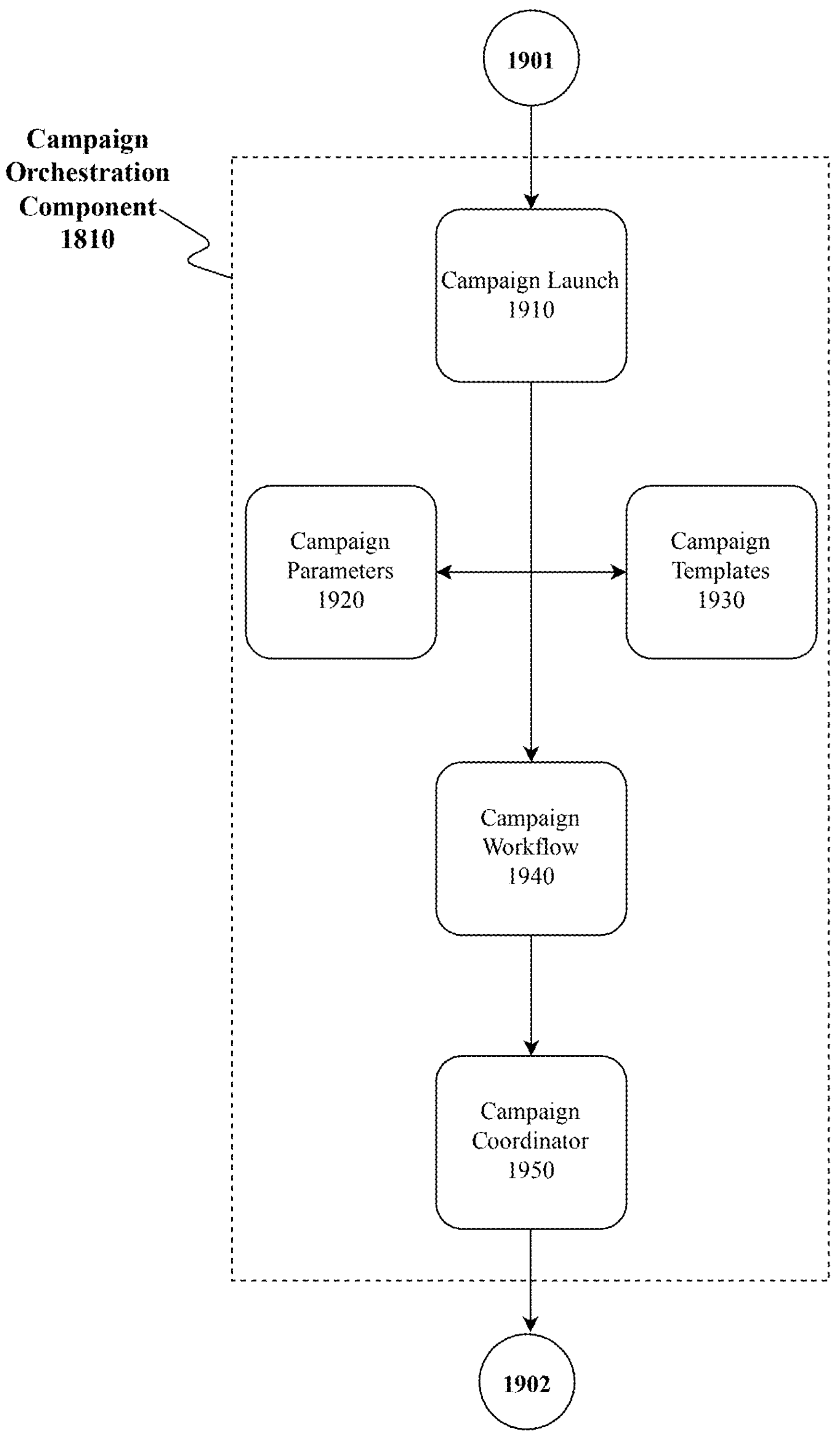
FIG. 19 illustrates an exemplary architecture of a campaign orchestration component comprising subcomponents for campaign initiation, configuration, workflow generation, and execution management.

FIG. 19 is a block diagram illustrating an exemplary architecture of campaign orchestration component 1810, in an embodiment. Campaign orchestration 1810 initiates and manages fusion workflows by translating mission-specific intelligence requirements into executable configurations that govern the behavior of downstream components in fusion engine 1800. Campaign orchestration 1810 translates PIRs into executable workflows and manages their lifecycle across operational phases. In certain embodiments, campaign orchestration 1810 also receives scoring feedback from downstream components and reprioritizes tasking objectives, sensor allocations, and model selection strategies accordingly. The system supports structured campaign definitions that specify group behavior tracking, evasion signature detection, and segmented POL modeling. Campaign orchestration 1810 receives data 1901, which comprises user-defined or system-triggered campaign definitions including mission parameters, configuration preferences, and optional template references. This input is transformed into structured workflows for downstream execution.

Campaign launch 1910 provides a unified entry mechanism for campaign creation. This subcomponent may be invoked manually by an analyst, triggered by external systems upon detection of defined activity thresholds, or executed according to pre-scheduled intelligence routines. It ingests high-level collection intent and resolves it into a campaign object, incorporating authorization tokens, tasking rationale, and trigger metadata. This object serves as the persistent anchor for the campaign lifecycle.

In an embodiment, campaign launch 1910 incorporates a large language model (LLM) configured to receive priority intelligence requirements (PIRs) in natural language and translate them into structured tasking criteria. These may include collection modality, spatial coverage, temporal bounds, revisit intervals, and resolution preferences. The LLM outputs one or more candidate Courses Of Action (COAs), which are evaluated based on mission feasibility, target relevance, and historical effectiveness. The resulting structured tasking elements are incorporated into the campaign object generated by 1910 and passed to campaign workflow 1940 for execution. In various embodiments, the LLM may further update its tasking logic based on feedback from scoring outputs, analyst interaction, and campaign performance outcomes. In some embodiments, the structured tasking criteria generated by the LLM are expressed in a schema-based format, such as a JavaScript Object Notification (JSON) object or protobuf message, comprising fields for modality preference, sensor type, geographic bounds, revisit cadence, time-of-day constraints, and tasking priority. These structured outputs are validated for completeness and consistency and are ingested by campaign workflow 1940 to instantiate parameterized pipelines across ingest, correlation, and prediction phases.

Campaign parameters 1920 define the operational footprint of the campaign, encompassing geospatial extent, time constraints, monitoring targets, and collection conditions. These parameters are encoded as structured fields within the campaign object and are used throughout the system to constrain data ingestion, filter tasking opportunities, and guide predictive modeling. For instance, parameters might specify a moving target type (e.g., medium-sized vessel), enforce a minimum revisit interval, or exclude certain sensor modalities based on operational restrictions.

Campaign templates 1930 are predefined configurations that encapsulate domain-specific knowledge and processing logic. Unlike parameters, which are user- or trigger-defined, templates are curated by system administrators or SMEs and may include assumptions about likely movement behavior, risk thresholds, and preferred correlation modes. Templates simplify workflow instantiation by supplying validated defaults and may also encode internal logic for auto-tuning based on target class or terrain type. Templates may be categorized into tactical and strategic modes. Tactical templates prioritize short-term identity continuity and reactive retasking, while strategic templates focus on long-horizon behavior modeling, temporal pattern extraction, and facility-level trend detection.

Campaign workflow 1940 is a dynamic assembly of linked analytic stages derived from the current campaign's parameter and template configuration. It determines how sensor inputs are ingested, how identity continuity is established, which prediction algorithms are applied, and how behavior is scored. Unlike static pipelines, workflows generated in 1940 may adapt during execution based on data characteristics or scoring outcomes. This flexibility supports campaigns that must evolve in response to emerging movement patterns or collection opportunities. Campaign workflow 1940 may be dynamically reconfigured to incorporate new modeling assumptions or scoring parameters in response to mission-level guidance or anomaly detection events. Workflow orchestration supports dynamic reconfiguration of analytic stages at runtime, allowing substitution or parameter adjustment of correlation, prediction, or scoring modules without interrupting campaign execution. This enables real-time adaptation to evolving operational contexts or data characteristics.

Campaign coordinator 1950 supervises the execution of each active campaign. It serves as a runtime controller that launches ingestion via component 1820, tracks processing outcomes, manages handoff across analytic modules, and adjusts internal state based on environmental changes or analyst feedback. It maintains campaign-level memory, enabling pause, resume, and reconfiguration operations. The coordinator also ensures synchronization with external platforms responsible for collection (e.g., 1080) or tasking (e.g., 130), closing the operational loop.

In aggregate, campaign orchestration 1810 enables mission-specific intelligence operations to be instantiated rapidly, adapted in real time, and continuously evaluated against operational objectives. The output of campaign orchestration 1810 is campaign execution data 1902, which includes a fully configured workflow definition, mission parameters, and runtime directives. This data is passed to ingest and ETL component 1820 to initiate source acquisition, apply operational filters, and align data processing behavior with the active campaign.

Figure 20:
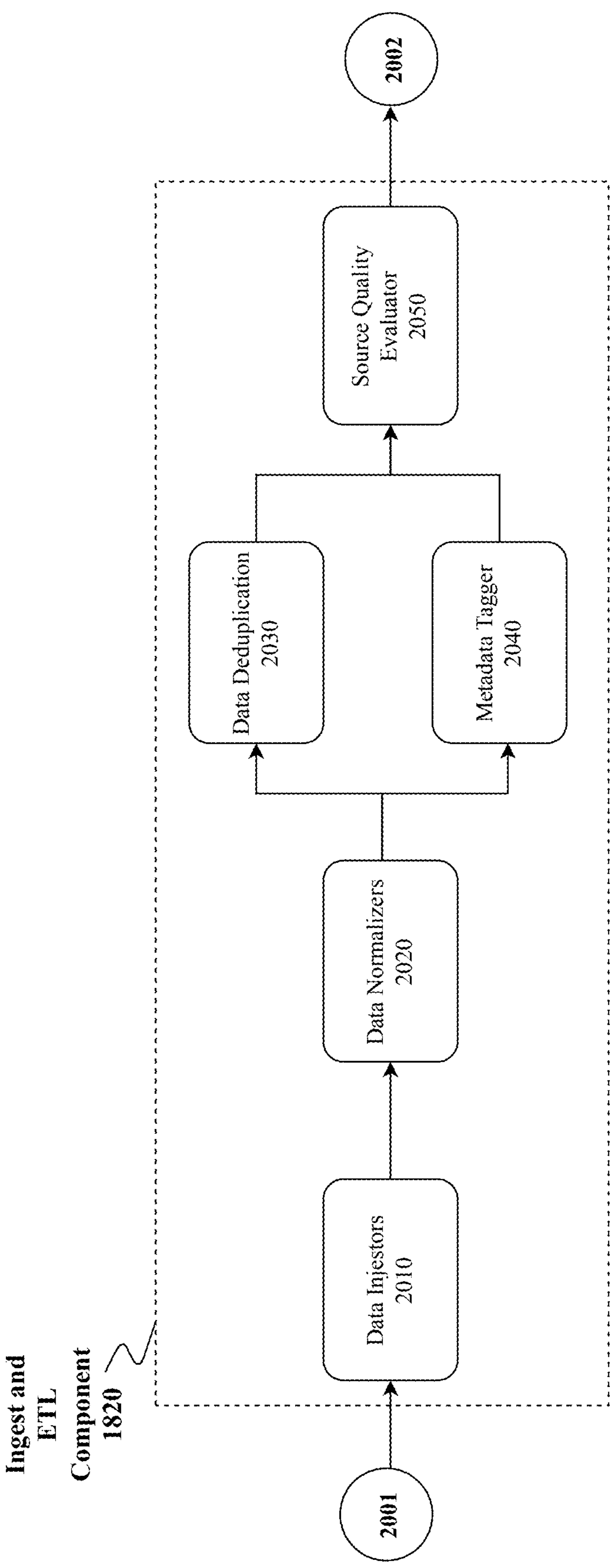
FIG. 20 illustrates the internal architecture of ingest and Extract, Transform, Load (ETL) component, including data ingestion, normalization, deduplication, tagging, and source evaluation subcomponents.

FIG. 20 is a block diagram illustrating an exemplary architecture of ingest and ETL component 1820, in an embodiment. Ingest and ETL component 1820 serves as the data acquisition and normalization subsystem of fusion engine 1800, transforming raw intelligence feeds from multiple domains into structurally and semantically unified formats for downstream fusion analysis. Ingest and ETL component 1820 supports ingestion from sources that report on individual or group activity, including swarm formations or adversarial decoy deployments.

Ingest and ETL component 1820 receives data 2001, which comprises multi-source intelligence inputs from external feeds, campaign configuration metadata from campaign orchestration 1810, and optional preprocessing or enrichment directives from containerized analytics workbench 1010. These inputs collectively define the raw and contextually scoped information set processed by the ingest pipeline.

Data ingestors 2010 are source-specific adapters that establish authenticated data pipelines from heterogeneous intelligence sources, including Geospatial Intelligence (GEOINT), Signals Intelligence (SIGINT), Open-Source Intelligence (OSINT), and Cyber Intelligence/Domain (CYBER). Each ingestor implements protocol-specific logic for polling, subscribing, or passively receiving inputs. For example, the GEOINT ingestor handles imagery-derived object detections, while the SIGINT ingestor processes radio-frequency emissions and intercept metadata. OSINT feeds may include social media monitoring and commercial vessel tracking, whereas CYBER ingestors process logs, packet traces, or endpoint telemetry. These ingestors operate asynchronously and in parallel to support high-throughput ingestion across multiple intelligence modalities. In certain embodiments, ingestion subcomponents are implemented using asynchronous processing models and may support parallel ingestion threads or event-driven task queues. This enables the system to process large volumes of multi-modal intelligence inputs concurrently, improving responsiveness and reducing latency in time-sensitive ISR contexts.

Data normalizers 2020 restructure incoming intelligence into a consistent internal schema. This transformation involves multiple stages: timestamp alignment across time zones and formats; geospatial reprojection to a common coordinate system; harmonization of field structures; and unit standardization for metrics such as distance, frequency, or speed. The normalization layer establishes cross-source comparability, enabling otherwise incompatible inputs to be meaningfully correlated.

Deduplication 2030 identifies and resolves redundant or overlapping reports. It uses compound criteria—such as spatiotemporal clustering, sensor metadata, and observation content—to infer whether two or more reports describe the same event. Rather than discarding duplicates outright, the system may synthesize fused observations with merged metadata and enhanced accuracy. This prevents bias in downstream analytics and ensures track continuity is not artificially inflated by redundant input.

Metadata tagger 2040 augments each normalized report with contextual annotations critical to fusion logic. Tags may include observation confidence scores, environmental modifiers (e.g., cloud cover, jamming likelihood), source reliability flags, and automatically extracted named entities. These tags feed directly into the correlation and scoring stages, influencing identity continuity decisions and behavior scoring metrics. Metadata tagger 2040 may annotate observations with indicators relevant to group association (e.g., velocity alignment, synchronized maneuvering) or evasion likelihood (e.g., improbable path, unusual timing). These enriched reports ensure that downstream fusion components have access to behavioral cues needed for sophisticated custody scoring. The pipeline supports adaptive enrichment logic based on the campaign configuration or scoring history.

Source quality evaluator 2050 maintains historical performance models for each source or sensor stream. These models are continuously updated using retrospective validation and comparison against ground truth or fused consensus. When reports are processed, evaluator 2050 applies learned weights and quality scores that influence how each observation is treated in the correlation and scoring pipelines.

The final output of ingest and ETL component 1820 is a stream of structurally normalized, deduplicated, and contextually enriched observation reports, annotated with quality metrics and confidence scores. This output is forwarded as data 2002 to spatiotemporal correlation component 1830 for identity continuity estimation and track generation.

Ingest and ETL component 1820 implements a staged processing architecture in which certain subcomponents operate sequentially while others execute in parallel. For example, normalized data from data normalizers 2020 may be simultaneously routed to both deduplication 2030 and metadata tagger 2040, whose outputs are then evaluated together by source quality evaluator 2050. This modular flow allows for selective activation, parallel execution, and adaptive processing based on data characteristics and campaign configuration.

Together, the subcomponents of ingest and ETL component 1820 implement a robust processing chain that converts unstructured, domain-specific data into standardized, traceable, and enriched formats suitable for fusion. This subsystem ensures that all intelligence inputs entering the system are deduplicated, normalized, and contextually enhanced, forming a reliable foundation for target tracking, identity correlation, and behavioral analysis.

Figure 21:
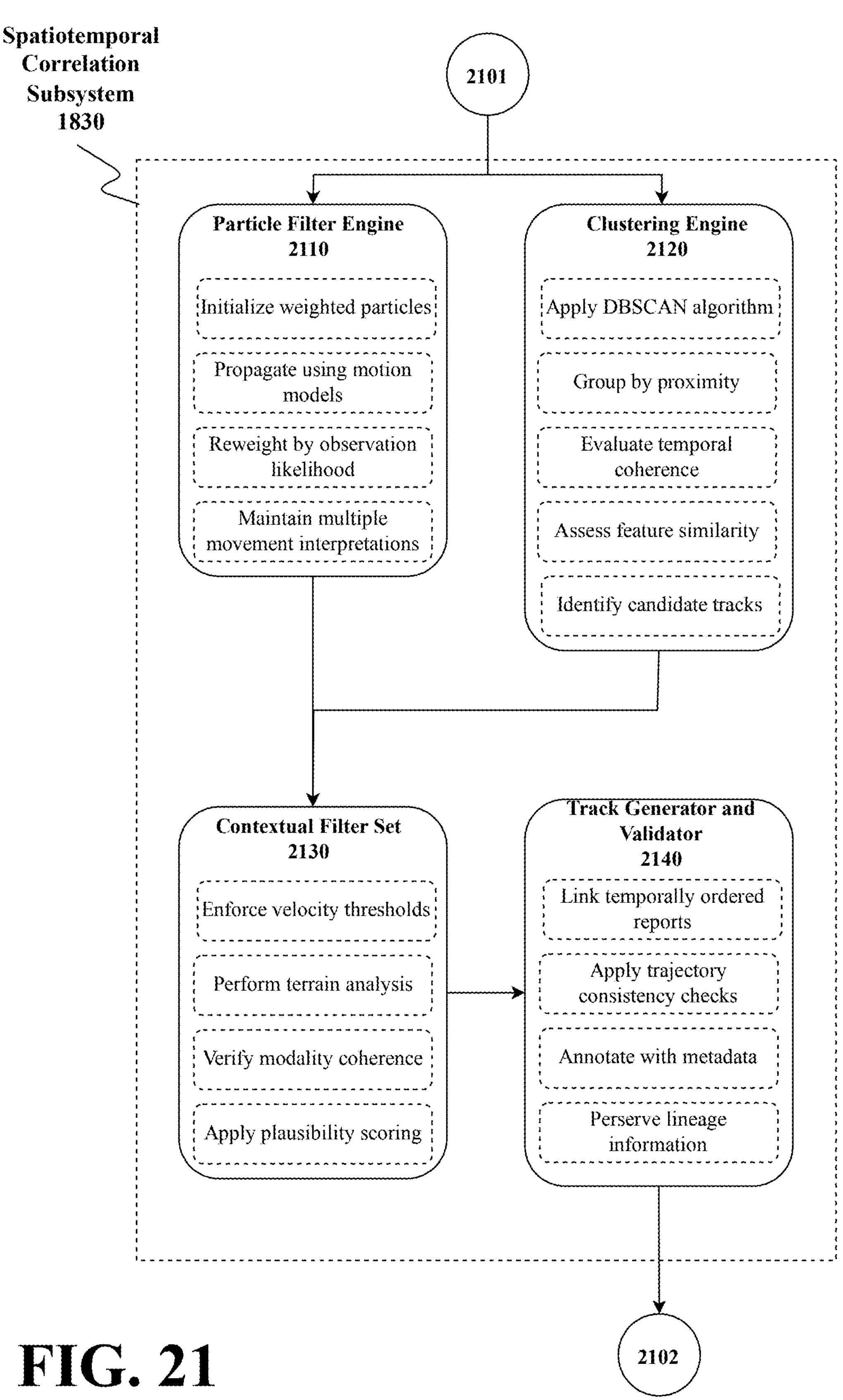
FIG. 21 is a block diagram illustrating an exemplary architecture of spatiotemporal correlation subsystem, which processes multi-source observation data to generate validated target tracks.

FIG. 21 is a block diagram illustrating an exemplary architecture of spatiotemporal correlation subsystem 1830, in an embodiment. Spatiotemporal correlation subsystem 1830 receives observation data 2101 from ingest and ETL component 1820 and generates validated target tracks (data 2102) that preserve identity continuity across disparate or temporally separated observations. The subsystem comprises four coordinated components that collectively perform probabilistic estimation, observation clustering, domain-specific filtering, and track validation. Spatiotemporal correlation subsystem 1830 extends beyond traditional single-target correlation to support multi-target association across spatially distributed observations.

Particle filter engine 2110 addresses the challenge of tracking targets under uncertain or incomplete reporting. It implements recursive Bayesian state estimation to maintain evolving hypotheses over target motion. Upon receiving data 2101, it initializes a set of weighted particles representing candidate states, including target position, velocity, and maneuver characteristics. Particles are propagated using dynamic motion models and reweighted according to observation likelihood. This nonparametric approach supports nonlinear trajectories and heterogeneous sensor inputs, allowing the system to maintain multiple plausible interpretations of a target's movement over time.

Clustering engine 2120 resolves ambiguity in multi-target environments by applying density-based spatial clustering algorithms such as DBSCAN. It groups observations based on proximity, temporal coherence, and feature similarity without assuming a predefined number of entities. This unsupervised methodology identifies spatial-temporal clusters representing candidate tracks while filtering noise. Clustering engine 2120 enables the discovery of arbitrarily shaped trajectories, critical for real-world data where targets may maneuver unpredictably or appear intermittently.

Contextual filter set 2130 applies physical and semantic constraints to refine the associations proposed by prior components. It enforces velocity thresholds to reject transitions that exceed plausible movement limits, performs terrain analysis to ensure tracks align with feasible paths, and verifies modality coherence across linked segments. Additional plausibility scoring may be applied based on sensor characteristics, report confidence, and domain-specific heuristics. This component eliminates false linkages that spatiotemporal correlation alone may not disambiguate.

Track generator and validator 2140 assembles filtered observations into coherent, validated tracks. It links temporally ordered reports using association memory and applies trajectory consistency checks to detect anomalies such as discontinuities or unrealistic accelerations. Each track is annotated with metadata including predicted position estimates, velocity vectors, continuity confidence metrics, and track quality scores. Lineage information is preserved, enabling traceability to the contributing observations and intermediate processing states. The resulting track records form the primary output of the subsystem and are suitable for both predictive modeling and downstream scoring. The track generator and validator 2140 may output both individual and group-level tracks, each with corresponding continuity and behavior scores. Group association logic may operate in parallel to single-entity tracking, using distance thresholds, movement similarity, and temporal alignment to identify coordinated units or convoy-like formations.

During execution, input data 2101 is processed concurrently and independently by particle filter engine 2110 and clustering engine 2120. Their respective hypotheses are reconciled and refined by contextual filter set 2130. Resulting candidate associations are passed to track generator and validator 2140, which emits validated tracks (data 2102) annotated with identity continuity indicators and quality metrics. These track records are forwarded to pattern of life and prediction engine 1840 (see FIG. 22) for future movement modeling and behavior assessment, and may also support scoring operations within fusion scoring engine 1860 (see FIG. 24). This architecture enables resilient multi-target tracking across ambiguous, noisy, or conflicting observation inputs, providing the continuity substrate required for predictive ISR and fused intelligence generation.

Figure 22:
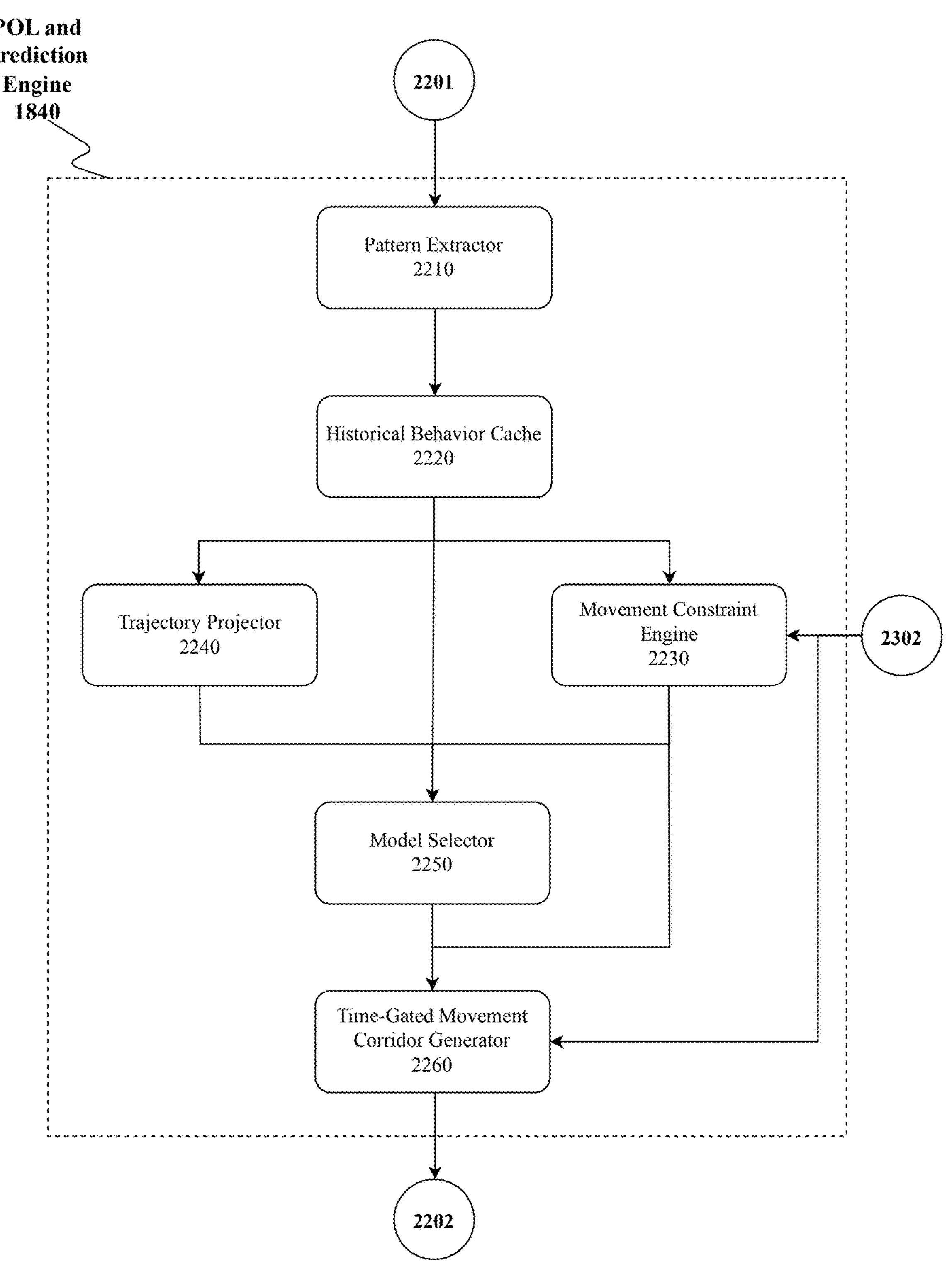
FIG. 22 is a block diagram illustrating an exemplary architecture of pattern of life and prediction engine, which generates constrained probabilistic movement forecasts using historical behavior models, terrain-aware mobility data, and adaptive trajectory prediction techniques.

FIG. 22 is a block diagram illustrating an exemplary architecture of pattern of life and prediction engine 1840, in an embodiment. Pattern of life and prediction engine 1840 receives two primary inputs: validated tracks (data 2101) from spatiotemporal correlation subsystem 1830 and terrain-weighted transit cost raster data (data 2302) from transit cost raster system 1850. These inputs are used to generate probabilistic movement forecasts (data 2201), which represent time-gated geospatial corridors formatted as polygonal regions or grid-based probability maps, each annotated with temporal bounds and confidence surfaces. The engine implements a modular prediction framework that integrates historical behavior modeling, geospatial movement constraints, and adaptive forecasting techniques.

Pattern of life and prediction engine 1840 supports generation of time-segmented behavior models. Forecasts may include diurnal or weekly activity windows, mission-phase-specific behavior, or seasonal movement patterns. These segmented models enhance prediction accuracy and enable detection of behavior divergence indicative of evasion or spoofing. The prediction engine also supports ensemble forecasting methods that distinguish between regular and adversarial movement hypotheses, improving the fidelity of downstream behavior alignment scoring.

Pattern extractor 2210 identifies structured behavioral patterns from historical track data to support model-based forecasting. By applying spatial-temporal segmentation and behavior typing, it identifies underlying activity modes such as patrol loops, approach-and-return paths, and temporally gated movements. This transformation allows irregular or sparse input data to be represented in terms of characteristic behavioral primitives that capture intent, routine, and variance.

Historical behavior cache 2220 serves as a persistent memory layer for retaining extracted behavior profiles across campaigns. Cached profiles may include waypoint frequency distributions, temporal activity calendars, directional preference histograms, and learned state transition matrices. Entries are indexed by target ID, geographic context, and behavioral type, enabling targeted retrieval during prediction tasks. The cache supports personalized modeling and facilitates incremental refinement as new data becomes available.

Movement constraint engine 2230 combines behavioral priors with operational and geospatial feasibility. It applies user-defined constraints such as maximum allowable displacement, no-go zones, and time-bound conditions, and integrates them with terrain-weighted cost raster data 2302 to compute movement feasibility fields. These fields define reachable regions over time given terrain friction, infrastructure availability, and target-specific mobility limits. The constraint engine enables the prediction system to distinguish between behaviorally probable paths and physically attainable ones.

Trajectory projector 2240 synthesizes candidate future paths within the feasible movement space. Using the current track endpoint, historical behaviors, and mobility parameters, it generates multiple trajectory hypotheses through vector extrapolation, stochastic sampling, and waypoint chaining. Each hypothesis includes predicted spatial paths, timing estimates, and model-derived confidence scores. The projector enables generation of divergent behavioral outcomes while retaining coherence with the target's observed tendencies and physical environment.

Model selector 2250 dynamically evaluates forecasting strategies and prioritizes the most contextually appropriate models. For instance, short-horizon predictions with high-resolution input may favor kinematic models, while sparse historical data may trigger statistical or rule-based forecasts. Selector logic may employ ensemble learning to combine predictions from multiple models, such as Markov chains for discrete behavior state transitions and Bayesian filters for posterior estimation under uncertainty. This adaptive model selection supports robust prediction under heterogeneous data and mission conditions.

Time-gated movement corridor generator 2260 transforms trajectory hypotheses into bounded probabilistic volumes representing where the target is likely to be across future time intervals. This component performs spatial convolution between the projected movement vectors and the transit cost raster data 2302 to generate terrain-aware movement envelopes that reflect both expected behavior and movement feasibility. Output corridors expand with time to reflect growing uncertainty and are represented as either raster-based probability fields or geospatial polygons annotated with temporal windows and confidence thresholds. These regions form the authoritative spatial-temporal reference frame used for subsequent scoring and ISR planning.

During execution, validated track data 2101 enters pattern extractor 2210, which derives structured movement profiles for the target. These profiles are retained in historical behavior cache 2220 and referenced during new prediction tasks. Movement constraint engine 2230 fuses these profiles with terrain-based movement costs (data 2302) and mission constraints to define plausible movement areas. Trajectory projector 2240 generates path hypotheses within these constraints, and model selector 2250 selects optimal forecasting logic based on prediction context. Time-gated movement corridor generator 2260 transforms selected hypotheses into movement forecasts (data 2201), which are passed to fusion scoring engine 1860. These outputs also serve as behavioral reference corridors for custody scoring and deviation analysis, providing a foundation for dynamic retasking, anomaly detection, and confidence-based track continuity assessment. The prediction engine thus enables anticipatory ISR by transforming historical behavior and geospatial knowledge into forward-looking, constrained, and confidence-weighted movement forecasts.

Figure 23:
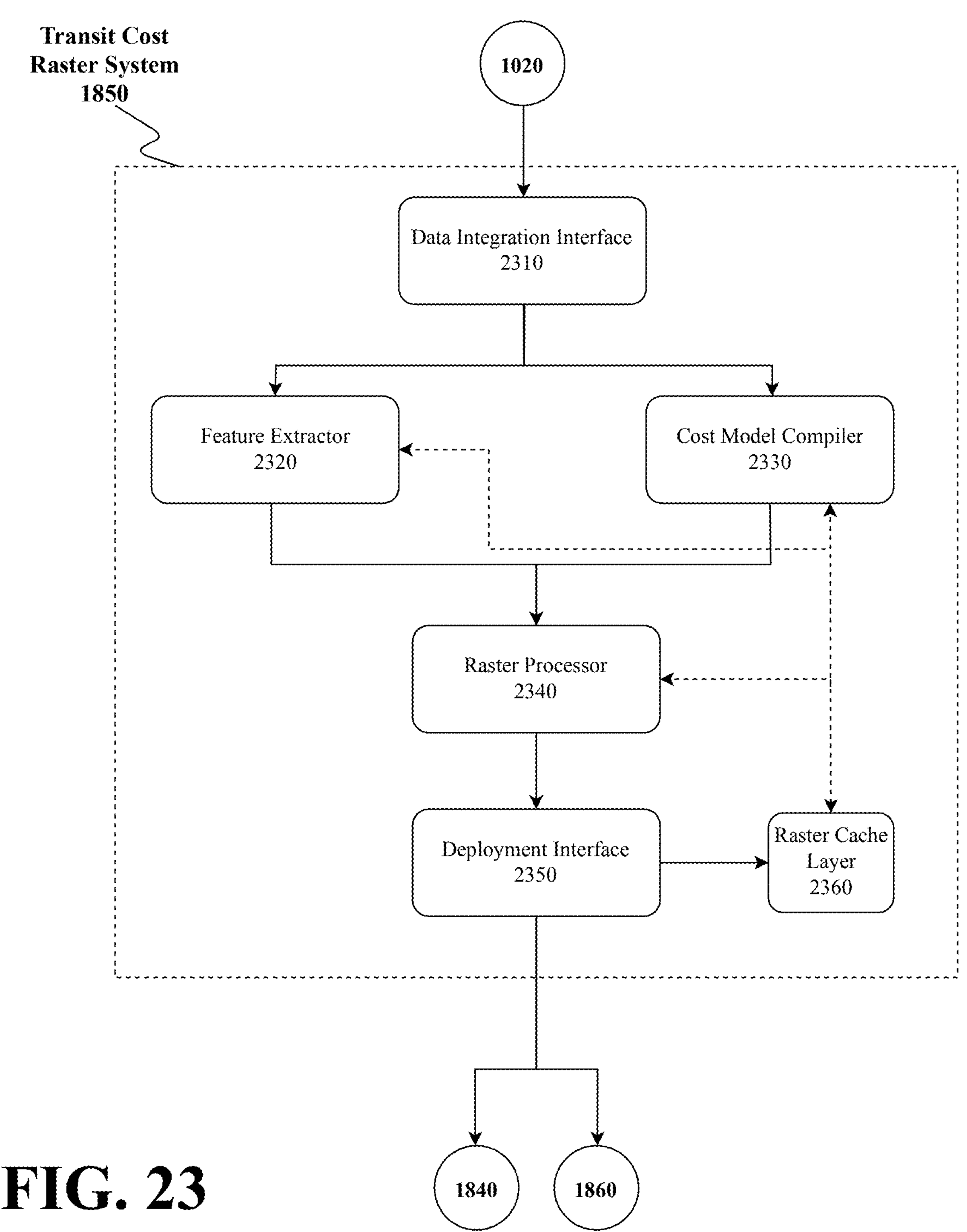
FIG. 23 is a block diagram illustrating an exemplary architecture of transit cost raster system, which modularly generates and serves terrain-weighted geospatial cost surfaces by integrating elevation, infrastructure, and environmental data to support prediction and scoring operations.

FIG. 23 is a block diagram illustrating an exemplary architecture of transit cost raster system 1850, in an embodiment. Transit cost raster system 1850 generates terrain-weighted geospatial cost surfaces that quantify the relative difficulty of movement across a defined area of interest. These rasterized mobility fields are used by downstream systems to constrain predicted paths, assess movement feasibility, and support behavior scoring. The system implements a modular and selectively instantiated architecture that supports parallel processing, conditional reuse, and persistent caching of raster products for efficient reuse across campaigns. Transit cost raster system 1850 may generate variant rasters based on predefined system configurations, such as expected movement behavior and group mobility constraints. Terrain masking and other advanced environmental factors are not currently incorporated, but may be supported in future configurations.

Data integration interface 2310 ingests heterogeneous geospatial and environmental data from sources such as space domain awareness system 1020 and physical feasibility data 150. Inputs may include digital elevation models (DEMs), land cover maps, infrastructure overlays, and dynamic environmental inputs such as cloud cover, wind speed, or terrain obscuration. These datasets are harmonized into a campaign-specific spatial reference frame and passed downstream for analysis.

Feature extractor 2320 derives terrain and infrastructure features relevant to mobility modeling. These include slope rasters, elevation gradients, surface classifications (e.g., urban, forested, aquatic), and infrastructure presence such as roadways or bridges. Feature extractor 2320 may access raster cache layer 2360 to reuse previously extracted feature masks for static or recurring AOIs, reducing redundant computation when terrain inputs have not changed. Cached feature layers allow the system to isolate and reprocess only the dynamic components (e.g., environmental overlays) when conditions evolve.

Cost model compiler 2330 converts extracted features into numerical movement penalties using target-specific mobility profiles and campaign-defined cost logic. It may retrieve intermediate cost grids from raster cache layer 2360 when compatible raster products exist and apply delta updates or overlays to adapt for new constraints or updated mission goals. By accessing stored cost fields, the compiler reduces processing time in overlapping or persistent monitoring zones.

Raster processor 2340 constructs final geospatial rasters from compiled cost surfaces. It supports multi-band raster formats, where each band represents a different mobility scenario, operational constraint, or environmental variant. Raster processor 2340 performs spatial smoothing, edge handling, and metadata annotation for each generated tile. It also writes completed raster products to raster cache layer 2360 with campaign-aware keys, enabling future reuse across missions with similar geographic or operational parameters. When existing raster tiles are requested, processor 2340 may validate cached entries for freshness and retrieve them directly if no updates are required. Raster cache layer 2360 acts as a high-efficiency storage tier, enabling rapid retrieval of previously computed cost surfaces, terrain masks, and mobility constraints. Cached rasters are indexed by campaign, Area Of Interest (AOI), and parameter set. This enables significant performance optimization in repeated tasking cycles over persistent surveillance regions, reducing computational overhead and latency.

Raster cache layer 2360 provides persistent storage for raster products and intermediate artifacts, supporting both read and write operations across the raster generation workflow. Cached items may include final raster tiles, intermediate cost surfaces, feature masks, and associated metadata (e.g., resolution, AOI bounds, generation timestamp, and mobility class). The cache is indexed for efficient lookup by area of interest, raster configuration, and campaign version. It serves as a critical performance optimization layer, enabling faster processing and reduced compute overhead for frequently surveilled regions or repeated tasking patterns. Raster cache layer 2360 may include policy-specific movement templates for evaluating track feasibility under adversarial movement assumptions. These rasters provide terrain-awareness for both individual and group behavior prediction. In some implementations, raster generation includes feature-layer deltas, wherein static terrain masks are reused and dynamic overlays—such as environmental data—are applied incrementally. This delta-based raster composition reduces redundant processing for campaigns in geographically persistent areas.

Deployment interface 2350 delivers raster products to prediction engine 1840 and fusion scoring engine 1860. These consumers use the terrain-weighted cost grids to constrain path hypotheses and evaluate behavior alignment, respectively. Rasters may be served via API, mounted as campaign-scoped assets, or version-controlled in a shared data layer to maintain reproducibility. Deployment interface 2350 queries raster cache layer 2360 for the latest validated version of the requested raster tile set prior to issuing data to consumers.

During execution, data integration interface 2310 supplies source inputs to feature extractor 2320, which may retrieve static layers from cache 2360 and produce updated terrain features. Cost model compiler 2330 combines these features with mobility logic, optionally reusing prior cost surfaces from cache when available. Raster processor 2340 assembles and annotates output rasters, writing them back to raster cache layer 2360. Deployment interface 2350 retrieves final raster tiles from cache or processor output and distributes them to prediction engine 1840 and scoring engine 1860. This architecture enables terrain-aware intelligence operations with efficient reuse of raster products, scalable support for complex campaigns, and reduced latency across predictive and scoring workflows.

Figure 24:
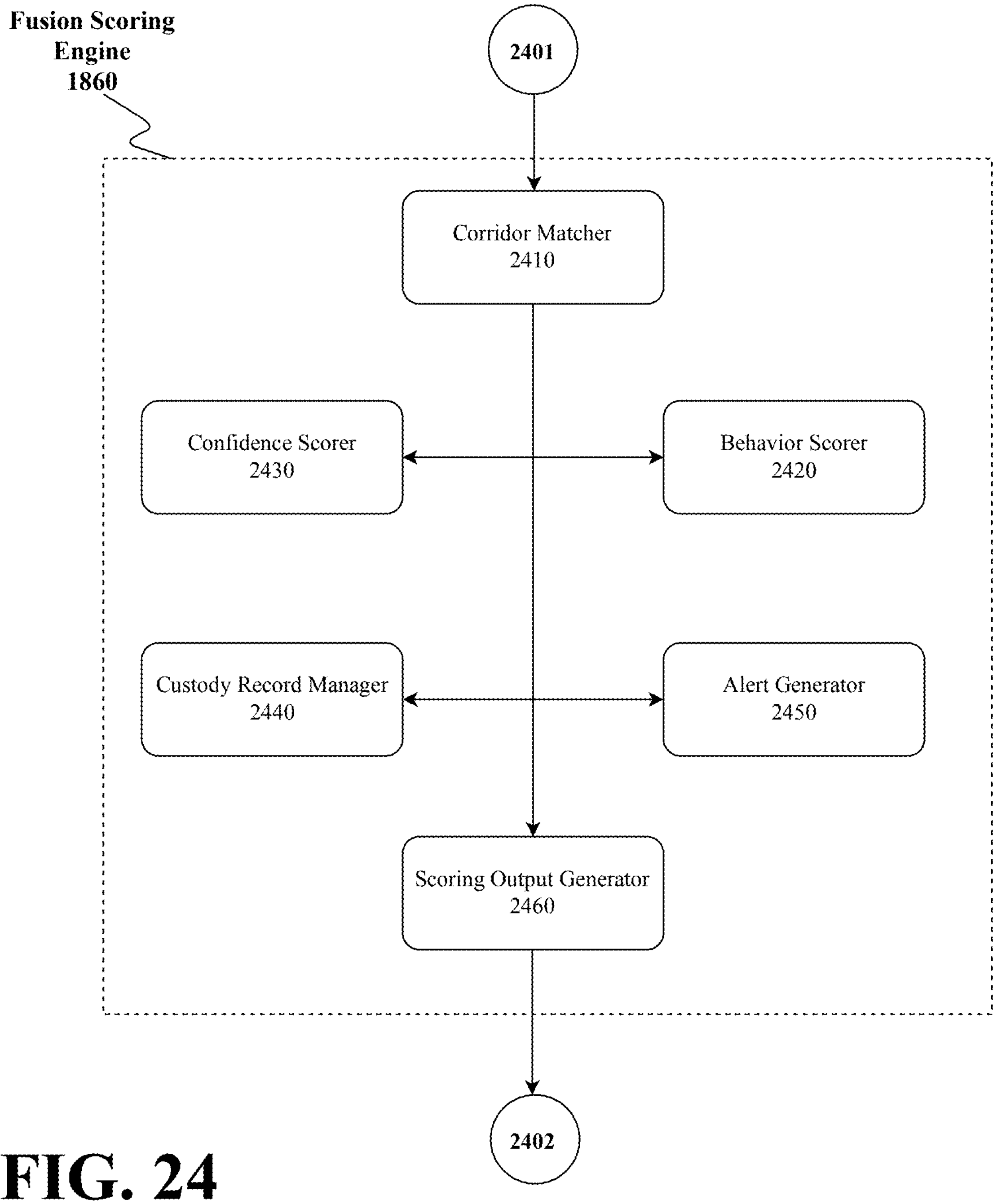
FIG. 24 is a block diagram illustrating an exemplary architecture of fusion scoring engine, which computes behavior alignment and identity continuity scores for incoming observations, updates custody records, and generates alerts and tasking recommendations to support real-time ISR and campaign adaptation.

FIG. 24 is a block diagram illustrating an exemplary architecture of fusion scoring engine 1860, in an embodiment. Fusion scoring engine 1860 evaluates incoming observations in the context of prior movement forecasts, terrain constraints, and historical tracks to assess behavioral conformity, identity continuity, and tasking priority. Fusion scoring engine 1860 evaluates observations using both standard predictive comparisons and advanced behavior modeling. The engine may assign behavior alignment scores that reflect not only deviation from expected trajectories, but also the plausibility of group-level coherence or deception signatures. The engine plays a central role in maintaining persistent custody by computing probabilistic association scores, logging confidence metrics, and issuing both alerts and tasking recommendations in response to anomalous or ambiguous observations. It integrates spatiotemporal reasoning, geospatial feasibility analysis, and statistical scoring models to support real-time decision-making in multi-INT fusion environments.

In various embodiments, fusion scoring engine 1860 receives input data 2401 from multiple subsystems, including fused observation reports from spatiotemporal correlation subsystem 1830, predictive movement corridors from pattern of life and prediction engine 1840, and terrain-weighted feasibility rasters from transit cost raster system 1850. Additional context may be provided by satellite data acquisition optimization platform 1080 and dynamic tasking subsystem 130, supplying tasking history, sensor availability, and campaign-level prioritization. Observations may reflect processed detections from electro-optical imagery, synthetic aperture radar, signals intelligence intercepts, or correlation events from computer network operations analysis. Each observation includes geospatial coordinates, temporal metadata, source identifiers, observation confidence scores, and optional feature vectors representing detected characteristics. These inputs collectively define the operational, spatial, and predictive context necessary for continuity assessment, behavior scoring, and ISR decision support.

Corridor matcher 2410 compares incoming fused observations against the predicted time-gated movement corridors produced by pattern of life and prediction engine 1840. The matcher evaluates whether the observation falls within the corridor's spatial and temporal bounds, incorporating terrain-aware movement feasibility derived from transit cost rasters 1850. This comparison determines not only behavioral consistency but also physical plausibility. Observations lying outside expected corridors may signal deviation, track fragmentation, or sensor misassociation.

Behavior scorer 2420 computes a deviation score representing the degree to which an observation aligns with the predicted trajectory in space, time, and motion vector. This score accounts for spatial offset, timing drift, heading divergence, and terrain-constrained feasibility. The scorer may penalize observations that imply implausible transit paths through high-cost terrain, even if temporally aligned. Scoring thresholds are adjustable by campaign, allowing adaptive tuning based on operational context.

Confidence scorer 2430 calculates a continuity confidence score indicating the likelihood that the observation belongs to an existing custody track. It considers behavior alignment, sensor metadata (e.g., source reliability, resolution, latency), and spatiotemporal proximity to previous observations. Using probabilistic inference techniques, such as Bayesian update or fuzzy logic integration, the scorer dynamically adjusts identity confidence in response to reinforcing or contradictory evidence. Confidence scores decay over time in the absence of confirming observations, allowing the system to gracefully shed stale associations.

Custody record manager 2440 maintains persistent, versioned records of track-level continuity assessments. Each custody record includes a unique track identifier, identity confidence history, deviation logs, source lineage, and scoring metadata. These records are updated continuously as new observations are ingested and serve as the authoritative basis for determining custody state. The manager may compute track health indicators, monitor continuity gaps, and support triage interfaces by ranking custody records according to urgency or risk of loss.

Alert generator 2450 monitors scoring metrics and triggers alert conditions when predefined thresholds are crossed. For example, a sharp drop in behavior alignment or a discontinuity in identity confidence may result in an alert, triggering re-acquisition recommendations or automated retasking. In addition to alerts, generator 2450 may produce ISR tasking recommendations based on track degradation, priority level, or behavioral divergence. These outputs are passed to satellite data acquisition optimization platform 1080 or dynamic tasking subsystem 130 to redirect sensors, tighten revisit intervals, or initiate alternative collection strategies. Alert payloads include contextual metadata such as scoring history, predicted vs. observed path divergence, and observation provenance. Each custody record is version-controlled and timestamped, preserving a complete audit trail of score evolution, observation lineage, and hypothesis transitions. This metadata is utilized during analyst triage, ISR traceability assessments, and forensic evaluations of fusion model performance. Custody record lineage also informs scoring thresholds for future reacquisition and anomaly detection.

Scoring output generator 2460 assembles the results of scoring operations into structured output packages suitable for dissemination. This component receives scoring data from behavior scorer 2420, confidence scorer 2430, and custody record manager 2440, along with any tasking recommendations or alert flags from alert generator 2450. Output generator 2460 formats these results into scoring outputs 2402, which may include behavior deviation scores, identity confidence metrics, custody status indicators, priority-ranked track lists, and system-generated tasking recommendations. These outputs are annotated with version identifiers, lineage references, and campaign tags, and are prepared in formats compatible with downstream consumers such as dynamic tasking subsystem 130, multi-source fusion system 1040, and containerized analytics workbench 1010.

Confidence scorer 2430 incorporates these behavioral assessments to determine whether an observation continues an existing track or requires reacquisition. When identity continuity scores drop below a confidence threshold, custody record manager 2440 triggers a reacquisition workflow that generates alternate hypotheses and refocuses tasking logic. Alert generator 2450 may flag adversarial behavior, group fragmentation, or decoy deployment based on scoring thresholds and movement anomalies. Scoring output generator 2460 supports campaign feedback loops that adjust tasking priorities, revisit intervals, or scoring sensitivity based on mission needs. In embodiments supporting group-level inference, fusion scoring engine 1860 computes cohesion metrics based on spatial proximity variance, velocity vector alignment, and trajectory synchrony. These metrics are compared to learned baselines to detect fragmentation, convergence, or evasion. Scores are aggregated into group-level confidence indicators that contribute to ISR cueing and alerting logic. When initiating custody reacquisition, the system generates and scores multiple candidate identity hypotheses based on spatiotemporal proximity, behavioral plausibility, and raster-constrained feasibility. Candidates are ranked using a composite scoring function, and the highest-ranking paths are prioritized for retasking and continued observation.

Fusion scoring engine 1860 operates within a closed-loop feedback system; scoring outputs 2402 may inform campaign orchestration component 1950, which adjusts predictive modeling strategies, retasking thresholds, or scoring parameters in response to observed deviations. This feedback ensures adaptive system behavior in dynamic or ambiguous operating conditions.

During execution, fusion scoring engine 1860 receives fused observations, matches them to predicted movement corridors, computes behavior and identity scores, updates custody records, and emits structured scoring outputs via scoring output generator 2460. Through this continuous scoring and feedback process, the engine enables resilient custody tracking, early anomaly detection, and intelligence-informed ISR management across operational domains.

Figure 25:
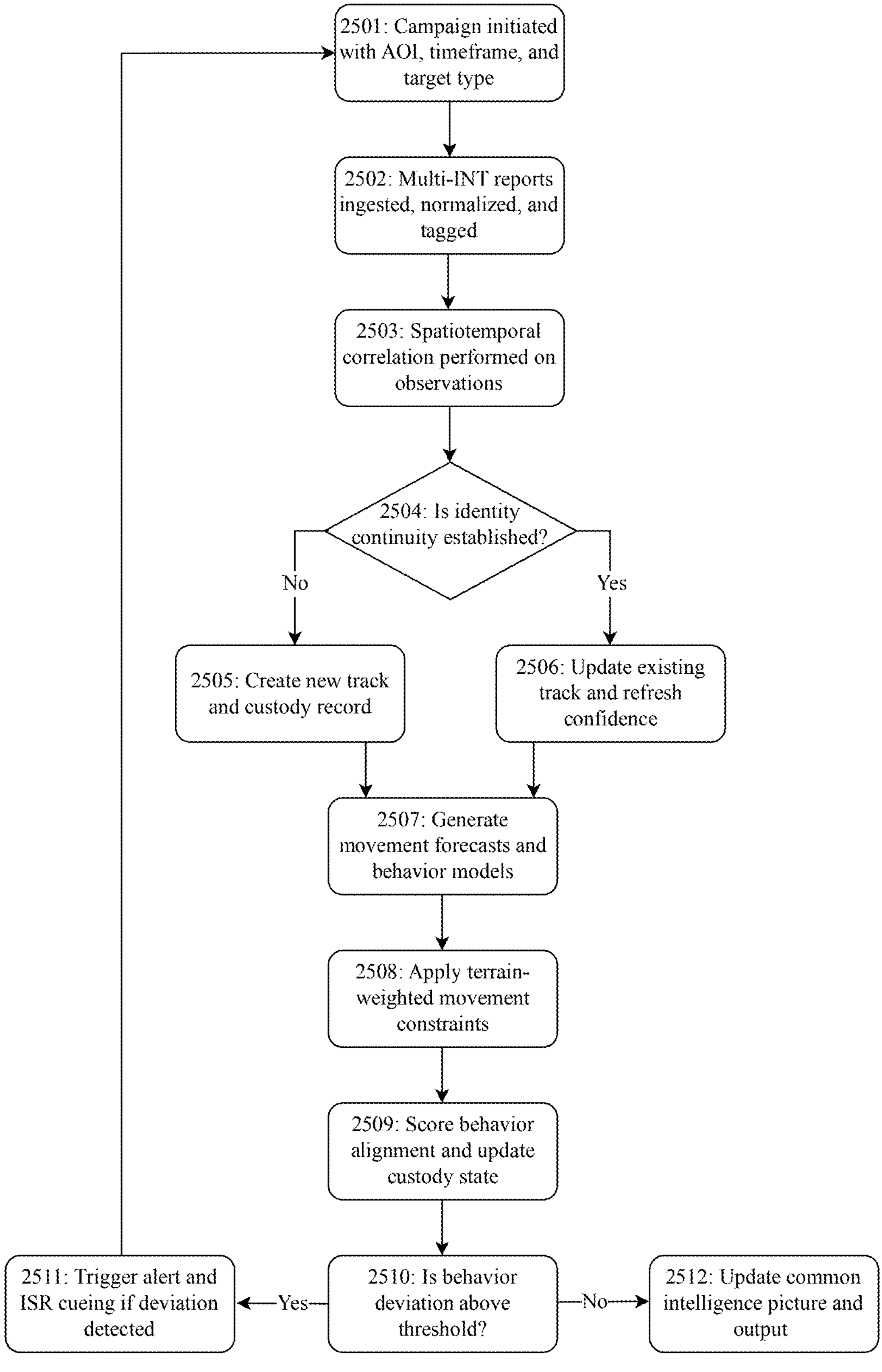
FIG. 25 is a flow diagram illustrating an end-to-end fusion workflow implemented by fusion engine for campaign-based target tracking, behavior prediction, scoring, and dynamic ISR tasking.

FIG. 25 illustrates an end-to-end fusion workflow process implemented within fusion engine 1800. At step 2501, campaign orchestration component 1810 initiates the workflow by ingesting priority intelligence requirements (PIRs), defining parameters such as area of interest, time frame, and target types, and generating a structured campaign configuration. Campaign orchestration further coordinates downstream fusion components and may dynamically reprioritize tasking based on feedback from later stages.

At step 2502, ingest and ETL component 1820 receives multi-source observation reports from GEOINT, SIGINT, OSINT, and CYBER domains. The component normalizes input formats, aligns timestamps and geospatial data, tags metadata including confidence scores and environmental modifiers, deduplicates overlapping reports, and applies source quality weights based on historical reliability models.

In step 2503, spatiotemporal correlation subsystem 1830 estimates target position and velocity over time using a combination of particle filters and DBSCAN clustering. The subsystem evaluates spatial and temporal coherence, applies contextual constraints such as velocity limits and terrain feasibility, and filters out implausible associations. Validated candidate tracks are forwarded for prediction and scoring.

Step 2504 represents a decision point where the system determines whether identity continuity with an existing track can be established. If continuity is not supported, step 2505 instantiates a new track and initializes corresponding identity and custody records. If continuity is supported, step 2506 updates the existing track and refreshes confidence scores based on the new observation. Lineage information is retained for both cases.

At step 2507, pattern of life and prediction engine 1840 generates forward-looking movement forecasts based on the validated track. The engine applies segmented behavioral models derived from historical activity, selects an appropriate prediction algorithm, and generates probabilistic movement corridors over future time intervals.

Step 2508 depicts the contribution of transit cost raster system 1850, which supplies terrain-weighted movement cost rasters based on topography, infrastructure, land use, and environmental constraints. These rasters constrain predicted movement to physically plausible regions and are convolved with predicted vectors to form time-bounded envelopes.

At step 2509, fusion scoring engine 1860 evaluates each incoming observation relative to the predicted movement corridor, assigns a behavior alignment score, updates the track's identity confidence, and logs results in a persistent custody record. The engine also detects signatures of adversarial behavior such as route spoofing or unexpected deviation.

Step 2510 introduces a behavior deviation decision point. If deviation scores exceed configured thresholds, step 2511 triggers alerts and initiates ISR cueing to direct collection assets toward the region of anomalous activity. This may include tasking adjustments or initiating a custody reacquisition workflow when identity continuity is at risk.

Step 2512 concludes the process with an update to the common intelligence picture, incorporating fused tracks, predictive envelopes, scoring results, and alert annotations. This output is presented to analysts and external systems and is used to maintain situational awareness.

A continuous feedback loop closes the cycle by returning updated scoring, track status, and system performance data to campaign orchestration component 1810. This enables adaptive campaign refinement, including reallocation of collection resources, threshold adjustments, or selection of alternative prediction models, ensuring persistent and responsive custody tracking across multiple observation cycles.

FIG. 26 illustrates a campaign lifecycle flow within fusion engine 1800. At step 2601, a campaign definition is received through one of three mechanisms: manual analyst input, event-driven triggers from external systems (such as alerts or PIRs), or scheduled time-based execution. Step 2602 shows the application of campaign template 1930, which incorporates domain-specific configuration parameters curated by system administrators or subject matter experts to standardize execution based on prior mission experience and operational context.

Step 2603 depicts workflow instantiation 1940, where analytics pipeline components are dynamically assembled into an execution sequence spanning data ingest, correlation, prediction, and scoring phases. Step 2604 presents a decision point evaluating whether strategic triggers are present that require a change in campaign priority. When such triggers are detected-such as emergent collection requirements, theater-level shifts, or PIR reprioritization-step 2605 implements strategic reprioritization by adjusting campaign parameters accordingly.

At step 2606, campaign coordinator 1950 continuously monitors campaign conditions, including processing status, environmental context, and scoring outcomes. It maintains campaign-level state and memory, enabling persistent context across execution cycles and supporting pause, resume, or reconfiguration operations. Step 2607 shows the reception of scoring feedback, including behavior alignment scores, group cohesion metrics, and adversarial behavior indicators produced by fusion scoring engine 1860.

Step 2608 represents a decision point that determines whether accumulated feedback warrants modification of the campaign configuration. If changes are required, step 2609 adjusts campaign parameters such as behavior deviation thresholds, model selection criteria, tasking cadence, or collection modality focus. These updates may be made autonomously or informed by analyst review.

The campaign lifecycle implements two feedback loops: one maintaining the current configuration when no adjustment is needed, and another reinitiating the modified pipeline after campaign parameters are updated. This cyclical process enables adaptive, mission-aligned refinement of campaign execution, allowing the system to respond to dynamic operational conditions while preserving continuity and efficiency across multiple campaign iterations.

FIG. 27 is a flow diagram illustrating an alert and ISR tasking decision tree implemented within fusion engine 1800. At step 2701, observation processing evaluates new multi-INT observations received from GEOINT, SIGINT, OSINT, and CYBER sources. Step 2702 presents a decision point where the system evaluates the behavior alignment score against a configured threshold. When the behavior alignment score falls below this threshold—indicating significant deviation from predicted movement patterns—step 2703 generates an analyst alert, flags the observation for review, and triggers behavior assessment workflows.

Step 2704 evaluates the observation's identity continuity score against a continuity confidence threshold. If the score is below threshold—suggesting potential track fragmentation, sensor ambiguity, or observation misassociation—step 2705 initiates automated ISR re-tasking via satellite data acquisition optimization platform 1080. This includes generating updated collection requirements and issuing new tasking directives to reacquire or reinforce custody of the target.

At step 2706, the system evaluates whether the target has been lost within the past configured time window (e.g., N minutes) based on the target's custody history. If recent loss is detected, step 2707 initiates a custody reacquisition workflow, which includes generating alternative trajectory hypotheses, applying retroactive correlation, and adapting scoring logic to increase reacquisition probability.

Step 2708 assesses campaign-defined parameters such as target priority and proximity to the area of interest boundary. When a target is identified as high priority or approaching the spatial limits of the campaign, step 2709 initiates campaign modification via campaign orchestration component 1950. This may include increasing tasking frequency, shifting sensor focus, or reprioritizing the campaign's resource allocation.

Step 2710 analyzes the observation in the context of known group behavior, using cohesion scoring models. If anomalies in group coordination or formation are detected, step 2711 initiates group-level assessment, updating cohesion metrics and potentially issuing coordinated collection plans targeting multiple entities.

At step 2712, the system evaluates the observation for signatures of adversarial behavior, such as deception or evasion patterns. If matched against configured adversarial profiles, step 2713 applies an adversarial flag to the observation and invokes specialized evasion-aware scoring logic to reassess alignment and confidence under contested conditions.

When an observation passes all decision points without exceeding any threshold or triggering any alerts, step 2714 applies standard processing. The observation is logged to the custody record and processed at the standard cadence without initiating any ISR redirection or campaign changes.

Multiple branches in this decision tree may be triggered in parallel based on a single observation. Each triggered branch—such as alerting, tasking adjustment, reacquisition, or adversarial scoring—feeds back into the broader fusion workflow by updating tasking plans, campaign parameters, custody records, and predictive models. As a result, all outcomes contribute to the persistent custody cycle and ensure that subsequent observations benefit from adaptive system behavior.

FIG. 28 illustrates the custody record and track scoring update cycle implemented within fusion engine 1800. At step 2801, new observations are ingested from multi-source intelligence feeds, including SIGINT, GEOINT, OSINT, and CYBER inputs. Step 2802 matches each observation to existing track identifiers using spatiotemporal correlation subsystem 1830, evaluating spatial and temporal proximity to known tracks.

At step 2803, each matched observation is compared against predicted movement corridors generated by pattern of life and prediction engine 1840 to assess whether the observed location aligns with the forecasted movement envelope. Step 2804 updates the associated track record by incorporating a revised confidence score representing identity continuity probability, logging deviation from predicted behavior, and appending sensor lineage metadata for provenance tracking.

Step 2805 writes the updated information to a version-controlled custody record, including timestamps and historical state information to preserve a full audit trail of track evolution. In step 2806, the system evaluates the overall health of the track by computing a continuity score based on accumulated scoring metrics, behavioral alignment history, and observation quality. Step 2807 presents a decision point where the system determines whether the continuity score has fallen below a defined threshold, indicating potential custody degradation or track fragmentation.

If continuity has degraded beyond the threshold, step 2808 initiates a custody reacquisition workflow, generating alternative identity hypotheses, adjusting scoring models, and searching for re-association candidates to restore custody. Independently of reacquisition status, step 2809 applies a confidence decay function that reduces the continuity score as a function of time elapsed since the last confirming observation. This decay may be parameterized based on campaign configuration, target type, or historical behavior.

At step 2810, the system enters an observation wait state, maintaining campaign and track context while monitoring for new incoming observations. The process then returns to step 2801, forming a continuous tracking cycle that enables persistent custody across observation intervals, including periods of ambiguity or signal loss.

This cyclic process allows fusion engine 1800 to maintain and adapt target custody under conditions of intermittent data, behavioral variance, or sensor noise. By applying structured decay, predictive comparison, and reacquisition logic, the system ensures continuity is preserved where possible and gracefully degraded where necessary.

FIG. 29 illustrates an exemplary end-to-end execution workflow implemented within fusion engine 1800, depicting how multiple subsystems operate in a coordinated, feedback-driven cycle to perform automated target fusion, tracking, prediction, and scoring across multi-intelligence sources.

At step 2901, a campaign is initiated by campaign orchestration component 1810, which ingests a priority intelligence requirement (PIR) received via an analyst interface or automated trigger. This PIR is parsed by a large language model (LLM) embedded within campaign launch component 1910, producing structured tasking criteria, including collection modality, spatial coverage, revisit frequency, and resolution constraints. These parameters are used to instantiate a campaign object passed to campaign workflow component 1940.

At step 2902, ingest and ETL component 1820 begins data acquisition, receiving asynchronous observation reports from external intelligence feeds, including GEOINT, SIGINT, OSINT, and CYBER sources. These inputs are ingested by source-specific adapters within data ingestors 2010, which handle protocol negotiation and authentication.

Step 2903 invokes deduplication component 2030, which evaluates temporal and spatial overlaps, source identifiers, and observation content to identify redundant or near-duplicate records. When detected, redundant entries are merged to preserve data integrity and prevent artificial inflation of track confidence scores.

At step 2904, normalized and deduplicated reports are passed through spatiotemporal correlation component 1830, beginning with particle filter engine 2110, which estimates posterior state distributions for candidate targets using recursive Bayesian techniques. Simultaneously, clustering engine 2120 applies density-based clustering (e.g., DBSCAN) to identify coherent sets of observations. Contextual filter set 2130 then discards implausible associations based on velocity thresholds, terrain feasibility, and modality consistency.

In step 2905, filtered observations are assembled into tracks by track generator and validator 2140, which computes trajectory consistency, predicts future positions, and annotates each track with continuity confidence metrics, source lineage, and observation quality indicators.

At step 2906, pattern of life and prediction engine 1840 retrieves prior behavior data from historical behavior cache 2220, including waypoint distributions, activity cycles, and state transition models. This informs predictive modeling performed by pattern extractor 2210 and trajectory projector 2240.

In step 2907, movement constraint engine 2230 integrates behavior priors with geospatial feasibility surfaces provided by transit cost raster system 1850. These surfaces are computed using feature extractor 2320 and cost model compiler 2330, and convolved with predicted paths to produce time-gated, terrain-aware movement corridors via time-gated movement corridor generator 2260.

At step 2908, fusion scoring engine 1860 receives new fused observations and predicted movement corridors. Corridor matcher 2410 determines spatial and temporal alignment; behavior scorer 2420 computes alignment deviation scores; and confidence scorer 2430 updates identity continuity confidence based on proximity, metadata, and prior scoring history.

If alignment is within configured thresholds, step 2909 updates the persistent custody record via custody record manager 2440, which logs continuity metrics, deviation history, and sensor lineage. Otherwise, step 2910 invokes alert generator 2450, which emits real-time alerts and ISR cueing directives to dynamic tasking subsystem 130 or satellite data acquisition optimization platform 1080.

At step 2911, if confidence scores fall below defined thresholds, the system initiates a custody reacquisition workflow, generating alternative hypotheses, retroactively correlating observations, and adjusting scoring logic to restore track continuity.

All scoring results and alert conditions are ingested at step 2912 by campaign coordinator 1950, which evaluates whether campaign parameters should be modified. These modifications may include adjustment of prediction models, scoring thresholds, tasking cadence, or resource allocation.

Finally, at step 2913, the latest fused tracks, movement forecasts, scoring outputs, and alert annotations are disseminated to multi-source intelligence fusion system 1040, where they populate the Common Intelligence Picture (CIP). This output is made available for analyst review and downstream decision support. The full workflow operates as a closed-loop process, enabling persistent, adaptive custody tracking under dynamic operational conditions.

FIG. 30 illustrates an exemplary raster caching and delta update workflow implemented within transit cost raster system 1850, supporting efficient terrain-aware movement modeling for use in predictive and scoring pipelines. At step 3001, a campaign initiates a request for a movement cost raster tailored to a specific area of interest and operational configuration. Step 3002 triggers a cache lookup using a composite key representing the area, mobility constraints, and model type. In step 3003, the system checks for an exact match within raster cache layer 2360. If found, step 3004 retrieves the cached raster tile directly, bypassing regeneration.

When no matching raster is available, step 3005 invokes feature extractor 2320 to retrieve previously computed static terrain layers, including elevation, slope, and land classification. In step 3006, dynamic overlays—such as cloud cover, precipitation, or temporary terrain obstructions—are applied as delta layers by cost model compiler 2330. These overlays are merged with the static masks in step 3007 to generate a raster that reflects current environmental conditions. In step 3008, the newly compiled raster is stored in raster cache layer 2360 under its unique key. Finally, at step 3009, deployment interface 2350 transmits the raster to prediction engine 1840 and scoring engine 1860 for use in constrained movement forecasting and behavioral deviation analysis. This architecture enables high-throughput, low-latency raster provisioning through selective reuse and efficient incremental updates.

FIG. 31 illustrates an exemplary group behavior scoring pipeline implemented within fusion scoring engine 1860, used to evaluate the behavioral coherence of multiple candidate tracks for convoy, swarm, or co-travel analysis. At step 3101, a set of temporally aligned tracks is ingested, typically derived from spatiotemporal correlation subsystem 1830. In step 3102, spatial distances between track pairs are computed over overlapping time intervals. Step 3103 compares velocity vectors to assess directional alignment, while step 3104 evaluates whether entities initiate or adjust movement in synchronized time windows.

These metrics are aggregated in step 3105 to compute a group cohesion score, which may be a weighted function of distance, vector similarity, and temporal synchrony. At step 3106, the score is evaluated against configured thresholds to determine whether a group-level track should be established, or whether anomalies in coordination suggest adversarial behavior or decoy deployment. In step 3107, the system updates custody records with cohesion indicators, derived group tags, and scoring annotations. If the group exhibits significant behavioral alignment or concerning divergence, step 3108 forwards this information to dynamic tasking subsystem 130 for ISR retasking, or to multi-source fusion system 1040 for CIP annotation. This capability enables persistent monitoring and alerting on coordinated target formations or their fragmentation.

In a non-limiting use case example, fusion engine 1800 may be deployed in a high-tempo combat zone in support of wartime operations where the volume of sensor reports exceeds human analytic capacity and observation fidelity is frequently degraded due to contested ISR conditions. Campaign orchestration component 1810 may be used to instantiate a persistent monitoring campaign for known or suspected high-value mobile targets operating across rugged or urbanized terrain. This campaign may be initialized in response to Priority Intelligence Requirements (PIRs) containing spatial bounds, revisit intervals, and sensor constraints, which are processed by campaign launch component 1910 and resolved into structured workflows via campaign workflow component 1940.

During execution, ingest and ETL component 1820 receives asynchronous reports from multiple intelligence sources, including GEOINT imagery, SAR-derived detections, SIGINT intercepts, and text-based OSINT feeds. Reports are normalized into a unified schema by data normalizers 2020, and redundancies are resolved via deduplication component 2030 to mitigate double counting or artificial continuity inflation. Particle filter engine 2110 generates multiple posterior hypotheses for target states under uncertainty, and clustering engine 2120 associates reports into candidate tracks. Contextual filter set 2130 ensures that track transitions do not violate terrain, velocity, or modality constraints.

As tracks are established, pattern of life and prediction engine 1840 retrieves historical movement patterns for the targets in question from historical behavior cache 2220, producing a segmented model of past operations (e.g., nighttime displacements, stationary intervals, cyclic facility visits). These models are fused with campaign-specific movement constraints by movement constraint engine 2230. Terrain-aware movement forecasting is performed using transit cost raster system 1850, where feature extractor 2320 retrieves elevation and slope maps, and cost model compiler 2330 encodes penalties for adverse terrain, vegetation, and weather. The resulting raster is deployed via deployment interface 2350 to define feasible corridors for future movement.

Incoming observations are evaluated against predicted movement envelopes by fusion scoring engine 1860. Corridor matcher 2410 computes spatiotemporal proximity to forecast paths, while behavior scorer 2420 quantifies directional and speed deviation. Confidence scorer 2430 updates identity continuity metrics based on cumulative evidence. When scoring thresholds are violated—such as through erratic movement or directional reversals—alert generator 2450 may issue ISR cueing updates to dynamic tasking subsystem 130, prompting retasking of orbital or airborne sensors to reacquire the target. All updates are logged by custody record manager 2440, which preserves identity confidence history, sensor lineage, and scoring trajectory over time. Scoring outputs and recommendations are passed back to campaign coordinator 1950, which may adjust revisit timing, tasking cadence, or model selection in real time.

This configuration enables persistent target custody in environments where individual sensors or analysts may be overwhelmed, and where continuity must be preserved despite fragmented or degraded reporting.

In an embodiment, fusion engine 1800 may be employed to enhance maritime domain awareness across coastal regions, Exclusive Economic Zones (EEZs), or global sea lanes. A maritime campaign is instantiated via campaign orchestration component 1810 to monitor vessels that exhibit anomalous routing, port avoidance, or spoofing behavior. The campaign may be seeded by historical vessel behavior derived from historical behavior cache 2220, including typical origin-destination pairs, average transit times, and port visit sequences. This prior behavior informs the initial trajectory hypotheses generated by trajectory projector 2240 within pattern of life and prediction engine 1840.

Observations are ingested by ingest and ETL component 1820 from a range of sources, including Automatic Identification System (AIS) data, space-based synthetic aperture radar (SAR) imagery, visible-band satellite imagery, and OSINT indicators such as port authority records or ship-spotting feeds. Data ingestors 2010 handle protocol-specific parsing and authentication, while data normalizers 2020 structure the incoming feeds. Tracks are assembled through clustering engine 2120, and particle filter engine 2110 allows for uncertainty propagation due to ocean clutter or spoofed signals.

Transit cost raster system 1850 generates mobility surfaces for maritime zones, encoding penalties for restricted zones, high-traffic regions, or known smuggling lanes. For example, cost model compiler 2330 may increase movement penalties in areas under embargo or naval patrol, while feature extractor 2320 tags historical chokepoints and infrastructure influence zones (e.g., oil platforms, EEZ boundaries).

When fusion scoring engine 1860 detects that a vessel's behavior diverges from predicted port-to-port routing—such as entering territorial waters without clearance or abruptly changing course into high-penalty sectors—behavior scorer 2420 produces a deviation score, and confidence scorer 2430 determines whether the vessel can still be confidently associated with its original track. If confidence falls below a threshold, alert generator 2450 may issue a maritime deviation alert and trigger retasking of commercial satellite assets via satellite data acquisition optimization platform 1080.

The alert, scoring history, and fused track metadata are ingested by multi-source intelligence fusion system 1040 and reflected within the Common Intelligence Picture (CIP) for consumption by analysts. Meanwhile, campaign coordinator 1950 may elevate campaign priority or refine tasking parameters for future collections based on scoring feedback. This use case supports operational awareness in maritime security, counterproliferation, and anti-smuggling missions.

In another non-limiting use case example, fusion engine 1800 may support persistent urban surveillance in dense metropolitan environments where tracking targets over time is impeded by occlusion, traffic complexity, and environmental interference. A campaign instantiated via campaign orchestration component 1810 may focus on monitoring high-value facilities or zones of interest, such as government buildings, transit hubs, or protest-prone areas. The campaign defines spatial coverage zones and time-of-day monitoring constraints, which are structured into workflows by campaign workflow component 1940.

Ingest and ETL component 1820 receives detections from Electro-Optical (EO) imagery, video frame object detectors, mobile device signal data, and open-source geotagged content. Normalization by data normalizers 2020 is followed by clustering engine 2120, which groups detections into tracks. Transit cost raster system 1850 builds constrained urban mobility maps by combining road networks, walkability scores, traffic congestion data, and vertical structure (e.g., overpasses, alleys) to define feasible paths. These are compiled by cost model compiler 2330 into multi-band raster sets segmented by time-of-day or mode of movement.

Pattern extractor 2210 segments past behavior into temporal routines, identifying cyclical patterns such as commuting, delivery routes, or patrol loops. Trajectory projector 2240 then forecasts likely next positions using raster-constrained movement logic. If a tracked entity deviates from its expected routine—e.g., an official vehicle entering a side alley at an unexpected time—behavior scorer 2420 issues a deviation score, and confidence scorer 2430 determines whether continuity is maintained.

When movement patterns fall outside of urban POL norms, alert generator 2450 may issue tactical alerts. For example, uncharacteristic convergence of foot traffic near a facility after dark could trigger real-time cueing of drone assets via dynamic tasking subsystem 130, or automated annotation in the CIP. Custody record manager 2440 retains full scoring and deviation logs, enabling triage, backtracking, or behavior-based categorization. Feedback flows to campaign coordinator 1950, which may adjust model sensitivity, retasking windows, or scoring thresholds in response to anomalous activity trends.

This configuration supports real-time awareness, force protection, and predictive cueing in environments characterized by complexity and high reporting density.

In another non-limiting use case example, fusion engine 1800 may support counter-smuggling operations across remote border regions where intermittent reporting, difficult terrain, and deceptive tactics challenge continuous monitoring. A campaign launched via campaign orchestration component 1810 may focus on known infiltration routes or smuggling hotspots, leveraging multi-domain reporting—such as vehicle detections from EO/SAR platforms, low-power RF emissions from handheld radios, and Human Intelligence (HUMINT) sightings.

Ingest and ETL component 1820 ingests these diverse sources and aligns them temporally and spatially. Contextual filter set 2130 enforces physical plausibility, rejecting paths through mountainous terrain not traversable by vehicle. Pattern of life and prediction engine 1840 segments historical cross-border movement into phases—e.g., staging, movement, dispersal—and predicts expected next steps.

Transit cost raster system 1850 generates mobility surfaces with extreme penalties for known chokepoints or observed fencing, while assigning low-cost paths to traditional smuggling corridors. Deviations from these paths—particularly those involving nighttime travel through steep terrain or high-patrol zones—are detected by fusion scoring engine 1860, using evasion-aware scoring logic within behavior scorer 2420.

Simultaneously, group behavior scoring pipeline (see FIG. 31) evaluates whether observed tracks are temporally aligned and exhibit similar velocity vectors and route changes. Step 3105 produces a group cohesion score, and if coordinated movement is confirmed, alert generator 2450 issues a priority ISR retasking signal. ISR assets are directed by dynamic tasking subsystem 130, while group activity is annotated within the CIP by multi-source fusion system 1040.

Custody record manager 2440 logs group-level continuity and enables reacquisition workflows for individual targets lost near border zones. Campaign coordinator 1950 may adjust track health thresholds or trigger alternative hypotheses for reacquisition when confidence degrades due to signal dropout or spoofing activity.

This use case supports interdiction and surveillance operations in terrain-constrained and data-sparse environments where behavioral analysis and group inference enable effective ISR prioritization.

It will be understood that the foregoing use cases are presented for illustrative purposes only and are not intended to be limiting. The systems and methods described herein, including those implemented by fusion engine 1800 and its constituent subsystems, are highly modular and configurable, enabling adaptation to a wide variety of operational domains and intelligence workflows beyond those explicitly disclosed. For example, embodiments may be applied to humanitarian monitoring, disaster response, critical infrastructure surveillance, supply chain anomaly detection, border security, or autonomous system coordination. Subsystems such as ingest and ETL component 1820, pattern of life and prediction engine 1840, and fusion scoring engine 1860 may be independently deployed, integrated with third-party platforms, or tailored for domain-specific tasking. The architecture supports runtime reconfiguration, enabling alternative analytic models, movement constraints, or scoring logic to be substituted or adjusted without interruption of system operations. As such, the invention is not limited to the particular embodiments shown and described, but may be adapted and extended in accordance with the scope of the appended claims and the full breadth of the inventive concepts disclosed herein.

Latent Geocyber Deterrence and Threat Detection System Architecture

FIG. 32 is a block diagram illustrating exemplary architecture of latent geocyber deterrence and threat detection system 3200, in an embodiment. System 3200 integrates with existing components of the intelligence architecture, including fusion engine 1800, multi-source intelligence fusion system 1040, and containerized analytics workbench 1010, to extend cross-domain threat detection and deterrence capabilities through unified latent space modeling. In some embodiments, the unified latent space may be implemented as a graph structure, wherein nodes represent tracked entities, activities, or events, and edges represent semantic similarity, behavioral correlation, or inferred causal relationships. This graph-based structure enables detection of anomalous subgraphs, emergent behavioral motifs, or structural shifts in latent connectivity associated with adversary escalation.

System 3200 builds upon the dynamic campaign and correlation architecture of fusion engine 1800, as described in FIGS. 18-31. Specifically, the geodesic behavior learning, anomaly scoring, and predictive modeling functions disclosed herein interoperate with and extend the campaign orchestration workflows of FIG. 19, the ingest and normalization pipelines of FIG. 20, the spatiotemporal correlation and track validation processes of FIG. 21, and the forecasting and trajectory projection engines disclosed in FIGS. 22-24. These capabilities are leveraged throughout the architecture of system 3200 to support latent-space operations, digital twin divergence tracking, and real-time deterrence planning. Deterrence capabilities include simulating the behavioral impact of cyber countermeasures, posture changes, and information operations, and recommending those actions that best disrupt adversary momentum or redirect projected threat trajectories.

System 3200 receives input data 3201 of various types from various sources including, for example, priority intelligence requirements (PIRs) from multi-source intelligence fusion system 1040, raw intelligence feeds from external collection platforms, and processed data from satellite data acquisition optimization platform 1080, live context data aggregator 180, and containerized analytics workbench 1010, and processes heterogeneous, multi-modal intelligence data to generate threat assessments, behavioral predictions, anomaly alerts, and deterrence recommendations. In graph-based embodiments, data-derived embeddings are used to update latent node and edge attributes, enabling structural reasoning over evolving intelligence relationships. These outputs feed back into the common intelligence picture (CIP), enhancing both tactical and strategic situational awareness.

Multimodal data ingestion layer 3300 serves as the primary input interface for system 3200, receiving and aligning intelligence from cyber telemetry, satellite imagery, radio frequency and electromagnetic warfare signals, mobile behavioral patterns, social media sentiment, and supply chain telemetry. A spatial-temporal alignment engine ensures coherence across sources by normalizing timestamps, geolocations, and signal confidence scores.

Modality-specific encoder layer 3400 transforms raw intelligence inputs into latent domain embeddings using neural network architectures tailored to each data modality. These include convolutional or transformer-based models for imagery, spectrogram encoders for RF data, transformer models for network telemetry, and large language models for text and sentiment sources. A metadata fusion layer attaches temporal, spatial, behavioral, and signal lineage context to each embedding to preserve analytical traceability.

Latent hyperspace construction subsystem 3500 projects these multi-modal embeddings into a shared mathematical space using contrastive learning techniques to align cross-domain representations. Manifold optimization techniques—such as Lorentzian autoencoders or diffusion-based latent models—maintain temporal and causal structure. The subsystem includes latent terrain mapping to identify operational clusters, latent "safe zones," and under-observed corridors that may represent adversarial routes or collection gaps. Historical embeddings are persistently stored in a latent archive to support long-term trend analysis and back-tracing.

Geodesic modeling and anomaly detection engine 3600 analyzes movement and behavior within latent space. Time-sequenced embeddings are used to learn baseline geodesic trajectories, against which deviations are measured. Anomalies are detected based on latent jumps, unexpected cross-modal co-occurrences, or emergent patterns inconsistent with known behaviors. The system supports reverse path inference to identify latent precursors to anomalies, enabling attribution and early warning.

Latent twin monitoring subsystem 3700 maintains real-time digital twins of high-value entities and regions, initialized using historical behavior and template-informed baselines. The system tracks divergence from learned confidence envelopes and computes deviation scores to detect operational shifts. Region-based twins may include behavioral norms or sentiment baselines. The subsystem supports adversarial latent simulations to test detection robustness and stress-test twin model resilience.

Predictive simulation and deterrence engine 3800 simulates adversary behavior forward in latent space and evaluates the potential impact of preemptive interventions. Forecasts may include escalation risk, kinetic trigger zones, or cyber campaign trajectories. Simulated deterrence actions—such as information operations, posture changes, or cyber countermeasures—are scored for impact, and messaging recommendations are generated to support exposure or signaling campaigns.

Visualization and tactical decision interface 3900 provides real-time insight into latent dynamics. The interface includes a latent space visualizer, geo-cyber integrated CIP dashboard, tactical report (TACREP) generator, and mission communication infrastructure interface adapter that translates latent anomalies into actionable geospatial coordinates. The interface supports fusion of latent and physical indicators for command-level decision-making. Visualization and tactical decision interface 3900 transmits output data 3202 to external systems—including fusion engine 1800, dynamic tasking subsystem 130, multi-source intelligence fusion system 1040, and other interoperable command, control, or ISR platforms—to support dissemination, tasking coordination, and situational awareness across integrated intelligence architectures.

Continuous learning and model adaptation component 4000 enables the system to evolve with the threat environment. Confirmed feedback, intervention outcomes, and novel data inputs are processed to retrain latent models and update behavioral templates. Adversarial latent simulations are used to expand detection coverage, and concept drift is continuously monitored to trigger model reinitialization when necessary.

Bidirectional arrows between subsystems 3700, 3800, and 3900 indicate support for cross-referenced outputs, shared analytics, and feedback-driven decision support workflows. These links reflect optional feedback paths or coordinated operational updates rather than mandatory processing recursion System 3200 is interoperable with base architecture components. It integrates with dynamic tasking subsystem 130 for retasking based on anomaly or twin divergence, queries the virtual satellite database 140 for optimized collection planning, and expands live context data aggregator 180 with latent alerts and cohesion signals. It extends machine learning training subsystem 230 to support multi-modal encoding and latent trajectory modeling, and coordinates with fusion engine 1800 for threat inference and scoring. Schedule manager 430 uses latent path forecasts to prioritize collection, and CIP dashboard overlays present both latent and physical threat indicators with coordination for deterrence messaging and strike planning.

In operation, system 3200 performs continuous ingestion, latent modeling, behavior tracking, simulation, and feedback analysis. Outputs are persistently fed into the broader intelligence architecture, maintaining a dynamic, predictive, and cross-domain-enhanced common intelligence picture.

FIG. 33 is a block diagram illustrating exemplary architecture of multimodal data ingestion layer 3300, in an embodiment. Multimodal data ingestion layer 3300 serves as the primary input interface for latent geocyber deterrence and threat detection system 3200, receiving heterogeneous intelligence data streams from multiple collection sources and transforming them into normalized, temporally aligned formats suitable for downstream latent space processing. Layer 3300 interfaces with external collection platforms, satellite data acquisition optimization platform 1080, live context data aggregator 180, and containerized analytics workbench 1010 to aggregate multi-domain intelligence feeds while maintaining data provenance and quality metrics throughout the ingestion process. Incoming data streams are routed to their respective ingestors based on predefined data source identifiers, protocol headers, or source platform metadata, enabling parallel processing across modality-specific pipelines.

Cyber telemetry ingestor 3310 processes network-based intelligence including intrusion detection system alerts, network flow data, packet capture logs, and endpoint telemetry from monitored networks and systems. Ingestor 3310 handles signals intelligence related to cyber operations including command-and-control beacon traffic, botnet communications, and lateral movement indicators while supporting obfuscated collection environments such as virtual private networks, virtual machines, and sandboxed analysis systems. The component comprises protocol-specific parsers for common network data formats and includes authentication mechanisms for secure data feeds while preserving original timestamps and source attribution metadata. Cyber telemetry ingestor 3310 applies initial filtering to remove noise and duplicate entries while tagging observations with confidence scores based on source reliability and collection methodology.

Geospatial intelligence ingestor 3320 receives satellite imagery including electro-optical, infrared, and Synthetic Aperture Radar (SAR) data along with terrain models, orbital parameters, and geospatial metadata from satellite data acquisition optimization platform 1080 and external imagery providers. The component includes image-based photo correlation capabilities configured to detect and time-align physical events such as missile launches, construction activities, or vehicle movements across multiple collection platforms. Ingestor 3320 processes both static imagery and video feeds while extracting embedded metadata including collection geometry, sensor parameters, and environmental conditions during acquisition. The component performs initial quality assessment of imagery products including cloud cover evaluation, resolution verification, and geometric accuracy validation while maintaining linkage to collection tasking requests and mission parameters.

RF and EW signal ingestor 3330 processes signals intelligence and electromagnetic warfare data including radar emissions, communication intercepts, and electronic countermeasure signatures. The component handles both raw signal data and processed intelligence products while maintaining spectral characteristics, directionality information, and power level measurements. Ingestor 3330 classifies detected emissions according to known signature libraries and identifies potential spoofing, jamming, or deception activities within the electromagnetic spectrum. The component is configured to process both real-time signal streams and archived collections while preserving temporal precision required for cross-domain correlation and enforcing source protection protocols for sensitive collection methods.

Behavioral and Advertising Technology (AdTech) ingestor 3340 analyzes human activity patterns through mobile device telemetry, location services data, and movement tracking information while processing social media sentiment analysis, regional psychological operations indicators, and online behavioral patterns. The component detects anomalous maritime and aerial tracking behaviors including dark Automatic Identification System (AIS) transmissions, aircraft transponder manipulation, and identity spoofing in vessel or aircraft tracking systems. Ingestor 3340 processes advertising technology data streams to identify population movement trends, device clustering patterns, and behavioral anomalies that may indicate coordinated activities or deception operations. The component comprises privacy protection mechanisms configured to anonymize personally identifiable information while preserving the analytical utility of behavioral patterns and movement signatures.

Supply chain risk ingestor 3350 traces component origins, firmware provenance, and manufacturing lineage while establishing geospatial linkages to production facilities, transshipment points, and integration centers. The component processes customs declarations, shipping manifests, and trade databases to identify supply chain vulnerabilities and potential compromise vectors. Ingestor 3350 correlates component tracking data with geospatial intelligence from ingestor 3320 to establish physical facility associations and manufacturing capacity assessments. The component includes vendor databases, component libraries, and vulnerability tracking systems while monitoring for counterfeit components, unauthorized modifications, or supply chain interdiction activities.

Temporal and spatial alignment engine 3360 normalizes timestamps across disparate data sources, converts geospatial coordinates to common reference systems, and standardizes confidence scoring methodologies to enable coherent multi-modal processing. Engine 3360 resolves timezone differences, clock drift variations, and collection latency factors to establish synchronized temporal baselines across all ingested data streams. The component performs geospatial reprojection and datum conversion to ensure spatial consistency while maintaining original coordinate accuracy and uncertainty measurements. Engine 3360 includes quality scoring algorithms that assess data completeness, source reliability, and collection confidence while generating composite quality metrics for downstream processing systems. The output of alignment engine 3360 comprises temporally and spatially normalized observation records from multiple intelligence modalities, each tagged with standardized metadata, enabling downstream encoders in layer 3400 to independently process domain-specific semantics while preserving temporal correlation across data streams.

Layer 3300 implements a staged processing architecture in which ingestors 3310, 3320, 3330, 3340, and 3350 operate in parallel to handle simultaneous data streams from multiple domains, while temporal and spatial alignment engine 3360 provides centralized normalization services. Each ingestor includes source-specific authentication, protocol handling, and data validation capabilities while forwarding normalized observations to alignment engine 3360. Engine 3360 applies cross-domain temporal correlation and spatial registration to create coherent multi-modal observation records that preserve individual source characteristics while enabling joint analysis.

Output from multimodal data ingestion layer 3300 consists of normalized, timestamped, and geolocated observation records tagged with confidence scores, source lineage, and quality metrics. These processed observations flow to modality-specific encoder layer 3400, where domain-optimized neural networks transform the normalized data into latent space embeddings suitable for cross-domain fusion and analysis. Layer 3300 maintains audit trails and provenance records for all processed data while implementing access controls and classification handling appropriate to source sensitivities and operational security requirements.

FIG. 34 is a block diagram illustrating exemplary architecture of modality-specific encoder layer 3400, in an embodiment. Modality-specific encoder layer 3400 transforms normalized intelligence data from multimodal data ingestion layer 3300 into domain-optimized embeddings that preserve semantic content while enabling cross-modal correlation and latent space fusion. Layer 3400 employs neural network architectures tailored to the characteristics of each intelligence modality while maintaining temporal coherence and spatial relationships across encoded representations. Each encoder within layer 3400 includes domain-specific preprocessing, feature extraction, and embedding generation logic optimized for downstream latent space construction and cross-domain analysis. Observation records are routed to modality-specific encoders based on source metadata, domain type, or input stream identifier, enabling parallel semantic transformation across intelligence modalities.

Imagery encoder 3410 processes geospatial intelligence including satellite imagery, terrain models, and visual data using convolutional neural networks or vision transformer architectures to extract spatial features, object characteristics, and change detection patterns. Encoder 3410 includes multi-scale feature extraction logic to capture both fine-grained details and broader contextual information while maintaining geospatial registration and temporal alignment across image sequences. The component handles multiple spectral bands including visible, infrared, and synthetic aperture radar data while generating embeddings that encode terrain characteristics, facility features, vehicle signatures, and environmental conditions. Imagery encoder 3410 incorporates attention mechanisms to focus on regions of interest and applies data augmentation techniques to improve robustness across varying collection conditions including different viewing angles, illumination, and weather.

Cyber log encoder 3420 transforms network telemetry, intrusion alerts, and cyber intelligence using transformer-based models including LogBERT and similar architectures designed for sequential log analysis. Encoder 3420 generates embeddings that represent intrusion events, attack progression chains, reconnaissance behaviors, and command-and-control patterns while preserving temporal relationships between network activities. The component processes both structured and unstructured log formats and includes tokenization strategies configured for network protocols, system events, and security alerts. Cyber log encoder 3420 encodes behavioral signatures associated with known threat actors and campaign tactics, techniques, and procedures.

RF/sensor encoder 3430 processes electromagnetic warfare data, signals intelligence, and radio frequency signatures using one-dimensional convolutional networks and spectrogram-based encoders optimized for signal classification and characterization. Encoder 3430 transforms time-domain and frequency-domain signal representations into embeddings that preserve spectral features, modulation patterns, and emission dynamics while encoding directionality information, power levels, and operational signatures. The component handles both narrowband and wideband signals and is configured to apply noise reduction and interference mitigation techniques to improve signal clarity and classification accuracy. RF/sensor encoder 3430 generates embeddings that represent radar emissions, jamming patterns, and electronic countermeasure activities while supporting source protection requirements.

Social/language encoder 3440 processes human intelligence, open source intelligence, and advertising technology data using large language models and natural language processing architectures to extract sentiment trends, narrative themes, and behavioral indicators. Encoder 3440 analyzes text data including social media posts, news articles, technical publications, and intercepted communications while generating embeddings that capture semantic meaning, emotional context, and cultural nuance. The component includes multilingual processing capabilities and domain-specific vocabulary handling, and it encodes temporal sentiment evolution and community narrative shifts. Social/language encoder 3440 produces embeddings representing psychological operations indicators, influence campaign patterns, and adversary messaging strategies while maintaining anonymization of personally identifiable information.

Metadata fusion layer 3450 integrates temporal, spatial, behavioral, and signal lineage metadata with domain-specific embeddings generated by encoders 3410 through 3440. Layer 3450 attaches collection timestamps, geospatial coordinates, confidence scores, and source attribution to each embedding while preserving provenance chains and upstream quality metrics. The component comprises standardized metadata schemas that enable consistent cross-domain correlation and support temporal alignment, spatial registration, and confidence-weighted fusion. Metadata fusion layer 3450 produces composite embeddings that combine semantic content with contextual metadata, ensuring downstream compatibility with latent hyperspace construction and anomaly detection.

Layer 3400 implements a parallel processing architecture in which encoders 3410-3440 operate independently to transform modality-specific inputs, while metadata fusion layer 3450 provides centralized integration services. Each encoder comprises domain-optimized neural architectures trained on representative datasets for its respective intelligence domain while maintaining consistent output dimensionality and temporal resolution to support effective cross-modal alignment. The architecture supports both batch and streaming processing modes, enabling real-time exploitation and historical analysis, and includes model versioning and performance monitoring to ensure encoding fidelity.

Output from modality-specific encoder layer 3400 consists of enriched domain-specific embeddings annotated with temporal, spatial, and contextual metadata, preserving intra-modal relationships while enabling cross-modal correlation. These embeddings are passed to latent hyperspace construction subsystem 3500, where fusion engine 3510 aligns representations across domains using contrastive learning techniques to construct a unified latent space for threat modeling and anomaly detection. Layer 3400 maintains embedding quality metrics, model performance records, and encoding provenance to support continuous learning and forensic traceability.

FIG. 35 is a block diagram illustrating exemplary architecture of latent hyperspace construction subsystem 3500, in an embodiment. Latent hyperspace construction subsystem 3500 creates a unified mathematical space where multimodal intelligence embeddings from modality-specific encoder layer 3400 can be jointly modeled, analyzed, and correlated across domain boundaries. Subsystem 3500 employs advanced machine learning techniques including contrastive learning, manifold optimization, and geometric modeling to transform domain-specific embeddings into a coherent latent representation that preserves semantic relationships while enabling cross-domain pattern detection and anomaly identification. The unified latent space created by subsystem 3500 serves as the foundation for downstream geodesic modeling, digital twin monitoring, and predictive simulation capabilities.

Cross-modal latent fusion engine 3510 receives enriched domain-specific embeddings from metadata fusion layer 3450, the outputs of which include semantically encoded observations from encoders 3410-3440 combined with temporal, spatial, and contextual metadata.

Engine 3510 employs contrastive learning techniques to align representations across cyber, imagery, radio frequency, and text domains by maximizing similarity for temporally and spatially co-occurring observations while maintaining semantic coherence within each modality. The component includes multi-modal alignment algorithms that learn shared representations by identifying corresponding patterns across different intelligence domains, such as correlating cyber reconnaissance activities with geospatial facility observations or linking electromagnetic emissions with social media sentiment shifts. Cross-modal latent fusion engine 3510 generates unified embeddings that preserve domain-specific characteristics while enabling cross-domain similarity calculations and relationship detection.

Manifold optimization engine 3520 enforces geometric consistency and causal structure within the unified latent space using advanced mathematical frameworks including Lorentzian autoencoders, diffusion-based latent models, or Riemannian geometry optimization techniques. Engine 3520 ensures that the latent space maintains smooth manifold properties that reflect realistic behavioral transitions and causal relationships between intelligence observations. The component includes regularization techniques configured to prevent embedding collapse or mode failure while maintaining temporal coherence and spatial consistency across the latent representation. Manifold optimization engine 3520 applies geometric constraints that enforce physically plausible relationships between entities and events while preserving the ability to detect anomalous patterns that deviate from expected manifold structure.

Latent terrain mapper 3530 analyzes the optimized latent space to identify operational zones, behavioral clusters, and tactical features that represent different types of adversarial or benign activities. Mapper 3530 discovers adversary-preferred latent clusters that indicate common operational patterns, under-observed latent corridors that may represent surveillance gaps or tactical vulnerabilities, and high-density regions that correspond to well-monitored operational areas. The component includes clustering algorithms and density analysis techniques configured to characterize the latent terrain while identifying potential safe zones, operational boundaries, and transition pathways that adversaries might exploit. Latent terrain mapper 3530 generates geographic-style maps of the latent space that highlight tactically significant regions and enable strategic planning of intelligence collection and analysis priorities.

Latent embedding archive 3540 provides persistent storage and indexing capabilities for all processed latent representations, enabling historical analysis, trend detection, and temporal correlation across extended time periods. Archive 3540 stores time-sequenced latent embeddings for tracked entities, regions, and events while maintaining linkage to original source data and processing metadata. The component includes retrieval mechanisms configured to support queries based on temporal ranges, spatial proximity in latent space, or semantic similarity to reference patterns. Latent embedding archive 3540 enables backtracing analysis to identify precursor activities, supports longitudinal behavioral studies, and provides training data for continuous model improvement and adversarial simulation capabilities.

In some embodiments, latent embeddings produced by subsystem 3500 are temporally indexed and filtered using posterior estimation techniques such as those described in spatiotemporal correlation subsystem 1830 (FIG. 21), including particle filters and clustering engines. Temporal coherence constraints applied by manifold optimization engine 3520 may further incorporate continuity metrics or behavioral thresholds derived from scoring models described in FIG. 24.

Subsystem 3500 is configured to operate using an iterative processing architecture where cross-modal latent fusion engine 3510 generates initial unified embeddings that are refined by manifold optimization engine 3520 to ensure geometric consistency and causal structure. Latent terrain mapper 3530 analyzes the optimized space to identify tactical features while latent embedding archive 3540 stores processed representations for historical analysis and retrieval. The subsystem supports both batch processing for historical intelligence analysis and real-time streaming for operational intelligence while maintaining version control and provenance tracking for all generated latent representations.

Output from latent hyperspace construction subsystem 3500 consists of unified latent embeddings that represent multi-modal intelligence observations within a coherent mathematical space suitable for cross-domain analysis and pattern detection. These latent representations flow to geodesic modeling and anomaly detection engine 3600 where behavioral trajectories are analyzed and deviations from expected patterns are identified. Subsystem 3500 also provides latent embeddings to latent twin monitor subsystem 3700 for digital twin initialization and behavioral baseline establishment. The unified latent space created by subsystem 3500 enables advanced analytics including cross-domain correlation, predictive modeling, and anomaly detection that would not be possible using traditional domain-specific analysis approaches. In some embodiments, the unified latent space may be alternatively represented as a graph structure, where each node corresponds to a tracked entity, event, or observation, and each edge represents a latent relationship, such as semantic similarity, temporal proximity, behavioral correlation, or inferred causal linkage. Graph-based implementations may support anomaly detection using subgraph matching, centrality analysis, or dynamic edge weighting based on latent confidence scores and entity interactions.

FIG. 36 is a block diagram illustrating exemplary architecture of geodesic modeling and anomaly detection engine 3600, in an embodiment. Engine 3600 analyzes behavioral patterns within the unified latent space produced by latent hyperspace construction subsystem 3500 to establish baseline trajectories, detect deviations from expected behaviors, and identify coordinated activities that may indicate adversarial operations. The engine employs mathematical modeling techniques to characterize normal behavioral paths through latent space and includes anomaly detection algorithms that identify patterns inconsistent with established baselines or indicative of deception. Engine 3600 supports both individual entity analysis and group-level behavioral assessment, providing causal inference capabilities for attribution and early warning.

Geodesic behavior learner 3610 establishes baseline behavioral paths across intelligence domains using time-sequenced latent embeddings from subsystem 3500 to learn typical movement patterns and activity progressions. Learner 3610 analyzes historical trajectories to identify common behavioral geodesics that reflect normal operational routines and expected transitions between mission phases. The component encodes canonical event sequences for known adversary tactics—such as reconnaissance, staging, and execution—and captures variance patterns that distinguish routine fluctuations from meaningful deviations. Geodesic behavior learner 3610 includes temporal modeling techniques that represent both short-term dynamics and long-duration operational cycles, maintaining sensitivity to context-specific behavioral variations.

Latent anomaly detector 3620 identifies deviations from baseline geodesic patterns by analyzing incoming latent embeddings for behavioral inconsistencies, trajectory dislocations, and statistical outliers. Detector 3620 flags changes in operational status, emerging threats, and deception indicators by identifying latent jumps, modality co-occurrences not typically linked, or transitions outside learned behavioral boundaries. The component uses statistical modeling and machine learning classifiers to separate true anomalies from normal variance, generating confidence scores and contextual tags for each detection.

Device cohesion detector 3630 identifies coordinated movement and synchronized behaviors among multiple entities that may represent group operations, logistical preparations, or force staging activities. Operating continuously over incoming latent trajectories, detector 3630 produces group-level coordination metrics, including spatiotemporal proximity scores, movement synchrony, and inferred operational formations. The component comprises clustering algorithms and correlation models configured to detect both overt and subtle patterns of group behavior, including convoy formations, distributed attacks, or coordinated cyber-physical campaigns. Outputs from device cohesion detector 3630 are used by latent twin monitor subsystem 3700 to maintain group-level digital twins and update divergence scoring for linked entities, by predictive simulation and deterrence engine 3800 to model coordinated threat escalation, and by visualization and tactical decision interface 3900 to generate overlays and alerts identifying synchronized activity and group movements.

Cross-modality query engine 3640 enables contextual reasoning across intelligence domains and is activated when anomalies are detected in a single modality. Engine 3640 queries nearby latent vectors to identify corroborating or contradictory signals, providing additional context for flagged behaviors. It is configured to perform proximity-based similarity searches, retrieving relevant latent patterns across modalities while preserving semantic integrity for domain-specific analysis. Analysts can explore correlations such as cyber operations linked to facility changes or RF emissions aligned with sentiment shifts, with ranked results based on latent similarity and temporal proximity.

Causal path inference engine 3650 is also activated in response to detected anomalies and performs reverse trajectory analysis to identify precursor events, campaign setup activities, and plausible cause-effect sequences for each flagged deviation. Engine 3650 traces backward through latent behavioral paths to reconstruct candidate activity chains and identify potential intervention points. The component includes temporal reasoning logic that accounts for operational delays, tactic progression timelines, and campaign staging intervals. Causal path inference engine 3650 generates hypothesis trees representing possible causal chains, each annotated with supporting evidence and probabilistic confidence. In graph-based embodiments, the causal path inference engine may perform backward or forward reasoning over directed graphs, identifying subgraph patterns consistent with known adversarial behaviors. Graph motifs such as star patterns, cascades, or temporal chains may be matched against behavioral templates to support attribution and threat phase reconstruction. Path-based inference may also incorporate edge type semantics, allowing, for example, a cyber link to lead into a geospatial staging event, followed by RF emission anomalies, forming a multi-domain causal chain.

Engine 3600 is configured to operate in a parallel processing architecture: geodesic behavior learner 3610 continuously updates baseline models, while latent anomaly detector 3620 monitors live embeddings for deviation. Device cohesion detector 3630 operates independently and continuously to analyze group behaviors, while cross-modality query engine 3640 and causal path inference engine 3650 provide on-demand analysis initiated by anomaly detection events. The engine supports adaptive feedback loops, incorporating confirmed anomalies into updated baselines while maintaining alert sensitivity to emerging, previously unseen behavior types.

In various embodiments, latent trajectory modeling and pattern-of-life prediction performed by geodesic modeling and anomaly detection engine 3600 build upon the forecasting, raster-constrained prediction, and scoring logic described in FIGS. 22-24. Similarly, attribution workflows within engine 3600 leverage campaign orchestration, ingestion, and spatiotemporal correlation services from FIGS. 19-21. Predictive simulation workflows further integrate with scoring and alert generation mechanisms as detailed in FIGS. 25-31.

Output from geodesic modeling and anomaly detection engine 3600 includes anomaly alerts with associated confidence scores, group coordination assessments, cross-domain correlation results, and causal attribution hypotheses. These outputs are provided to latent twin monitor subsystem 3700 for updating digital twin baselines, to predictive simulation and deterrence engine 3800 for threat forecasting, and to visualization and tactical decision interface 3900 for operational awareness and analyst review. Engine 3600 maintains provenance tracking and audit trails for all pattern detections and hypothesis generations to support forensic and historical analysis.

FIG. 37 is a block diagram illustrating exemplary architecture of latent twin monitor subsystem 3700, in an embodiment. Latent twin monitor subsystem 3700 maintains real-time digital representations of high-value entities, regions, and operational environments within the unified latent space to enable continuous behavioral assessment, deviation tracking, and predictive modeling capabilities. Subsystem 3700 receives latent embeddings from latent hyperspace construction subsystem 3500 and anomaly data from geodesic modeling and anomaly detection engine 3600 to update digital twin models and assess behavioral conformity against established baselines. The subsystem supports both entity-specific twins that model individual facilities, platforms, or networks and region-based twins that capture population-level behaviors, sentiment baselines, and area-wide operational patterns.

Twin state manager 3710 maintains persistent digital twin models for tracked entities including facilities, vehicle fleets, network infrastructures, and geographic regions. The component stores and updates time-sequenced latent embeddings that capture behavioral evolution over extended periods and is configured to initialize twins using historical data or dynamically create new twins in response to emerging entities or mission priorities. Twin state manager 3710 models routine operational characteristics, behavioral cycles, and normative patterns while preserving historical context to support trend analysis and predictive modeling.

Confidence envelope tracker 3720 continuously compares real-time entity behavior against established baseline trajectories and behavioral constraints to detect significant deviations. The tracker computes envelope breach metrics and deviation scores that reflect how far current behavior strays from learned norms. It applies adaptive thresholding based on entity type, operational context, and criticality to detect meaningful divergence while minimizing false alerts. Confidence envelope tracker 3720 supports long-term confidence degradation modeling and flags deviations that may signal operational shifts, threat escalation, or adversarial deception.

Behavior template library 3730 defines expected latent behavior patterns for specific entity classes, mission phases, and operational states. Template structures include common event sequences such as radar site activation cycles or cyber staging activities. The library provides baseline trajectories for twin initialization and behavior alignment and supports template evolution through user input, analyst validation, and machine learning based on confirmed behavior observations. Version control and provenance tagging are maintained to track template updates and ensure transparency in behavior alignment logic.

Adversarial latent simulator 3740 generates synthetic latent trajectories to simulate spoofing, evasion, and deceptive maneuvers. This component is configured to test the robustness of digital twin models and anomaly detection thresholds under adversary countermeasures, including identity masking, operational misdirection, and information concealment. The simulator supports red team evaluation of detection capabilities and contributes training data for system refinement. It incorporates known adversary tactics as well as synthetic generation of novel deception patterns to stress-test model resilience and highlight vulnerability points.

Subsystem 3700 operates in a coordinated processing architecture in which twin state manager 3710 maintains live digital twin representations and updates them based on incoming latent embeddings. Confidence envelope tracker 3720 assesses behavioral alignment continuously, independent of anomaly detection, while behavior template library 3730 provides initialization and assessment references. Adversarial latent simulator 3740 operates on demand to test system resilience and improve detection capability. The subsystem maintains bidirectional communication with geodesic modeling and anomaly detection engine 3600 to receive anomaly alerts and return updated behavioral baselines, supporting dynamic refinement of detection logic and learning algorithms.

Output from latent twin monitor subsystem 3700 includes twin divergence alerts, behavioral deviation assessments, and confidence scores that are provided to predictive simulation and deterrence engine 3800 for threat forecasting and intervention planning. Subsystem 3700 also supplies twin status updates and deviation metrics to visualization and tactical decision interface 3900 for operational awareness and analyst review. In addition, behavioral baseline data and updated twin models are shared with geodesic modeling and anomaly detection engine 3600 to enhance anomaly sensitivity and trajectory modeling. The subsystem maintains audit trails that document twin evolution, behavior history, and deviation scoring over time for attribution, training, and forensic analysis.

FIG. 38 is a block diagram illustrating exemplary architecture of predictive simulation and deterrence engine 3800, in an embodiment. Engine 3800 forecasts adversary behavior within the unified latent space and evaluates potential intervention strategies to prevent or mitigate emerging threats through strategic deterrence actions. It receives latent trajectory data from geodesic modeling and anomaly detection engine 3600 and twin divergence assessments from latent twin monitor subsystem 3700 to generate forward-looking behavioral predictions and assess the likely effects of various deterrence options. The engine applies advanced simulation techniques to project escalation scenarios, conflict trigger zones, and operational campaign progressions while modeling how preemptive actions—including messaging, posture adjustments, and cyber countermeasures—might influence adversary behavior and decision-making.

Latent path simulator 3810 projects adversary behavior forward in the latent space by analyzing current trajectories, behavioral baselines, and operational indicators. It generates multiple scenario trajectories representing plausible adversary courses of action, including escalation pathways, mission preparations, and multi-phase campaign sequences. The component is configured to perform Monte Carlo simulations and probabilistic modeling to produce ensemble forecasts that capture outcome uncertainty and behavioral variance. Latent path simulator 3810 models outcomes such as kinetic trigger conditions, conflict escalation thresholds, and cyber campaign evolution, ensuring temporal coherence and causal consistency across projection timelines.

Intervention simulation modeler 3820 evaluates how various deterrence strategies could alter forecasted adversary trajectories. It models the potential effects of decoy deployments, information operations, posture shifts, and cyber disruption measures by analyzing their influence on adversary response logic. The component simulates multiple levels of intervention timing, intensity, and coordination to assess impacts on adversary intent, decision latency, and campaign behavior. Simulation logic includes behavioral modeling, strategic goal analysis, and game-theoretic frameworks that account for cultural, organizational, and contextual factors affecting adversary decision-making under deterrence pressure.

Deterrence strategy recommender 3830 synthesizes simulation results to produce ranked intervention options with predicted impact scores. It evaluates each candidate deterrence action along dimensions such as effectiveness in modifying behavior, escalation risk, operational feasibility, and alignment with strategic objectives. The recommender includes capabilities for generating messaging and signaling guidance, exposure operations, and posture coordination suggestions. Multi-criteria decision analysis is used to rank outputs, and each recommendation is annotated with associated risk assessments, expected outcomes, and confidence indicators.

Engine 3800 operates in an integrated simulation architecture in which latent path simulator 3810 generates baseline behavioral forecasts, intervention simulation modeler 3820 assesses the effects of candidate deterrence actions, and deterrence strategy recommender 3830 outputs actionable guidance. The engine supports both long-term strategic campaign planning and short-term tactical response modeling and maintains scenario libraries to support retrospective analysis and adaptive strategy refinement. Feedback loops allow simulation parameters to be iteratively updated based on operational results or changes in strategic posture.

Engine 3800 maintains bidirectional communication with latent twin monitor subsystem 3700. It incorporates twin divergence signals into simulation inputs and provides updated trajectory expectations back to the twin monitor to refine confidence envelopes and behavioral baselines. The engine also receives anomaly and behavior trajectory data from geodesic modeling and anomaly detection engine 3600, informing simulation initialization and enhancing forecast accuracy. In return, engine 3800 supplies predicted activity paths and escalation likelihoods that improve anomaly pattern recognition and detection sensitivity in 3600.

In an embodiment, predictive simulation and deterrence engine 3800 incorporates adversary models that reflect historical behavior patterns, observed escalation thresholds, and known campaign structures. Deterrence simulations may include variations in timing, scale, and coordination of candidate actions. Simulated outcomes are evaluated based on divergence reduction in latent space trajectories, delay in projected threat convergence, or destabilization of adversary coordination signatures. Behavioral forecasting is adjusted in response to each simulated action to reflect likely adversary adaptation, with feedback loops that identify deterrence strategies capable of driving latent behavior back toward baseline confidence envelopes.

In various embodiments, candidate deterrence actions may include information operations (e.g., strategic message injection or exposure operations), posture signaling (e.g., ISR retasking, visible force movement), and cyber countermeasures (e.g., access disruption, beacon suppression, or traffic shaping). These actions are simulated in the latent space by modeling changes to adversary behavior paths, digital twin divergence metrics, and escalation probability over time. The system supports configuration of deterrence modes by domain (e.g., cyber, kinetic, psychological) and mission phase, enabling scenario-specific intervention planning aligned to command policy.

Each candidate deterrence action is assigned an impact score derived from simulated changes to threat trajectory, digital twin stability, and system confidence metrics. Additional scoring dimensions may include operational feasibility, risk of adversary counter-escalation, duration of effect, and latency of response. A multi-criteria decision model integrates these scores to rank intervention options, with sensitivity analysis tools available for analyst validation or override. In some embodiments, the system supports rules-based filtering to exclude actions based on legal, diplomatic, or mission policy constraints.

The deterrence engine operates within a closed-loop architecture by receiving real-world outcome feedback via continuous learning and model adaptation component 4000. Confirmed deterrence effectiveness, observed adversary reaction, and downstream intelligence collection results are used to retrain intervention simulation models, refine behavior forecasts, and update strategic guidance parameters. This adaptive loop enhances future simulation fidelity and supports refinement of latent-space representations to increase detection sensitivity and intervention effectiveness over time.

Output from predictive simulation and deterrence engine 3800 includes threat forecasts, escalation probability assessments, and prioritized deterrence recommendations. These outputs are transmitted to visualization and tactical decision interface 3900 for analyst review, situational awareness, and operational planning. Engine 3800 also provides simulation-derived guidance to dynamic tasking subsystem 130 for sensor retasking and collection prioritization, and communicates with mission communication infrastructure interface adapter 3940 to support execution of deterrence strategies across relevant operational channels. The engine maintains detailed records of simulation logic, assumptions, and outputs to support decision-maker confidence, reproducibility, and post-action effectiveness assessment.

FIG. 39 is a block diagram illustrating exemplary architecture of visualization and tactical decision interface 3900, in an embodiment. Interface 3900 provides comprehensive situational awareness and decision support capabilities by presenting latent space analysis, threat forecasts, and deterrence recommendations in formats suitable for both operational personnel and command-level decision-makers. It receives data from geodesic modeling and anomaly detection engine 3600, latent twin monitor subsystem 3700, and predictive simulation and deterrence engine 3800 to generate integrated displays that combine traditional geospatial intelligence with advanced latent analytics. The interface supports both real-time monitoring and strategic planning, enabling users to explore cross-domain relationships, validate system outputs, and coordinate response actions through interactive tools.

Latent space visualizer 3910 displays real-time positioning, drift, and clustering of entities and anomalies within the unified latent space created by latent hyperspace construction subsystem 3500. Visualizer 3910 includes multiple rendering modes—such as three-dimensional layouts, graph-based topology, and projection planes—that allow analysts to observe latent relationships and behavioral shifts not visible in traditional domain-specific views. The component supports interactive exploration including zoom, pan, and time-based tracing of latent trajectories. Visualizer 3910 provides color coding, icons, and threat markers to distinguish entity types, behavioral states, and alert conditions, with real-time overlays for anomalies flagged by engine 3600. In embodiments utilizing graph-based representations, the latent space visualizer may include a graph topology view, enabling users to observe nodes (e.g., individuals, facilities, devices) and edges (e.g., communications, movement paths, behavioral linkages) with real-time annotations. Analysts may explore high-centrality nodes, tightly connected subgraphs, or anomaly-flagged relationships using interactive graph queries. The interface may further support community structure overlays and path tracing tools to support threat attribution and escalation modeling.

Geo-cyber integrated display that unifies traditional Common Operational Picture (COP)/Common Intelligence Picture (CIP) dashboard 3920 overlays latent intelligence onto a geospatially contextualized COP elements with latent-derived cyber and behavioral insights. Dashboard 3920 incorporates latent representations derived from behavioral and AdTech inputs, such as pattern-of-life deviations, spoofing indicators, and sentiment shifts. It integrates anomaly alerts from latent anomaly detector 3620 and twin divergence assessments from confidence envelope tracker 3720, displaying them in relation to physical infrastructure, mission zones, and environmental context. The component supports layered visualization modes that allow operational users to view specific intelligence types, time slices, or forecast scenarios while maintaining situational coherence and mission alignment. Dashboard 3920 is optimized for shared operations center use, providing persistent tactical displays and briefing views.

Tactical Report (TACREP) generator 3930 produces formatted tactical and operational reports by transforming latent analysis outputs into standardized intelligence products. Generator 3930 generates situational summaries, anomaly rollups, twin divergence indicators, and recommended actions for distribution to relevant operational and command staff. The component includes automated report generation capabilities that support periodic updates, event-driven reports, and analyst-triggered products. It supports template customization to adapt content based on user role, mission phase, or classification level, while maintaining traceability to source data and analysis rationale. Output 4001 from TACREP generator 3930 comprises human-readable tactical reports, situation summaries, and decision-support products intended for consumption by analysts, operators, and command-level personnel.

Targeting interface adapter 3940 converts latent-derived threat forecasts into actionable targeting outputs. The component translates predicted adversary trajectories and geospatial anomaly locations into targetable coordinates, timing windows, and response options for integration with long-range strike platforms and networked fire control systems. Adapter 3940 includes coordinate transformation logic that maps latent positions to geospatial coordinates while accounting for movement predictions and uncertainty bounds. The component is configured to generate timing recommendations and target packages aligned with simulated deterrence options from deterrence strategy recommender 3830, and supports output protocols for direct integration with external tactical targeting networks or mission command interfaces and response coordination tools. Output 4002 from targeting interface adapter 3940 comprises machine-readable targeting data, timing recommendations, and latent-derived threat coordinates formatted for integration with external tactical targeting networks or mission command interfaces, weapon systems, and strike planning interfaces.

Interface 3900 is structured to support both individual analyst workstations and shared operations center environments. Latent space visualizer 3910 provides advanced exploratory tools for analysts, while geo-cyber dashboard 3920 offers shared, mission-oriented views. TACREP generator 3930 enables structured report production, and targeting interface adapter 3940 facilitates operational execution. The interface enforces role-based access controls, classification management, and auditability for all user interactions and outputs.

Interface 3900 maintains bidirectional communication with continuous learning and model adaptation component 4000 to support feedback-driven improvement of system accuracy and relevance. Analysts may confirm or modify detected anomalies, adjust relevance scores, and provide outcome feedback that is routed to system learning components. In turn, updates to visual display modules, recommendation logic, or data representations are pushed to interface 3900 to reflect evolving system capabilities and mission requirements.

Output from interface 3900 includes operational alerts, intelligence reports, and targeting data. These outputs are distributed to dynamic tasking subsystem 130 for collection reprioritization, multi-source intelligence fusion system 1040 for common intelligence picture updates, and tactical targeting networks or mission command interface components for response coordination. Interface 3900 also maintains full audit logs of analyst interactions, decision flows, and dissemination events to support accountability, traceability, and continuous interface performance evaluation.

FIG. 40 is a block diagram illustrating exemplary architecture of continuous learning and model adaptation component 4000, in an embodiment. Component 4000 ensures system evolution and responsiveness to changing threat landscapes by collecting operational feedback, refining analytical models, and adapting detection capabilities based on confirmed outcomes and emerging adversarial behaviors. It receives data from all subsystems of latent geocyber deterrence and threat detection system 3300, including ingestion, encoding, latent modeling, anomaly detection, twin monitoring, simulation, and interface components, as well as from external validation sources. Component 4000 both ingests operational and analyst-generated feedback and distributes updated models, parameters, and templates back to core system components, enabling a closed-loop learning architecture that maintains performance over time.

Feedback ingestion router 4010 collects ground-truth annotations, user confirmations, and validation data from across the architecture. Sources include analyst-reviewed anomaly assessments from visualization and tactical decision interface 3900, operational outcome reports from targeting interface adapter 3940, integration of new data modalities identified by multimodal ingestion layer 3300, and updated feature usage metrics from downstream encoders and models. Router 4010 normalizes incoming feedback, maintains provenance and source traceability, and supports both automated and analyst-initiated submission pipelines. It enables detailed corrections, contextual additions, and quality assessments to be captured for use in adaptive model refinement.

Model refinement engine 4020 performs incremental updates to latent fusion models, trajectory predictors, anomaly classifiers, and behavioral templates. It updates latent alignment parameters within cross-modal latent fusion engine 3610, geodesic baselines within geodesic behavior learner 3710, and detection thresholds in latent anomaly detector 3720. The engine also adapts twin models and behavioral templates used by latent twin monitor subsystem 3800 and simulation forecasting logic in predictive simulation engine 3900. Model refinement engine 4020 supports class-level and entity-specific updates, while employing continual learning techniques that prevent catastrophic forgetting and maintain backward compatibility with validated system behaviors. In graph-based embodiments, refinement of analytical models may further include updating graph topology or edge attributes based on newly ingested intelligence. For example, edge weights may be adjusted to reflect confidence scores, relationship strength, or temporal relevance. Embedding updates may correspond to node features in the graph, and anomaly detection algorithms may operate on evolving subgraphs reflecting adversary campaigns. Model refinement may further incorporate graph-specific learning methods such as graph convolutional networks (GCNs) or attention-based node ranking to improve detection sensitivity over time.

Adversarial simulation generator 4030 creates synthetic latent behavior trajectories that represent spoofing, evasion, and misdirection tactics used by threat actors. It trains and injects synthetic inputs into the detection pipeline to assess system robustness against new or previously unseen adversarial strategies. Scenarios include identity masking, deceptive movement, campaign obfuscation, and coordination concealment. Generator 4030 produces adversarial trajectories for stress-testing models in 3700, 3800, and 3900, while logging system responses to inform refinement.

Concept drift detector 4040 monitors the latent space for long-term distributional changes across modalities, behavior classes, or environmental factors. It analyzes latent embedding shifts, new class emergence, modality reweighting, and anomalous correlation patterns that may signal drift in adversary tactics or operational context. Upon detecting significant drift, detector 4040 triggers reinitialization or retraining of affected models, while maintaining temporal stability through versioned adaptation paths and rollback capability.

Component 4000 operates in a coordinated learning architecture: feedback ingestion router 4010 collects and normalizes feedback, model refinement engine 4020 adapts system behavior based on confirmed results, adversarial simulation generator 4030 tests robustness against synthetic threats, and concept drift detector 4040 ensures system adaptability to evolving operational conditions. The component supports both automated feedback loops and analyst-guided refinement, while maintaining full version control, provenance records, and audit trails of all learning operations.

Component 4000 maintains bidirectional integration with all subsystems in system 3300. It sends updated models, alignment parameters, and detection templates to latent hyperspace construction subsystem 3600, geodesic modeling and anomaly detection engine 3700, latent twin monitor subsystem 3800, predictive simulation and deterrence engine 3900, and interface 3900, while receiving raw feedback, system usage metrics, and performance indicators from components 3300 through 3900.

Output 4001 includes refined detection parameters, updated models, and behavioral templates distributed across the architecture to improve system accuracy and responsiveness. Component 4000 also provides adaptation assessments and performance summaries to interface 3900 for analyst review and maintains complete documentation of learning processes and model evolution for system transparency and auditability.

FIG. 41 is a flow diagram illustrating an exemplary end-to-end operational workflow for latent threat detection within system 3200, in an embodiment. The process begins at step 4101, where Priority Intelligence Requirements (PIRs) are received by multi-source intelligence fusion system 1040. These PIRs are parsed by a language model to extract structured parameters such as modality, geographic region, revisit frequency, and operational constraints.

At step 4102, a new campaign is instantiated based on the parsed PIR. This includes defining tasking scope, asset constraints, and collection feasibility. The dynamic tasking subsystem 130 generates sensor tasking instructions and collection windows, which are evaluated using the virtual satellite database 140 and queued through schedule manager 430.

At step 4103, multi-domain collection begins. Cyber telemetry, geospatial imagery, RF signals, behavioral indicators, and supply chain data are ingested by multimodal ingestion layer 3300. These streams are normalized and temporally aligned using alignment engine 3360 to create synchronized, provenance-tagged observation records.

At step 4104, modality-specific encoder layer 3400 processes the aligned data using neural network architectures tailored to each modality. The resulting embeddings are fused with spatial, temporal, and source metadata through metadata fusion layer 3450, preparing each record for cross-domain correlation.

At step 4105, latent hyperspace construction subsystem 3500 projects the enriched embeddings into a unified latent space. Cross-modal latent fusion engine 3510 aligns semantically similar events across modalities, and manifold optimization engine 3520 imposes temporal coherence and geometric consistency. The resulting latent space reflects both observed behavior and inferred proximity across cyber, RF, imagery, and behavioral domains.

At step 4106, geodesic behavior learner 3610 constructs baseline trajectories representing typical adversary behavior, facility operations, and campaign dynamics. These trajectories serve as references for deviation detection and predictive modeling.

At step 4107, latent anomaly detector 3620 evaluates incoming embeddings against the geodesic baselines. The system determines whether the observed latent trajectory deviates beyond configured thresholds for displacement, cross-modal inconsistency, or novelty. If the anomaly exceeds threshold, it is flagged for further analysis and routed to latent twin monitor subsystem 3700. If not, the embedding is archived and no alert is issued 4107*a*.

At step 4108, latent twin monitor subsystem 3700 evaluates the flagged behavior in the context of the relevant digital twin. The system determines whether the new behavior breaches the digital twin's confidence envelope based on learned baselines and template-informed tolerances. If the confidence envelope is breached, a twin divergence alert is triggered and passed to the predictive simulation engine. If the deviation remains within acceptable bounds, the twin model is updated passively without triggering escalation 4108*a*.

At step 4109, predictive simulation and deterrence engine 3800 receives the divergence alert and initiates forward simulation of potential adversary behavior in latent space. Latent path simulator 3810 projects multiple future trajectories, and intervention simulation modeler 3820 evaluates how posture changes, signaling, or cyber countermeasures may alter those outcomes. The system determines whether any modeled deterrence strategy produces a sufficient reduction in escalation risk or campaign momentum. If a viable intervention is identified, it is passed to the tactical interface for recommendation and execution. If not, the system logs the forecast and returns to monitoring 4109*a*.

At step 4110, visualization and tactical decision interface 3900 receives anomalies, forecasts, and strategy outputs. Latent trajectory visualizations, CIP overlays, and TACREPs are presented to analysts and operational commanders. Concurrently, if the deterrence engine produced targetable indicators, targeting interface adapter 3940 converts these into geospatial coordinates and transmission schedules.

At step 4111, dynamic tasking subsystem 130 reprioritizes collection planning based on latent anomalies and twin divergence. Retasking is issued to ISR platforms, with updated access windows coordinated through schedule manager 430 and feasibility assessments refreshed through virtual satellite database 140.

At step 4112, continuous learning and model adaptation component 4000 determines whether feedback is available from analyst validation, operational outcomes, or confirmation data. If feedback is available, it is routed through feedback ingestion router 4010 and applied to retrain encoders, update behavior templates, adjust scoring thresholds, and refine latent alignment parameters through model refinement engine 4020 4112*a*. If no feedback is available, the system continues with the current models and awaits future validation data 4112*b*.

This workflow illustrates the full intelligence cycle implemented by system 3200, in which PIRs are operationalized through collection, latent fusion, behavioral monitoring, forecasting, and adaptive tasking. Each phase includes decision logic to ensure that only validated anomalies trigger escalation, and that intervention planning is grounded in simulation-based evidence.

FIG. 42 is a flow diagram illustrating latent space fusion and geodesic trajectory modeling, in which multi-modal intelligence data is transformed into unified behavioral trajectories for cross-domain anomaly detection and predictive forecasting. is a flow diagram illustrating the latent space fusion and geodesic trajectory modeling process within latent hyperspace construction subsystem 3500 and geodesic modeling and anomaly detection engine 3600, in an embodiment. The process transforms heterogeneous, multi-modal intelligence data into unified latent trajectories suitable for anomaly detection, behavioral segmentation, and predictive modeling.

At step 4201, multi-modal observation records are received from multimodal data ingestion layer 3300, including normalized outputs from cyber telemetry ingestor 3310, geospatial intelligence ingestor 3320, RF and EW signal ingestor 3330, behavioral and AdTech ingestor 3340, and supply chain risk ingestor 3350. Each observation is temporally aligned and tagged with spatial coordinates, source lineage, and confidence metadata.

At step 4202, encoding begins in parallel across modality-specific encoder layer 3400. Imagery encoder 3410 processes visual and terrain data using convolutional or vision transformer models; cyber log encoder 3420 applies transformer-based architectures to network telemetry; RF/sensor encoder 3430 generates embeddings from signal features using spectrogram encoders; and social/language encoder 3440 transforms text and sentiment data using large language models. Each encoder produces standardized domain-specific embeddings.

At step 4203, cross-modal latent fusion engine 3510 aligns the embeddings into a unified latent space. The system applies contrastive learning to maximize similarity between temporally and spatially correlated inputs across modalities while preserving semantic integrity within each domain.

At step 4204, manifold optimization engine 3520 applies geometric constraints—such as Lorentzian or Riemannian manifold models—to maintain smooth latent trajectories, causal continuity, and anomaly separability within the fused space.

At step 4205, temporally indexed embedding sequences are assembled into latent trajectories. Historical embeddings are retrieved from latent embedding archive 3540 to extend the time series, allowing for continuous modeling across observation windows.

At step 4206, geodesic behavior learner 3610 analyzes the latent sequences to derive baseline trajectories reflecting typical adversary behavior, operational cycles, and mission-specific patterns. Learned geodesics include canonical sequences such as reconnaissance-to-execution transitions.

At step 4207, behavioral segmentation logic within geodesic behavior learner 3610 partitions latent trajectories into contextual regimes based on temporal, operational, or mission-phase characteristics. These include weekday versus weekend behavior, diurnal cycles, or staging versus active operations, enabling anomaly models to account for situational baselines.

At step 4208, trajectory projection logic within geodesic behavior learner 3610 extrapolates current latent positions through the learned geodesic space to generate future behavior forecasts. The system produces multiple plausible trajectories with associated confidence intervals for downstream use.

At step 4209, dynamic threshold calibration logic within latent anomaly detector 3620 adjusts anomaly scoring sensitivity based on entity type, historical variance, and mission context. This allows the system to detect significant deviations while minimizing false positives.

At step 4210, latent embedding archive 3540 stores the generated trajectories, geodesic baselines, and forecast models with temporal and entity indexing. This enables future backtracing, attribution analysis, and digital twin model initialization.

The outputs of this process include unified latent trajectories, baseline geodesic templates, and forecast models, which are provided to latent anomaly detector 3620 for deviation scoring and to latent twin monitor subsystem 3700 for confidence envelope tracking and behavior template alignment.

FIG. 43 is a flow diagram illustrating the digital twin divergence monitoring and alerting workflow implemented by latent twin monitor subsystem 3700, in an embodiment. This process maintains real-time latent behavioral baselines for high-value entities and regions, evaluates deviations from expected behavior using confidence envelopes, and triggers graduated alerting protocols based on deviation severity and operational context.

At step 4301, a digital twin is initialized by twin state manager 3710 when a new entity or region is selected for monitoring. Historical latent embeddings are retrieved from latent embedding archive 3540, and a behavioral baseline is established using available observation history.

At step 4302, behavior template library 3730 selects one or more templates relevant to the entity's classification, mission phase, or operational role. Templates may describe expected facility routines, platform movement patterns, cyber posture signatures, or regional sentiment trends.

At step 4303, confidence envelope tracker 3720 defines statistical tolerance envelopes around the behavioral baseline. These envelopes are computed based on historical variance, behavioral type, and entity criticality, forming a multidimensional latent boundary for normal behavior.

At step 4304, real-time monitoring begins. As new latent embeddings are received from latent hyperspace construction subsystem 3500, twin state manager 3710 updates the entity's behavioral trajectory and current latent position.

At step 4305, confidence envelope tracker 3720 calculates divergence scores by comparing the observed trajectory to the envelope boundaries. Both instantaneous and cumulative drift metrics are generated, and a behavioral alignment score is computed.

At step 4306, the system determines whether the divergence score exceeds configured thresholds. Adaptive thresholds may be applied based on the entity's operational state, behavior variability, or priority tier.

At step 4307, if divergence exceeds threshold, the system generates a graduated alert. Minor deviations trigger monitoring alerts, moderate deviations initiate tactical warnings 4307*a*, and critical breaches result in escalation alerts flagged for immediate analyst or command review.

At step 4308, if the alert is classified as significant, causal analysis is initiated. The system queries cross-modality query engine 3640 to retrieve corroborating signals and activates causal path inference engine 3650 to identify latent precursors or coordinated activity patterns.

At step 4309, the divergence alert is passed to predictive simulation and deterrence engine 3800. Latent path simulator 3810 projects likely future behavior, and intervention simulation modeler 3820 evaluates candidate deterrence strategies to return the trajectory to normative bounds.

At step 4310, twin state manager 3710 updates the digital twin model. If the deviation is within acceptable variance, the baseline is updated accordingly. If the deviation reflects a confirmed behavioral shift, the system may revise templates or expand the envelope.

At step 4311, escalation protocols are applied. Alerts are transmitted to visualization and tactical decision interface 3900, with routing based on severity. Tactical alerts are presented to analysts; strategic alerts may be escalated to command authorities or linked to targeting interface adapter 3940.

At step 4312, if the behavioral pattern exhibits characteristics of spoofing, deception, or adversarial masking, adversarial latent simulator 3740 is invoked. The simulator generates synthetic threat trajectories to evaluate whether the observed deviation aligns with known deception tactics and tests the robustness of the current twin model.

This workflow enables system 3200 to maintain persistent behavioral awareness, apply adaptive tolerance thresholds, and initiate appropriate response workflows across monitoring, attribution, and deterrence systems.

FIG. 44 is a flow diagram illustrating the deterrence simulation and outcome forecasting workflow implemented by predictive simulation and deterrence engine 3800, in an embodiment. This process transforms threat indicators into forward behavioral projections, models potential interventions, and produces prioritized deterrence strategies with risk-adjusted impact forecasts.

At step 4401, simulation is initialized when divergence alerts are received from latent twin monitor subsystem 3700 or anomaly signals from geodesic modeling and anomaly detection engine 3600. The system establishes simulation parameters using the current latent state, threat classification, and mission context.

At step 4402, latent path simulator 3810 generates forward behavioral projections by extrapolating current trajectories using historical patterns and geodesic baselines. Monte Carlo simulation techniques produce ensemble forecasts representing plausible adversary outcomes.

At step 4403, escalation modeling logic identifies critical paths within the forecast set, flagging those that may lead to mission success, conflict escalation, or kinetic triggers.

At step 4404, candidate interventions are generated based on forecasted paths and operational constraints. Options may include posture shifts, cyber effects, messaging, exposure operations, or signaling measures.

At step 4405, intervention simulation modeler 3820 evaluates each candidate by simulating its influence on projected latent behavior, campaign timing, and adversary decision-making dynamics.

At step 4406, outcome probability assessment estimates effectiveness for each intervention using likelihood scores, confidence bounds, and risk indicators derived from historical adversary behavior and operational context.

At step 4407, deterrence strategy recommender 3830 performs multi-criteria analysis to rank interventions by expected impact, escalation risk, and strategic alignment.

At step 4408, timing optimization logic identifies windows where interventions are most likely to succeed, based on trajectory evolution and adversary decision cycles.

At step 4409, if an intervention includes messaging elements, strategy recommender 3830 generates timing and content guidance, including delivery mode and audience targeting.

At step 4410, execution outputs are transmitted to visualization and tactical decision interface 3900 and, where applicable, to targeting interface adapter 3940. Outputs include risk assessments, implementation instructions, and escalation thresholds.

At step 4411, outcome monitoring begins, comparing actual adversary response to simulation forecasts. Results are used to update behavior models via continuous learning and model adaptation component 4000.

This workflow enables system 3200 to transition from passive threat detection to proactive deterrence planning through behavioral forecasting, intervention simulation, and time-sensitive operational guidance.

FIG. 45 is a flow diagram illustrating the cross-domain anomaly triangulation and attribution workflow implemented by geodesic modeling and anomaly detection engine 3600, in an embodiment. This workflow transforms a single-modality latent anomaly into a comprehensive multi-domain threat attribution process by identifying corroborating evidence across intelligence domains, reconstructing causal relationships, and generating targeted collection requirements to resolve attribution uncertainty.

At step 4501, latent anomaly detector 3620 identifies a behavioral deviation in a single modality that exceeds configured thresholds. The anomaly is tagged with latent coordinates, a confidence score, and domain-specific indicators.

At step 4502, cross-modality query engine 3640 performs a latent neighborhood search, retrieving temporally and spatially proximate embeddings from other modalities (e.g., cyber, GEOINT, RF, behavioral) to discover potentially correlated signals.

At step 4503, cross-modality query engine 3640 evaluates retrieved embeddings for temporal alignment, spatial proximity, and semantic consistency. Signals are scored based on whether they reinforce the original anomaly, contradict it, or provide complementary indicators.

At step 4504, causal path inference engine 3650 conducts temporal context analysis by examining activity before and after the anomaly to identify precursor behaviors or post-event effects. This step establishes a chronological framework for causality assessment.

At step 4505, causal path inference engine 3650 performs reverse trajectory reconstruction within latent space, generating candidate causal chains and identifying possible operational precursors, setup activities, or coordinated behaviors. This process leverages geodesic baselines learned by geodesic behavior learner 3610 to guide trajectory reconstruction and ensure temporal plausibility.

At step 4506, causal path inference engine 3650 generates attribution hypotheses by integrating correlated signals and inferred causal paths into structured candidate explanations. Each hypothesis is scored for alignment with known tactics, techniques, and procedures (TTPs).

At step 4507, probabilistic fusion logic within geodesic modeling and anomaly detection engine 3600 performs confidence-weighted evidence integration. The system applies Bayesian inference or equivalent probabilistic models to evaluate the aggregated support for each hypothesis across modalities.

At step 4508, collection gap analysis logic within dynamic tasking subsystem 130 examines the attribution hypothesis structure to identify information shortfalls. The system determines which additional data—by modality, time window, or location—could improve attribution confidence.

At step 4509, tasking planner within dynamic tasking subsystem 130 generates specific collection requirements to close identified intelligence gaps. Tasking directives include spatial coordinates, temporal windows, modality specifications, and priority levels.

At step 4510, latent anomaly detector 3620, in coordination with geodesic modeling and anomaly detection engine 3600, evaluates new observations received in response to tasking. Attribution hypotheses are confirmed, revised, or rejected based on the incoming evidence.

At step 4511, attribution reporting component of geodesic modeling and anomaly detection engine 3600 produces a final attribution confidence update. Structured reports are generated with confidence scores, signal lineage, hypothesis ranking, and recommendations for further investigation or operational response.

At step 4512, if attribution confidence exceeds operational thresholds, multi-source intelligence fusion system 1040 updates the common intelligence picture with attribution metadata. In parallel, predictive simulation and deterrence engine 3800 may be triggered to evaluate response strategies, and continuous learning and model adaptation component 4000 receives feedback for use in future anomaly correlation training.

This workflow enables system 3200 to escalate isolated latent anomalies into actionable multi-domain threat assessments through intelligent signal fusion, causal inference, and ISR-guided attribution planning.

FIG. 46 is a flow diagram illustrating the real-time ISR integration and tasking flow implemented by latent geocyber deterrence and threat detection system 3200, in an embodiment. This workflow demonstrates how latent space analytics directly drive operational collection and response through seamless integration with dynamic ISR systems and enterprise tasking infrastructure.

At step 4601, latent threat detection occurs when any component of system 3200 produces actionable intelligence. This may include anomaly alerts from latent anomaly detector 3620, digital twin divergence notifications from latent twin monitor subsystem 3700, deterrence recommendations from predictive simulation and deterrence engine 3800, or attribution assessments from geodesic modeling and anomaly detection engine 3600.

At step 4602, threat prioritization logic within system 3200 evaluates the operational significance of each detection. This evaluation considers confidence scores, entity criticality, escalation potential, and alignment with strategic objectives to assign a priority level for tasking and response.

At step 4603, latent collection requirement generation translates the threat into concrete ISR needs. Geographic location, timing windows, modality selection, and resolution thresholds are derived from the latent indicators and formatted according to tasking protocols.

At step 4604, the system's ISR tasking interface formats these requirements for handoff to dynamic tasking subsystem 130. This interface layer converts latent-derived intelligence into structured tasking requests compatible with the base system's collection orchestration logic.

At step 4605, dynamic tasking subsystem 130 queries virtual satellite database 140 to identify candidate platforms, assess orbital geometry, and evaluate provider capabilities against the tasking requirements.

At step 4606, a multi-constraint feasibility assessment is performed. This combines threat-derived collection needs with environmental conditions from live context data aggregator 180, orbital access data from space domain awareness system 1020, and other physical constraints to determine viable options.

At step 4607, task prioritization logic within dynamic tasking subsystem 130 integrates latent-derived urgency with ongoing campaigns and available ISR resources to finalize asset allocation and execution order.

At step 4608, schedule manager 430 and satellite data acquisition optimization platform 1080 execute sensor retasking. Tasking spans multiple modalities including imagery, signals intelligence, and behavioral indicators, selected to support the latent threat profile. Collection feasibility logic executed by dynamic tasking subsystem 130 integrates physical constraints and orbital geometry assessments as described in FIG. 23, including terrain-weighted raster overlays and multi-constraint scheduling windows.

At step 4609, visualization and tactical decision interface 3900 updates the common intelligence picture maintained by multi-source fusion system 1040. This includes threat alerts, collection tasking status, and predictive trajectory overlays.

At step 4610, targeting interface adapter 3940 activates when the threat reaches a high-priority escalation threshold. Latent-derived target coordinates and deterrence strategies are translated into taskable tactical targeting networks or mission command interfaces for integration with strike networks and tactical response systems.

At step 4611, multi-platform collection is executed. ISR sensors collect according to the retasked plan, and data is routed through satellite data acquisition optimization platform 1080 and containerized analytics workbench 1010 for preprocessing and enhancement.

At step 4612, results integration feeds the collected intelligence back into multimodal data ingestion layer 3300. The data is encoded, fused into latent space, and correlated with existing behavioral trajectories and threat hypotheses.

At step 4613, continuous learning and model adaptation component 4000 compares observed outcomes against predicted trajectories. Behavioral templates, geodesic baselines, and anomaly scoring models are refined to improve sensitivity and forecasting accuracy in future detection cycles.

This workflow illustrates the operational value of latent space analysis by demonstrating its direct integration with ISR tasking, dynamic response coordination, and adaptive system learning.

In a non-limiting use case example, system 3200 is deployed to monitor suspected covert military buildup near a contested coastal region with intermittent ISR coverage and degraded communication conditions. The operational goal is to detect early indicators of adversary force staging, assess strategic intent, and dynamically coordinate collection and deterrence efforts.

At campaign startup, multi-source intelligence fusion system 1040 receives a Priority Intelligence Requirement (PIR) specifying the need to identify anomalous maritime activity and associated land-based logistical staging. The PIR is processed by a language model to generate structured tasking criteria, which are used to initiate a new collection campaign via dynamic tasking subsystem 130 (base patent). The campaign includes spatial and temporal bounds and is handed off to latent geocyber deterrence and threat detection system 3200 for execution.

As data is collected from satellites, cyber sensors, RF monitors, and behavioral telemetry, it flows into multimodal data ingestion layer 3300, which includes the cyber telemetry ingestor 3310, geospatial intelligence ingestor 3320, RF and EW signal ingestor 3330, behavioral and AdTech ingestor 3340, and supply chain risk ingestor 3350. These components normalize and align diverse inputs across time and space, tagging them with source lineage and quality scores.

Encoded by modality-specific encoder layer 3400, incoming data is transformed into latent embeddings using neural architectures optimized per modality: vision transformers for imagery (imagery encoder 3410), transformers for log data (cyber log encoder 3420), spectrogram encoders for RF (RF/sensor encoder 3430), and large language models for open-source and behavioral signals (social/language encoder 3440). Metadata fusion layer 3450 appends contextual tags to each embedding.

These embeddings are then projected into a shared mathematical space by latent hyperspace construction subsystem 3500. The cross-modal latent fusion engine 3510 aligns embeddings via contrastive learning, while the manifold optimization engine 3520 imposes temporal and geometric structure. Latent terrain mapper 3530 identifies under-observed latent regions adjacent to known maritime traffic zones. Latent embeddings are indexed and archived in latent embedding archive 3540 for future attribution.

Within geodesic modeling and anomaly detection engine 3600, geodesic behavior learner 3610 establishes baselines for ship routing, radar activation cycles, and logistical support behavior. When a cluster of AIS-disabled vessels approach the region, latent anomaly detector 3620 flags their unexpected routing pattern. Simultaneously, device cohesion detector 3630 identifies synchronized movement from behavioral data, suggesting convoy-like dynamics. Cross-modality query engine 3640 correlates this with unusual RF emissions, while causal path inference engine 3650 reconstructs backward trajectories to identify prior refueling and loading phases, likely missed in initial collection.

These anomalies are evaluated by latent twin monitor subsystem 3700, which maintains entity-specific and regional twins. Twin state manager 3710 tracks deviations against behavioral templates selected by behavior template library 3730. A breach in confidence envelopes calculated by confidence envelope tracker 3720 triggers an escalation alert. To test twin robustness, adversarial latent simulator 3740 generates spoofing trajectories, verifying that the observed pattern is consistent with adversary movement—not a false positive.

The alert is passed to predictive simulation and deterrence engine 3800. Latent path simulator 3810 projects future staging and potential amphibious landing scenarios. Intervention simulation modeler 3820 evaluates multiple deterrence strategies, including posture signaling and cyber disruptions, while deterrence strategy recommender 3830 produces a prioritized course of action with messaging windows and risk-weighted impact scores.

The selected strategy includes ISR intensification and maritime messaging. Latent-derived collection requirements are passed to dynamic tasking subsystem 130, which interfaces with virtual satellite database 140 to identify suitable platforms. Schedule manager 430 and satellite data acquisition optimization platform 1080 (base patent) retask satellites and SIGINT sensors. Environmental feasibility is confirmed using live context data aggregator 180, which pulls current cloud cover and comms interference metrics.

Collection outputs feed into containerized analytics workbench 1010, where enhanced imagery and signal data are processed and returned to multimodal data ingestion layer 3300. The updated embeddings confirm the presence of landing equipment, escalating the twin divergence further.

Visual overlays are published to visualization and tactical decision interface 3900, with trajectory overlays and CIP updates pushed through multi-source intelligence fusion system 1040. For time-sensitive response, targeting interface adapter 3940 generates pre-coordinated targetable coordinates derived from the latent forecast.

Finally, continuous learning and model adaptation component 4000 ingests the operational outcome and analyst validation. Feedback ingestion router 4010 collects real-world observations, model refinement engine 4020 updates behavior templates and scoring logic, and concept drift detector 4040 verifies that no retraining threshold has been crossed. The result is a refined detection model, now sensitized to early-stage maritime force projection under signal concealment.

This example demonstrates how system 3200 operates across the full intelligence cycle—ingestion, latent modeling, anomaly detection, forecasting, ISR tasking, and continuous refinement—while seamlessly integrating with existing systems described in the base patent to convert complex threat signatures into decisive ISR and deterrence operations.

In a non-limiting use case example, an integrated intelligence architecture comprising system 3200 and fusion engine 1800 is deployed to monitor the potential militarization of a disputed inland logistics corridor. The operational objective is to detect adversarial force aggregation under civilian cover, project likely campaign trajectories, and enable early strategic signaling to deter escalation.

The workflow begins when a Priority Intelligence Requirement (PIR) is issued through the multi-source intelligence fusion system, specifying the need to monitor anomalous construction activity, force staging indicators, and logistics pattern deviations in a defined area of interest. The PIR is parsed into structured tasking criteria and used to instantiate a new campaign via the campaign orchestration component of fusion engine 1800. A campaign object is created with spatial and temporal constraints, target classifications, and modality preferences.

As intelligence is collected, it is ingested and normalized by the ingestion and ETL components of the base system, which receive and process data from satellite imagery, RF monitoring, cyber telemetry, and behavioral indicators. Spatiotemporal correlation is performed to associate and track reported entities over time, with confidence metrics derived from track clustering and posterior filtering logic.

System 3200 operates concurrently by ingesting the same intelligence streams through its multimodal data ingestion layer. Cyber telemetry, behavioral observations, RF signals, and facility imagery are routed through modality-specific encoders and projected into latent space via the latent hyperspace construction subsystem. Cross-modal fusion and manifold optimization create coherent behavioral representations used for cross-domain correlation and predictive modeling.

Within system 3200, geodesic modeling and anomaly detection identifies deviations from established baselines. Anomalies are triggered by a pattern of synchronized vehicle movements, cyber spoofing behavior, and previously undocumented logistics flows converging at a depot facility. Causal reconstruction traces prior events to a spoofed component shipment, evaluated against terrain-aware mobility constraints to filter implausible paths.

Latent twin monitoring confirms a breach of the expected behavior envelope for the depot, triggering an alert. Predictive simulation and deterrence components project future adversary actions and evaluate intervention strategies. Based on forecasted escalation, the system recommends ISR intensification and exposure operations timed to adversary decision cycles.

These recommendations are passed to the dynamic tasking subsystem, which queries the virtual satellite database to identify suitable collection assets. Environmental feasibility is assessed using live context data, including weather and orbital access. The satellite data acquisition optimization platform generates an updated collection plan, and the schedule manager issues tasking instructions.

New imagery and signals data are processed through the containerized analytics workbench, including enhancement, pattern recognition, and geolocation. Updated observations are passed to fusion engine 1800, which refines track scoring and adjusts campaign weightings based on the new evidence. In parallel, the same data is re-encoded in system 3200 to update latent forecasts and confirm digital twin divergence.

Threat overlays, confidence scores, and predictive trajectories are published to the visualization and tactical decision interface. Alerts are also transmitted to a tactical targeting network or mission command interface adapter, which prepares targeting outputs for integration with over-the-horizon response systems. The updated situational picture is reflected across the CIP dashboard.

Finally, results are ingested by the continuous learning and model adaptation component. Confirmed outcomes are used to refine anomaly thresholds, retrain trajectory models, and adjust behavioral templates for future monitoring. This use case demonstrates how system 3200 builds on the orchestration, ingestion, tracking, prediction, and scoring logic of fusion engine 1800 and the broader base architecture to extend traditional ISR operations into proactive, simulation-informed deterrence and threat attribution.

It will be understood that the foregoing use case examples are presented for illustrative purposes only and is not intended to be limiting. The example demonstrates one embodiment of how system 3200 may operate in coordination with base system components to perform latent space threat detection, predictive modeling, ISR tasking, and deterrence execution in a maritime domain. However, the systems and methods described herein are broadly applicable across a wide range of operational contexts and intelligence disciplines.

Other non-limiting use case examples may include detecting coordinated cyber reconnaissance and lateral movement across enterprise networks, identifying infrastructure spoofing or deceptive logistics movements using fused behavioral and RF indicators, monitoring population sentiment divergence in geopolitical gray zones, or tracking distributed adversarial campaign phases across cyber, geospatial, and human terrain. In each case, system 3200 may ingest domain-specific observations, encode them into latent representations, evaluate behavioral deviations against learned baselines, simulate possible adversary courses of action, and generate tasking or deterrence recommendations through integrated system interfaces.

Accordingly, the scope of the present disclosure should not be limited to the particular implementations, workflows, or domain-specific examples described herein. Variations in system topology, data source integration, modeling techniques, operational roles, deployment environments, and user interface design are considered within the scope of the inventive concepts. Functional subsystems may be embodied in software, hardware, firmware, or any combination thereof, and may be deployed centrally, at the edge, or in hybrid configurations adapted to mission or organizational requirements. The claims are intended to cover all such modifications, equivalents, and variations as fall within the spirit and scope of the appended claims.

Exemplary Computing Environment

Figure 9:
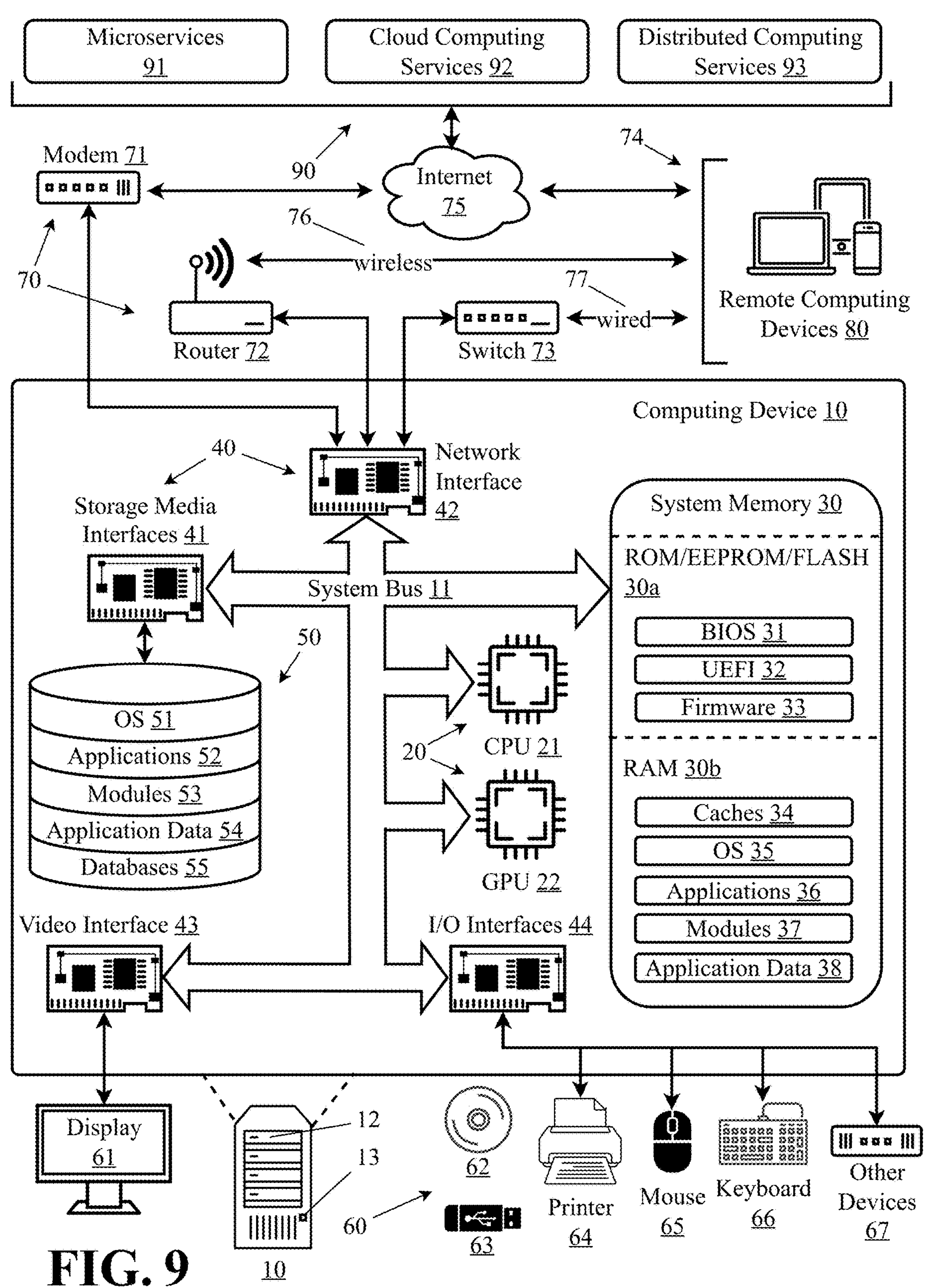
FIG. 9 illustrates an exemplary computing environment on which an embodiment described herein may be implemented.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths;

tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, and low latency, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities. NAND flash memory comes in different types, such as Single-Level Cell (SLC), Multi-Level Cell (MLC), Triple-Level Cell (TLC), and Quad-Level Cell (QLC), each with trade-offs between performance, and endurance. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as performance and availability. For example, Terraform can be used to automatically provision and scale resources on AWS spot instances during periods of high demand, such as for surge rendering tasks, to take advantage while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a container file or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for generating a common intelligence picture using latent space fusion and threat forecasting, the computing system comprising:

one or more processors configured to:

process Priority Intelligence Requirements (PIRs) using a language model and machine learning models to derive operational objectives, generate structured tasking instructions, and prioritize multi-modal sensor collection;

execute multi-phase intelligence operations including tasking, data ingestion, processing, analysis, dissemination, and feedback based on PIR-derived objectives;

encode intelligence data from geospatial, cyber, radio frequency, and behavioral sources using modality-specific encoders to generate domain embeddings;

fuse the domain embeddings into a unified latent space using contrastive learning or manifold optimization techniques;

construct latent trajectories over time and detect cross-domain anomalies based on deviations from expected geodesics, cross-modal inconsistencies, or latent displacement, thereby generating latent anomaly data;

maintain digital twin models for entities or regions selected for monitoring, track divergence from learned behavioral baselines, and compute deviation scores;

simulate adversary behavior within the unified latent space to forecast potential escalation or activity paths, and evaluate candidate deterrence actions, and generate deterrence simulation results;

recommend intervention options including timing, messaging, or posture changes based on latent divergence and projected outcomes; and generate and update intelligence visualizations, alerts, and reports based on latent anomalies, digital twin divergence, and deterrence simulation results.

2. The computing system of claim 1, wherein each modality-specific encoder transforms data into domain-specific embeddings using neural network architectures optimized for one or more input modality characteristics.

3. The computing system of claim 1, wherein the unified latent space is constructed using a contrastive learning framework that aligns multi-modal embeddings by maximizing similarity for temporally and spatially co-occurring inputs while preserving temporal coherence.

4. The computing system of claim 1, wherein constructing latent trajectories over time comprises generating time-sequenced behavioral paths within the unified latent space, and wherein detecting cross-domain anomalies comprises detecting deviations of the time-sequenced behavioral paths from expected geodesic movement within the unified latent space.

5. The computing system of claim 1, wherein each digital twin model is initialized with a latent behavioral baseline and a set of learned activity templates, and is configured to compute a divergence score when real-time entity behavior exceeds configured confidence thresholds.

6. The computing system of claim 1, wherein the computing system is further configured to perform causal path inference by identifying candidate latent trajectories that precede a detected anomaly, thereby enabling reverse attribution of precursor activities.

7. The computing system of claim 1, wherein the computing system evaluates potential deterrence actions by simulating their effect on projected adversary behavior within latent space and by adjusting future trajectory forecasts based on modeled intervention outcomes.

8. The computing system of claim 1, wherein each deterrence simulation result comprises a calculation of intervention impact based on changes to forecasted latent behavior, digital twin stability, and projected threat likelihood.

9. The computing system of claim 1, wherein the unified latent space is implemented as a graph structure comprising nodes representing entities and edges representing observed or inferred relationships, and wherein anomaly detection comprises identifying anomalous subgraphs, edge patterns, or node centrality shifts indicative of adversary activity.

10. The computing system of claim 1, wherein the computing system comprises a geospatially contextualized operational dashboard that presents the latent trajectories, detected anomalies, and forecasted escalation.

11. A computer-implemented method for generating a common intelligence picture using latent space fusion and threat forecasting, the method comprising:

processing Priority Intelligence Requirements (PIRs) using a language model and machine learning models to derive operational objectives, generate structured tasking instructions and prioritize multi-modal sensor collection;

executing multi-phase intelligence operations including tasking, data ingestion, processing, analysis, dissemination, and feedback based on PR-derived objectives;

encoding intelligence data from geospatial, cyber, radio frequency, and behavioral sources using modality-specific encoders to generate domain embeddings;

fusing the domain embeddings into a unified latent space using contrastive learning or manifold optimization techniques;

constructing latent trajectories over time and detecting cross-domain anomalies based on deviations from expected geodesics, cross-modal inconsistencies, or latent displacement, thereby generating latent anomaly data;

maintaining digital twin models for entities or regions selected for monitoring, tracking divergence from learned behavioral baselines, and computing deviation scores;

simulating adversary behavior within the unified latent space to forecast potential escalation or activity paths, evaluating candidate deterrence actions, and generating deterrence simulation results;

recommending intervention options including timing, messaging, or posture changes based on latent divergence and projected outcomes; and generating and updating intelligence visualizations, alerts, and reports based on latent anomalies, digital twin divergence, and deterrence simulation results.

12. The method of claim 11, wherein encoding the intelligence data comprises transforming data into domain-specific embeddings using neural network architectures optimized for the one or more input modality characteristics.

13. The method of claim 11, wherein fusing the domain embeddings comprises constructing the unified latent space using a contrastive learning framework that aligns multimodal embeddings by maximizing similarity for temporally and spatially co-occurring inputs while preserving temporal coherence.

14. The method of claim 11, wherein constructing latent trajectories comprises generating time-sequenced behavioral paths, and wherein detecting cross-domain anomalies comprises detecting observed divergence from expected movement through the unified latent space.

15. The method of claim 11, wherein maintaining digital twin models comprises initializing each digital twin model with a latent behavioral baseline and a set of learned activity templates, and computing a divergence score when real-time entity behavior exceeds configured confidence thresholds.

16. The method of claim 11, further comprising performing causal path inference by identifying candidate latent trajectories that precede a detected anomaly, thereby enabling reverse attribution of precursor activities.

17. The method of claim 11, wherein evaluating candidate deterrence actions comprises simulating their effect on projected adversary behavior within latent space and adjusting future trajectory forecasts based on modeled intervention outcomes.

18. The method of claim 11, wherein simulating adversary behavior comprises calculating intervention impact based on changes to forecasted latent behavior, digital twin stability, and projected threat likelihood.

19. The method of claim 11, wherein the unified latent space is implemented as a graph structure comprising nodes representing entities and edges representing observed or inferred relationships, and wherein detecting cross-domain anomalies comprises identifying anomalous subgraphs, edge patterns, or node centrality shifts indicative of adversary activity.

20. The method of claim 11, further comprising presenting the constructed latent trajectories, detected anomalies, and forecasted escalation within a geospatially contextualized operational dashboard through a visualization interface.

* * * * *